US010287988B2

(12) United States Patent
Asati et al.

(10) Patent No.: US 10,287,988 B2
(45) Date of Patent: May 14, 2019

(54) METHODS AND SYSTEMS FOR ENHANCING OPERATION OF POWER PLANT GENERATING UNITS AND SYSTEMS

(71) Applicant: General Electric Company, Schenectady, NY (US)

(72) Inventors: Mahesh Kumar Asati, Greenville, SC (US); Peter John Eisenzopf, Altamont, NY (US)

(73) Assignee: General Electric Company, Schenectady, NY (US)

(*) Notice: Subject to any disclaimer, the term of this patent is extended or adjusted under 35 U.S.C. 154(b) by 446 days.

(21) Appl. No.: 15/083,237

(22) Filed: Mar. 28, 2016

(65) Prior Publication Data
US 2016/0281607 A1 Sep. 29, 2016

Related U.S. Application Data

(60) Provisional application No. 62/139,468, filed on Mar. 27, 2015, provisional application No. 62/139,471, (Continued)

(51) Int. Cl.
F02C 7/26 (2006.01)
F02C 6/18 (2006.01)
F01K 23/10 (2006.01)
F02C 9/28 (2006.01)
F01K 13/00 (2006.01)

(52) U.S. Cl.
CPC .............. *F02C 7/26* (2013.01); *F01K 13/00* (2013.01); *F01K 23/10* (2013.01); *F02C 6/18* (2013.01); *F02C 9/28* (2013.01); *Y02E 20/16* (2013.01)

(58) Field of Classification Search
CPC .. F01K 13/00; F01K 23/10; F02C 6/18; F02C 7/26; F02C 9/28
See application file for complete search history.

(56) References Cited

U.S. PATENT DOCUMENTS 6,164,057 A 12/2000 Rowen et al.
6,167,547 A 12/2000 Senechal et al.
(Continued)

*Primary Examiner* — Mohammad Ali
*Assistant Examiner* — Vincent W Chang
(74) *Attorney, Agent, or Firm* — Mark E. Henderson; Ernest G. Cusick; Frank A. Landgraff

(57) ABSTRACT

A method for controlling and enhancing a startup operation for a combined cycle power block (block) having at least one gas turbine and at least one steam turbine, wherein operating parameters define performance and operational characteristics for the startup operation, the method comprising: receiving measured operating parameters from a plurality of reference blocks and, for each of the plurality of reference blocks, a plurality of types of the startup operations; given the measured operating parameters, developing one or more reference transfer functions between two of the measured operating parameters; receiving measured operating parameters from the startup operation of a target block; given the measured operating parameters from the target block, developing one or more transfer functions for the target block between two of the operating parameters; selecting one of the reference transfer functions; and normalizing the transfer function of the target block per the selected reference transfer function.

19 Claims, 49 Drawing Sheets

Related U.S. Application Data filed on Mar. 27, 2015, provisional application No. 62/139,510, filed on Mar. 27, 2015, provisional application No. 62/139,507, filed on Mar. 27, 2015.

(56) References Cited

U.S. PATENT DOCUMENTS

| | | |
|---|---|---|
| 6,278,899 B1 | 8/2001 | Piche et al. |
| 6,304,539 B1 | 10/2001 | Okamoto |
| 6,335,913 B1 | 1/2002 | Okamoto |
| 7,058,552 B2 | 6/2006 | Stothert et al. |
| 7,356,383 B2 | 4/2008 | Pechtl et al. |
| 7,474,080 B2 | 1/2009 | Huff et al. |
| 7,805,207 B2 | 9/2010 | El Rifai |
| 7,974,826 B2 | 7/2011 | Davari et al. |
| 8,080,887 B2 | 12/2011 | Radl |
| 8,126,629 B2 | 2/2012 | Buchalter et al. |
| 8,135,568 B2 | 3/2012 | Pandey et al. |
| 8,156,251 B1 | 4/2012 | Sorenson et al. |
| 8,352,148 B2 | 1/2013 | D'Amato et al. |
| 8,396,608 B2 | 3/2013 | Subbloie |
| 8,504,407 B2 | 8/2013 | Sacks et al. |
| 8,538,593 B2 | 9/2013 | Sun et al. |
| 8,620,482 B2 | 12/2013 | Muller |
| 8,639,480 B2 | 1/2014 | Arnold et al. |
| 8,797,199 B1 | 8/2014 | Goodnow |
| 8,798,801 B2 | 8/2014 | Subbloie |
| 8,816,531 B2 | 8/2014 | Krok et al. |
| 2002/0173897 A1* | 11/2002 | Leamy ............ F02C 9/28 701/100 |
| 2004/0257858 A1 | 12/2004 | Mansingh et al. |
| 2010/0292813 A1 | 11/2010 | Boiko et al. |
| 2011/0071692 A1* | 3/2011 | D'Amato ............ G05B 17/02 700/291 |
| 2013/0197676 A1 | 8/2013 | Salsbury et al. |
| 2013/0282195 A1 | 10/2013 | O'Connor et al. |
| 2014/0150438 A1 | 6/2014 | Ellis et al. |
| 2016/0247074 A1* | 8/2016 | Takeuchi ............ F01D 19/02 |

\* cited by examiner

METHODS AND SYSTEMS FOR ENHANCING OPERATION OF POWER PLANT GENERATING UNITS AND SYSTEMS

CROSS-REFERENCE TO RELATED APPLICATIONS

This application claims priority to U.S. Provisional patent application No. 62/139,471 entitled "METHODS AND SYSTEMS FOR ENHANCING OPERATION OF POWER PLANT GENERATING UNITS AND SYSTEMS" filed on Mar. 27, 2015; U.S. Provisional patent application No. 62/139,510 entitled "METHODS AND SYSTEMS FOR ENHANCING OPERATION OF POWER PLANT GENERATING UNITS AND SYSTEMS" filed on Mar. 27, 2015; U.S. Provisional patent application No. 62/139,507 entitled "METHODS AND SYSTEMS FOR ENHANCING OPERATION OF POWER PLANT GENERATING UNITS AND SYSTEMS" filed on Mar. 27, 2015; U.S. Provisional patent application No. 62/139,468 entitled "METHODS AND SYSTEMS FOR ENHANCING OPERATION OF POWER PLANT GENERATING UNITS AND SYSTEMS" filed on Mar. 27, 2015; which provisional applications are incorporated herein by reference in their entirety; this application claims the benefit of the provisionals' filing date under 35 U.S.C. 119(e).

BACKGROUND OF THE INVENTION

The invention of the present application relates generally to power generation and, more particularly, to methods and systems related to the economic and performance optimization and/or enhancement of power plants having thermal generating units in design or operation.

In electric power systems, a number of participants or power plants generate electricity that is then distributed over common transmission lines to residential and commercial customers. As will be appreciated, thermal generating units, such as gas turbines, steam turbines, and combined-cycle plants and distributed generation, are relied on to generate a significant portion of the power consumers and industry require. Each of the power plants within such systems include one or more power generating units, and each of these units typically includes a control system that controls operation, and, in the case of power plants having more than one generating unit, the performance of the power plant as a whole. As an example, one of the responsibilities of a plant operator is the generation of an offer curve representing the cost of power production. An offer curve typically includes an incremental variable cost curve, an average variable cost curve, or another suitable indication of variable power generating expense, which typically is expressed in dollars per megawatt-hour versus output in megawatts and these expressions may be made for one or more generating points or have one or more time periods. It will be appreciated that an average variable cost curve may represent a cumulative cost divided by a cumulative power output for a given point, and an incremental variable cost curve may represent a change in cost divided by a change in power output. An incremental variable cost curve may be obtained, for example, by taking a first derivative of an input-output curve of the power plant that represents cost per hour versus power generated. In a combined-cycle power plant in which waste heat from a fuel burning generator is used to produce steam to power a supplemental steam turbine, an incremental variable cost curve may also be obtained with known techniques, but its derivation may be more complex.

In most power systems, a competitive process commonly referred to as economic dispatch is used to divide the power grid's system load among power plants over a future time period. As part of this process, power plants periodically generate offer curves and send those offer curves to a power system authority or dispatcher. Such offer curves represent bids from the power plants to generate a portion of the electricity required by the power system over a future market period. The dispatch authority receives the offer curves from the power plants within its system and evaluates them to determine the level at which to engage each power plant so to most efficiently satisfy the predicted load requirements of the system. In doing this, the dispatch authority analyzes the offer curves and, with the objective of finding the lowest generating cost for the system, produces a commitment schedule that describes the extent to which each of the power plants will be engaged over the relevant time period.

Once the commitment schedule is communicated to the power plants, each power plant may determine the most efficient and cost-effective manner by which to satisfy its load commitment. It will be appreciated that the generating units of the power plant include control systems that monitor and control operation. When the generating units include thermal generators, such control systems govern the combustion systems and other aspects of the operation. (For illustrative purposes, both a gas turbine and combined-cycle power plants are described herein; however, it will be appreciated that certain embodiments of the present invention may be applied to other types of power generating units or be used in conjunction there with.) The control system may execute scheduling algorithms that adjust the fuel flow, inlet guide vanes, and other control inputs to ensure efficient operation of the engine. However, the actual output and efficiency of a power plant is impacted by external factors, such as variable ambient conditions, that cannot be fully anticipated. As will be appreciated, the complexity of such systems and the variability of operating conditions make it difficult to predict and control performance, which often result in inefficient operation.

Machine degradation that occurs over time is another difficult to quantify fact, which may have a significant effect on the performance of the generating units. It will be appreciated that rate of degradation, replacement of worn components, timing of maintenance routines, and other factors impact the short term performance of the plant, and thus need to be accounted for when generating cost curves during the dispatching process as well as when assessing the long term cost-effectiveness of the plant. As an example, gas turbine life typically is impacted by operating patterns that include rates of consumption impacted by hours of operation, load, transients and transient rates of load change, and number of starts. If a gas turbine or a component thereof reaches its starts limit before its hours limit, it must be repaired or replaced, even if it has hours-based life remaining. Hours-based life in a gas turbine may be prolonged by reducing firing temperature, but this reduces efficiency of the gas turbine, which increases cost of operation. Conversely, increasing the firing temperature increases efficiency, but shortens gas turbine life and increases maintenance and/or replacement costs. In a similar way, the operations cycles of a turbine such as its being turned off or ramped up rapidly do affect the life consumption rate of the apparatus as well as the fuel quantity consumed. As will be appreciated, life cycle cost of a thermal engine is dependent on many complex factors, while also representing a significant consideration in the economic efficiency of the power plant.

Given the complexity of modern power plants, particularly those having multiple generating units, and the market within which it competes, power plant operators continued to struggle to maximize economic return. For example, grid compliance and dispatch planning for a power plant is adversely impacted by controlling thermal generating units in an overly-static manner, i.e., using static control profiles, such as heat rate curves gathered derived from only periodic performance tests. Between these periodic updates, turbine engine performance may change (e.g., from degradation), which may affect start-up and load performance. Moreover, intraday changes in the external factors, without accounting for the same in the turbine control profiles, may lead to inefficient operation. To compensate for this type of variability, power plant operators often become overly conservative in planning for future operation, which results in underutilized generating units. Other times, plant operators are forced to operate units inefficiently to satisfy overcommitments.

Without identifying the short-term inefficiencies and/or long-term deterioration as each is realized, the conventional control systems of power plants either have to be retuned frequently, which is an expensive process, or conservatively operated so to preemptively accommodate component deterioration. The alternative is to risk violating operational boundaries that leads to excessive fatigue or failure. Similarly, conventional power plant control systems lack the ability to most cost-effectively accommodate changing conditions. As will be appreciated, this results in power plant utilization that is often far from optimal. As such, there exists a need for improved methods and systems for monitoring, modeling, and controlling power plant operation, particularly those that enable a more complete understanding of the myriad operating modes available to operators of complex modern power plants and the economic trade-offs associated with each. It can also be appreciated that a physical design or operating control means or maintenance work scope(s) and the timing of said work scope could have alternate designs, which, depending upon the original design, may later in and asset's economic life, provide options to change the physical apparatus or its operating control, or the asset's maintenance plans or work scope, all subject to the selected regulatory, economic, contractual or engineering limits.

BRIEF DESCRIPTION OF THE INVENTION

The present application thus describes a method for modeling for controlling and enhancing operation of a startup operation for a combined cycle power block (block) having at least one gas turbine and at least one steam turbine, wherein operating parameters define performance and operational characteristics for the startup operation, the method comprising: receiving measured operating parameters from a plurality of reference blocks and, for each of the plurality of reference blocks, a plurality of types of the startup operations; given the measured operating parameters, developing one or more reference transfer functions between two of the measured operating parameters; receiving measured operating parameters from the startup operation of a target block; given the measured operating parameters from the target block, developing one or more transfer functions for the target block between two of the operating parameters; selecting one of the reference transfer functions; and normalizing the transfer function of the target block per the selected reference transfer function.

These and other features of the present application will become more apparent upon review of the following detailed description of the preferred embodiments when taken in conjunction with the drawings and the appended claims.

DETAILED DESCRIPTION OF THE INVENTION

Example embodiments of the invention will be described more fully hereinafter with reference to the accompanying drawings, in which some, but not all embodiments are shown. Indeed, the invention may be embodied in many different forms and should not be construed as limited to the embodiments set forth herein; rather, these embodiments are provided so that this disclosure will satisfy applicable legal requirements. Like numbers may refer to like elements throughout.

According to aspects of the present invention, systems and methods are disclosed which may be used to optimize the performance of power systems, power plants, and/or thermal power generating units for a given set of design and operating control capabilities. In exemplary embodiments, this optimization includes an economic optimization by which an operator of a power plant decides between alternative modes of operation so to enhance profitability. Embodiments may be utilized within a particular power system so to provide a competitive edge in procuring advantageous economic commitment terms during the dispatch process. An adviser function may allow operators to make choices between operating modes based on accurate economic comparisons and projections. As another feature, the process of prospectively purchasing fuel for future generating periods may be improved so that fuel inventory is minimized, while not increasing the risk of a shortfall. Other configurations of the present invention, as described below, provide computer-implemented methods and apparatus for modeling power systems, and power plants having multiple thermal generating units. Technical effects of some configurations of the present invention include the generation and solution of energy system models that predict performance under varying physical, operational, and/or economic conditions. Exemplary embodiments of the present invention combine a power plant model that predicts performance under varying ambient and operational conditions with an economic model that includes economic constraints, objectives, and market conditions so to optimize profitability. In doing this, the optimization system of the present invention may predict optimized setpoints that maximize profitability for particular combinations of ambient, operational, contractual, regulatory, legal, and/or economic and market conditions. The present invention enables the economic valuation of an initial physical or operating control and can value the economic impacts of available design or operating controls or control points. Further, that the economically optimized control and design is enabled for one or multiple time periods under consideration from the instant to a lifecycle.

Figure 1:
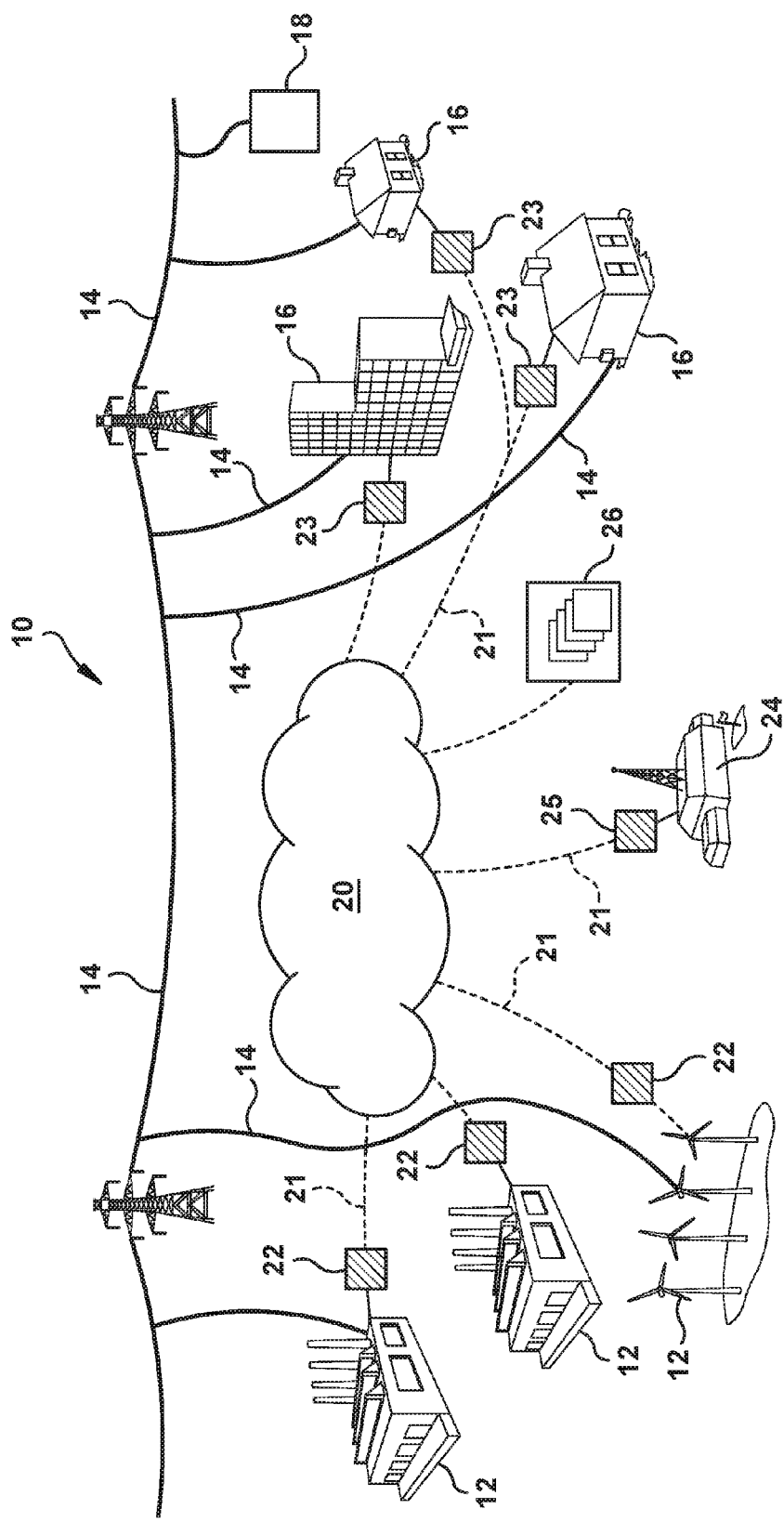
FIG. 1 shows a schematic diagram of a power system according to aspects of the present invention.

FIG. 1 illustrates a schematic representation of a power system 10 that includes aspects of the present invention as well as an exemplary environment in which embodiments may operate. Power system 10 may include power generators or plants 12, such as, for example, the illustrated wind and thermal power plants. It will be appreciated that thermal power plants may include generating units such as gas turbines, coal-fired steam turbines, and/or combined-cycle plants. In addition, power system 10 may include other types of power plants (not shown), such as solar power installations, hydroelectric, geothermal, nuclear, wind, fuel cell, reciprocating engine, energy storage and/or any other suitable power sources now known or discovered hereafter and any combination of said systems. Transmission lines 14 may connect the various power plants 12 to customers or loads 16 of power system 10. It should be understood that transmission lines 14 represent a grid or distribution network for the power system and may include multiple sections and/or substations as may be desired or appropriate. The power generated from power plants 12 may be delivered via transmission lines 14 to loads 16, which, for example, may include municipalities, residential, or commercial customers. Power system 10 may also include storage devices 18 that are connected to transmission lines 14 so to store energy during periods of excess generation. Said power systems may be an electrical grid scale or a smaller power distribution system such as for an industrial operation, a commercial entity or campus or other grouping of power generation and load consuming entity whose system may be designed or operated with a purposed economic optimization effected by those stakeholders.

Power system 10 also includes control systems or controllers 22, 23, 25 that manage or control the operation of several of the components contained therein. For example, a plant controller 22 may control the operation of each of the power plants 12. Load controllers 23 may control the operation of the different loads 16 that are part of the power system 10. For example, a load controller 23 may manage the manner or timing of a customer's power purchase. A dispatch authority 24 may manage certain aspects of the operation of power system 10, and may include a power system controller 25 that controls the economic dispatch procedure by which load commitments are distributed among participating power plants. Controllers 22, 23, 25, which are represented by rectangular blocks, may be connected via communications lines or connections 21 to a communications network 20 over which data is exchanged. The connections 21 may be wired or wireless. It will be appreciated that communications network 20 may be connected to or part of a larger communications system or network, such as the internet or a private computer network.

In addition, the controllers 22, 23, 25 may receive information, data, and instructions from and/or send information, data, and instructions to data libraries and resources, which may be referred to herein generally as "data resources 26", through communications network 20, or, alternatively, may store or house one or more such data repositories locally. Data resources 26 may include several types of data, including but not limited to: market data, operating data, and ambient data. Market data includes information on market conditions, such as energy sales price, fuel costs, labor costs, regulations, etc. Operating data includes information relating to the operating conditions of the power plant or its generating units, such as temperature or pressure measurements within the power plant, air flow rates, fuel flow rates, etc. Ambient data includes information related to ambient conditions at the plant, such as ambient air temperature, humidity, and/or pressure. Market, operating, and ambient data each may include historical records, present condition data, and/or data relating to forecasts. For example, data resources 26 may include present and forecast meteorological/climate information, present and forecast market conditions, usage and performance history records about the operation of the power plant, and/or measured parameters regarding the operation of other power plants having similar components and/or configurations, as well as other data as may be appropriate and/or desired. In operation, for example, power system controller 25 of dispatch authority 24 may receive data from and issue instructions to the other controllers 22, 23 within power system 10. Each of the plant and the load controllers then controls the system component for which it is responsible and relays information about it to and receive instruction from power system controller 25.

Figure 2:
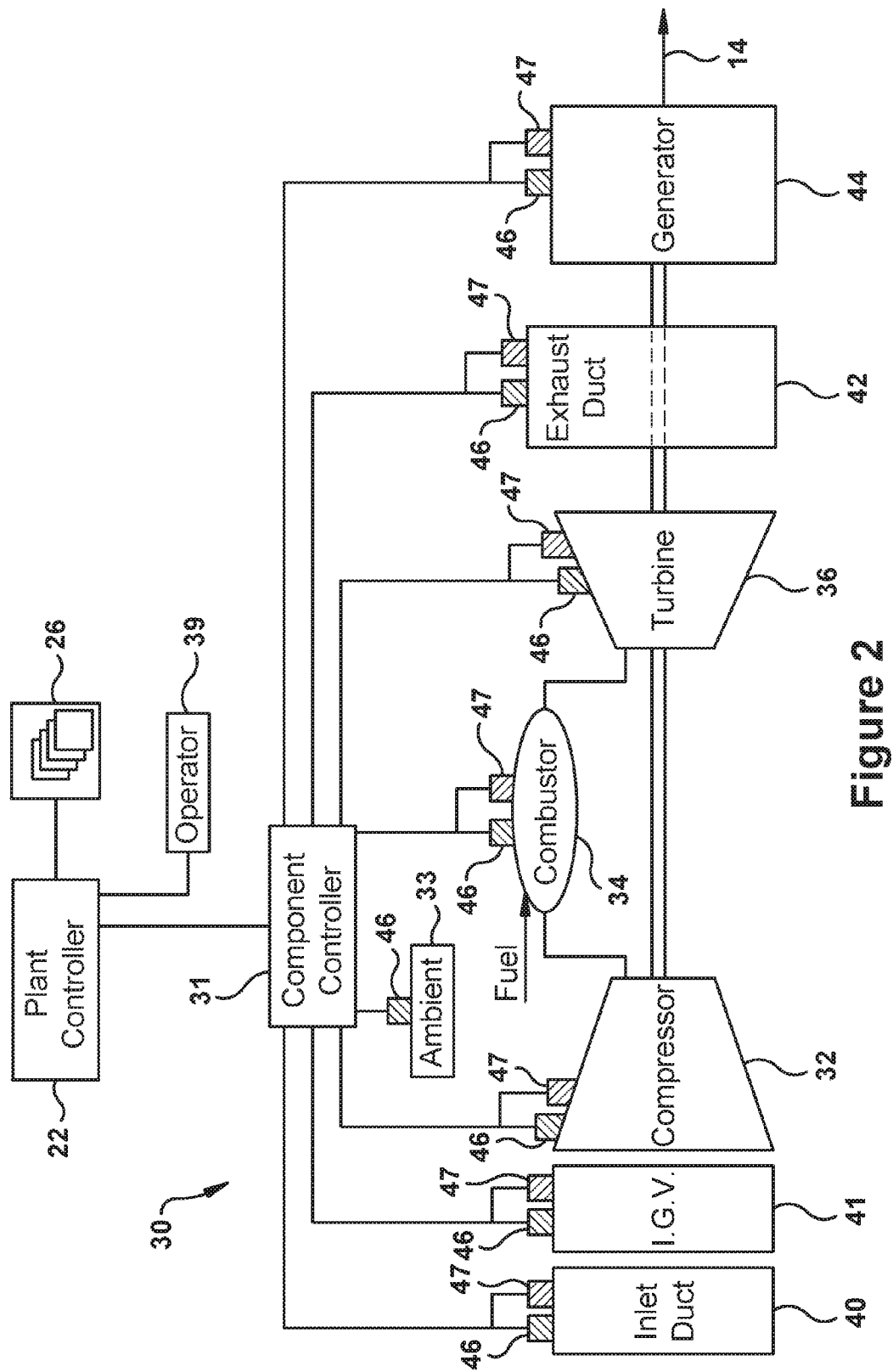
FIG. 2 illustrates a schematic diagram of an exemplary thermal generating unit as may be employed within power plants according to embodiments of the present invention.

FIG. 2 is a schematic diagram of an exemplary thermal generating unit, a gas turbine system 30, that may be used within a power plant according to the present invention. As illustrated, gas turbine system 30 includes a compressor 32, a combustor 34, and a turbine 36 that is drivingly coupled to the compressor 32, as well as a component controller 31. The component controller 31 may connect to the plant controller 22, which may connect to an user input device for receiving communications from an operator 39. Alternatively, it will be appreciated that the component controller 31 and the plant controller 22 may be combined into a single controller. An inlet duct 40 channels ambient air to the compressor 32. As discussed in FIG. 3, injected water and/or other humidifying agent may be channeled to the compressor through inlet duct 40. Inlet duct 40 may have filters, screens and sound absorbing devices that contribute to a pressure loss of ambient air flowing through inlet duct 40 into inlet guide vanes 41 of compressor 32. An exhaust duct 42 channels combustion gases from an outlet of turbine 36 through, for example, emission control and sound absorbing devices. The sound adsorbing materials and emission control devices may apply a backpressure to the turbine 36. The turbine 36 may drive a generator 44 that produces electrical power, which then may be distributed through power system 10 via transmission lines 14.

The operation of the gas turbine system 30 may be monitored by several sensors 46 that detect various operating conditions or parameters throughout it, including, for example, conditions within the compressor 32, combustor 34, turbine 36, generator 44, and ambient environment 33. For example, temperature sensors 46 may monitor ambient temperatures, compressor discharge temperature, turbine exhaust temperature, and other temperatures within the flow path of the gas turbine system 30. Likewise, the pressure sensors 46 may monitor ambient pressure, static and dynamic pressure levels at the compressor inlet, compressor outlet, turbine exhaust, and that other suitable locations within the gas turbine system. Humidity sensors 46, such as wet and dry bulb thermometers, may measure ambient humidity in the inlet duct of the compressor. Sensors 46 may also include flow sensors, speed sensors, flame detector sensors, valve position sensors, guide vane angle sensors and other sensors that are typically used to measure various operating parameters and conditions relative to the operation of the gas turbine system 30. As used herein, the term "parameter" refers to measurable physical properties of operation which may be used to define the operating conditions within a system, such as gas turbine system 30 or other generating system described herein. Operating parameters may include temperature, pressure, humidity and gas flow characteristics at locations defined along the path of the working fluid, as well as ambient conditions, fuel characteristics, and other measurables as may be suitable without limit. It will be appreciated that control system 31 also includes several actuators 47 by which it mechanically controls the operation of the gas turbine system 30. Actuators 47 may include electro-mechanical devices having variable setpoints or settings that allow the manipulation of certain process inputs (i.e., manipulated variables) for the control of process outputs (i.e., controlled variables) in accordance with a desired result or mode of operation. For example, commands generated by the component controller 31 may cause one or more actuators 47 within the turbine system 30 to adjust valves between the fuel supply and combustor 34 that regulate the flow level, fuel splits, and/or type of fuel being combustor. As another example, commands generated by control system 31 may cause one or more actuators to adjust an inlet guide vane setting that alters their angle of orientation.

The component controller 31 may be a computer system having a processor that executes program code to control the operation of the gas turbine system 30 using sensor measurements and instructions from user or plant operator (hereinafter "operator 39"). As discussed in more detail below, software executed by the controller 31 may include scheduling algorithms for regulating any of the subsystems described herein. The component controller 31 may regulate gas turbine system 30 based, in part, on algorithms stored in its digital memory. These algorithms, for example, may enable the component controller 31 to maintain the NOx and CO emissions in the turbine exhaust to within certain predefined emission limits, or, in another instance, maintain the combustor firing temperature to within predefined limits. It will be appreciated that algorithms may include inputs for parameter variables such as compressor pressure ratio, ambient humidity, inlet pressure loss, turbine exhaust backpressure, as well as any other suitable parameters. The schedules and algorithms executed by the component controller 31 accommodate variations in ambient conditions that affect emissions, combustor dynamics, firing temperature limits at full and part-load operating conditions, etc. As discussed in more detail below, the component controller 31 may apply algorithms for scheduling the gas turbine, such as those setting desired turbine exhaust temperatures and combustor fuel splits, with the objective of satisfying performance objectives while complying with operability boundaries of the gas turbine system. For example, the component controller 31 may determine combustor temperature rise and NOx during part-load operation in order to increase the operating margin to the combustion dynamics boundary and thereby improve operability, reliability, and availability of the generating unit.

Figure 3:
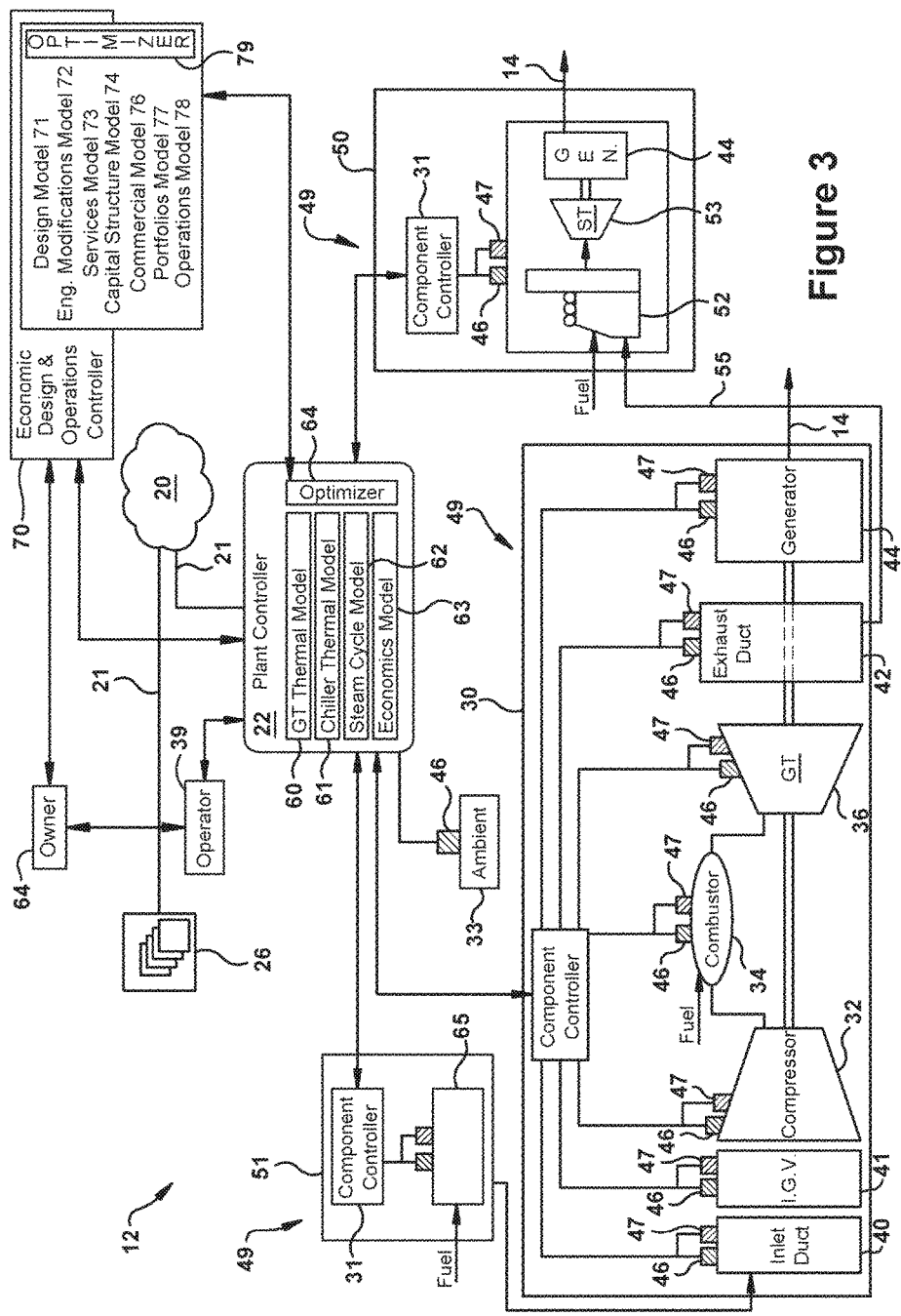
FIG. 3 shows a schematic diagram of an exemplary power plant having a plurality of gas turbines in accordance with embodiments of the present invention and the decision support points for local and system level economic optimization, both for near and long term lifecycle periods.

Turning to FIG. 3, a schematic diagram is provided of an exemplary power plant 12 having a plurality of generating units or plant components 49 in accordance with aspects of the present invention. The illustrated power plant 12 of FIG. 3 is a common configuration, and thus will be used to discuss several of the exemplary embodiments of the present invention that are presented below. However, as will be appreciated, the methods and systems described herein may be more generally applicable and scalable to power plants having more generating units than those shown in FIG. 3, while still also applicable to power plants having a single generating component such as the one illustrated in FIG. 2. It will be appreciated that the power plant 12 of FIG. 3 is a combined-cycle plant that includes several plant components 49, including a gas turbine system 30 and a steam turbine system 50. Power generation may be augmented by other plant components 49, such as an inlet conditioning system 51 and/or a heat recovery steam generator having a duct firing system (hereinafter, "HRSG duct firing system 52"). It will be appreciated that each of the gas turbine system 30, the steam turbine system 50 that includes the HRSG duct firing system 52, and the inlet conditioning system 51 includes a control system or the component controller 31 that communicates electronically with sensors 46 and actuators 47 that are dedicated to each plant component. As used herein, the inlet conditioning system 51, unless otherwise stated, may refer to components used to condition air before entering the compressor, which may include an inlet chilling system or chiller, evaporator, fogger, water injection system, and/or, in some alternative cases, a heating element.

In operation, the inlet conditioning system 51 cools the air entering the gas turbine system 30 so to enhance the power generating capacity of the unit. The HRSG duct firing system 52 burns fuel to provide additional heat so to increase the supply of steam that is expanded through a turbine 53. In this manner the HRSG duct firing system 52 augments the energy supplied by the hot exhaust gases 55 from the gas turbine system, and thereby increases the power generating capacity of the steam turbine system.

By way of exemplary operation, the power plant 12 of FIG. 3 directs a flow of fuel to the combustor 34 of gas turbine system 30 for combustion. The turbine 36 is powered by combustion gases and drives the compressor 32 and generator 44, which delivers electrical energy to the transmission lines 14 of the power system 10. The component controller 31 of gas turbine system 30 may set commands for the gas turbine system regarding fuel flow rate and receive sensor data from the gas turbine system, such as the air inlet temperature, humidity, power output, shaft speed, and temperatures of the exhaust gas. The component controller 31 may also collect other operating data from pressure and temperature sensors, flow control devices and other devices monitoring the operation of the gas turbine system. The component controller 31 may send data regarding the operation of the gas turbine system and receive instruction from the plant controller 22 regarding setpoints for actuators that control process inputs.

During certain modes of operation, the air entering gas turbine system 30 may be cooled or otherwise conditioned by inlet conditioning system 51 so to augment the generating capacity of gas turbine system. The inlet conditioning system 51 may include a refrigeration system 65 for cooling water, and a component controller 31 that controls its operation. In this instance, the component controller 31 may receive information regarding the temperature of the cooling water as well as instruction regarding the desired level of injection, which may come from the plant controller 22. The component controller 31 of inlet conditioning system 51 may also issue commands causing refrigeration system 65 to produce cooling water having a certain temperature and flow rate. The component controller 31 of inlet conditioning system 51 may send data regarding the operation of the inlet conditioning system 51.

Steam turbine system 50 may include turbine 53 and HRSG duct firing system 52, as well as a component controller 31 that, as illustrated, is dedicated to the control of its operation. Hot exhaust gases 55 from exhaust ducts of the gas turbine system 30 may be directed into the steam turbine system 50 to produce the steam that is expanded through the turbine 53. As will be appreciated, HRSG duct firing systems are regularly used to provide additional energy for the production of steam so to increase the generating capacity of a steam turbine system. It will be appreciated that the rotation induced within the turbine 53 by the steam drives a generator 44 so to produce electrical energy that may be then sold within power system 10 across transmission lines 14. The component controller 31 of the steam turbine system 50 may set the flow rate of fuel burned by the duct firing device 52 and thereby increase the generation of steam beyond the amount that may be produced with exhaust gases 55 alone. The component controller 31 of the steam turbine system 50 may send data regarding the operation of that the plant component 49 and receive therefrom instruction as to how it should operate.

The plant controller 22 of FIG. 3, as illustrated, may be connected to each of the component controllers 31 and, via these connections, communicate with sensors 46 and actuators 47 of the several plant components 49. As part of controlling the power plant 12, the plant controller 22 may simulate its operation. More specifically, the plant controller 22 may include or communicate with digital models (or simply "models") that simulate the operation of each plant component 49. The model may include algorithms that correlate process input variables to process output variables. The algorithms may include sets of instructions, logic, mathematical formula, functional relationship descriptions, schedules, data collections, and/or the like. In this instance, the plant controller 22 includes: a gas turbine model 60, which models the operation of the gas turbine system 30; an inlet conditioning system model 61, which models the operation of inlet conditioning system 51; and a steam turbine model 62, which models the operation of the steam turbine system 50 and the HRSG duct firing system 52. As a general note, it will be appreciated that the systems and their related models, as well as the discrete steps of the methods provided herein, may be subdivided and/or combined in various ways without materially deviating from the scope of the present invention, and that the manner in which each are described is exemplary unless otherwise stated or claimed. Using these models, the plant controller 22 may simulate the operation, e.g., thermodynamic performance or parameters describing operation, of the power plant 12.

The plant controller 22 may then use results from the simulations so to determine optimized operating modes. Such optimized operating modes may be described by parameter sets that include a plurality of operating parameters and/or setpoints for actuators and/or other operating conditions. As used herein, the optimized operating mode is one that, at minimum, is preferable over at least one alternative operating mode pursuant to defined criteria or performance indicators, which may be selected by an operator to evaluate plant operation. More specifically, optimized operating modes, as used herein, are those that are evaluated as preferable over one or more other possible operating modes which were also simulated by the plant model. The optimized operating modes are determined by evaluating how the model predicts the power plant will operate under each. As discussed below, an optimizer 64, e.g., a digital software optimization program, may run the digital power plant model pursuant to various parameter sets and, then, identify preferable or optimized modes of operation by evaluating the results. The variations in the setpoints may be generated by perturbations applied around the setpoints chosen for analysis. These may be based in part on historical operation. It will be appreciated that the optimized operating mode may be determined by the optimizer 64 based on one or more defined cost functions. Such cost functions, for example, may regard a cost to produce power, profitability, efficiency, or some other criteria as defined by the operator 39.

To determine costs and profitability, the plant controller 22 may include or be in communication with an economic model 63 that tracks the price of power and certain other variable costs, such as the costs of the fuel used in the gas turbine system, the inlet conditioning system, and HRSG duct firing system. The economic model 63 may provide the data used by the plant controller 22 to judge which of the proposed setpoints (i.e., those chosen setpoints for which operation is modeled for determining optimized setpoints) represents minimal production costs or maximum profitability. According to other embodiments, as discussed in more detail with FIG. 4, the optimizer 64 of the plant controller 22 may include or operate in conjunction with a filter, such as a Kalman filter, to assist in tuning, adjusting and calibrating the digital models so that the models accurately simulate the operation of the power plant 12. As discussed below, the model may be a dynamic one that includes a learning mode in which it is tuned or reconciled via comparisons made between actual operation (i.e., values for measured operating parameters that reflect the actual operation of the power plant 12) and predicted operation (i.e., values for the same operating parameters that the model predicted). As part of the control system, the filter also may be used to adjust or calibrate the models in real time or in near real time, such as every few minutes or hour or as specified.

The optimized setpoints generated by the plant controller 22 represents a recommended mode of operation and, for example, may include fuel and air settings for the gas turbine system, the temperature and water mass flow for the inlet conditioning system, the level of duct firing within the steam turbine system 50. According to certain embodiments, these suggested operating setpoints may be provided to the operator 39 via an interface device such as a computer display screen, printer, or sound speaker. Knowing the optimized setpoints, the operator then may input the setpoints into the plant controller 22 and/or the component controller 31, which then generates control information for achieving the recommended mode of operation. In such embodiments where the optimized setpoints do not include specified control information for achieving the operating mode, the component controllers may provide the necessary control information for this and, as discussed in more detail below, may continue controlling the plant component in a closed loop manner pursuant to the recommended operating mode until the next optimization cycle. Depending on operator preference, the plant controller 22 also may directly or automatically implement optimized setpoints without operator involvement.

By way of exemplary operation, the power plant 12 of FIG. 3 directs a flow of fuel to combustor 34 of the gas turbine system 30 for combustion. The turbine 36 is powered by combustion gases to drive the compressor 32 and the generator 44, which delivers electrical energy to transmission lines 14 of the power system 10. The component controller 31 may set commands for the gas turbine system 30 regarding fuel flow rate and receive sensor data from the gas turbine system 30 such as the air inlet temperature and humidity, power output, shaft speed and temperatures of the exhaust gas. The component controller 31 may also collect other operating data from pressure and temperature sensors, flow control devices and other devices monitoring the gas turbine system 30. The component controller 31 of the gas turbine system 30 may send data regarding the operation of the system and receive instruction from the plant controller 22 regarding setpoints for actuators that control process inputs.

During certain modes of operation, the air entering gas turbine system 30 may be cooled by cold water supplied to the inlet air duct 42 from the inlet conditioning system 51. It will be appreciated that cooling the air entering a gas turbine may be done to augment the capacity of the gas turbine engine to generate power. The inlet conditioning system 51 includes a refrigeration system or refrigerator 65 for cooling water, and a component controller 31. In this instance, the component controller 31 receives information regarding the temperature of the cooling water and commands regarding the desired cooling of the intake air. These commands may come from the plant controller 22. The component controller 31 of inlet conditioning system 51 may also issue commands to cause refrigeration system 65 to produce cooling water having a certain temperature and flow rate. The component controller 31 of inlet conditioning system 51 may send data regarding the operation of the inlet conditioning system 51 and receive instruction from the controller 22.

The steam turbine system 50, which may include a HRSG with a duct firing device 52, a steam turbine 53, and a component controller 31 that may be dedicated to its operation. Hot exhaust gases 55 from an exhaust duct 42 of the gas turbine system 30 is directed into the steam turbine system 50 to produce the steam that drives it. The HRSG duct firing system 52 may be used to provide additional heat energy to produce steam so to increase the generating capacity of steam turbine system 50. The steam turbine 53 drives generator 44 to produce electrical energy that is delivered to the power system 10 via the transmission lines 14. The component controller 31 of the steam turbine system 50 may set the flow rate of fuel burned by the duct firing device 52. Heat generated by the duct firing device increases the generation of steam beyond the amount produced by exhaust gases 55 from turbine 36 alone. The component controller 31 of the steam turbine system 50 may send data regarding the operation of the system to and receive instruction from the plant controller 22.

The plant controller 22 may communicate with the operator 39 and data resources 26, for example, to receive data on market conditions such as prices and demand for power delivered. According to certain embodiments, the plant controller 22 issues recommendations to the operator 39 regarding desired operating setpoints for the gas turbine system 30, inlet conditioning system 51, and steam turbine system 50. The plant controller 22 may receive and store data on the operation of the components and subsystems of the power plant 12. The plant controller 22 may be a computer system having a processor and memory storing data, the digital models 60, 61, 62, 63, the optimizer 64 and other computer programs. The computer system may be embodied in a single physical or virtual computing device or distributed over local or remote computing devices. The digital models 60, 61, 62, 63 may be embodied as a set of algorithms, e.g. transfer functions, that relate operating parameters of each of the systems. The models may include a physics-based aero-thermodynamic computer model, a regression-fit model, or other suitable computer-implemented model. According to preferred embodiments, the models 60, 61, 62, 63 may be regularly, automatically and in real-time or near real-time tuned, adjusted or calibrated or tuned pursuant to ongoing comparisons between predicted operation and the measured parameters of actual operation. The models 60, 61, 62, 63 may include filters that receives data inputs regarding actual physical and thermodynamic operating conditions of the combined-cycle power plant. These data inputs may be supplied to the filter in real-time or periodically every 5 minutes, 15 minutes, hour, day, etc. during the operation of the power plant 12. The data inputs may be compared to data predicted by the digital models 60, 61, 62, 63 and, based on the comparisons, the models may be continuously refined.

As will be appreciated, there are limitations in the current art of economic tools related to the configuration and operation of power plants and/or fleets of power generating units. These limitations include the failure to identify various aspects of value creation for the many possible combinations of physical engineering designs and operational choices for the use and consumption of the generating assets, as well as limitations relating to calculating probabilities related thereto. Further, often times the algorithms used to calculate the economic value of certain operational scenarios are employed using incomplete datasets. Further still, timely analytical output is typically unavailable so that an update of a plant operational assumption, such as during the course of analyzing possible modifications with a power plant owner, is not available for discussion and presentation in near real-time, which would be highly advantageous and helpful given the complexity of the subject matter and the number of stakeholders at any power plant. As will be discussed, aspects of the present invention include systems and methods for uncovering and analyzing economic value for complex industrial system operations, such as those that include power generating plants, that may be used to assess alternate hardware and/or software modifications to those complex systems, which include operational decision support in a timely manner. The present invention may be used to identify near or more optimal design configurations, modification, and operational optimization decision support to achieve customer value drivers. As will be discussed, these solutions may take into account the financial constraints of the owners and operators of the systems, and may be used to estimate performance and financial risk and return.

Historical performance information of a subject power plant or generating units and its peers may be recorded, such as, for example, by the original equipment manufacturer. As will be appreciated, some generating units or power plants may include equipment that has not been closely monitored or tracked, or if tracked, may have sparse observational data. According to the present invention, a deep learning method may be employed which imputes the value of missing data by using data from the subject unit as well as comparable peer units. This fuller set of data may then be used to calculate a value for similarly configured and operated generating units. With respect to estimating the value of the present unit should it be configured and operated by combinations of similar units, the value for a viable configurations may be used by the configuration optimizer to consider feasible engineering changes or modifications available to the equipment, as well as alternative operating decision support and/or settings of such decision support, customer preferences for design and/or operations, the value estimates of each asset or operational change singularly or in combination. The present application, as will be discussed, may then assist in selecting the most preferable set of plant modifications that closely match the preferences and constraints of the decision-makers, owners, and other stakeholders. For example, according to certain embodiments, inputs data and stored results may be held for analytical use in the current instant and later for other units or performance attribution when "original assumptions" are compared to "as realized" performance. The design parameters and installed hardware along with operations data of the generating assets, if available, may be retained in one or more data repositories. The available unit modifications may be described in text-based form such that in a design document or in structured design systems where digital records of parameters and models are held. These bases of knowledge regarding engineering and applicable rules to one or more operating profiles for a given asset may then be used to compute or derived feasible changes and upgrades to a base design or an "as installed" configuration. Preferences with respect to financial returns and risk for the owner of the generating assets also may be recorded. As will be appreciated, power plants and/or power plant fleets have different capital structures such as equity investment, debt, leases and partnerships. The stakeholders typically have other assets in their portfolios which are being managed also. The value chains the stakeholders of a power plant change with the introduction of new technologies and competitors or regulations. Further, owners of power plants have constraints which cover a vast array of possibilities from limits on capital investment, outputs of the asset such as to a partner, regulatory limits, contract terms, union agreements, financial terms, etc. Aspects of valuing constraints have many combinations and most owner operators of complex assets have unique circumstances which the disclosed system is capable of quantifying, thereby allowing portfolio owners to understand configurations that are preferable. The preferences and constraints of the owner may be stored for scenario simulation, optimization, and further change reference. These values may also be retained so to serve as reference cases for future similar circumstances and risk calculation. Taken together, the presently disclosed invention may enable a quantification of financial preferences along the many aspects particular to each of the generating assets.

Referring again to FIG. 3, the present invention enables the economic testing of design and operational constraints via the co-optimization of commercial revenue, asset design, operations, maintenance, control, and financing. These capabilities are enabled with the economic design and operations optimization controller 70 and optimizer 79, which may communicate with the plant controller 22 and the operator 39 so as to achieve the macro objectives of the owner 67. The economic design and operations optimization controller 70 of the example embodiment may compute the risk and return objectives of the owner 67 or other controlling body. It should be appreciated that the optimization function will be configured to seek to satisfy the economic risk and value management objectives of the assets owner 67 while also fulfilling other objectives sought by one or more stakeholders comprising the controlling entity of the plant, such as generation flexibility, emissions, steam output, reliability, mechanical or electrical takeoff for other purposes, and any conceivable primary or secondary objectives.

As will be appreciated a power plant design may be beneficially changed to better realize changing objectives. For example design changes, which may occur during the plant economic life, may include turbine blade changes, controllability, combustion systems, the addition of heat recovery steam generator or steam turbine features, cooling circuit features, etc. According to the present invention, the economic design and operations optimization controller 70 may include one or more subcomponent models used to evaluate and analyze current and potential value. A power plant design model 71 may include one or more of models that describe the physical aspects of the generating assets of the power plant 12. The engineering models of the design model 71 may be provided inputs from various sensors, such as temperatures, pressures, flow and other assumptions, and be used to calculate outputs, which then may be used as data inputs to the other models, such as, other engineering models or operational, economic, service, commercial, etc., as described herein. Example outputs of the design model 71 may include flows, temperatures, pressures, power output, fuel consumption, reliability, remaining life, physical or other engineering aspects.

An engineering modification model 72 may be related to possible design modifications related to a given generating asset or power plant. The engineering modification model 72 may be well structured with defined inputs and outputs, such that the economic design and operations optimization controller 70 may call a candidate engineering modifications model 72 and configure the design model 71 to use the candidate modification instead of, or in addition, to the current design. When presented with inputs, the model 72 may then be used to produce outputs reflecting operation pursuant to the modified design. According to a preferred embodiment, the available products and operational design support engines and services may be parameterized and catalogued for the purposes of being called and combined with the original plant engineering models, which will may be used to enable a new engineering model. Combinations of available designs thusly maybe constructed and tested by the optimizer 79 in the economic design and operations controller 70.

As will be appreciated, industrial service agreements for apparatus and generating units of power plants are prevalent. Further, the physical systems of a power plant consume life as they operate and aspects of their physical characteristics degrade. Maintenance operations may restore design guarantees and performance levels, or improve the efficiency, reliability, maintainability and flexibility of the generating assets and their operation. According to the present invention, a service model 73 may be provided to model and analyze maintenance work scope as a function of time, use, present condition, etc. of the generating assets while taking into account their thermal, mechanical and/or electrical performance. Further, the service model 73 may have terms which assure the service interval duration and time schedule, that the asset will have a specified performance, and/or outcomes that such objectives are not satisfied. The service model 73 may quantify such possibilities and manage maintenance and service schedule and work scope. The service model 73 may be configured so that it is callable by the economic design and operations optimization controller 70 and the optimizer 79 for computation, in combination with other models.

Further, owners and/or other controlling interests of a power plant or plants may have varied capital structure, such as a balance sheet, income statement, and/or statement of cash flows, which are reflective of their financial position, historical asset allocation decisions, debt, equity and financial limits set by financing terms of a lender or governing body. This capital structure may be quantitatively and logically modeled by a capital structure model 74 so that such may be called and potential modifications and economic ramifications may be singularly or in combination with other of the models in the controller 70. Additionally, a power plant's operation typically follows the requirements needed to satisfy a commercial commitment, such as an obligation to generate into an electrical grid, supply steam to a coupled industrial or commercial process, or power to a mechanical function, etc. The terms of such arrangements are defined by contracts and those terms may be adjustable. The present invention may further include a commercial model 75, which may be configured and quantified with such inputs, logic, and/or revenue, costs, and other aspects of use so to the callable by the economic design and operations optimization 70 so that viable and more preferable alternatives are analyzed.

As will be appreciated, a generating unit or power plant may be a sub-part of a larger power plant or fleet of plants, which are owned or controlled in the context of a portfolio owned to achieve an operational or financial objective. The power plant and/or the other assets of the portfolio may be modeled by a portfolio model 76, which, in conjunction with the other models herein described, may model alternative power generating scenarios or other configurations that may then be tested against the owners 67 objectives so to determine economically preferable alternatives. Beneficial decisions such as asset allocation amongst the plants, load assignment, expansion, change, disposition, maintenance work scope, constraints satisfaction may be optimally made in concert with one or more of the other system aspects being optimized in the economic design and operations optimization controller 70.

Additionally, as will be appreciated, many power plants typically use fuel whose terms of purchase include price, quantity, and quality over one or more time periods. Such fuels may include natural gas, oil, coal, hydrogen, waste gases or materials, methane, etc. One or more of these fuels may be purchased for direct delivery and may also have structured contract sales and derivatives such as futures contracts and financial options. The suppliers of these fuels may have contract terms which require a plant to agree on a physical delivery and time so that capacity logistics and pipelines, railcars and other modes of delivery are actionable. As will be appreciated, there may be penalties for over and under consumption. The terms of purchase, delivery and hedging, indexing to fuel quality, as a function of time and other requirements may be quantified in a fuel contract model 77. In this manner, one or more terms or aspects may be tested with one or more of the other models in the economic design and operations optimization controller 70. As will be further appreciated, a power plant's cost to generate may be materially influenced by the cost of fuel. A plant operator may choose to purchase fuel on the spot market under the premise that competing plants near the subject plant(s) on the dispatch curve have a similar fuel cost and policy, thus the current plant is not at a competitive disadvantage. A beneficial decision may be to use the futures markets and fuel hedging at various durations ahead of the need to bid the plant's output into the market for management of the cost of fuel purchases—either alone as financial contracts with their net impact on the cost of fuel or in combination with the terms of purchase power agreements and pricing of day ahead market offers. Additional complexity to be advantageously managed related to fuel is capacity allocation in situations where delivery volume or fuel quality may be constrained, and a priori commitments to delivery are required by the fuel provider. By treating the industrial apparatus of a power plant along with its commercial assignment and variable cost such as fuel as an integrated analytical system, a co-optimization (of the fuel purchase price and quantity, delivery capacity, power sale term and price, quantity of gas or oil purchased in the futures market and its contractual timing, storage and financial options strategy with respect to price and quantity combinations of Puts, Calls, Sell backs of options and the triggering logic of said sell-backs, subject to the variability of generating demand, competitor policy and preferences, weather, underlying fuel price volatility and changes in the generating capability of the subject plant(s)) is enabled.

The operations of the power plant 12 by its operator and plant controller 22 may be modeled by an operations model 78 such that any operational aspects maybe computable by the economic design and operations optimization controller 70 so to compute scenarios in concert with one or more of the other models in the controller 70 that have been described herein. According to preferred embodiments, one or more decisions, modification to the design or operations policy, service timing and work scope, capital structure, plant contract, bid, dispatch, portfolio choice, fuel purchase and other operational choices may be exposed to the optimizer 79, which may calculate combinations of scenarios to achieve objectives as defined by the owner and or other stakeholders of the power plant. Logic between a subsystem and macro objectives may be managed to prevent choice oscillation or contradiction.

Figure 4:
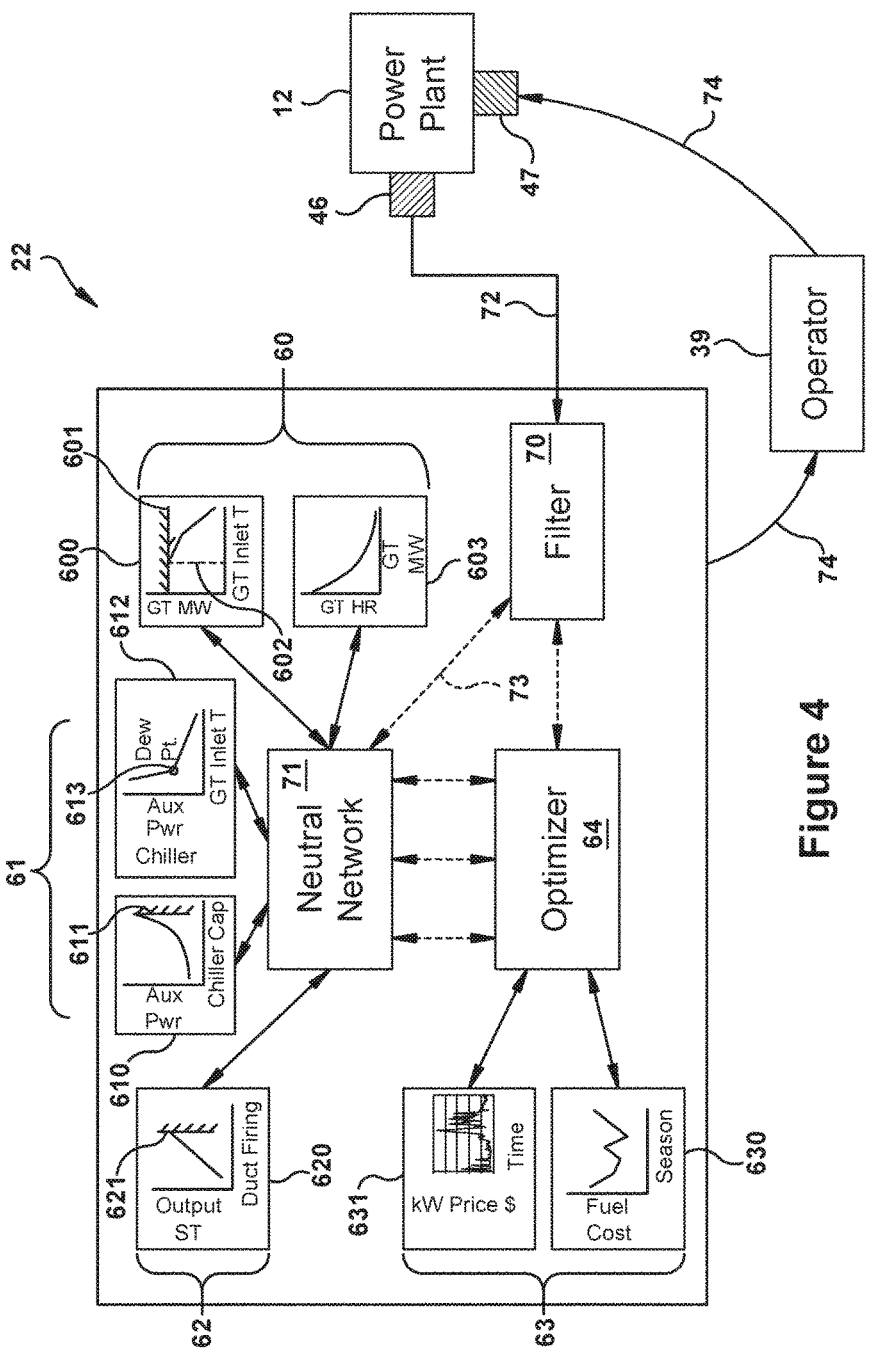
FIG. 4 illustrates an exemplary system configuration of a plant controller and optimizer according to aspects of the present invention.

FIG. 4 illustrates a schematic system configuration of a plant controller 22, which includes a filter 70, an artificial neural network configuration 71 ("neural network 71"), and an optimizer 64, according to aspects of the present invention. The filter 70, which, for example, may be a Kalman filter, may compare the actual data 72 of measured operating parameters from sensors 46 of the power plant 12 to predicted data 73 of the same operating parameters by the models 60, 61, 62, 63 and neural network 71, which is simulating the operation of the power plant 12. Differences between the actual data and predicted data then may be used by the filter 70 to tune the model of the power plant simulated by the neural network 71 and digital models.

It should be understood that while certain aspects of the present invention are described herein with reference to models in the form of neural network based models, it is contemplated that the present invention may be implemented using other types of models, including but not limited to, physics-based models, data-driven models, empirically developed models, models based upon heuristics, support vector machine models, models developed by linear regression, models developed using "first principles" knowledge, etc. Additionally, to properly capture the relationship between the manipulated/disturbance variables and the controlled variables, according to certain preferred embodiments, the power plant model may have one or more of the following characteristics: 1) nonlinearity (a nonlinear model is capable of representing a curve rather than a straight line relationship between manipulated/disturbance and controlled variables); 2) multiple input/multiple output (the model may be capable of capturing the relationships between multiple inputs—the manipulated and disturbance variables—and multiple outputs—controlled variables); 3) dynamic (changes in the inputs may not instantaneously affect the outputs, rather there may be a time delay that is followed by a dynamic response to the changes, for example, it may take several minutes for changes in the inputs to fully propagate through the system. Since optimization systems execute at a predetermined frequency, the model must represent the effects of these changes over time and take them into account); 4) adaptive (the model may be updated at the beginning of each optimization to reflect the current operating conditions); and 5) derived from empirical data (since each power plant is unique, the model may be derived from empirical data obtained from the power generating unit). Given the foregoing requirements, a neural network based approach is a preferred technology for implementing the necessary plant models. Neural networks may be developed based upon empirical data using advanced regression algorithms. As will be appreciated, neural networks are capable of capturing the nonlinearity commonly exhibited in the operation of the power plant components. Neural networks can also be used to represent systems with multiple inputs and outputs. In addition, neural networks can be updated using either feedback biasing or on-line adaptive learning. Dynamic models can also be implemented in a neural network based structure. A variety of different types of model architectures have been used for implementation of dynamic neural networks. Many of the neural network model architectures require a large amount of data to successfully train the dynamic neural network. Given a robust power plant model, it is possible to compute the effects of changes in the manipulated variables on the controlled variables. Furthermore, since the plant model is dynamic, it is possible to compute the effects of changes in the manipulated variables over a future time horizon.

The filter 70 may generate performance multipliers applied to inputs or outputs of the digital models and neural network or modify the weights applied to the logic units and algorithms used by the digital models and neural network. These actions by the filter reduce the differences between the actual condition data and the predicted data. The filter continues to operate to reduce the differences further or address fluctuations that may occur. By way of example, the filter 70 may generate performance multipliers for the predicted data regarding the compressor discharge pressure and temperature in the gas turbine, the efficiency of the gas and steam turbines, the flow of fuel to the gas turbine system, the inlet conditioning system, and HRSG duct firing system, and/or other suitable parameters. It will be appreciated that these categories of operating data reflect operating parameters that are subject to degradation of performance over time. By providing performance multipliers for these types of data, the filter 70 may be particularly useful in adjusting the models and neural network to account for degradation in the performance of the power plant.

As illustrated in FIG. 4, according to certain embodiments of the present invention, each of the digital models 60, 61, 62, 63 of the several plant components 49 of the power plant of FIG. 3 includes algorithms, which are represented by the several graphs, that are used to model the corresponding systems. The models interact and communicate within the neural network 71, and it will be appreciated that, in doing so, the neural network 71 forms a model of the entire combined-cycle power plant 12. In this manner, the neural network simulates thermodynamic and economic operation of the plant. As indicated by the solid arrows in FIG. 4, the neural network 71 collects data outputted by models 60, 61, 62, 63 and provides data to be used as inputs by the digital models.

The plant controller 22 of FIG. 4 also includes an optimizer 64, such as an computer program, that interacts with the neural network 71 to search for optimal setpoints for the gas turbine system, inlet conditioning system, steam turbine system, and HRSG duct firing system to achieve a defined performance objective. The performance objective, for example, may be to maximize the profitability of the power plant. The optimizer 64 may cause the neural network 71 to run the digital models 60, 61, 62, 63 at various operational setpoints. The optimizer 64 may have perturbation algorithms that assist in varying the operational setpoints of the models. The perturbation algorithms cause the simulation of the combine cycle power plant provided by the digital models and neural network to operate at setpoints different than the current operational setpoint for the plant. By simulating the operation of the power plant at different setpoints, the optimizer 64 searches for operational setpoints that would cause the plant to operate more economically or improve performance by some other criteria, which may be defined by operator 39.

According to exemplary embodiments, economic model 63 provides data used by the optimizer 64 to determine which setpoints are most profitable. Economic model 63, for example, may receive and store fuel cost data formatted such as a chart 630 that correlates the cost of fuel over time, such as during the seasons of a year. Another chart 631 may correlate the price received for electrical power at different times of a day, week or month. Economic model 63 may provide data regarding the price received for power and the cost of fuel (gas turbine fuel, duct firing fuel and inlet conditioning system fuel) used to produce it. The data from economic model 63 may be used by the optimizer 64 to evaluate each of the operational states of the power plant pursuant to operator defined performance objectives. The optimizer 64 may identify which of the operational states of the power plant 12 is optimal (which, as used herein, means at least preferable over an alternative operational state) given the performance objectives as defined by operator 39. As described, the digital models may be used to simulate the operation of the plant components 49 of the power plant 12, such as modeling thermodynamic operation of the gas turbine system, the inlet conditioning system, or the steam turbine system. The models may include algorithms, such as mathematical equations and look-up tables, which may be stored locally and updated periodically or acquired remotely via data resources 26, that simulate the response of plant components 49 to specific input conditions. Such look-up tables may include measured operating parameters describing the operation of the same type of components that operate at remote power plant installations.

Thermal model 60 of gas turbine system 30, for example, includes an algorithm 600 that correlates the effect of the temperature of inlet air to power output. It will be appreciated that this algorithm may show that power output decreases from a maximum value 601 as the inlet air temperature increases beyond a threshold 602 temperature. Model 60 may also include an algorithm 603 that correlates the heat rate of the gas turbine at different power output levels of the engine. As discussed, heat rate represents the efficiency of a gas turbine engine or other power generating unit, and is inversely related to efficiency. A lower heat rate indicates a higher thermodynamic performance efficiency. Digital model 61 may simulate thermodynamic operation of the inlet conditioning system 51. In this case, for example, digital model 61 includes an algorithm 610 that correlates the chilling capacity based on energy applied to run refrigeration system 65 of inlet conditioning system 51, so that the calculated chilling capacity indicates the amount of cooling applied to the air entering the gas turbine. There may be a maximum chilling capacity value 611 that can be achieved by refrigeration system 65. In another case, a related algorithm 612 may correlate the energy applied to run refrigeration system 65 to the temperature of the chilled air entering compressor 32 of gas turbine system 30. Model 61 may show, for example, that the power required to run the inlet conditioning system increases dramatically when reducing the temperature of the air entering the gas turbine below the dew point 613 of ambient air. In the case of steam turbine system 50, digital model 62 may include an algorithm 620 that correlates the power output of the steam turbine system to the energy added by HRSG duct firing system 52, such as the amount of fuel consumed by duct firing. Model 62 may indicate, for example, that there is an upper threshold level 621 to the increase in steam turbine system output that can be achieved by the HRSG duct firing system, which may be included in algorithm 620.

According to certain embodiments of the present invention, as illustrated in FIG. 4, the neural network 71 may interact with and provide communications between each of the digital models of the several plant components 49 of the power plant 12 of FIG. 3. The interaction may include collecting output data from the models and generating input data used by the models to generate further output data. The neural network 71 may be a digital network of connected logic elements. The logic elements may each embody an algorithm that accepts data inputs to generate one or more data outputs. A simple logic element may sum the values of the inputs to produce output data. Other logic elements may multiply values of the inputs or apply other mathematical relationships to the input data. The data inputs to each of the logic elements of the neural network 71 may be assigned a weight, such as multiplier between one and zero. The weights may be modified during a learning mode which adjusts the neural network to better model the performance of the power plant. The weights may also be adjusted based on commands provided by the filter. Adjusting the weights of the data inputs to the logic units in the neural network is one example of the way in which the neural network may be dynamically modified during operation of the combined-cycle power plant. Other examples include modifying weights of data inputs to algorithms (which are an example of a logic unit) in each of thermodynamic digital models for the steam turbine system, inlet conditioning system, and gas turbine. The plant controller 22 may be modified in other ways, such as, adjustments made to the logic units and algorithms, based on the data provided by the optimizer and/or filter.

The plant controller 22 may generate an output of recommended or optimized setpoints 74 for the combined-cycle power plant 12, which, as illustrated, may pass through an operator 39 for approval before being communicated and implemented by power plant actuators 47. As illustrated, the optimized setpoints 74 may include input from or be approved by the operator 39 via a computer system such as the one described below in relation to FIG. 6. The optimized setpoints 74 may include, for example, a temperature and mass flow rate for the cooling water generated by the inlet conditioning system and used to cool the air entering the gas turbine system; a fuel flow rate to the gas turbine system; and a duct firing rate. It will be appreciated that optimized setpoints 74 also may be then used by the neural network 71 and models 60, 61, 62, 63 so that the ongoing plant simulation may predict operating data that may later be compared to actual operating data so that the plant model may continually be refined.

Figure 5:
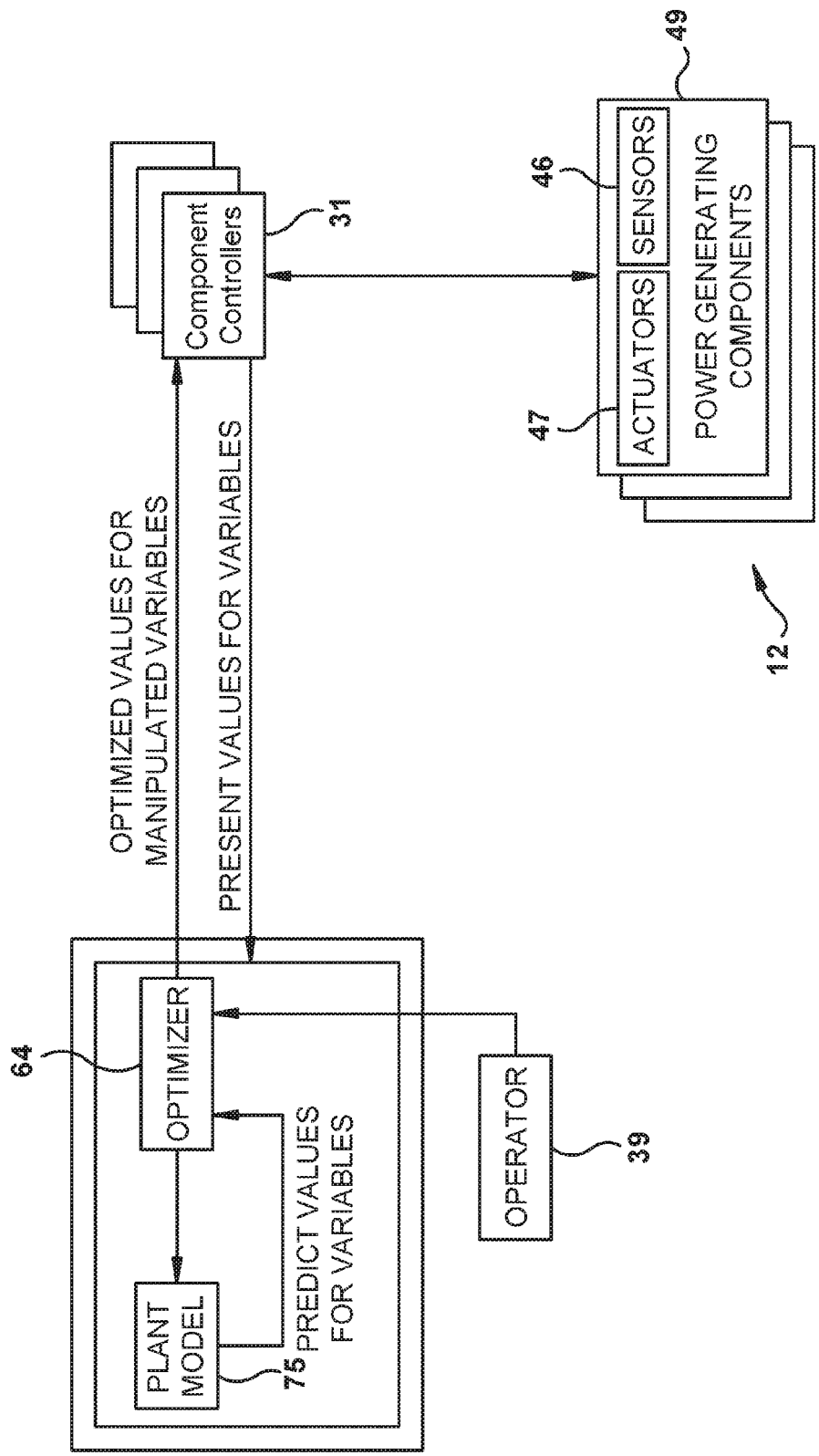
FIG. 5 illustrates a schematic diagram of a power plant with a plant controller and optimizer having a system configuration according to certain aspects of the present invention.

FIG. 5 illustrates a simplified system configuration of a plant controller 22 with an optimizer 64 and power plant model 75. In this exemplary embodiment, the plant controller 22 is shown as a system having the optimizer 64 and power plant model 75 (which, for example, includes the neural network 71 and models 60, 61, 62, 63 discussed above in relation to FIG. 4). The power plant model 75 may simulate the overall operation of a power plant 12. In accordance with the illustrated embodiment, the power plant 12 includes a plurality of generating units or plant components 49. The plant component 49, for example, may include thermal generating units, or other plant subsystems as already described, each of which may include corresponding component controllers 31. The plant controller 22 may communicate with the component controllers 31, and through and by the component controllers 31, may control the operation of the power plant 12 via connections to sensors 46 and actuators 47.

It will be appreciated that power plants have numerous variables affecting their operation. Each of these variables may be generally categorized as being either input variables or output variables. Input variables represent process inputs, and include variables that can be manipulated by plant operators, such as air and fuel flow rates. Input variables also include those variables that cannot be manipulated, such as ambient conditions. Output variables are variables, such as power output, that are controlled by manipulating those input variables that may be manipulated. A power plant model is configured to represent the algorithmic relationship between input variables, which include those that can be manipulated, or "manipulated variables", and those that cannot be manipulated, or "disturbance variables", and output or controlled variables, which will be referred to as "controlled variables". More specifically, manipulated variables are those that may be varied by the plant controller 22 to affect controlled variables. Manipulated variables include such things as valve setpoints that control fuel and air flow. Disturbance variables refer to variables that affect controlled variables, but cannot be manipulated or controlled. Disturbance variables include ambient conditions, fuel characteristics, etc. The optimizer 64 determines an optimal set of setpoint values for the manipulated variables given: (1) performance objectives of the power plant (e.g., satisfying load requirements while maximizing profitability); and (2) constraints associated with operating the power plant (e.g., emissions and equipment limitations).

According to the present invention, an "optimization cycle" may commence at a predetermined frequency (e.g., every 5 to 60 seconds, or 1 to 30 minutes). At the commencement of an optimization cycle, the plant controller 22 may obtain present data for manipulated variables, controlled variables and disturbance variables from the component controllers 31 and/or directly from sensors 46 of each of the plant components 49. The plant controller 22 then may use power plant model 75 to determine optimal setpoint values for the manipulated variables based upon the present data. In doing this, the plant controller 22 may run the plant model 75 at various operational setpoints so to determine which set of operational setpoints are most preferable given the performance objectives for the power plant, which may be referred to as "simulation runs". For example, a performance objective may be to maximize the profitability. By simulating the operation of the power plant at different setpoints, the optimizer 64 searches for the set of setpoints which the plant model 75 predicts causes the plant to operate in an optimal (or, at least, preferable manner). As stated, this optimal set of setpoints may be referred to as "optimized setpoints" or an "optimized operating mode". Typically, in arriving at the optimized setpoints, the optimizer 64 will have compared numerous sets of setpoints and the optimized setpoints will be found superior to each of the other sets given the performance objections defined by the operator. The operator 39 of the power plant 12 may have the option of approving the optimized setpoints or the optimized setpoints may be approved automatically. The plant controller 22 may send the optimized setpoints to the component controller 31 or, alternatively, directly to the actuators 47 of the plant components 49 so that settings may be adjusted pursuant to the optimized setpoints. The plant controller 22 may be run in a closed loop so to adjust setpoint values of the manipulated variables at a predetermined frequency (e.g., every 10-30 seconds or more frequently) based upon the measured current operating conditions.

The optimizer 64 may be used to minimize a "cost function" subject to a set of constraints. The cost function essentially is a mathematical representation of a plant performance objective, and the constraints are boundaries within which the power plant must operate. Such boundaries may represent legal, regulatory, environmental, equipment, or physical constraints. For instance, to minimize NOx, the cost function includes a term that decreases as the level of NOx decreases. One common method for minimizing such a cost function, for example, is known as "gradient descent optimization" Gradient descent is an optimization algorithm that approaches a local minimum of a function by taking steps proportional to the negative of the gradient (or the approximate gradient) of the function at the current point. It should be understood that a number of different optimization techniques may be used depending on the form of the model and the costs and constraints. For example, it is contemplated that the present invention may be implemented by using, individually or in combination, a variety of different types of optimization approaches. These optimization approaches include, but not limited to, linear programming, quadratic programming, mixed integer non-linear programming, stochastic programming, global non-linear programming, genetic algorithms, and particle/swarm techniques. Additionally, plant model 75 may be dynamic so that effects of changes are taken into account over a future time horizon. Therefore, the cost function includes terms over a future horizon. Because the model is used to predict over a time horizon, this approach is referred to as model predictive control, which is described in S. Piche, B. Sayyar-Rodsari, D. Johnson and M. Gerules, "Nonlinear model predictive control using neural networks," *IEEE Control Systems Magazine*, vol. 20, no. 2, pp. 53-62, 2000, and which is fully incorporated herein by reference.

Constraints may be placed upon both process inputs (which includes manipulated variables) and process outputs (which includes controlled variables) of the power plant over the future time horizon. Typically, constraints that are consistent with limits associated with the plant controller are placed upon the manipulated variables. Constraints on the outputs may be determined by the problem that is being solved. According to embodiments of the present invention and as a step in the optimization cycle, the optimizer 64 may compute the full trajectory of manipulated variable moves over the future time horizon, for example one hour. Thus, for an optimization system that executes every 30 seconds, 120 values may be computed over an one hour future time horizon for each manipulated variable. Since plant model or performance objectives or constraints may change before the next optimization cycle, the plant controller 22/optimizer 64 may only outputs the first value in the time horizon for each manipulated variable to component controllers 31 as optimized setpoints for each respective manipulated variable. At the next optimization cycle, the plant model 75 may be updated based upon the current conditions. The cost function and constraints also may be updated if they have changed. The optimizer 64 then maybe used to recompute the set of values for the manipulated variables over the time horizon and the first value in the time horizon, for each manipulated variable, is output to the component controller 31 as setpoint values for each respective manipulated variable. The optimizer 64 may repeat this process for each optimization cycle, thereby, constantly maintaining optimal performance as the power plant 12 is affected by unanticipated changes in such items as load, ambient conditions, fuel characteristics, etc.

Figure 6:
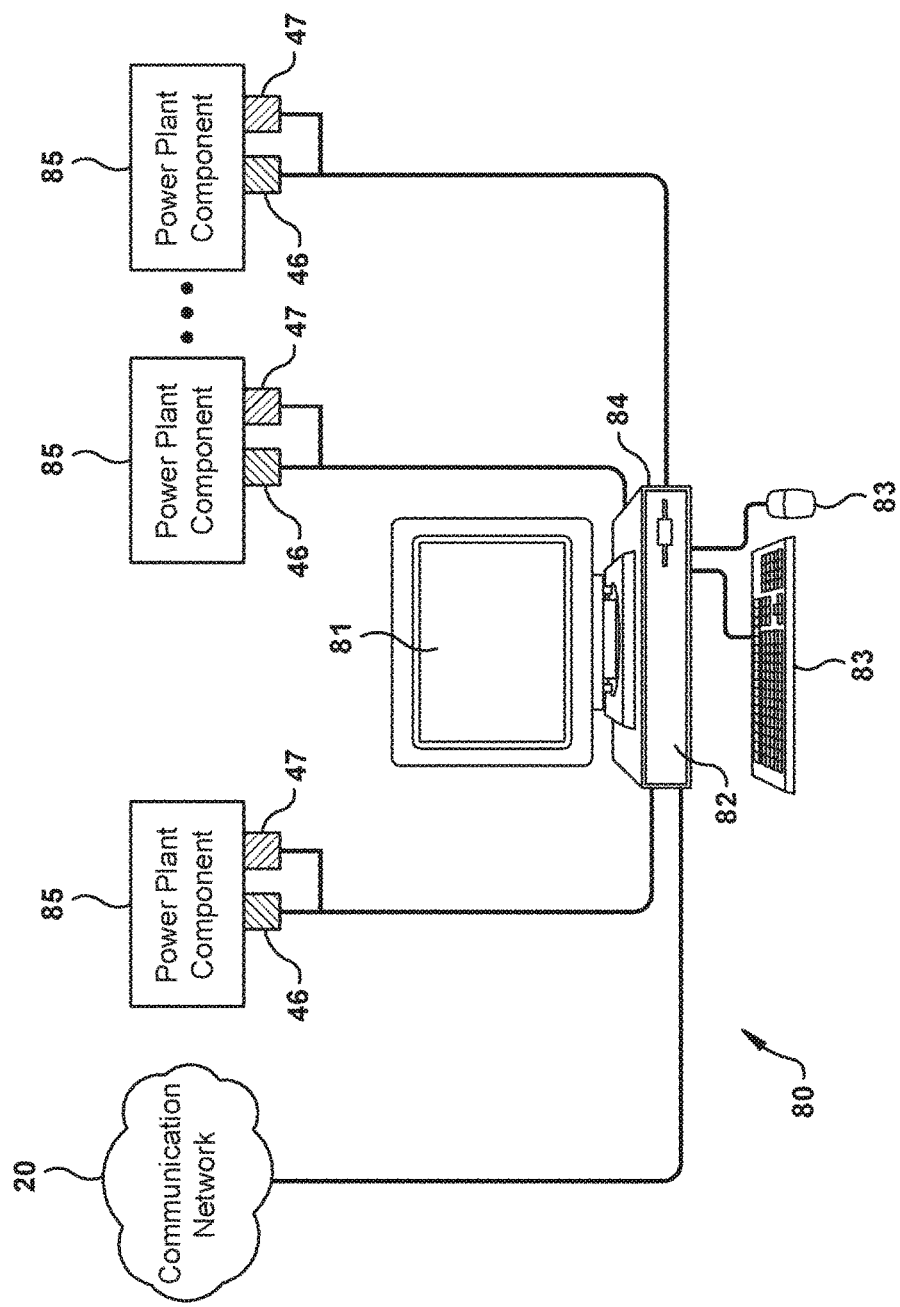
FIG. 6 shows a computer system having an exemplary user interface according to certain aspects of the present invention.

Turning to FIG. 6, an illustrative environment and user input device for a plant controller and control program is illustrated according to an exemplary embodiment. Though other configurations are possible, the embodiment includes a computer system 80 having a display 81, a processor 82, an user input device 83, and a memory 84. Aspects of the computer system 80 may be located at the power plant 12, while other aspects maybe remote and connected via communications network 20. As discussed, the computer system 80 may be connected to each generating unit or other plant component 49 of the power plant 12. The power plant components 49 may include gas turbine system 30, steam turbine system 50, inlet conditioning system 51, HRSG duct firing system 52, and/or any subsystems or subcomponents related thereto, or any combination thereof. The computer system 80 also may be connected to one or more sensors 46 and actuators 47, as may be necessary or desired. As stated, sensors 46 may be configured to sense operating conditions and parameters of the components and relay signals to the computer system 80 regarding these conditions. The computer system 80 may be configured to receive these signals and use them in manners described herein, which may include transmitting signals to one or more of actuators 47. Unless otherwise required, however, the present invention may include embodiments that are not configured to directly control the power plant 12 and/or to sense operating conditions. In configurations of the present invention that do control the power plant 12 and/or sense operating conditions, such input or control can be provided by receiving and/or transmitting signals from/to one or more separate software or hardware systems that more directly interact with physical components of the power plant and its sensors and actuators. The computer system 80 may include a power plant control program ("control program"), which makes the computer system 80 operable to manage data in a plant controller by performing the processes described herein.

In general, the processor 82 executes program code that defines the control program, which is at least partially fixed in the memory 84. While executing program code, the processor 82 may process data, which may result in reading and/or writing transformed data from/to memory 84. Display 81 and input device 83 may enable a human user to interact with the computer system 80 and/or one or more communications devices to enable a system user to communicate with computer system 80 using any type of communications link. In embodiments, a communications network, such as networking hardware/software, may enable computer system 80 to communicate with other devices in and outside of a node in which it is installed. To this extent, the control program of the present invention may manage a set of interfaces that enable human and/or system users to interact with the control program. Further, the control program, as discussed below, may manage (e.g., store, retrieve, create, manipulate, organize, present, etc.) data, such as control data, using any solution.

Computer system 80 may comprise one or more general purpose computing articles of manufacture capable of executing program code, such as the control programs defined herein, that is installed thereon. As used herein, it is understood that "program code" means any collection of instructions, in any language, code or notation, that cause a computing device having an information processing capability to perform a particular action either directly or after any combination of the following: (a) conversion to another language, code or notation; (b) reproduction in a different material form; and/or (c) decompression. Additionally, computer code may include object code, source code, and/or executable code, and may form part of a computer program product when on at least one computer readable medium. It is understood that the term "computer readable medium" may comprise one or more of any type of tangible medium of expression, now known or later developed, from which a copy of the program code may be perceived, reproduced, or otherwise communicated by a computing device. When the computer executes the computer program code, it becomes an apparatus for practicing the invention, and on a general purpose microprocessor, specific logic circuits are created by configuration of the microprocessor with computer code segments. A technical effect of the executable instructions is to implement a power plant control method and/or system and/or computer program product that uses models to enhance or augment or optimize operating characteristics of power plants so to more efficiently leverage the economic return of a power plant, given anticipated ambient and/or market conditions, performance parameters, and/or life cycle cost related thereto. In addition to using current information, historical and/or forecast information may be employed, and a feedback loop may be established to dynamically operate the plant more efficiently during fluctuating conditions. The computer code of the control program may be written in computer instructions executable by the plant controller 22. To this extent, the control program executed by the computer system 80 may be embodied as any combination of system software and/or application software. Further, the control program may be implemented using a set of modules. In this case, a module may enable the computer system 80 to perform a set of tasks used by control program, and may be separately developed and/or implemented apart from other portions of control program. As used herein, the term "component" means any configuration of hardware, with or without software, which implements the functionality described in conjunction therewith using any solution, while the term "module" means program code that enables computer system to implement the actions described in conjunction therewith using any solution. When fixed in the memory 84 of the computer system 80 that includes the processor 82, a module is a substantial portion of a component that implements the actions. Regardless, it is understood that two or more components, modules, and/or systems may share some/all of their respective hardware and/or software. Further, it is understood that some of the functionality discussed herein may not be implemented or additional functionality may be included as part of the computer system 80. When the computer system 80 comprises multiple computing devices, each computing device may have only a portion of control program fixed thereon (e.g., one or more modules). Regardless, when the computer system 80 includes multiple computing devices, the computing devices may communicate over any type of communications link. Further, while performing a process described herein, the computer system 80 may communicate with one or more other computer systems using any type of communications link.

As discussed herein, the control program enables the computer system 80 to implement a power plant control product and/or method. The computer system 80 may obtain power plant control data using any solution. For example, computer system 80 may generate and/or be used to generate power plant control data, retrieve power plant control data from one or more data stores, repositories or sources, receive power plant control data from another system or device in or outside of a power plant, plant controller, component controller, and/or the like. In another embodiment, the invention provides a method of providing a copy of program code, such as for power plant control program, which may implement some or all of a process described herein. It is understood that aspects of the invention can be implemented as part of a business method that performs a process described herein on a subscription, advertising, and/or fee basis. A service provider could offer to implement a power plant control program and/or method as described herein. In this case, the service provider can manage (e.g., create, maintain, support, etc.) a computer system, such as the computer system 80, that performs a process described herein for one or more customers.

Computer models of power plants may be constructed and then used to control and optimize power plant operation. Such plant models may be dynamic and iteratively updated via ongoing comparison between actual (i.e., measured) operating parameters versus those same parameters as predicted by the plant model. In preparing and maintaining such models, instructions may be written or otherwise provided that instruct the processor 82 of the computer system 80 to generate a library of energy system generating units and components ("library of components") in response to user input. In some configurations, user input and the generated library includes properties of the component with the library as well as rules to generate scripts in accordance with operating and property values. These property values can be compiled from data stored locally in memory 84 and/or taken from a central data repository maintained at a remote location. The library of components may include non-physical components, such as economic or legal components. Examples of economic components are fuel purchases and sales, and examples of legal components are emission limits and credits. These non-physical components can be modeled with mathematical rules, just as components representing physical equipment can be modeled with mathematical rules. The instructions may be configured to assemble a configuration of energy system components from the library, as may be configured by an operator. A library of energy system components may be provided so that an user may select from it components so to replicate an actual power plant or create a hypothetical one. It will be appreciated that each component may have several properties that may be used by the user to enter specific values matching operating conditions of an actual or hypothetical power plant being modeled. Scripts may be generated for the assembled energy system components and their configuration. The generate scripts may include mathematical relationships within and/or among the energy system components, including economic and/or legal components, if used in the energy system component configuration. The computer system 80 then may solve mathematical relationships and show results of the solution on the display 81. Configurations in which signals may be transmitted from computer 80, the signals may be used to control an energy system in accordance with the results of the solution. Otherwise, results may be displayed or printed and used for setting physical equipment parameters and/or determining and/or using determined nonphysical parameters, such as fuel purchases and/or sales, so a preferred or optimized mode of operation is achieved. The library of plant components may include a central repository of data representing an ongoing accumulation of data relating to how each plant component operates under different parameters and conditions. The central repository of data may be used to provide "plug data" for instances when sensor data is determined unreliable.

Figure 7:
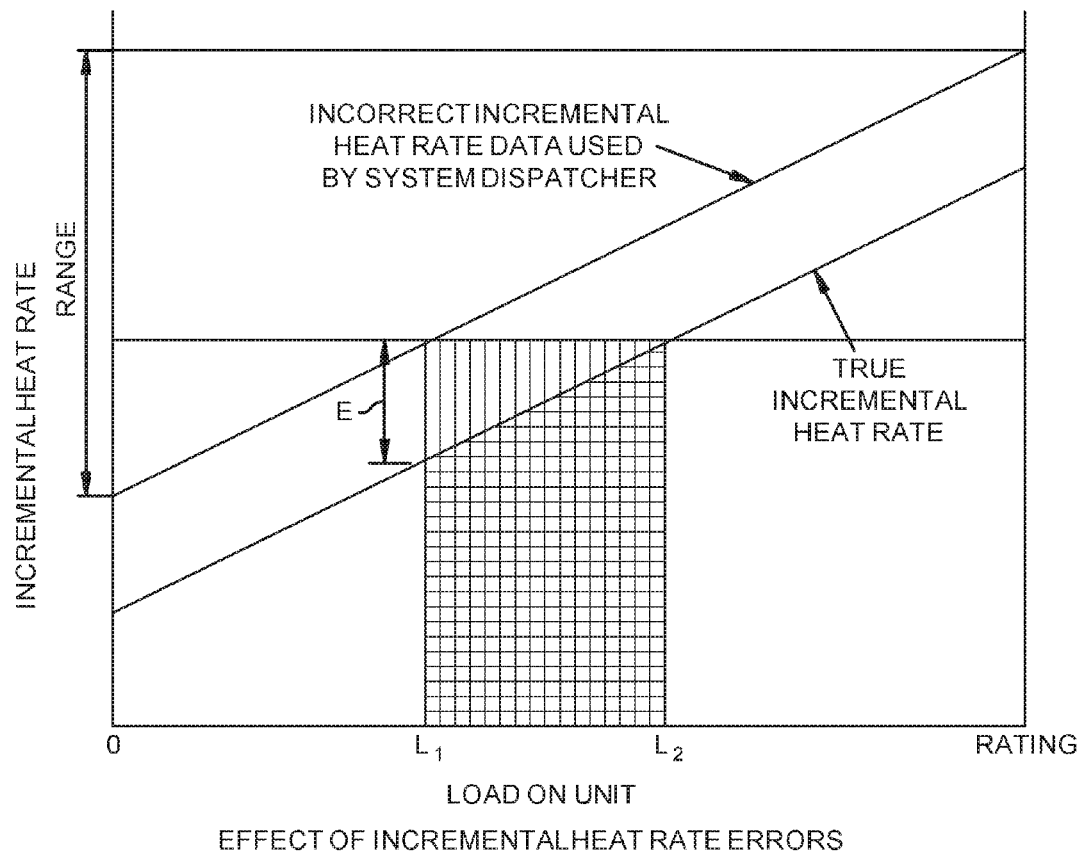
FIG. 7 is an exemplary incremental heat rate curve and an effect error may have on the economic dispatch process.
Figure 8:
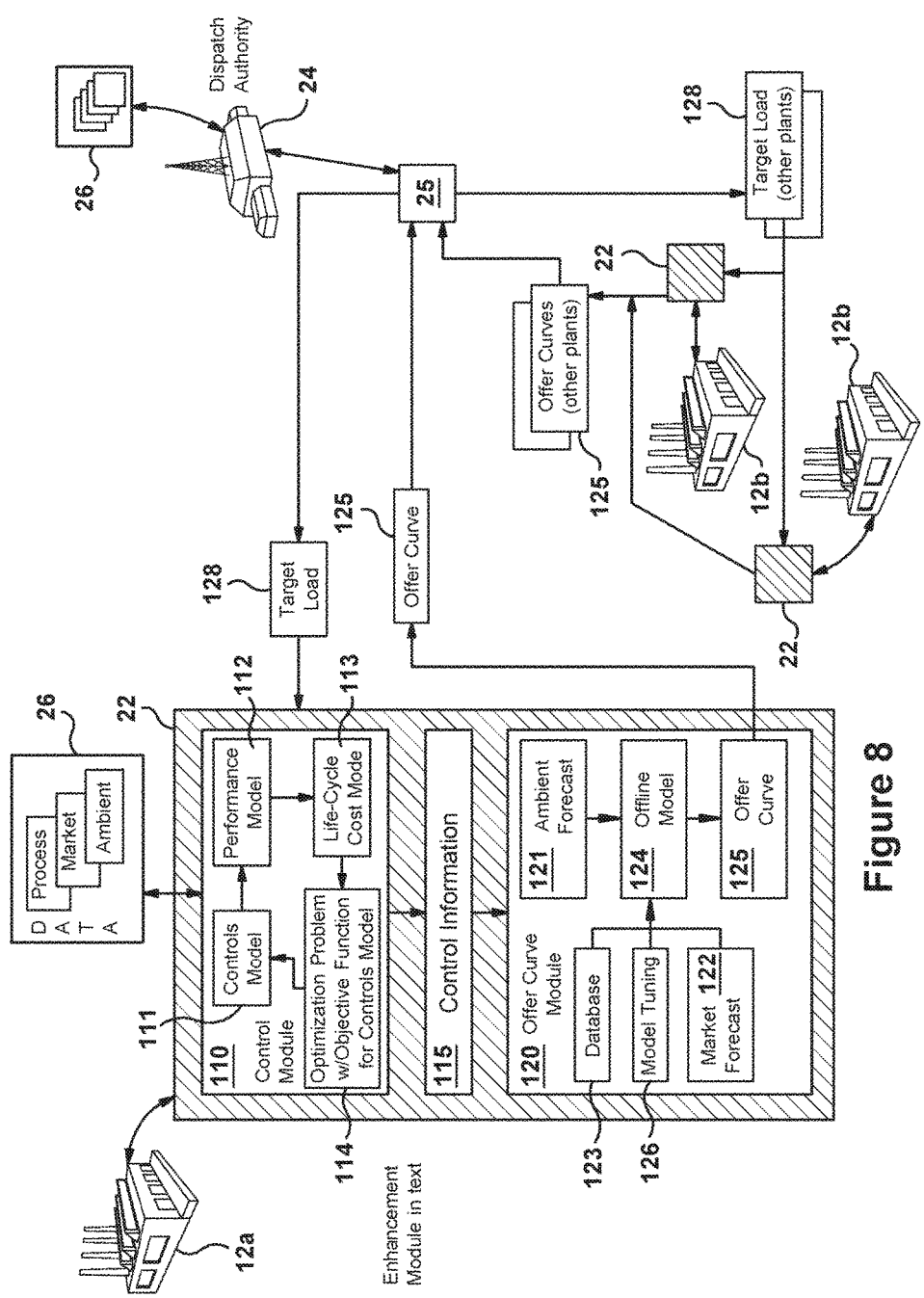
FIG. 8 shows a schematic diagram of an exemplary plant controller with a power system according to aspects of the present invention.
Figure 9:
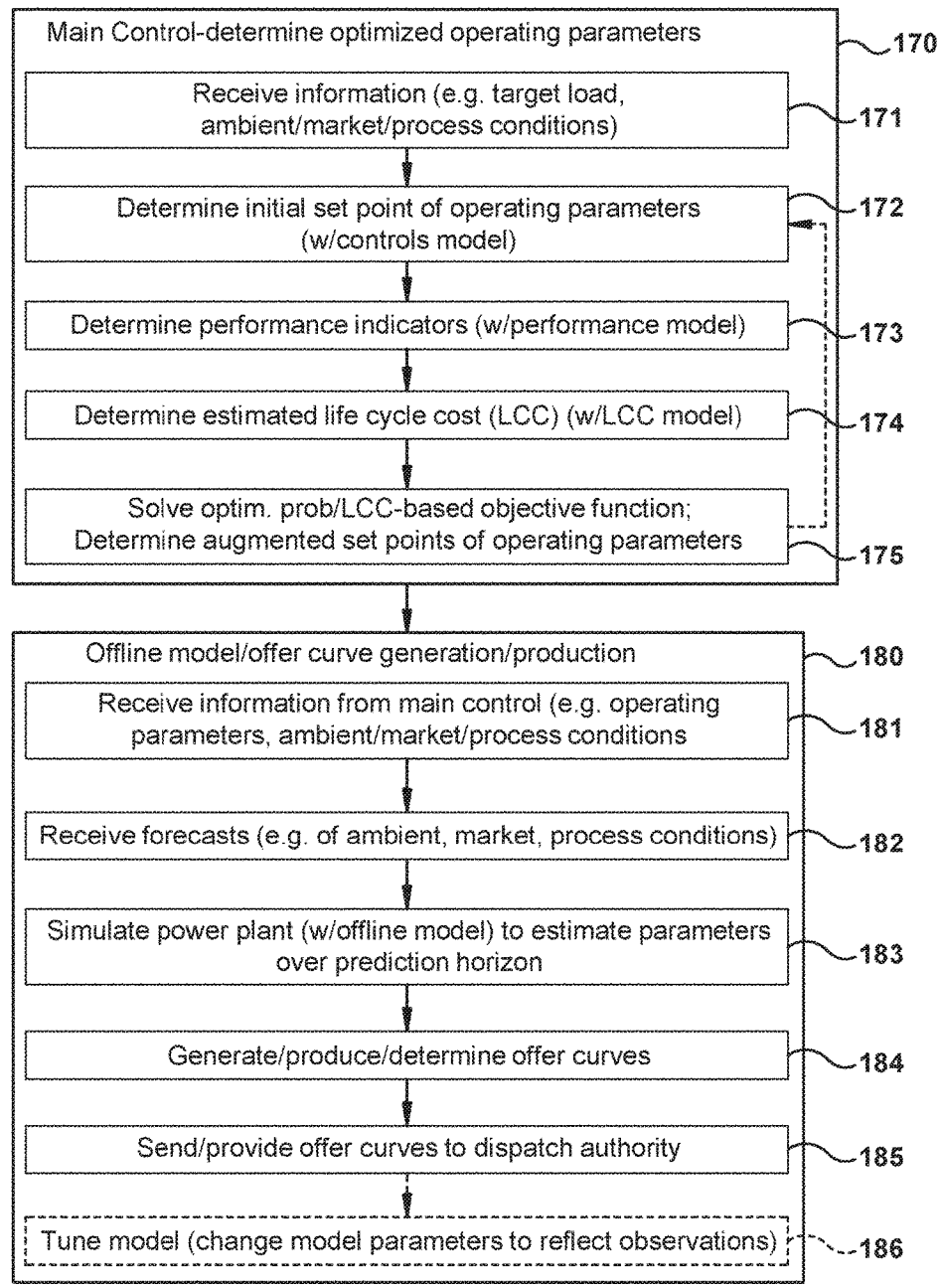
FIG. 9 illustrates a flow diagram of power plant control method according to aspects of the present invention.

Turning to FIGS. 7 through 9, a more detailed discussion of the economic dispatch process is provided, including ways in which the control systems discussed above may be used to optimize such dispatches procedures from the perspective of both a power system central authority or individual power plants participating within such systems, whichever the case may be. It will be appreciated that, from the perspective of a central authority dispatcher, the objective of the economic dispatch process is to dynamically respond to changing variables, including changing load requirements or ambient conditions, while still minimizing generating cost within system. For the participating power plants, it will be appreciated that, in general, the objective is to utilize available capacity while minimizing generating cost so to maximize economic return. Given the complexities of power systems, the process of economic dispatch typically includes the frequent adjusting of load on the participating power plants by the dispatcher. When successful, the process results in available power plants being operated at loads where their incremental generating costs are approximately the same—which results in minimizing generating costs—while also observing system constraints, such as maximum and minimum allowable loads, system stability, etc. It will be appreciated that accurate incremental cost data is necessary for economic dispatch to function optimally. Such incremental cost data has primary components that include fuel cost and incremental fuel consumption. The incremental fuel consumption data is usually given as a curve of incremental heat rate versus power output. Specifically, the incremental heat rate, IHR, of a thermal generating unit is defined as the slope of the heat rate curve, where the heat rate of the unit is the ratio of heat input plotted against electrical output at any load. Errors in this data will result in the dispatching of units at loads that do not minimize total generating cost.

A number of items can introduce errors into the incremental heat rate curves. These may be grouped into two categories. A first category includes items that produce errors present at the time the data is given to the dispatcher. For example, if the data is collected by testing, errors due to instrument inaccuracy will be included in all calculations made with them. As discussed in more detail below, certain aspects of the present invention include ways of confirming sensor accuracy during data collection and timely identifying instances when collected data may be unreliable due to sensor malfunction. A second category of errors includes items that cause data to be less accurate as time passes. For example, if performance of a generating unit changes due to equipment degradation or repair or changes in ambient conditions, the incremental heat rate data used for dispatch will be in error until such data is updated. One aspect of the present invention is to identify those parameters thermal generating units that may significantly affect incremental heat rate calculations. A knowledge of such parameters and their relative significance then may be used to determine how often dispatch data should be updated to reflect true plant performance.

Errors in incremental heat rate data lead to situations where power plants are incorrectly dispatched, which typically results in increased generating cost for the power system. For example, referring to the graph of FIG. 7, a situation is provided where the true incremental heat rate is different from the incremental heat rate that is used in the dispatch process. In dispatching the unit, the dispatch authority uses the incremental heat rate data that is in error by "E", as indicated. (It should be noted that FIG. 7 assumes that a power system's incremental heat rate is not affected by the load imposed on the given unit, which may be substantially correct if the power system is a large one in comparison to the size of the given generating unit.) As shown, the generating unit will be dispatched at $L_1$, which is the load where the unit and the system incremental heat rates are equal based on the information available. If the correct incremental heat rate information were used, the unit would be dispatched at $L_2$, the load where the true incremental heat rate of the plant equals the power system's incremental heat rate. As will be appreciated, the error results in the underutilization of the power plant. In cases where the alternative is true, i.e., where the positioning of the incorrect incremental heat rate plot relative to the true incremental heat rate plot is reversed, the error results in the unit being overcommitted, which may require it to operate inefficiently to satisfy its dispatched load commitment. From the perspective of the central dispatch authority of the power system, it will be appreciated that reducing errors in the data used in the dispatch process will reduce total system fuel costs, increase system efficiency, and/or decrease the risk of not meeting load requirements. For the operators of power plants within the system, reducing such errors should promote full utilization of the plant and improve economic return.

FIGS. 8 and 9, respectively, illustrate a schematic diagram of a plant controller 22 and a flow diagram 169 of a control method pursuant to aspects of the present invention. In these examples, methods are provided that illustrate economic optimization within a power system that uses economic dispatch to distribute load among possible providers. The fundamental process of economic dispatch is one that may be employed in different ways and between any two levels defined within the layered hierarchy common to many power systems. In one instance, for example, the economic dispatch process may be used as part of a competitive process by which a central government authority or industry cooperative association of portions load among several competing companies. Alternatively, the same principles of economic dispatch may be used to apportion load among commonly owned power plants so to minimize generating costs for the owner of the plants. It may also be used at the plant level as a way for an operator or plant controller to apportion its load requirements among the different local generating units that are available to it. It will be appreciated that, unless otherwise stated, the systems and methods of the present invention are generally applicable to any of these possible manifestations of the economic dispatch process.

In general, the dispatch process seeks to minimize generating cost within a power system via the creation of a dispatch schedule in which the incremental generating costs for each participating power plant or generating unit is approximately the same. As will be appreciated, several terms are often used to describe the economic dispatch process, and so will be defined as follows. A "prediction horizon" is a predefined period of time over which optimization is to be performed. For example, a typical prediction horizon may be from a few hours to a few days. An "interval" within the prediction horizon is a predefined time resolution of optimization, i.e., the aforementioned "optimization cycle", which describes how often optimization is to be performed during the prediction horizon. For example, a typical time interval for an optimization cycle may be from several seconds to several minutes. Finally, a "prediction length" is the number of time intervals for which optimization is to be performed, and may be obtained by dividing the prediction horizon by the time interval. Thus, for a 12-hour prediction horizon and a 5-minute time interval, a prediction length is 144 time intervals.

Aspects of the present invention provide methods of control and/or controllers for power plants, as well as methods and systems for optimizing performance, cost-effectiveness, and efficiency. For example, according to the present invention, a minimum variable operating cost may be achieved for a thermal generating unit or power plant that balances variable performance characteristics and cost parameters (i.e., fuel cost, ambient conditions, market conditions, etc.) with life-cycle cost (i.e., variable operation and its effect on maintenance schedules, part replacement, etc.). By varying one or more parameters of a thermal generating unit taking such factors into account, more economical advantage may be taken of the unit over its useful life. For example, in power plants that include a gas turbine, firing temperature may be varied to provide a desired load level more economically based on operating profile, ambient conditions, market conditions, forecasts, power plant performance, and/or other factors. As a result, the disposal of parts with residual hours-based life remaining in starts-limited units may be reduced. Further, a power plant control system that includes a feedback loop updated with substantially real-time data from sensors that are regularly tested and confirmed as operating correctly will allow further plant optimization. That is, according to certain embodiments of the present invention, by introducing a real-time feedback loop between the power plant control system and dispatch authority, target load and unit commitment may be based on highly accurate offer curves that are constructed based on real-time engine performance parameters.

FIG. 8 illustrates a schematic design of an exemplary the plant controller 22 according to aspects of the present invention. It will be appreciated that the plant controller 22 may be particularly well-suited for implementing method 169 of FIG. 9. Because of this, FIGS. 8 and 9 will be discussed together, though it will be appreciated that each may have aspects applicable to more general usage. The power system 10 represented in FIG. 8 includes a "power plant 12a", to which the plant controller 22 is dedicated, as well as "other power plants 12b", which may represent power plants within the power system that compete against power plant 12a. As illustrated, the power system 10 also includes a dispatch authority 24 that, through a dedicated system controller 25, manages the dispatch process between all participating power plants 12a, 12b within the system.

The power plant 12a may include numerous sensors 46 and actuators 47 by which the plant controller 22 monitors operating conditions and controls the plant's operation. The plant controller 22 may communicate with numerous data resources 26, which may be located remotely to it and accessible over a communications network and/or contained locally and accessible over a local network. As illustrated, the schematic representation of the plant controller 22 includes several subsystems which have been delineated from each other by the several boxes. These subsystems or "boxes" have been separated mostly by function so to assist in description. However, it will be appreciated that separated boxes may or may not represent individual chips or processors or other individual hardware elements, and may or may not represent separated sections of computer program code executed within the plant controller, unless otherwise stated. Similarly, while the method 169 is broken into two major sections or blocks, this is for convenience and to assist with description. It will be appreciated that any or all of the separate boxes shown in FIG. 8 may be combined into one or more sections in the plant controller 22, as may any or all of the separate blocks or steps shown in FIG. 9.

The method 169 of FIG. 9 may begin, for example, with a control section 170 that receives or gathers present information and data for use (at step 171), which may include market data, operating data, and/or ambient data. Within the plant controller 22, a corresponding control module 110 may be arranged to request/receive this type of data from data resources 26 or any other suitable source. Control module 110 may also be configured to receive a target load 128 from dispatch authority 24 (though on an initial run, such a target load may not be available, and a predefined initial target load may be used). Ambient data may be received from remote or local data repositories and/or forecast services, and may be included as a component of data resources 26. Ambient data also may be gathered via ambient sensors deployed around power plant 12a, as well as received via a communication link with the dispatch authority 24. According to aspects of the present invention, ambient data includes historical, present, and/or forecast data that describe ambient conditions for power plant 12a, which, for example, may include air temperature, relative humidity, pressure, etc. Market data may be received from remote or local data repositories and/or forecast services, and may be included as a component of data resources 26. Market data may also be received via a communication link with dispatch authority 24. According to aspects of the present invention, market data includes historical, present, and/or forecast data that describe market conditions for power plant 12a, which, for example, includes energy sale price, fuel cost, labor cost, etc. Operating data also may be received from data repositories, and/or forecast services, and may be included as a component of data resources 26. Operating data may include data collected from multiple sensors 46 deployed within the power plant 12 and its plant components 49 that measure physical parameters relating to plant operation. Operating data may include historical, present, and/or forecast data, as well as a variety of process inputs and outputs.

As seen in FIG. 9, an initial setpoint for the power plant 12 may be determined, such as with a controls model 111 in the plant controller 22 of FIG. 8. For example, the controls model 111 may be configured to use thermodynamic and/or physical details of the power plant 12 and additional information, such as ambient data or market data or process data, to determine a value of an operating parameter for the power plant 12 (at step 172 of FIG. 9). In one instance, for example, the value of an operating parameter may be a value that would be required to achieve power output sufficient to meet a target load. The determined value may be used as an initial setpoint for the respective operating parameter of the power plant 12 (also step 172 of FIG. 9). It will be appreciated that examples of such operating parameters may include: fuel flow rate, firing temperature, a position for inlet guide vanes (if guide vanes are present), a steam pressure, a steam temperature, and a steam flow rate. A performance indicator then may be determined (at step 173 of FIG. 9) by using a performance model 112 of the plant controller 22. The performance indicator may provide an operating characteristic, such as efficiency, of the power plant 12. The performance model 112 may be configured to use thermodynamic and/or physical details of the power plant 12, as well as the setpoints determined by controls model 111, so to determine a value of an operating characteristic of the power plant 12. The performance model 112 may be configured to take into account additional information, such as ambient conditions, market conditions, process conditions, and/or other relevant information.

In addition, according to certain aspects of the present invention, an estimate may be determined of a life cycle cost (LCC) of the power plant 12 (at step 174 of FIG. 9), such as with a LCC model 113 that is included in the plant controller 22 of FIG. 8. The LCC model 113, which may be a computer program or the like, may be configured to use physical and/or cost information about the power plant 12, as well as setpoints from controls model 111, to determine an estimated life cycle cost of power plant 12. Life cycle cost may include, for example, a total cost, a maintenance cost, and/or an operating cost of power plant 12 over its service life. The LCC model 113 may additionally be configured to take into account the results of performance model 112 for enhanced accuracy. The LLC model 113 may therefore use the determined setpoints of controls model 111 and the operating characteristic from the performance model 112, as well as other information, as desired, to estimate the service life of the power plant 12, as well as how much it may cost to operate and/or maintain the power plant 12 during its service life. As noted above, the service life of a power plant may be expressed in hours of operation and/or number of starts, and a given power plant has an expected service life that may be provided by a manufacturer of the power plant. Thus, predefined values of expected service life may be used at least as a starting point for LCC model 113, and/or an enhancement module 114.

Using information from other embodiments of the invention, such as results from determining an initial setpoint, a performance indicator, and an estimated life cycle, an optimization problem may be solved for the power plant 12 (at step 175) as described below. Such an optimization problem may include a plurality of equations and variables, depending on a depth of analysis desired, and may include an objective function, which in embodiments may be a LCC-based objective function. The solution may include providing an enhanced or augmented operating parameter of the power plant 12, such as, for example, by minimizing a LCC-based objective function (also step 175). In embodiments, the solution of the optimization problem may be performed by an enhancement module 114 of the plant controller 22 of FIG. 8.

As is known from optimization theory, an objective function represents a characteristic or parameter to be optimized and may take into account many variables and/or parameters, depending on how the optimization problem is defined. In an optimization problem, an objective function may be maximized or minimized, depending on the particular problem and/or the parameter represented by the objective function. For example, as indicated above, an objective function expressing LCC according to embodiments would be minimized to produce at least one operating parameter that may be used to run the power plant 12 so as to keep LCC as low as feasible. An optimization problem for the power plant 12, or at least an objective function, may take into account such factors as power plant characteristics, site parameters, customer specifications, results from controls model 111, performance model 112, and/or LCC model 113, ambient condition, market condition, and/or process condition, as well as any additional information that might be suitable and/or desired. Such factors may be gathered into terms of an objective function, so that, for example, a LCC-based objective function includes maintenance cost and operation cost represent over time, where time is a prediction horizon based on an estimated component service life. It will be appreciated that complex objective functions and/or optimization problems may be used in implementations of the present invention, as each may include many or all of the various functions and/or factors that are described herein.

Maintenance cost, for example, may be determined by modeling parts of the power plant 12 to estimate wear based on various parameters, such as those already discussed. It will be appreciated that any part of the power plant 12 may be modeled for these purposes. In a practical application, however, the parts associated with fewer, larger portions, or fewer, select portions of the power plant 12 might be modeled, and/or constants or plug values might be used for some parts instead of modeling. Whatever level of detail is employed, minimization of such an LCC-based objective function is part of an optimization problem that may vary for a given power plant as a result of many factors, such as those provided above, and may include at least one enhanced or augmented operating parameter of the power plant 12, such as in accordance with minimizing LCC. In addition, those skilled in the art will recognize that at least one constraint may be imposed upon the optimization problem, such as a predefined up time and/or down time, a predefined upper and/or lower temperature at various locations in the power plant 12, a predefined torque, a predefined power output, and/or other constraints as may be desired and/or appropriate. Unless otherwise stated, it is within the purview of those skilled in the art to determine what constraints should be applied and in what manner for a given optimization problem. Further, those skilled in the art will recognize situations in which additional optimization theory techniques may be applied, such as adding a slack variable to allow a feasible solution to the optimization problem.

Known techniques may be employed, such as by enhancement module 114 (FIG. 8), to solve an optimization problem for operation of the power plant 12. For example, an integer programming, a linear, a mixed integer linear, a mixed integer nonlinear, and/or another technique may be used as may be suitable and/or desired. In addition, as seen in the example objective function, the optimization problem may be solved over a prediction horizon, providing an array of values for at least one operating parameter of the power plant 12. While enhancement or augmentation may be performed over a relatively short prediction horizon, such as 24 hours or even on the order of minutes, enhancement module 114 (FIG. 8) may employ a longer prediction horizon, such as up to an estimated service life of the power plant 12, depending on a depth of analysis desired. In embodiments, initial setpoints determined, such as by controls model 111 (FIG. 8), may be adjusted responsive to and/or as part of the solution of the optimization problem to yield an enhanced or augmented or optimized setpoint. In addition, iteration may be used with determining an initial setpoint, determining a value of a performance indicator, determining an estimated LCC cost, and enhancing or augmenting (at steps 172-175 of FIG. 9) to refine results and/or better enhance or augment control setpoints of the power plant 12.

As will be described, an offer curve section 180 may generate an offer curve or set of offer curves, an example of which was shown previous in relation to FIG. 7. In the plant controller 22, control information 115 from control module 110 and/or data resources 26 may be received (at step 181 of FIG. 9) by an offer curve module 120. According to certain embodiments, control information 115 includes: control setpoints, performance, ambient conditions, and/or market conditions. This information may also be known as "as run" information. In addition, an ambient condition forecast 121 and/or market condition forecast 122 may be received (at step 182). According to certain embodiments, a database 123 may be included and may store current information, "as run" information, and/or historical information locally, including any or all of ambient conditions, market conditions, power plant performance information, offer curves, control setpoints, and/or any other information which may be suitable. Database 123 may be used to provide information to simulate operation of the power plant 12 (at step 183), such as with an offline model 124 of the power plant 12.

Offline model 124 may include a model similar to controls model 111, but may also include additional modeling information. For example, offline model 124 may incorporate portions or entireties of controls model 111, performance model 112, LCC model 113, and/or additional modeling information. By running offline model 124 with setpoints and/or information from enhancing or augmenting LCC, output of offline model 124 may be used to determine estimated values for cost of power production for each time interval in a prediction horizon and for various values of power output of the power plant 12 to generate one or more offer curves 125 (at step 184) which may be sent or otherwise provided to dispatch authority 24 (at step 185). Offline model 124 may use any suitable information, such as historical, current, and/or forecast information, in determining estimated operating costs and/or conditions of the power plant 12. In addition, offline model 124 in embodiments may be tuned (at step 186), such as by a model tuning module 126. Tuning may include, for example, periodically adjusting parameters for offline model 124 based on information received and/or provided by other parts of the plant controller 22 to better reflect actual operation of the power plant 12 so as to better simulate operation of the power plant 12. Thus, for a given set of operating parameters, if plant controller 12 observes an actual process condition that differs from what offline model 124 had predicted, plant controller 12 may change offline model 124 accordingly.

In addition to the offer curves 125 from the power plant 12a, as illustrated, dispatch authority 24 may receive offer curves 125 from other power plants 12b under its control. Dispatch authority 24 may assess the offer curves 125 and may generate a dispatch schedule to accommodate load on power system 10. Dispatch authority 24 may additionally take into account forecasted ambient conditions, a load forecast and/or other information as may be appropriate and/or desired, which it may receive from various local or remote data resources 26 to which it has access. As illustrated in, the dispatch schedule produced by dispatch authority 24 includes a control signal for the power plant 12 that includes a target load 128, to which the plant controller 22 may respond as described above.

It will be appreciated that the inclusion of life-cycle costs considerations, as described herein, may serve to increase the scope and accuracy of the plant models used in the optimization process and, in doing this, enable enhancements to the procedure. Offer curves 125, as described above, may represent variable cost (measured in dollars per megawatt-hour versus power plant output in megawatts). Offer curves 125 may include an incremental variable cost offer curve and an average variable cost offer curve. As can be seen, embodiments of the present invention may provide accurate assessments of variable cost via their generated offer curves 125. Using embodiments of the present invention, incremental variable cost offer curves have been shown to predict very closely actual incremental variable cost curves, while average variable cost offer curve have been shown to predict very closely actual average variable cost curves. The accuracy of the offer curves generated by embodiments of the present invention indicates that the various models used in the plant controller 22 of FIG. 8 provides a suitably representative model for the purposes outlined.

Figure 10:
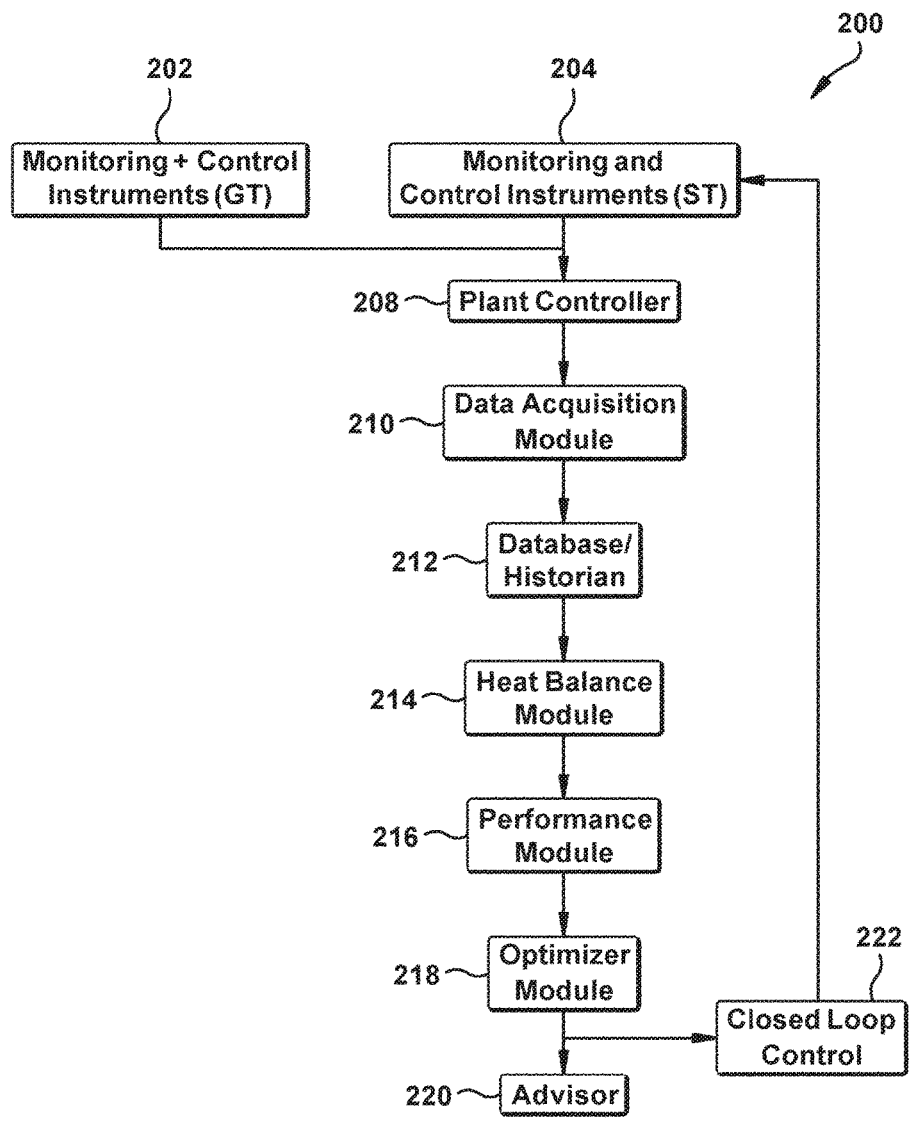
FIG. 10 illustrates a data flow diagram describing an architecture for a plant optimization system for a combined cycle power plant in accordance with aspects of the present invention.

Turning now to the FIGS. 10 through 12, other aspects of the present invention are described with reference to and inclusive of certain systems and methods provided above. FIG. 10 is a data flow diagram demonstrating an architecture for a plant optimization system 200 that may be used in a combined-cycle power plant having gas and steam turbine systems. In the embodiment provided, a system 200 includes monitoring and control instruments 202, 204, such as the sensors and actuators discussed above, associated with each of the gas turbine (202) and the steam turbine systems (204). Each of the monitoring and control instruments 202, 204 may transmit signals indicative of measured operating parameters to a plant controller 208. The plant controller 208 receives the signals, processes the signals in accordance with predetermined algorithms, and transmits control signals to monitoring and control instruments 202, 204 to affect changes to plant operations.

The plant controller 208 interfaces with a data acquisition module 210. The data acquisition model 210 may be communicatively coupled to a database/historian 212 that maintains archival data for future reference and analysis. A heat balance module 214 may receive data from data acquisition model 210 and database/historian 212 as requested to process algorithms that tunes a mass and energy balance model of the power plant to match measured data as closely as possible. Discrepancies between the model and the measured data may indicate errors in the data. As will be appreciated, a performance module 216 may use plant equipment models to predict the expected performance of major plant components and equipment. The difference between expected and current performance may represent degradation of the condition of plant equipment, parts, and components, such as, but, not limited to fouling, scaling corrosion, and breakage. According to aspects of the present invention, the performance module 216 may track degradation over time so that performance problems having the most significant effect on plant performance are identified.

As illustrated, an optimizer module 218 may be included. The optimizer module 218 may include a methodology for optimizing an economic dispatch of the plant. For example, according to embodiments, the power plant may be dispatched based on heat rate or incremental heat rate pursuant to the assumption that heat rate is equivalent to monetary resources. In an alternative scenario, in which the power plant includes an additional manufacturing process (not shown) for which steam is used directly (i.e., where the steam produced may be diverted from power generation in the steam turbine to another manufacturing use), it will be appreciated that the optimizer module 218 may solve an optimization problem wherein a component with a higher heat rate may be dispatched. For example, in certain situations, a demand for steam may outpace a demand for electricity or the electrical output may be constrained by electrical system requirements. In such cases, dispatching a lower efficiency gas turbine engine may allow greater heat to be recovered without raising electrical output in excess of a limit. In such scenarios, the dispatching of the component with a higher heat rate is the economically optimized alternative.

The optimizer module 218 may be selectable between an online (automatic) and an offline (manual) mode. In the online mode, the optimizer 218 automatically computes current plant economic parameters such as cost of electricity generated, incremental cost at each level of generation, cost of process steam, and plant operating profit on a predetermined periodicity, for example, in real-time or once every five minutes. An offline mode may be used to simulate steady-state performance, analyze "what-if" scenarios, analyze budget and upgrade options, and predict current power generation capability, target heat rate, correction of current plant operation to guarantee conditions, impact of operational constraints and maintenance actions, and fuel consumption. The optimizer 218 calculates a profit optimized output for the power plant based on real-time economic cost data, output prices, load levels, and equipment degradation, rather than an output based on efficiency by combining plant heat balances with a plant financial model. The optimizer 218 may be tuned to match the degradation of each component individually, and may produce an advisory output 220 and/or may produce a closed feedback loop control output 222. Advisory output 220 recommends to operators where to set controllable parameters of the power plant so to optimize each plant component to facilitate maximizing profitability. In the exemplary embodiment, advisory output 220 is a computer display screen communicatively coupled to a computer executing optimizer module 218. In an alternative embodiment, advisory output is a remote workstation display screen wherein the workstation accesses the optimizer module 218 through a network. Closed feedback loop control output 222 may receive data from optimizer module 218 and calculates optimized set points and/or bias settings for the modules of system 200 to implement real-time feedback control.

Figure 11:
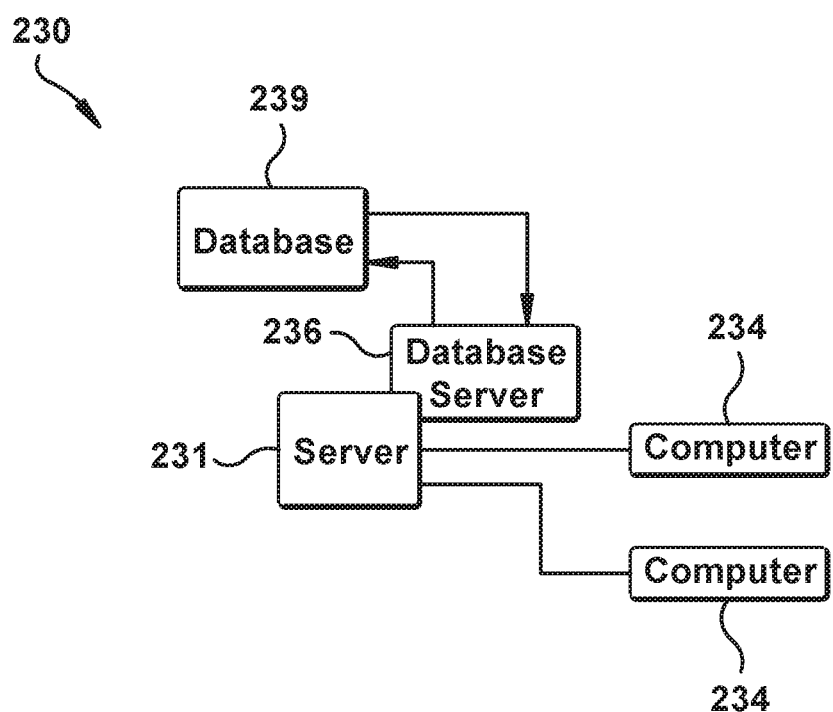
FIG. 11 provides a simplified block diagram of a computer system as may be employed with a real-time optimization system in accordance with aspects of the present invention.

FIG. 11 is a simplified block diagram of a real-time thermal power plant optimization system 230 that, according to aspects of the present invention, includes a server system 231, and a plurality of client sub-systems, also referred to as client systems 234, communicatively coupled to the server system 231. As used herein, real-time refers to outcomes occurring at a substantially short period after a change in the inputs affect the outcome, for example, computational calculations. The period represents the amount of time between each iteration of a regularly repeated task. Such repeated tasks may be referred to herein as periodic tasks or cycles. The time period is a design parameter of the real-time system that may be selected based on the importance of the outcome and/or the capability of the system implementing processing of the inputs to generate the outcome. Additionally, events occurring in real-time, occur without substantial intentional delay. In the exemplary embodiment, calculations may be updated in real-time with a periodicity of one minute or less. Client systems 234 may be computers that include a web browser, such that server system 231 is accessible to client systems 234 via the internet or some other network. Client systems 234 may be interconnected to the internet through many interfaces. Client systems 234 could be any device capable of interconnecting to the internet. A database server 236 is connected to a database 239 containing information regarding a plurality of matters, as described below in greater detail. In one embodiment, a centralized database 239, which includes aspects of data resources 26 discussed above, is stored on server system 231 and can be accessed by potential users at one of client systems 234 by logging onto server system 231 through the client systems 234. In an alternative embodiment database 239 is stored remotely from server system 231 and may be non-centralized.

According to aspects of the present invention, certain of the control methods discussed above may be developed for use in conjunction with system diagrams of FIGS. 10 and 11. For example, one method includes simulating power plant performance using a plant performance module of a software code segment that receives power plant monitoring instrument data. The data may be received through a network from a plant controller or a database/historian software program executing on a server. Any additional plant components, such as an inlet conditioning system or a HRSG duct firing system, may be simulated in a manner similar to that used to simulate power plant performance. Determining the performance of each plant component in the same manner allows the overall power plant to be treated as a single plant to determine optimize setpoints for the power plant rather than determining such setpoints for each component separately. Measurable quantities for each plant component may be parameterized so to express output or power plant efficiency on a component by component basis. Parameterizing plant equipment and plant performance includes calculating efficiency for components, such as, but not limited to, a gas turbine compressor, a gas turbine, a heat recovery steam generator (HRSG), a draft fan, a cooling tower, a condenser, a feed water heater, an evaporator, a flash tank, etc. Similarly, it will be appreciated that heat-rate and performance calculations may be parameterized and the resulting simultaneous equations solved in real-time, such that calculated results are available without intentional delay from the time each parameter was sampled. Solving parameterized simultaneous equations and constraints may also include determining a current heat balance for the power plant, determining an expected performance using present constraints on the operation of the power plant, such as, but not limited to spinning reserve requirements, electrical system demand, maintenance activities, freshwater demand, and component outages. Solving parameterized equations and constraints may also include determining parameters to adjust to modify the current heat balance such that a future heat balance equals the determined expected performance. In an alternative embodiment, solving parameterized simultaneous equations and constraints includes determining inlet conditions to the power plant, predicting an output of the power plant based on the determined inlet conditions and a predetermined model of the power plant, determining a current output of the power plant, comparing the predicted output to the determined output, and adjusting plant parameters until the determined output equals the predicted output. In exemplary embodiments, the method also includes correlating controllable plant parameters, plant equipment, and plant performance using parameterized equations, defining the objective of the optimization using an objective function that includes minimizing the heat rate of the power plant and/or maximizing the profit of the power plant, and defining the physically possible range of operation of each individual piece of equipment, and/or overall limits using constraints wherein the overall limits include maximum power production, maximum fuel consumption, etc.

Figure 12:
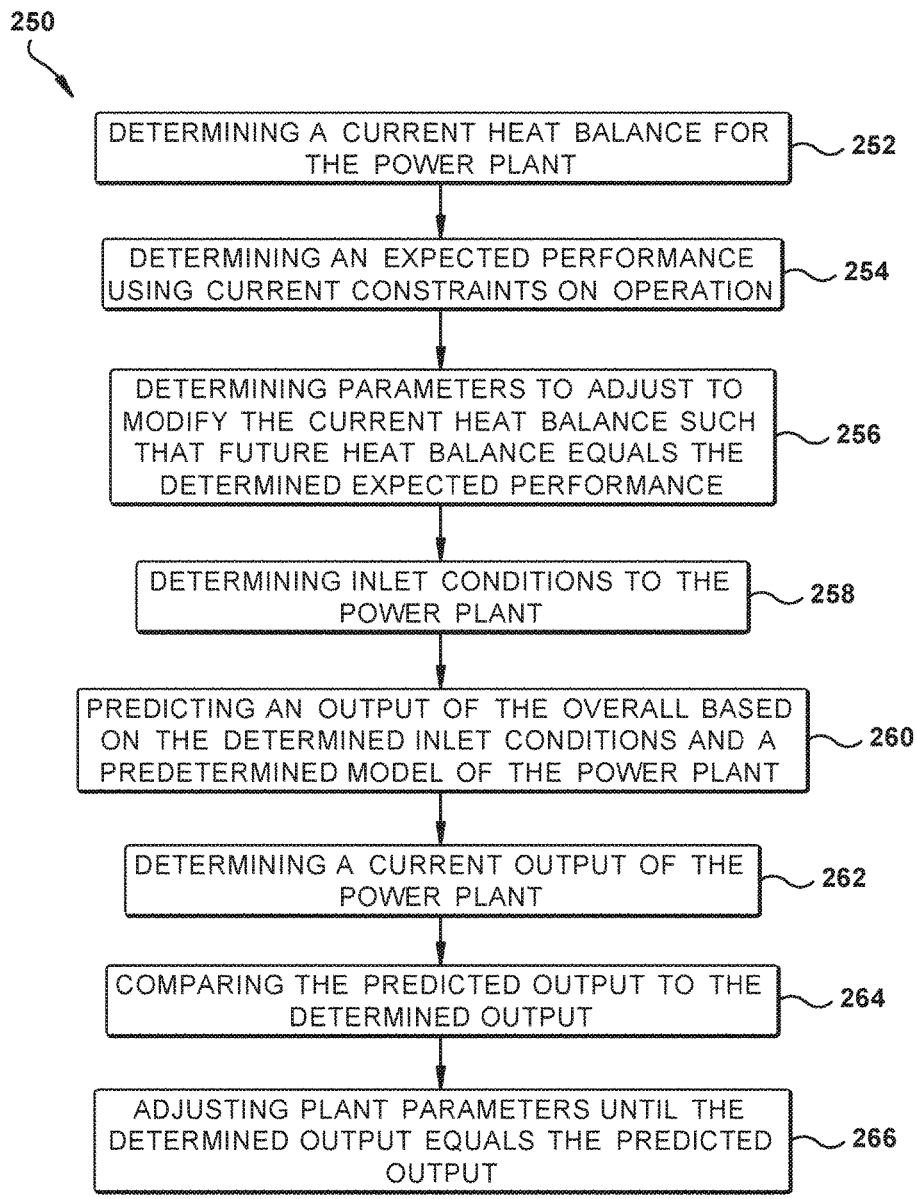
FIG. 12 is a flow diagram of an exemplary method for solving parameterized simultaneous equations and constraints in accordance with the present invention.

FIG. 12 a flow chart of an exemplary method 250 for solving parameterized simultaneous equations and constraints in accordance with the present invention. The method 250 includes determining (at 252) a current heat balance for the power plant, determining (at 254) an expected performance using current constraints on operation, and determining (at 256) parameters to adjust so to modify the current heat balance such that a future heat balance equals the determined expected performance. The method 250 also includes determining 258 inlet conditions to the power plant, predicting 260 an output of the power plant based on the determined inlet conditions and a predetermined model of the power plant, determining 262 a current output of the power plant, comparing 264 the predicted output to the determined output, and adjusting 266 plant parameters until the determined output equals the predicted output. It will be appreciated that the described method, and systems discussed in relation to the FIGS. 10 and 11, provide a cost-effective and reliable means for optimizing combined-cycle power plants.

Turning now to FIGS. 13 through 16, attention will be paid to the several flow diagrams and system configurations that illustrate control methodology according to certain aspects of the present invention. In general, according to an example embodiment, a control system for a thermal generating unit, such as the gas turbine system, or power plant may include first and second instances of a model that models the operation of the turbine, such as by utilizing physics-based models or mathematically modeling (e.g., transfer functions, etc.). The first model (which may also be referred to as the "primary model") may provide present operating parameters of the gas turbine system, which describe the turbines mode of operation and the operating conditions that correspond to it. As used herein, "parameters" refer to items that can be used to define the operating conditions of the turbine, such as, but not limited to, temperatures, pressures, gas flows at defined locations in the turbine, and compressor, combustor, and turbine efficiency levels, etc. Performance parameters may also be referred to as "model correction factors," referring to factors used to adjust the first or second models to reflect the operation of the turbine. Inputs to the first model may be sensed or measured and provided by an operator. In addition to current performance parameters, the method of the present invention may include receiving or otherwise obtaining information on external factors or disturbance variables, such as ambient conditions, that may affect the present or future operation of the gas turbine system.

The second model (also referred to as a "secondary model" or a "predictive model") is generated to identify or predict one or more operating parameters, such as controlled variables, of the gas turbine system, taking into consideration the present operating parameters, such as manipulated variables, and the one or more disturbance variables. Example operating parameters of the turbine include, but are not limited to, actual turbine operating conditions, such as, exhaust temperature, turbine output, compressor pressure ratios, heat rate, emissions, fuel consumption, expected revenues, and the like. Therefore, this second or predictive model may be utilized to indicate or predict turbine behavior at certain operating set points, performance objectives, or operating conditions that differ from present operating conditions. As used herein, the term "model" refers generally to the act of modeling, simulating, predicting, or indicating based on the output of the model. It is appreciated that, while the term "second model" is utilized herein, in some instances there may be no difference between the formulation of the first and second models, such that the "second model" represents running the first model with adjusted parameters or additional or different input.

Accordingly, by modeling the turbine operating behavior utilizing the second or predictive model that considers external factors and/or different operating conditions, turbine control can be adjusted to more efficiently operate under these different operating conditions or in light of the unanticipated external factors. This system therefore allows automated turbine control based on modeled behavior and operating characteristics. In addition, the described modeling system allows creating operator specified scenarios, inputs, operating points, operating objectives, and/or operating conditions to predict turbine behavior and operating characteristics at these operator specified conditions. Predicting such hypothetical scenarios allows operators to make more informed control and operating decisions, such as scheduling, loading, turn-down, etc. As used herein, the term "operating points" refers generally to operating points, conditions, and/or objectives, and is not intended to be limiting. Thus, an operating point may refer to an objective or setpoint, such as base load, turndown point, peak fire, and the like.

One example use of the described turbine modeling system includes adjusting turbine operation to satisfy grid compliance requirements while still operating at the most efficient levels. For example, regional grid authorities typically prescribe requirements that power generation plants be able to support a grid during frequency upsets. Supporting the grid during upsets involves increasing or decreasing turbine load under certain conditions, depending upon the grid state. For example, during an upset, a power plant is expected to increase its power generation output (e.g., by as much as 2%) to compensate for other supply deficiencies. Therefore, turbine operation typically constrains the base load point to allow for the turbine to be operated at a margined output level (also referred to as the "reserved margin") so that the increased load, if necessary, can be provided without incurring the additional maintenance factor associated with over firing. As one example, the reserved margin may be 98% of what base load would typically be, thus allowing increasing load to accommodate grid requirements (e.g., increasing 2%) without exceeding the 100% base load. However, unanticipated external factors, such as temperature, humidity, or pressure, can adversely impact turbine efficiency. As a day heats up, a turbine may not have that 2% reserve that it needs because heat has caused the turbine to operate less efficiently and the turbine cannot reach that 100% load as originally planned for. To compensate, conventional heat-rate curves cause operating the turbine in a more efficient state throughout the entire day in light of the possible machine efficiency loss (e.g., at 96%, etc.). The turbine modeling system described herein, however, allows modeling turbine behavior in real-time according to the current external factors (e.g., temperature, humidity, pressure, etc.), and thus controlling turbine operation to most efficiently operate given the current ambient conditions. Similarly, future turbine behavior can be predicted, such as to predict turbine behavior responsive to a day's heat fluctuation, allowing for turbine operation planning to achieve the most efficient and economically viable operation. As another example, power generation plants typically make decisions whether to shut gas turbines down at night or to simply reduce output levels (e.g., turn down). Turbine operating characteristics, such as emissions, exhaust temperature, and the like, impact this decision. Utilizing the turbine modeling system described herein, decisions can be made on a more intelligent basis, either before-hand or in real-time or near real-time. External factors and expected turbine operating parameters can be supplied to the second model to determine what the turbine operating characteristics would be. Thus, the modeled characteristics may be utilized to determine whether a turbine should be shut down or turned down, considering these characteristics (e.g., efficiency, emissions, cost, etc.).

As yet another example, a turbine modeling system may be utilized to evaluate the benefit of performing turbine maintenance at a given time. The turbine modeling system of the present invention may be utilized to model the operating characteristics of the turbine at its current capabilities based on current performance parameters. Then, an operator specified scenario can be generated that models the operating characteristics of the turbine if maintenance is performed (e.g., improving the performance parameter values to show an expected performance boost). For example, as turbines degrade over time, the performance parameters reflect machine degradation. In some instances, maintenance can be performed to improve those performance parameters and, thus, the operating characteristics of the turbine. By modeling or predicting the improved operating characteristics, a cost-benefit analysis can be performed to compare the benefit gained by performing the maintenance against the costs incurred.

Figure 13:
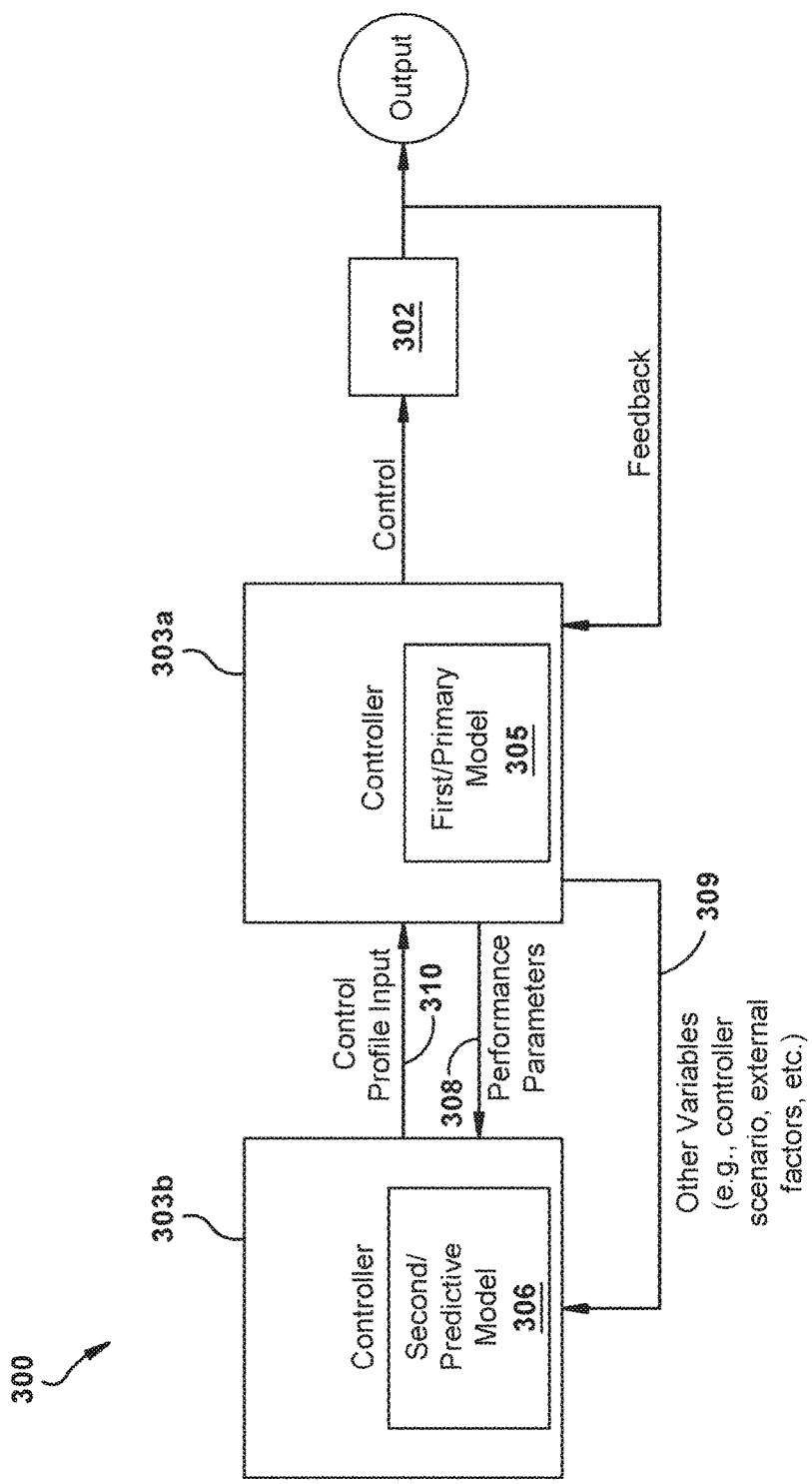
FIG. 13 shows a simplified configuration of a computer system according to control methodology of embodiments of the present invention.

FIG. 13 illustrates an exemplary system 300 that may be used to model turbine operating behavior. According to this embodiment, a power plant 302 is provided that includes a gas turbine having a compressor and a combustor. An inlet duct to the compressor feeds ambient air and possibly injected water to the compressor. The configuration of the inlet duct contributes to a pressure loss of ambient air flowing into the compressor. An exhaust duct for the power plant 302 directs combustion gases from the outlet of the power plant 302 through, for example, emission control and sound absorbing devices. The amount of inlet pressure loss and back pressure may vary over time due to the addition of components to the inlet and exhaust ducts, and due to clogging of the inlet and exhaust ducts.

The operation of the power plant 302 may be monitored by one or more sensors detecting one or more observable conditions, or operating or performance parameters, of the power plant 302. In addition, external factors, such as the ambient environment can be measured by one or more sensors. In many instances, two or three redundant sensors may measure the same parameter. For example, groups of redundant temperature sensors may monitor ambient temperature surrounding the power plant 302, the compressor discharge temperature, the turbine exhaust gas temperature, as well as other temperatures through the power plant 302. Similarly, groups of redundant pressure sensors may monitor the ambient pressure, and the static and dynamic pressure levels at the compressor inlet and outlet, the turbine exhaust, and other locations through the engine. Groups of redundant humidity sensors may measure ambient humidity in the inlet duct of the compressor. Groups of redundant sensors may also comprise flow sensors, speed sensors, flame detector sensors, valve position sensors, guide vane angle sensors, or the like that sense various parameters pertinent to the operation of power plant 302. A fuel control system may regulate the fuel flowing from a fuel supply to the combustor. The fuel controller may also select the type of fuel for the combustor.

As stated, "operating parameters" refer to items that can be used to define the operating conditions of the turbine system, such as temperatures, pressures, compressor pressure ratio, gas flows at defined locations in the turbine, load setpoint, firing temperature, as well as one or more conditions corresponding to the level of turbine or compressor degradation and/or the level of turbine or compressor efficiency. Some parameters are measured directly. Other parameters are estimated by the turbine models or are indirectly known. Still other parameters may represent hypothetical or future conditions and may be defined by the plant operator. The measured and estimated parameters may be used to represent a given turbine operating states. As used herein, "performance indicators" are operating parameters derived from the values of certain measured operating parameters, and represent a performance criteria for the operation of the power plant over a defined period. For example, performance indicators include heat rate, output level, etc.

As illustrated in FIG. 13, the system 300 includes one or more controllers 303a, 303b, which may each be a computer system having one or more processors that execute programs to control the operation of a power plant or generating unit 302. Although FIG. 13 illustrates two controllers, it is appreciated that a single controller 303 by be provided. According to a preferred embodiment, multiple controllers may be included so to provide redundant and/or distributed processing. The control actions may depend on, for example, sensor inputs or instructions from plant operators. The programs executed by the controller 303 may include scheduling algorithms, such as those for regulating fuel flow to the combustor, managing grid compliance, turndown, etc. The commands generated by the controller 303 can cause actuators on the turbine to, for example, adjust valves between the fuel supply and combustors so to regulate fuel flow, splits and type of fuel. Actuators may adjust inlet guide vanes on the compressor, or activate other control setpoints on the turbine. It will be appreciated that the controller 303 may be used to generate the first and/or the second models, as described herein, in addition to facilitating control of the power plant. The controller 303 may receive operator and/or present modeled output (or any other system output). As described previously, the controller 303 may include memory that stores programmed logic (e.g., software) and may store data, such as sensed operating parameters, modeled operating parameters, operating boundaries and goals, operating profiles, and the like. A processor may utilize the operating system to execute the programmed logic, and in doing so, also may utilize data stored thereon. Users may interface with the controller 303 via at least one user interface device. The controller 303 may be in communication with the power plant online while it operates, as well as in communication with the power plant offline while it is not operating, via an I/O interface. It will be appreciated that one or more of the controllers 303 may carry out the execution of the model-based control system described herein, which may include but not be limited to: sensing, modeling, and/or receiving operating parameters and performance parameters; generating a first power plant model reflecting current turbine operation; sensing, modeling, and/or receiving external factor information; receiving operator input, such as performance objectives, and other variables; generating a second power plant model reflecting operation in light of the additional data supplied; controlling present or future turbine operation; and/or presenting modeled operating characteristics. Additionally, it should be appreciated that other external devices or multiple other power plants or generating units may be in communication with the controller 303 via I/O interfaces. The controller 303 may be located remotely with respect to the power plant it controls. Further, the controller 303 and the programmed logic implemented thereby may include software, hardware, firmware, or any combination thereof.

The first controller 303a (which, as stated, may be the same or different controller as the second controller 303b) may be operable so to model the power plant 302 by a first or primary model 305, including modeling the turbine's current performance parameters. The second controller 303b may be operable to model turbine operating characteristics under different conditions via a second or predictive model 306. The first model 305 and the second model 306 may each be an arrangement of one or more mathematical representations of the turbine behavior. Each of these representations may rely on input values to generate an estimated value of a modeled operating parameter. In some circumstances, the mathematical representations may generate a surrogate operating parameter value that may be used in circumstances where a measured parameter value is not available. The first model 305 may then be utilized to provide a foundation and/or input to the second model 306 for determining turbine operating characteristics based on the current performance parameters of the power plant 302 and any other factors, such as external factors, operator supplied commands or conditions, and/or adjusted operating states. As described above, it is appreciated that "the second model 306" may simply be an instance of the same model as the first model 305 that considers additional or different inputs, such as external factors, different operating points, so to model different performance parameters or turbine behavior in light of the different inputs. The system 301 may further include an interface 307.

With continued reference to FIG. 13, a brief description of the interrelation between the system components is provided. As described, the first or primary model 305 models current performance parameters 308 of the power plant 302. These current performance parameters 308 may include, but are not limited to, conditions corresponding to the level of turbine degradation, conditions corresponding to the level of turbine efficiency (e.g., the heat rate or fuel to power output ratio), inlet guide vane angles, amount of fuel flow, turbine rotational speed, compressor inlet pressure and temperature, compressor exit pressure and temperature, turbine exhaust temperature, generator power output, compressor airflow, combustor fuel/air ratio, firing temperature (turbine inlet), combustor flame temperature, fuel system pressure ratios, and acoustic characteristics. Some of these performance parameters 308 may be measured or sensed directly from the turbine operation and some may be modeled based on other measured or sensed parameters. The performance parameters may be provided by the first model 305 and/or may be provided generally by the controller, such as if sensed and/or measured by the controller. Upon generating the first model 305, the performance parameters 308 (which are intended to refer to any turbine behavior provided by the model) are provided for generating the second or predictive model 306. Other variables 309 may be provided to the second model 306, depending upon the its intended use. For example, the other variables may include external factors, such as ambient conditions, that generally are uncontrollable and simply have to be accommodated for. In addition, the other variables 309 may include a controller specified scenario or operating point (e.g., a turbine operating point generated by or otherwise provided via the controller 303, such as turbine control based on the first model 305, etc.), measured inputs, which may be some or all of the same measured inputs as described as possibly being modeled by the first model 305. As described with reference to FIG. 14 below, an operator specified scenario 313 (e.g., one or more operator supplied commands indicating different turbine operating points or conditions) may also be supplied to the second model 306 via operator input. For example, as one exemplary use, the other variables 309 may include a controller specified scenario provided as one or more inputs to the second model 306 when attempting to model in real-time or near real-time current turbine behavior based on additional inputs, such as external factors or measured inputs. By utilizing a controller specified scenario of the first model in addition to one or more of these additional inputs, the expected real-time behavior of the power plant 302 can be modeled by the second model 306 taking into consideration these additional inputs, which may in turn be utilized to control the power plant 302 or adjust the first model 305 by control profile inputs 310.

Figure 14:
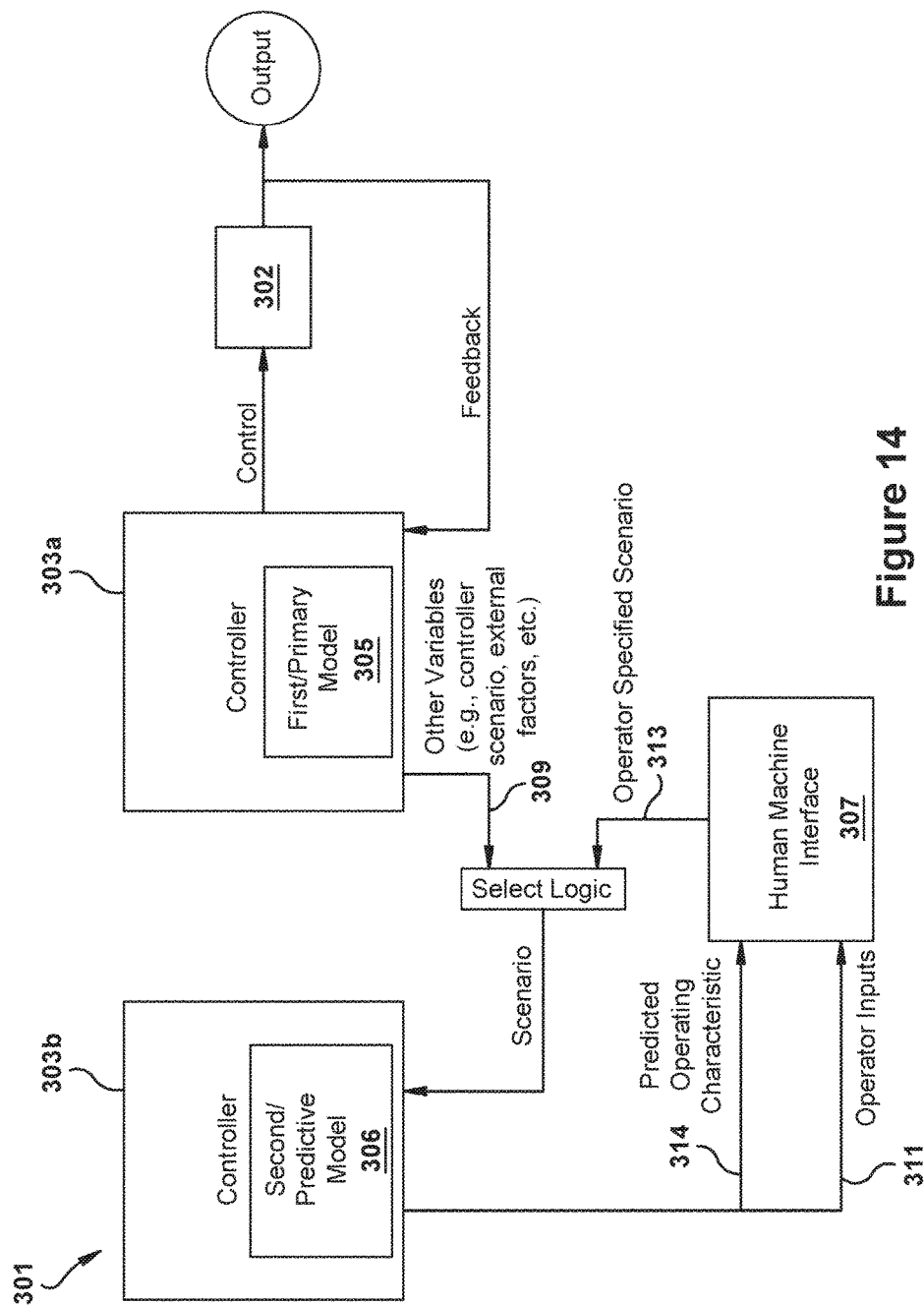
FIG. 14 illustrates an alternative configuration of a computer system in accordance with control methodology of embodiments of the present invention.

With reference to FIG. 14, an operator specified operating mode or scenario 313 is provided as one or more inputs via the interface 307 to the second or predictive model 306, which then models or predicts future turbine behavior under a variety of conditions. For example, an operator may supply commands to the interface 307 to generate a scenario in which the power plant 302 operates at a different operating point (e.g., different loads, configuration, efficiency, etc.). As an illustrative example, a set of operating conditions may be supplied via the operator specified scenario 313 that represent conditions that are expected for the following day (or other future timeframe), such as ambient conditions or demand requirements. These conditions then may be used by the second model 306 to generate expected or predicted turbine operating characteristics 314 for the power plant 302 during that time frame. Upon running the second model 306 under the operator specified scenario, the predicted operating characteristics 314 represent turbine behavior such as, but not limited to, base load output capability, peak output capability, minimum turndown points, emissions levels, heat rate, and the like. These modeled or predicted operating characteristics 313 may be useful when planning and committing to power-production levels, such as for day-ahead market planning and bidding.

Figure 15:
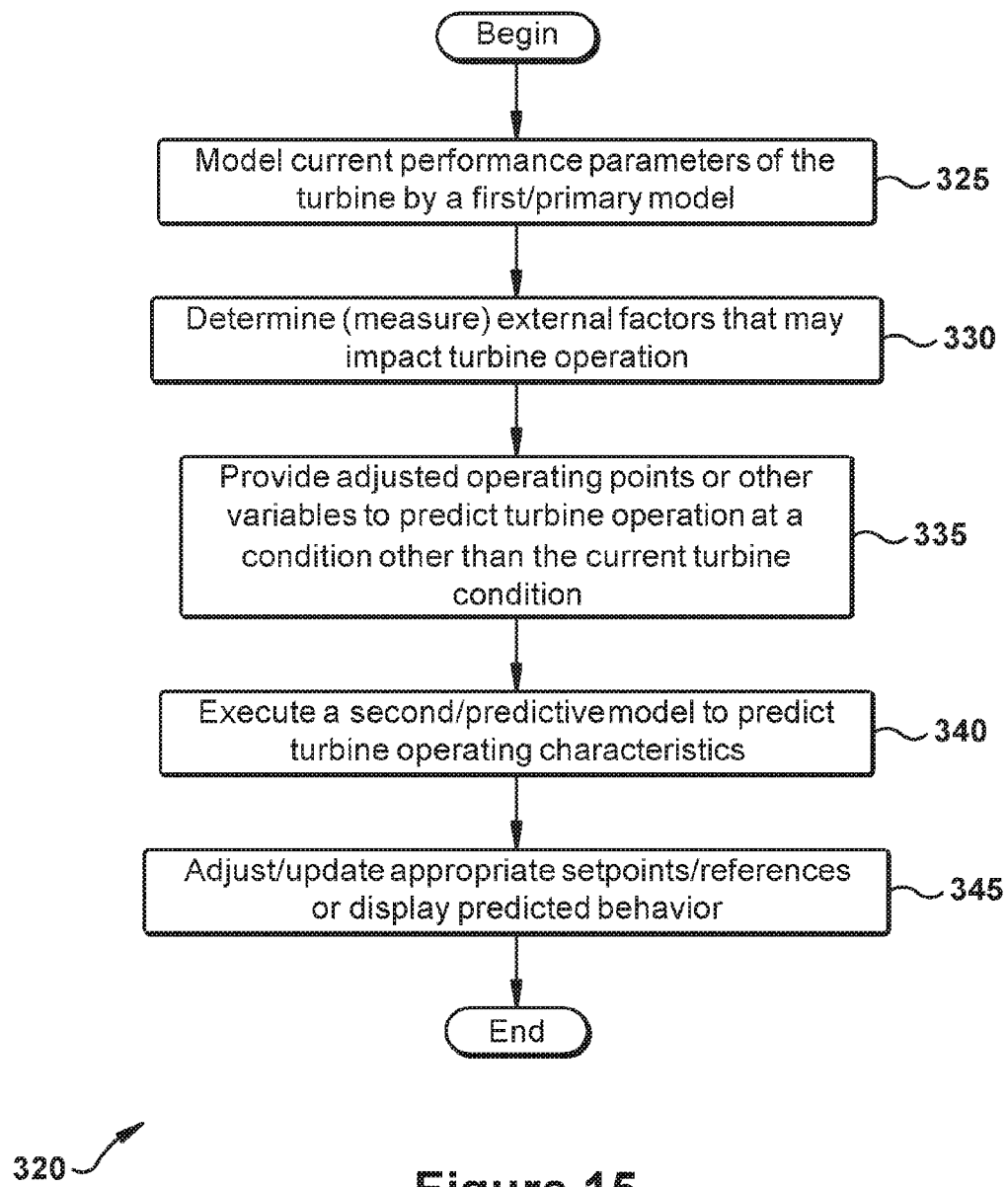
FIG. 15 is a flow diagram of an exemplary control methodology according to exemplary aspects of the present invention.

FIG. 15 illustrates an example method 320 by which an embodiment of the invention may operate. Provided is a flowchart of the basic operation of a system for modeling a turbine, as may be executed by one or more controllers, such as those described with reference to FIGS. 13 and 14. The method 320 may begin at step 325, in which the controller may model, by a first or primary model, one or more current performance parameters of a turbine according to the current operation. In order to generate this first model, the controller may receive as inputs to the model one or more operating parameters indicating the current operation of the turbine. As described above, these operating parameters may be sensed or measured and/or they may be modeled, such as may occur if the parameters cannot be sensed. The current operating parameters may include any parameter that is indicative of current turbine operation, as described above. It is appreciated that the methods and systems disclosed herein do not directly depend on whether the operating parameters are measured or modeled. The controller may include, for example, a generated model of the gas turbine. The model may be an arrangement of one or more mathematical representations of the operating parameters. Each of these representations may rely on input values to generate an estimated value of a modeled operating parameter. The mathematical representations may generate a surrogate operating parameter value that may be used in circumstances where a measured parameter value is not available.

At step 330, the controller may receive or otherwise determine one or more external factors that may impact current and/or future operation. As described above, these external factors are typically (but not required to be) uncontrollable, and therefore incorporating their influence in the second model is beneficial to generate the desired turbine control profile and/or operational behavior. External factors may include, but are not limited to, ambient temperature, humidity, or barometric pressure, as well as fuel composition and/or supply pressure, which may impact the turbine operational behavior. These external factors may be measured or sensed, may be estimated or otherwise provided manually by an operator (such as if the operator requests predicted behavior based on hypothetical scenarios or future conditions), and/or may be provided by third party information sources (e.g., weather services, etc.).

At step 335, the controller may receive adjusted operating points and/or other variables to predict turbine behavior at a condition different than the current turbine condition. Adjusted operating points may include, but are not limited, identifying the desired output level, such as if modeling the turbine at a reserved margin (e.g., 98% of base load), or if modeling the turbine at a peak load or during turndown, for example. Operating points may further include operating boundaries, such as, but not limited to, hot gas path durability (or firing temperature), exhaust frame durability, NOx emissions, CO emissions, combustor lean blow-out, combustion dynamics, compressor surge, compressor icing, compressor aero-mechanical limits, compressor clearances, and compressor discharge temperature. Thus, by providing these adjusted operating points or other variables, the operator may provide hypothetical scenarios for which the turbine model predicts the operating characteristics under those scenarios, which may be useful for controlling future operation of the turbine and/or for planning for future power generation and commitments.

Following step 335 is step 340, in which a second or predictive model of the turbine is generated based on the first model generated at step 325 and, optionally, the external factors and/or adjusted operating points or other variables provided at step 335. This second or predictive model thus may accurately indicate or predict operating parameters and, therefrom, performance indicators for the turbine during a future operating period.

Figure 16:
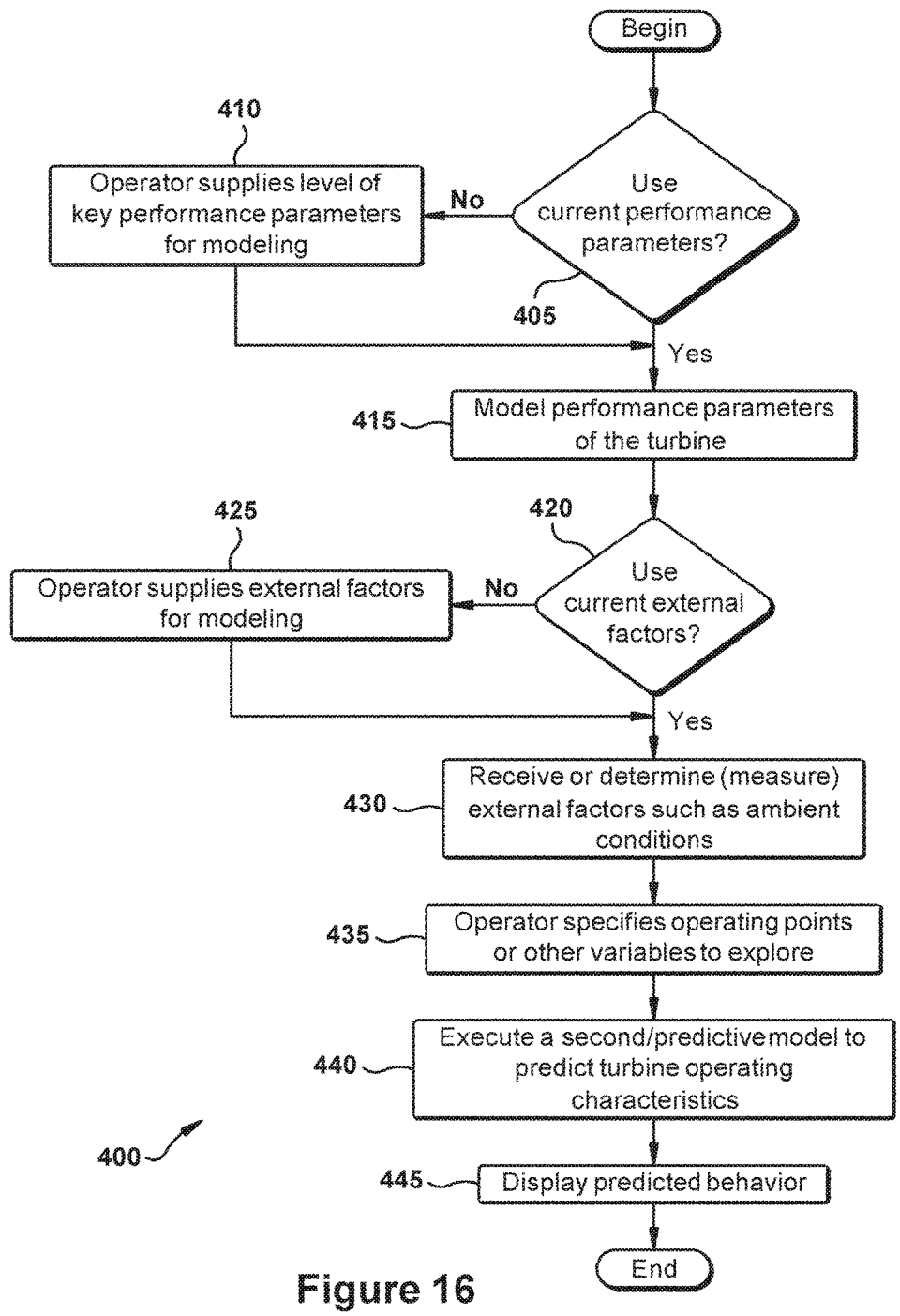
FIG. 16 is a flow diagram of an alternative control methodology according to exemplary aspects of the present invention.

At step 345, the modeled performance may be utilized to adjust current or future turbine operation and/or display to an operator the modeled performance. Accordingly, if adjusting current turbine operation, the turbine controller may receive the modeled performance parameters as inputs to alter a current control model (e.g., the first model) or a current control profile, such as by modifying various setpoints and/or references utilized for current turbine control. It is anticipated that this real-time or near real-time control of the turbine would be performed when the inputs to the second model generated at step 340 are representative of the current turbine conditions or current external factors. For example, real-time or near real-time adjustment at step 345 may be performed when the second model represents performance characteristics considering the current temperature, pressure, or humidity, and/or considering operating parameters or performance parameters of the turbine that more accurately represents turbine degradation and/or efficiency. FIG. 16 describes one example embodiment that may optionally receive operator specific inputs and generate predicted behavior under a different operating condition. The output of the model generated at step 340 may also be displayed or otherwise presented to an operator via an interface. For example, in one embodiment in which the operator provides hypothetical operating scenarios at step 335, the predicted turbine operating characteristics can be displayed for analysis and possible inclusion in future control or planning activities. Accordingly, the method 320 may end after step 345, having modeled the current performance parameters of the turbine by a first model, and then modeled the same turbine in consideration of additional external factors, adjusted operating points, or other additional data so to predict turbine operation based on this additional data.

FIG. 16 illustrates an example method 400 by which an alternative embodiment may operate. Provided is an example flowchart of the operation of a system for modeling a turbine, as may be executed by one or more controllers, such as described with reference to FIGS. 13 and 14. Method 400 illustrates use of the system 301 in which an operator may optionally supply additional variables to utilize the modeling capabilities to predict turbine behavior under hypothetical scenarios. The method 400 may begin at decision step 405, in which it is determined whether the turbine is to be modeled according to current turbine operating parameters and performance parameters, or if operator supplied parameters are to be considered when generating the model. For example, if the system is being utilized to predict hypothetical operating scenarios, then current performance parameters may not be needed as inputs to the model (assuming the model already reflects basic turbine operation and behavior). Accordingly, if it is determined at decision step 405 that current parameters are not to be utilized, then operations proceed to step 410 in which the operator supplies different performance parameters, allowing for modeling the turbine under a different operating point and in a different operating condition (e.g., in a more degraded state, at a different level of efficiency, etc.). Otherwise, the current performance parameters and/or operating parameters are utilized, such as is described with reference to step 325 of FIG. 15, and operations continue to step 415. At step 415, the controller may model, by a first or primary model, one or more performance parameters of a turbine either according to the operator supplied input from step 410 or the turbine's current operation. For example, if the model is generated based at least in part on operator supplied parameters at step 410, then the model generated at step 415 is representative of predicted turbine behavior under those performance parameters.

Following step 415 is decision step 420, in which it is determined whether subsequent modeling (e.g., the "second model" or the "predictive model") is to be based on current external factors, such as current temperature, pressure, or humidity, or on different external factors supplied by the operator. For example, in one scenario, the controller can model turbine operating behavior based on the additional data of one or more current external factors, which would allow further prediction of turbine behavior in light of the current conditions. In another scenario, however, the controller can be utilized to further model the turbine according to operator supplied conditions, which allows the predicting of turbine operating characteristics under various hypothetical scenarios. Accordingly, if it is determined at step 320 that operator supplied external factor data is to be considered when modeling, then operations continue to step 425. Otherwise, operations continue to step 430 utilizing current external factors. At step 430 the controller receives external factors to be considered when generating the second or predictive model, whether they are representative of the current state or hypothetical factors. Following step 430 are steps 435-445, which optionally permit consideration of different operating points, generating the predictive model based on the received data, and displaying the predicted behavior, respectively, in the same or similar manner as is described with respect to steps 325-345 of FIG. 15. The method 400 may end after step 445, having modeled turbine operating behavior optionally based on operator specified scenarios.

Accordingly, embodiments described herein allow utilizing turbine models to indicate turbine behavior and corresponding operating parameters of an actual turbine, in addition to predicting turbine behavior taking into consideration the current performance parameters and one or more external factors identified. These embodiments, therefore, provide a technical effect of indicating or predicting turbine behavior at operating points or operating conditions different than the current turbine operation. Yet an additional technical effect is provided that allows automated turbine control based at least in part on modeled behavior and operating characteristics, which may optionally include creating operator specified scenarios, inputs, operating points, and/or operating conditions to predict turbine behavior and operating characteristics at these operator specified conditions. A further technical effect realized includes the ability to predict various hypothetical scenarios allows operators to make more informed control and operating decisions, such as scheduling, loading, turn-down, etc. As will be appreciated, references made herein to step diagrams of systems, methods, apparatus, and computer program products according to example embodiments of the invention.

Figure 17:
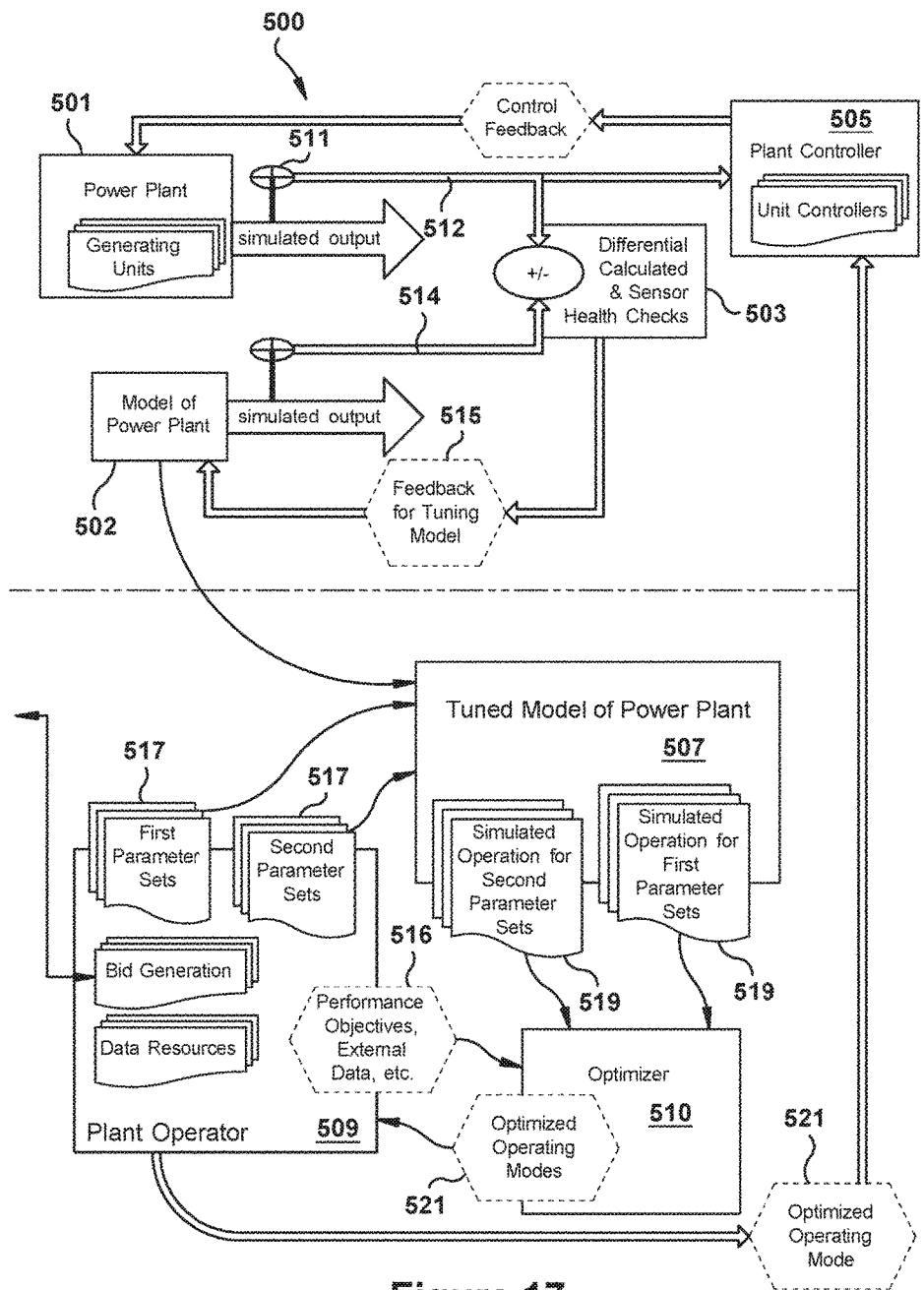
FIG. 17 is a flow diagram of an alternative control methodology according to exemplary aspects of the present invention.

Referring now to FIG. 17, a flow diagram 500 is illustrated in accordance with an alternative embodiment of the present invention. As will be appreciated, flow diagram 500 includes aspects that may be used as a control method or as part of a control system for facilitating the optimization of a power plant 501. The power plant 501 may be similar to any of those discussed in relation to FIGS. 2 and 3, though, unless otherwise restricted in the appended claims, it should be appreciated that the present invention may also be used in relation to other types of power plants. In a preferred embodiment, the power plant 501 may include a plurality of thermal generating units that generate electricity sold within a power system market, such as the one discussed in relation to FIG. 1. The power plant 501 may include many possible types of operating modes, which, for example, include the different ways in which thermal generating units of the plant are engage or operated, the output level of the plant, the ways in which the plant reacts to changing ambient conditions while satisfying a load requirements, etc. It will be appreciated that the operating modes may be described and defined by operating parameters that regard physical properties of particular aspects of the operation of the power plant 501. As further illustrated in FIG. 17, the present invention may include a power plant model 502. The power plant model 502 may include a computerized representation of the power plant that correlates process inputs and outputs as part of a simulation meant to mimic operation of the plant. As shown, the present invention further includes a tuning module 503; a plant controller 505; a tuned power plant model 507; a plant operator module 509; and an optimizer 510, each of which will be discussed individually below.

The power plant 501 may include sensors 511 that measure operating parameters. These sensors 511, as well as the operating parameters that they measure, may include any of those already discussed herein. As part of the present method, the sensors 511 may take measurements of operating parameters during an initial, current, or first period of operation (hereinafter, "first operating period"), and those measurements may be used to tune a mathematical model of the power plant, which, as discussed below, then may be used as part of an optimization process for controlling the power plant 501 in an improved or optimized manner of operation during a subsequent or second period of operation (hereinafter "second operating period"). The measured operating parameters may themselves be used to evaluate plant performance or be used in calculations to derive performance indicators that relate specific aspects of the power plant's operation and performance. As will be appreciated, performance indicators of this type may include heat rate, efficiency, generating capacity, as well as others. Accordingly, as an initial step, operating parameters that are measured by the sensors 511 during the first operating period may be used as (or used to calculate values for) one or more performance indicators. As used herein, such values for performance indicators (i.e., those that are based on measured values of operating parameters) will be referred to herein as "measured values". The measurements of the operating parameters and/or the measured values for the performance indicators, as shown, may be communicated 512 to both the plant controller 505 and the tuning module 503. The tuning module 503, as discussed in more detail below, may be configured to calculate feedback from a data reconciliation or tuning process for use in tuning the power plant model 502 so to configure the tuned power plant model 507.

The power plant model 502, as discussed, may be a computerized model that is configured to simulate the operation of the power plant 501. Pursuant to the present method, the power plant model 502 may be configured to simulate power plant operation that corresponds to the first operating period of the power plant 501. To achieve this, the power plant model 502 may be supplied information and data concerning the operating parameters of the first operating period. While this information may include any of the operating parameters measured during the first operating period, it will be appreciated that the input data for the power plant model 502 may be limited to a subset of the operating parameters measured. In this manner, the power plant model 502 then may be used to calculated values for selected operating parameters that were excluded from the input data set. More specifically, the power plant model may be supplied input data for the simulation that includes many of the values measured for the operating parameters, but from which certain measured values for selected operating parameter are omitted. As an output, the simulation may be configured to predict a simulated value for the selected operating parameter. The present method then may use the simulated values to predict values for the performance indicators. In this case, these values for the performance indicators will be referred to herein as the "predicted values". In this manner, the measured values for the performance indicators that were determined directly from measured power plant operating parameters may have corresponding predicted values. As illustrated, the predicted values for the performance indicators may be communicated 514 to the tuning module 503.

The tuning module 503 may be configured to compare the corresponding measured and predicted values for the performance indicators so to determine a differential therebetween. As will be appreciated, thusly calculated, the differential reflects an error level between actual performance (or measurements thereof) and performance simulated by the power plant model. The power plant model 502 may be tuned based on this differential or feedback 515. In this manner, the tuned power plant model 507 is configured. The tuned power plant model 507, which may also be referred to as an offline or predictive model, then may be used to determine optimized operating modes for a subsequent period of operation by simulating proposed or possible operating modes. The simulations may include estimations or forecasts about future unknown operating conditions, such as ambient conditions. As will be appreciated, the optimization may be based upon one or more performance objectives 516 in which a cost function is defined. As illustrated, the performance objectives 516 may be communicated to the optimizer 510 through the plant operator module 509.

The process of tuning the plant model may be configured as a repetitive process that includes several steps. As will be appreciated, according to certain embodiments, the power plant model 502 may include algorithms in which logic statements and/or parameterized equations correlate process inputs (i.e., fuel supply, air supply, etc.) to process outputs (generated electricity, plant efficiency, etc.). The step of tuning the power plant model 502 may include adjusting one of the algorithms in the power plant model 502, and then simulating the operation of the power plant 501 for the first operating period using the adjusted power plant model 502 so to determine the effect the adjustment had. More specifically, the predicted value for the performance indicator may be recalculated to determine the effect that the adjustment to the power plant model had on the calculated differential. If the differential turns out to be less using the adjusted power plant model 502, then the power plant model 502 may be updated or "tuned" so to include that adjustment going forward. It further will be appreciated that the power plant model 502 may be constructed with multiple logic statements that include performance multipliers used to reflect changes in the way the power plant operates under certain conditions. In such cases, tuning the power plant model 502 based on the calculated differential may include the steps of: a) making adjustments to one or more of the performance multipliers; b) simulating the operation of the power plant for the first operating period with the power plant model 502 having the adjusted performance multiplier; and c) recalculating the predicted value for the performance indicator using the power plant model 502 as adjusted by the performance multiplier so to determine if the recalculation results in reduced differential. These steps may be repeated until an adjustment made to one of the performance multipliers results in reducing the differential, which would indicate that the model is more accurately simulating actual performance. It will be appreciated that the performance multiplier, for example, may relate to expected performance degradation based upon accumulated hours of operation of the plant. In another example, where the performance indicator comprises a generating capacity, the step of tuning the power plant model 502 may include recommending adjustments to factors based on a differential between a measured generating capacity and a predicted generating capacity. Such adjustments may include changes that ultimately result in the predicted generating capacity substantially equaling the measured generating capacity. Accordingly, the step of tuning the power plant model 502 may include modifying one or more correlations within the power plant model 502 until the predicted or simulated value for a performance indicator substantially equals (or is within a margin of) the measured value for the performance indicator.

Once tuned, the method may then use the tuned model 507 to simulate proposed operation of the power plant. According to certain embodiments, a next step of the present method includes determining which simulated operation is preferable given defined performance objectives 516. In this manner, optimized modes of operating the power plant may be determined. According to a preferred embodiment, the process of determining an optimized operating mode may include several steps. First, multiple proposed operating modes may be selected or chosen from the many possible ones. For each of the proposed operating modes, corresponding proposed parameter sets 517 may be generated for the second operating period. As used herein, a parameter set defines values for multiple operating parameters such that, collectively, the parameter set defines or describes aspects of a particular mode of operation. As such, the proposed parameter sets may be configured to describe or relate to many of the possible operating modes of the power plant 501, and may be configured as input data sets for tuned power plant model 507 for simulating operation. Once the operating parameters are generated and organized into the proposed parameter sets, the tuned power plant model 507 may simulate operation of the power plant 501 pursuant to each. The optimizer 510 then may evaluate the results of the simulated operation 519 for each of the proposed parameter sets 517. The evaluation may be made pursuant to the performance objectives defined by the plant operator and the cost functions defined therein. The optimization process may include any of the methods described herein.

Cost functions defined by the performance objectives may be used to evaluate an economic performance of the simulated operation of the power plant 501 over the second operating period. Based on the evaluations, one of the proposed parameter sets may be deemed as producing simulated operation that is preferential compared to that produced by the other proposed parameter sets. According to the present invention, the mode of operation that corresponds to or is described by the proposed parameter set producing the most preferable simulated operation is designated as the optimized operating mode. Once determined, as discussed in more below, the optimized operating mode may be passed along to a plant operator for consideration or communicated to the plant controller for automated implementation.

According to a preferred embodiment, methods of the present invention may be used to evaluate specific modes of operation to determine and recommend preferable alternatives. As will be appreciated, the generating units of the power plant 501 are controlled by actuators having variable setpoints that are controllably linked to a control system, such as plant controller 505. The operating parameters of the power plant 501 may be classified into three categories: manipulated variables, disturbance variables, and controlled variables. The manipulated variables regard controllable process inputs that may be manipulated via actuators so to control the controlled variables, whereas, the disturbance variables regard uncontrollable process inputs that affect the controlled variables. The controlled variables are the process outputs that are controlled relative to defined target levels. Pursuant to preferred embodiments, the control method may include receiving forecasted values for the disturbance variables for the second operating period (i.e., the period of operation for which an optimized mode of operation is being calculated). The disturbance variables may include ambient conditions, such as ambient temperature, pressure, and humidity. In such cases, the proposed parameter sets generated for the second operating period may include values for the disturbance variables that relate to the forecasted values for the disturbance variables. More specifically, the generated values for each ambient condition parameter may include a range of values for each of the ambient condition parameters. The range, for example, may include a low case, medium case, and high case. It will be appreciated that having multiple cases may allow a plant operator to plan for best/worst case scenarios. The forecasted values may include likelihood ratings that correspond with the different cases, which may further assist the operator of the plant to plan for different operating contingencies and/or hedge against losses.

The step of generating the proposed parameter sets may include generating target levels for the controlled variables. The target levels may be generated so to correspond to competing or alternative operating modes of the power plant 501, and may include operator input. Such operator input may be prompted by the plant operator module 509. According to a preferred embodiment, such target levels may include a desired output level for the power plant 501, which may be based on likely output levels given past usage patterns for the plant. As used herein, "output level" reflects a load level or level of electricity generated by the power plant 501 for commercial distribution during the second operating period. The step of generating the proposed parameter sets may include generating multiple cases where the output level remains the same or constant. Such a constant output level may reflect a base load for the plant or a set of generating units. Multiple target levels may be generated where each corresponds to a different level of engagement from each of the generating units and these may be drawn toward likely operating modes given historic usage. The method may then determine the most efficient operating mode given the known constraints. Additionally, the proposed parameter sets may be generated so that the disturbance variables maintain a constant level for the multiple cases generated for each target level. The constant level for the disturbance variables may be based upon forecasted values that were received. In such cases, according to one aspect of the present invention, the step of generating the proposed parameter sets includes generating multiple cases wherein the manipulated variables are varied over ranges so to determine an optimized operating mode for achieving a base load level given the forecasted or expected ambient conditions. According to exemplary embodiments, the cost function is defined as a plant efficiency or a heat rate, or may include a more direct economic indicator, such as operating cost, revenue, or profit. In this manner, the most efficient method of controlling the power plant 501 may be determined in situations where a base load is known and disturbance variables may be predicted with a relatively high level of accuracy. The optimized operating mode determined by the present invention in such cases may be configured so to include a specific control solution (i.e., specific setpoints and/or ranges therefore for the actuators that control the manipulated variables of the power plant) that might be used by the plant controller 505 to achieve more optimal function. Calculated in this manner, the control solution represents the optimized operating mode for satisfying a defined or contracted target load given the values forecasted for the various disturbance variables. This type of functionality may serve as an interday or inter-market period optimization advisor or check that analyzes ongoing operation in the background for the purposes of finding more efficient operating modes that still satisfy previously fixed load levels. For example, as the market period covered by the previous dispatch bidding progresses, ambient conditions become known or, at least, the level of confidence in prediction them accurately increases over what was estimated during the bidding process. Given this, the present method may be used to optimized control solutions for meeting the dispatched load given the more certain knowledge of the ambient conditions. This particular functionality is illustrated in FIG. 17 as the second parameter sets 517 and the simulated operation 519 related to the second parameter sets 517. In this manner, the optimization process of the present invention may also include a "fine-tuning" aspect whereby simulation runs on the tuned power plant model 507 advise on more efficient control solutions, which may then be communicated to and implemented by the plant controller.

Another aspect of the present invention involves its usage for optimizing fuel purchases for the power plant 501. It will be appreciated that power plants typically make regular fuel purchases from fuel markets that operates in a particular manner. Specifically, such fuel markets are typically operated on a prospective basis in which power plants 501 predict the amount of fuel needed for a future operating period and then make purchases based on the prediction. In such systems, power plants 501 seek to maximize profits by maintaining low fuel inventories. Power plants 501, though, regularly purchase extra fuel amounts so to avoid the costly situation of having an inadequate supply of purchased fuel to generate the amount of power the plant contracted to provide during the dispatch process. This type of situation may occur when, for example, changing ambient conditions results in less efficient power generation than predicted or the power plants true generating capacity is overestimated. It will be appreciated that several aspects of the present application already discussed may be used to determine an optimized mode of operation and, using that, calculate a highly accurate prediction for the fuel supply needed. That is, the present optimization processes may provide a more accurate prediction regarding plant efficiency and load capabilities, which may be used to estimate the amount of fuel needed for a future operating period. This enables plant operators to maintain a tighter margin on fuel purchases, which benefits the economic performance of the plant.

The present invention, according to an alternative embodiment, includes a method for optimizing plant performance in which a prediction horizon is defined and used in the optimization process. As will be appreciated, a prediction horizon is a future period of operation, which is divided into regularly repeating intervals for the purposes of determine an optimized mode of operation for an initial time interval of the prediction horizon. Specifically, the power plant's operation is optimized by optimizing performance over the entire prediction horizon, which is then used to determine an optimized mode of operation for the initial time interval. As will be appreciated, the process is then repeated so to determine how the power plant should be operated during the next time interval, which, as will be appreciated, becomes the initial time interval relative to that next repetition of the optimization cycle. For this subsequent optimization, the prediction horizon may remain the same, but is redefined relative what is now defined as the initial time interval. This means that the prediction horizon is effectively pushed forward into the future by an additional time interval each repetition. As already mentioned, a "proposed parameter set" refers to a data set that includes values for multiple operating parameters and thereby defines or describes one of the possible operating modes for the power plant 501. Pursuant to a preferred embodiment, the process of determining the optimized operating mode in cases involving a prediction horizon may include one or more of the following steps. First, multiple proposed horizon parameter sets are generated for the prediction horizon. As used herein, a "proposed horizon parameter set" includes a proposed parameter set for each of the time intervals of the prediction horizon. For example, a 24 hour prediction horizon may be defined as including 24 1-hour time intervals, meaning that the proposed horizon parameter set includes proposed parameter sets for each of the 24 time intervals. As a next step, the proposed horizon parameter sets are used to simulate operation over the prediction horizon. Then, for each of the simulation runs, the cost function is used to evaluate an economic performance so to determine which of the proposed horizon parameter sets represents the most favorable or, as used herein, an "optimized horizon simulation run". According to exemplary embodiments, the operating mode described within the optimized horizon simulation run for the initial time interval of the prediction horizon may then be designated as the optimized operating mode for the period of operation that corresponds to the initial time interval. The optimization process then may be repeated for subsequent time intervals. The present invention may include receiving forecasted values for the disturbance variables for each of the time intervals defined within the prediction horizon. The proposed horizon parameter sets then may be generated so that the proposed parameter set that corresponds to each of the time interval includes values for the disturbance variables that relate to the forecasted values received for the disturbance variables.

As will be appreciated, the proposed horizon parameter sets may be generated so to cover a range of values for the disturbance variables. As before, that range may include multiple cases for each of the disturbance variables, and may include high and low values that represent, respectively, cases above and below the forecasted values. It will be appreciated that in accordance with any of the described embodiments, the steps of simulating modes of operation and determining therefrom optimized operating modes may be repeated and configured into a repetitive process. As used herein, each repetition is referred to as an "optimization cycle". It will be appreciated that each repetition may include defining a subsequent or next period of operation for optimization. This subsequent period may occur just after the period of operation optimized by the previous cycle or may include a period of operation that corresponds to a future period, as may be the case, for example, when the present method is used for the purposes of preparing dispatch bids or advising as to the economic impact of alternative maintenance schedules.

The steps of tuning the power plant model 502 may be repeated so to update the tuned power plant model 507. In this manner, a tuned power plant model 507 that reflects a recent tuning may be used with optimization cycles so to produce more effective results. According to alternative embodiments, the optimization cycle and the cycle of tuning the power plant model 502 may be disconnected relative to the each other such that each cycles according to its own schedule. In other embodiments, the power plant model 502 may be updated or tuned after a predefined number of the repetitions of the optimization cycle. The updated tuned power plant model 507 then is used in subsequent optimization cycles until the predefined number of repetitions occur so to initiate another tuning cycle. In certain embodiments, the tuning cycle occurs after each optimization cycle. According to alternative embodiments, the number of optimization cycles that initiate a tuning of the power plant model 502 is related to the number of time intervals of the prediction horizon.

The present invention, as stated, may optimize the operation of power plants 501 according to performance objectives, which may be defined by the plant operator. According to preferred embodiments, the present method is used to economically optimize operation of the power plant. In such cases, the performance objectives include and define a cost function that provides the criteria for the economic optimization. Pursuant to exemplary embodiments, the simulated operation for each of the proposed parameter sets includes, as an output, predicted values for selected performance indicators. The cost function may include an algorithm correlating the predicted values for the performance indicators to an operating cost or some other indication of economic performance. Other performance indicators that may be used in this manner, for example, include a power plant heat rate and/or a fuel consumption. According to alternative embodiments, simulation outputs include predicted values for hot gas path temperatures for one or more of thermal generating units of the power plant 501, which may be used to calculate a consumed component life cost. This cost reflects a predicted degradation cost associated with the hot gas path components that results from the simulated operation. The cost function may further include an algorithm correlating predicted values for the performance indicators to an operating revenue. In such cases, the operating revenue may then be compared to the operating cost so to reflect a net revenue or profit for the power plant 501. The present method may further include the step of receiving a forecasted price for electricity sold within the market for the period being optimized, and the selected performance indicators may include an output level of electricity, which then may be used to calculate expected operating revenue for the upcoming period of operation. In this manner, the present method may be used to maximize economic return by comparing operating costs and revenue.

As will be appreciated, performance objectives may further be defined to include selected operability constraints. According to certain alternative embodiments, the present method includes the step of disqualifying any of the proposed parameter sets that produce simulated operation violating any one of the defined operability constraints. Operability constraints, for example, may include emission thresholds, maximum operating temperatures, maximum mechanical stress levels, etc., as well as legal or environmental regulations, contractual terms, safety regulations, and/or machine or component operability thresholds and limitations.

The present method, as already mentioned, includes generating proposed parameter sets 517 that describe alternative or possible operating modes of the power plant 501. As illustrated, the proposed parameter sets 517 may be generated in the plant operator module 509 and may include input from a plant manager or human operators. Broadly speaking, the possible operating modes may be considered competing modes for which simulation is performed so to determine the mode of operation that best satisfies performance objectives and anticipated conditions. According to exemplary embodiments, these alternative operating modes may be selected or defined several ways. According to a preferred embodiment, the alternative operating modes include different levels of output for the power plant 501. Output level, as used herein, relates to the level of electricity generated by the power plant 501 for commercial distribution within the market during a defined market period. The proposed parameter sets may be configured to define multiple cases at each of the different output levels. Several output levels may be covered by the proposed parameter sets, and the ones chosen may be configured to coincide with a range of possible outputs for the power plant 501. It will be appreciated that the range of possible output levels may not be linear. Specifically, because of the multiple generating units of the power plant and the scalability limitations related thereto, the proposed parameter sets may be grouped or concentrated at levels that are more achievable or preferable given the particular configuration of the power plant 501.

As stated, each of the competing operating modes may include multiple cases. For instances where the competing operating modes are defined at different, the multiple cases may be chosen so to reflect a different manner by which the output level is achieved. Where the power plant has multiple generating units, the multiple cases at each output level may be differentiated by how each of thermal generating units is operated and/or engaged. According to one embodiment, the several generated cases are differentiated by varying the percentage of the output level provided by each of the generating units. For example, the power plant 501 may include a combined-cycle power plant 501 in which thermal generating units include gas and steam turbines. Additionally, the gas and steam turbines may be, respectively, augmented by an inlet conditioning system, such as a chiller, and a HRSG duct firing system. As will be appreciated, the inlet conditioning system, for example, may be configured for cooling inlet air of the gas turbine so to boost its generating capacity, and the HRSG duct firing system may be configured as a secondary heat source to the boiler so to boost the generating capacity of the steam turbine. According to this example, the thermal generating units include the gas turbine or, alternatively, the gas turbine boosted by the inlet conditioning system; and the steam turbine or, alternatively, the steam turbine boosted by the HRSG duct firing system. The multiple cases covered by the proposed parameter sets then may include instances where these particular thermal generating units are engaged in different ways while still satisfying the different output levels that were chosen as competing operating modes. The simulated operation may then be analyzed to determine which reflects an optimized operating mode pursuant to a defined criteria.

According to an alternative embodiment, the proposed parameter sets may be drawn toward different operating modes to calculate economic benefits of maintenance operations. To achieve this, one of the competing operating modes may be defined as one in which the maintenance operation is assumed to be completed before the period of operation chosen for optimization. This operating mode may be defined to reflect a performance boost that is expected to accompany the completion of this maintenance operation. An alternative operating mode may defined as being one in which the maintenance operation is not performed, meaning that the simulation of the multiple cases for this operating mode would not include the expected performance boost. The results from the simulations may then be analyzed so that the economic effects are better understood, and the multiple cases may be used to show how differing scenarios (such as fluctuations in fuel prices or unexpected ambient conditions) affect the outcome. As will be appreciated, using the same principles, the competing operating modes may include a turndown mode and a shutdown mode.

The present invention further includes different ways in which the optimization process may be used by power plant operators to automate processes and improve efficiency and performance. According to one embodiment, as illustrated in FIG. 17, the method includes the step of communicating a calculated optimized mode of operation 521 to the plant operator module 509 for approval by a human operator before the power plant 501 is controlled pursuant to the optimized operating mode. In an advisor mode, the present method may be configured to present alternative modes of operation and the economic ramifications associated with each so to bring such alternatives to the attention of the plant operator. Alternatively, the control system of the present mention may function to automatically implement optimized solutions. In such cases, the optimized operating mode may be electronically communicated to the plant controller 505 so to prompt control of the power plant 501 in a manner consistent therewith. In power systems that include an economic dispatch system for distributing electricity generation among a group of power plants 501, the optimization method of the present invention may be used for generating more accurate and competitive bids for submittal to the central authority or dispatcher. As one of ordinary skill in the art will appreciate, the optimization features already described may be used to generate bids that reflect true generating capacity, efficiency, heat rate, while also providing useful information to plant operators regarding the economic trade-offs the power plant is making in future market periods by choosing between different operating modes. Increased accuracy of this type and the additional analysis helps ensure that the power plant remains competitive in the bid process, while also minimizing the risk of highly unprofitable dispatch results due to unforeseen contingencies.

FIGS. 18 through 21 illustrate exemplary embodiments of the present invention that relate to turndown and/or shutdown operation of a power plant. The first embodiment, as illustrated in flow diagram 600 of FIG. 18—which may be referred to as a "turndown advisor—teaches methods and systems for simulating and optimizing a turndown level for the power plant during a defined or selected period of operation ("selected operating period"). In preferred embodiments, the present method is used with power plants having multiple gas turbines, which may include combined cycle plants having multiple gas turbines and one or more steam turbines. The tuned power plant model may be used to determine an optimized minimum load for operating the power plant at a turndown level during the selected operating period. As previously stated, an "optimized" operating mode may be defined as one that is deemed or evaluated as preferable over one or more other possible operating modes. An operating mode for the purpose of these embodiments may include an assignment of certain power generating units to fulfill a load commitment or other performance objectives, as well as the physical configurations of the generating units within a power plant. Such functionality means that in arriving at an optimized or enhanced operating mode, the present invention may consider a multitude of plant combinations that take into account the different turndown configurations of each generating unit as well as configurations which shutdown one or more of the units, while others remain operating at a full or turndown level. The method may further take into account other constraints such as operability constraints, performance objectives, cost functions, operator input, and ambient conditions in its calculation of an enhanced turndown operating mode for the power plant that enhances performance and/or efficiency. The present method, as described herein and/or delineated in the appended claims, may take into account present and predicted ambient conditions for the optimization of the turndown operating mode, as well as changing the unit configuration and/or control so to dynamically adjust operation of one or more of the generating units when actual conditions deviate from those predicted. According to a preferred embodiment, such performance is defined, at least in part, as the one that minimizes the level of fuel usage or consumption over the proposed turndown operating period.

The turndown advisor of the present invention may take into account several factors, criteria, and/or operating parameters in arriving at an optimized or enhanced turndown solution and/or recommended turndown action. According to preferred embodiments, these include, but are not limited to, the following: gas turbine engine operating boundaries (i.e., temperature, aerodynamic, fuel splits, lean blowout, mechanical, and emission limits); gas turbine and steam turbine control systems; minimum steam turbine throttle temperature; the maintenance of the vacuum seal on the condenser as well as other factors, such as the configuration or lineup of systems or their control. One of the outputs of the optimization may include a recommended operating mode and configuration of the power plant or a plurality of plants, wherein the plurality includes different types of power plants including wind, solar, reciprocating engine, nuclear, and/or other types. It will be appreciated that the recommended operating mode may be automatically initiated or electronically communicated to a plant operator for approval. Such control may be implemented via off-premise or on-premise control systems that are configured to control the operation of the generating units. Additionally, in situations where the power plant includes multiple gas turbine engines, the output of the present method may include identifying which of the gas turbines should continue operating and which should be shutdown during the turndown period, which is a process that is discussed in more detail in relation to FIG. 19. For each of the gas turbines that the advisor recommends for continued operation during the turndown period, the present method may further calculate a load level. Another output may include calculating the total load for the power plant during the turndown period, as well as the hourly target load profile based on the predicted ambient conditions, which, as stated, may be adjusted if conditions change. The present invention may also calculate the predicted fuel consumption and emissions of the power plant during the turndown operating period. The output of the disclosed method may include the operating lineup/configuration given the control setpoints available to the generating units and plant so to achieve the target generating levels more efficiently.

As discussed above, traders and/or plant managers (hereinafter "plant operators" unless distinguishing therebetween), who are not bound by preexisting contractual terms, typically bid their power plants on a prospective market, such as a day ahead market. As an additional consideration, plant operators are tasked with making sure adequate fuel supply is maintained so that the power plant is able to meet target or contracted generating levels. However, in many cases fuel markets operate prospectively such that advantageous pricing terms are available to power plants willing or able to commit to future fuel purchases in advance. More specifically, the further in advance the fuel is purchased, the more advantageous pricing. Given these market dynamics, for a power plant to achieve an optimized or high level of economic return, the plant operator must bid the plant competitively against other generating units so to utilize its generating capacity, while also estimating accurately the fuel required for future generating periods so that 1) the fuel may be purchased in advance so to secure the lower pricing; and 2) a large fuel buffer is not needed so that a lean fuel inventory may be maintained. If done successfully, the plant operator secures better pricing by committing early to future fuel purchases, while, at the same time, not over-purchasing so that unnecessary and costly fuel reserves are needed, or under-purchasing so to risk a fuel supply shortfall.

Methods of the present invention may optimize or enhance the efficiency and profitability of power generating activities by specifying an IHR profile for a generating unit or plant's particular configuration, especially as these relate to the preparation of a dispatch bid so to secure generating market share. The present method may include specifying optimal generating allocation across multiple generating units within a power plant or across several plants. The present method may take into account the operating and control configurations available to those generating units, permutate the possible arrangements, and thereby achieve a bid that, if selected, enables the generation of power over the bid period at a reduced or minimized cost. In doing this, the present method may consider all applicable physical, regulatory and/or contractual constraints. As part of this overall process, the present method may be used to optimize or enhance turndown and shutdown operation for a power plant having multiple generating units. This procedure may include taking into account anticipated exogenous conditions, such as, for example, weather or ambient conditions, gas quality, reliability of the generating units, as well as ancillary obligations, such as steam generation. The present method may be used to enumerate IHR profiles for a plurality of generating units having multiple configurations, as well as control settings for the selected turndown configuration and then control for the anticipated exogenous conditions in the preparation of the plants dispatch bid.

One common decision for operators relates to whether turndown or shutdown the power plant during off-peak periods, such as overnight, when demand or load requirements are minimal. As will be appreciated, the outcome of this decision depends significantly on the plant operator's understanding of the economic ramifications related to each of these possible modes of operation. In certain cases, the decision to turndown the power plant may be readily apparent, while the optimal minimum load at which to maintain the power plant during the turndown period remains uncertain. That is, while the plant operator has made the decision to turndown the power plant over a certain period, the operator is unsure about the turndown operating points at which to run the several generating units of the power plant in the most cost-effective manner.

Figure 18:
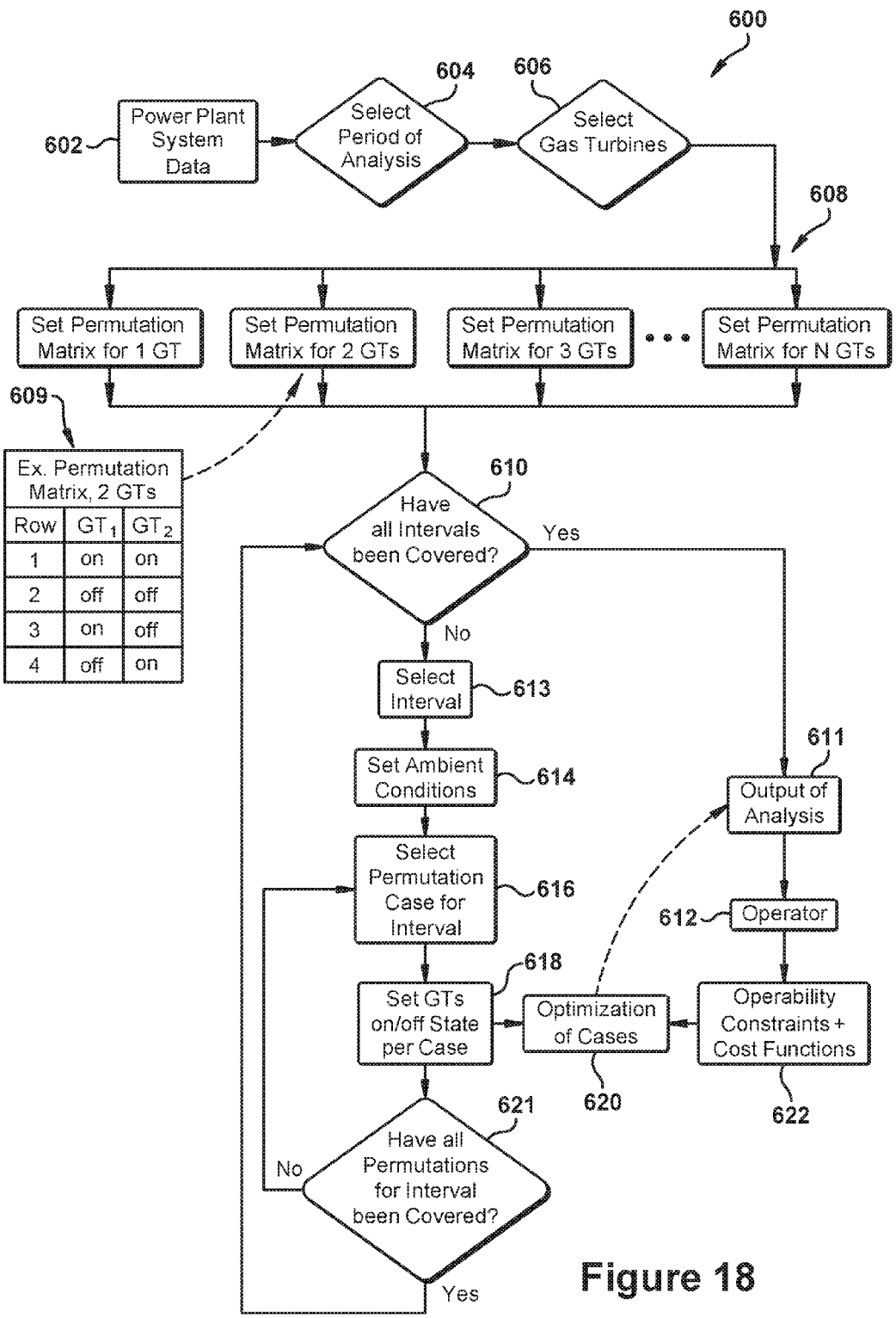
FIG. 18 illustrates a flow diagram in which an alternative embodiment of the present invention is provided that relates to the optimization of turndown operation.

The turndown advisor of FIG. 18 may be used as part of a process to recommend an optimal minimum load at which to operate the power plant. This advisor function may further recommend the best course of action for the power plant given a specific scenario of ambient conditions, economic inputs, and operating parameters and constraints. From these inputs the process may calculate the best operating levels and then may recommend the operating parameters necessary for control of the power plant, as will be discussed in more detail relative to FIG. 19. As will be appreciated, this functionality may result in several ancillary benefits, which include extended part life, more efficient turndown operation, improved economic performance, and improved accuracy in making fuel purchases.

As illustrated in flow diagram 600, certain information and relevant criteria may be gathered during the initial steps. At step 602, data, variables, and other factors associated with power plant systems and generating units may be determined. These may include any of the factors or information listed above. According to a preferred embodiment, an ambient profile may be received, which may include a forecast of ambient conditions during the selected operating period. Relevant emissions data may also be gathered as part of this step, which may include emissions limits as well as emissions to date for the power plant. Another factor includes data related to the potential sale of power and/or steam during the selected operating period. Other variables that may be determined as part of this step include the number of gas turbines at the plant, the combustion and the control systems for each of the gas turbines, as well as any other plant specific limitations that may be relevant to the calculations discussed below.

At step 604, the period of the proposed turndown operation (or "selected operating period") may be defined with particularity. As will be appreciated, this may be defined by an user or plant operation and include a selected operating period during which analysis of available turndown operating modes is desired. The definition of the selected operating period may include it anticipated length, as well as an user-specified start time (i.e., the time of the selected operating period will start) and/or a stop time (i.e., the time the selected operating period will end). This step may further include defining an interval within the selected operating period. The interval may be configured so to subdivide the selected operating period into a plurality of sequential and regularly spaced time periods. For the sake of the example provided herein, the interval will be defined as a hour and the selected operating period will be defined as including a plurality of the one-hour intervals.

At step 606, the number of the gas turbines involved in the optimization process for the selected operating period may be selected. This may include all of the gas turbines at the power plant or some portion thereof. The method may further include the consideration of other generating units at the power plant, such as steam turbine systems, and take into account their operational states during the selected operating period, as described in more detail below. The determination of the gas turbines involved in the turndown operation may include prompting for or receiving input from the plant operator.

At step 608, the present method may configure a permutation matrix given the number of gas turbines that were determined part of the proposed turndown operation during the selected operating period. As will be appreciated, the permutation matrix is a matrix that includes the various ways in which the plurality of gas turbine engines may be engaged or operated during the selected operating period. For example, as illustrated in the exemplary permutation matrix 609 of FIG. 18, the permutation matrix for the case of two gas turbines includes four different combinations that cover each of the possible configurations. Specifically, if the power plant includes a first and a second gas turbine, the permutation matrix includes the following rows or cases: a) both the first and second gas turbines are "on", i.e., are being operated in a turndown state of operation; 2) both the first and second gas turbines are "off", i.e., are being operated in a shutdown state of operation; 3) the first gas turbine is "on", and the second gas turbine is "off"; and 4) the first gas turbine is "off", and the second gas turbine is "on". As will be appreciated, only two permutations are possible in the case of a single gas turbine, while for three gas turbines, seven different rows or cases would be possible, each of which representing a different configuration as to how the three gas turbine engines may be engaged during a particular time frame in terms of the "on" and "off" operating states. In relation to FIG. 17 and the optimization process discussed in the text related thereto, each case or row of a permutation matrix may be thought of as representing a different or competing operating mode.

As part of the steps represented by steps 610, 613, 614, 616, and 618, the present method may configure proposed parameter sets for the proposed turndown operation. As stated, the selected operating period may be divided into the several hour-long time intervals. The process for configuring the proposed parameter sets may begin at step 610 where it is determined if each of the intervals has been addressed. If the answer to this inquiry is "yes," then the process, as illustrated, may continue to an output step (i.e., step 611) wherein the output of the turndown analysis is provided to an operator 612. If all of the intervals have not been covered, the process may continue to step 613 one of the intervals not already covered is selected. Then, at step 614, the ambient conditions may be set for the selected interval based upon received forecasts. Continuing to step 616, the process may select a row from the permutation matrix, and, at step 618, set the on/off state of the gas turbines pursuant to the particular row.

From there, the present method may continue along two different paths. Specifically, the method may continue to an optimization step represented by step 620, while also continuing to a decision step at step 621 where the process determines if all the permutations or rows of the permutation matrix have been covered for the selected interval. If the answer to this is "no," the process may loop back to step 616 where a different permutation row for the interval is selected. If the answer to this is "yes," then the process, as illustrated, may continue to step 610 so to determine if all of the intervals have been covered. As will be appreciated, once all of the rows of the permutation matrix for each interval have been addressed, the process may advance to the output step of step 611.

At step 620, the present method may optimize performance using the tuned power plant model, as previously discussed in FIG. 17. Consistent with this approach, multiple cases may be created for each of the competing operating modes, i.e., each of the rows of the permutation matrix for each of the intervals of the selected operating period. According to one preferred embodiment, the present method generates proposed parameter sets in which several operating parameters are varied so to determine the effect on a selected operating parameter or performance indicator. For example, according to this embodiment, the proposed parameter sets may include manipulating settings for an inlet guide vanes ("IGV") and/or an exhaust temperature of the turbine ("$T_{exh}$") so to determine what combination yields a minimized total fuel consumption rate for the power plant given the on/off state of the particular row and the ambient conditions forecast for the particular interval. As will be appreciated, operation that minimizes fuel consumption while satisfying the other constraints associated with turndown operation represents one manner by which turndown performance may be economically optimized or, at least, economically enhanced relative one or more alternative modes of operation.

As shown, according to certain embodiments, cost functions, performance objectives, and/or operability constraints may be used by the present invention during this optimization process. These may be provide via a plant operator, represented by step 622. These constraints may include limits as to the settings of the IGV, $T_{exh}$ limits, combustion boundaries, etc., as well as those associated with the other thermal systems that may be part of the power plant. For example, in power plants having combined cycle systems, the operation or maintenance of the steam turbine during the turndown operation may present certain constraints, such as, for example, the maintenance of a minimum steam temperature or condenser vacuum seal. Another operability constraint may include the necessary logic that certain ancillary systems may be affected in certain operating modes and/or certain subsystems are mutually exclusive, such as evaporative coolers and chillers.

Once the present method has cycled through the iterations given the intervals and the different rows of the permutation matrix, the results of the optimization may be communicated to the plant operator at step 611. These results may include an optimized case for each of the rows of the permutation matrix for each of the time intervals. According to one example, the output describes an optimized operation that is defined by a cost function of fuel consumption for the power plant for each of the permutations for each of the intervals. Specifically, the output may include the minimum fuel required (as optimized using the tuned power plant model pursuant to methods already described) for each of the possible plant configurations (as represented by the rows of the permutation matrix) for each interval, while also satisfying operability constraints, performance objectives, and anticipated ambient conditions. According to another embodiment, the output includes an optimization that minimizes a generating output level (i.e., megawatts) for the possible plant configurations for each of the intervals in the same way. As will be appreciated, certain of the possible plant configurations (as represented by permutations of the permutation matrix) may be unable to satisfy operability constraints no matter the fuel supply for generating output level. Such results may be discarded and not considered further or reported as part of the output of step 611.

Figure 19:
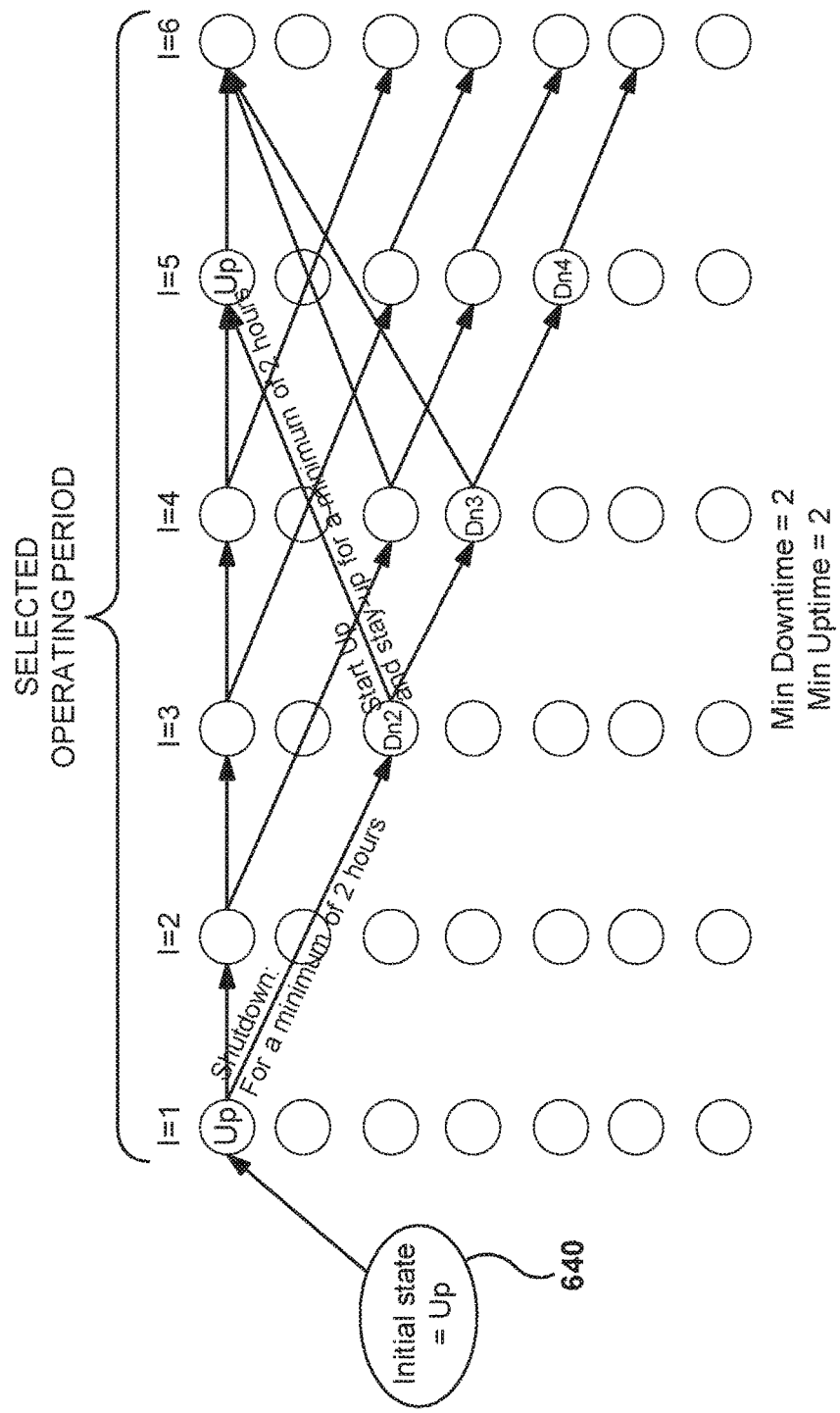
FIG. 19 illustrates a flow diagram in which an alternative embodiment of the present invention is provided that relates to the optimizing between turndown and shutdown operation.
Figure 20:
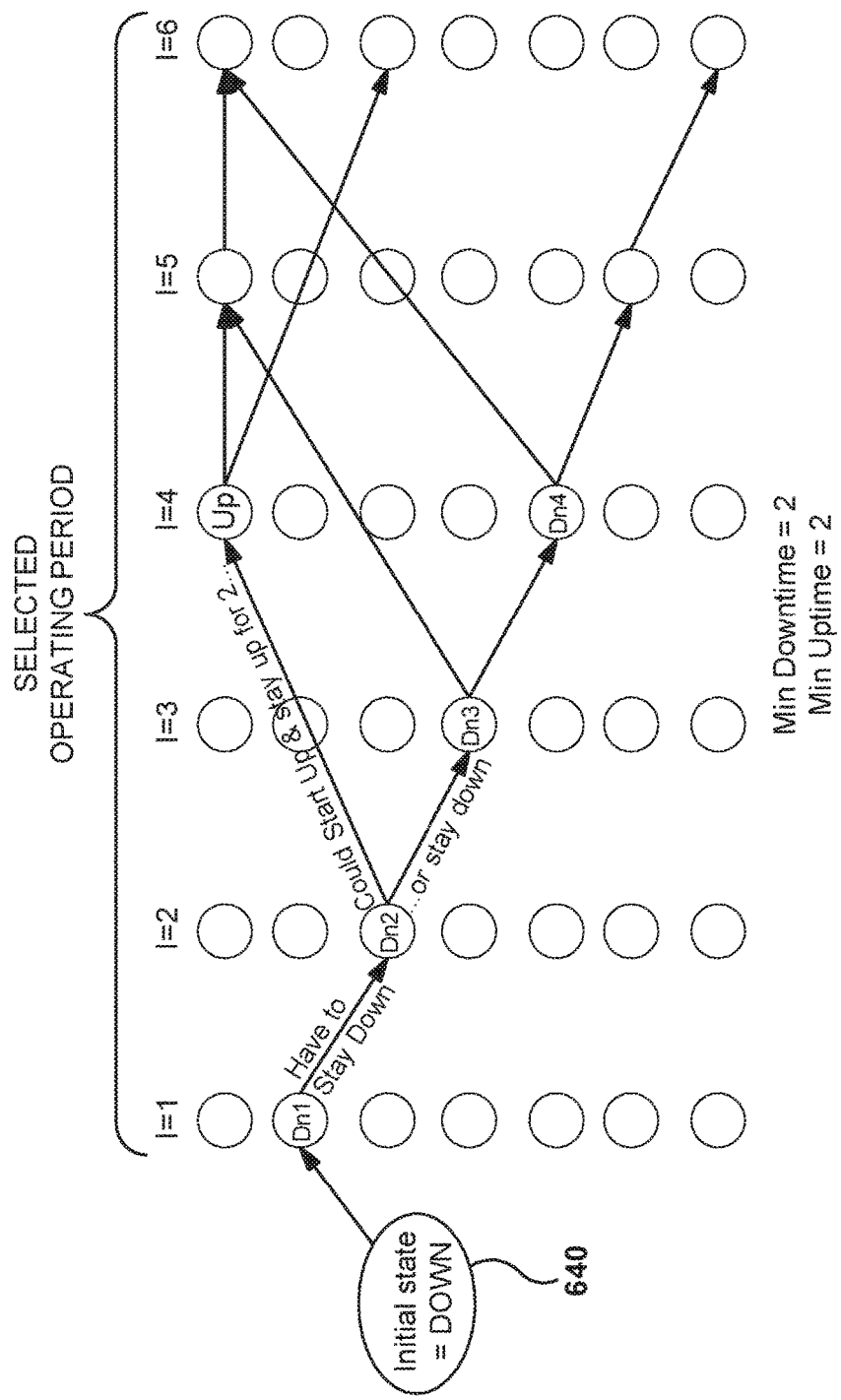
FIG. 20 is a diagram illustrating available operating modes of a gas turbine during a selected operating period having defined intervals according to aspects of an exemplary embodiment of the present invention.

FIGS. 19 and 20 graphically represent ways in which a gas turbine of a power plant may be operated over a selected operating period that includes defined intervals ("I" in the figures) given typical constraints associated with transient operation. As will be appreciated, transient operation includes switching a generating unit between different operating modes, including those involving transitioning to or from a shutdown mode of operation. As shown, multiple operational pathway or sequences 639 may be achieved depending upon: 1) an initial state 640 of the gas turbine; and 2) the decisions made regarding whether to change operating modes at the intervals where changes are possible given the transient operating constraints. As will be appreciated, the several different sequences 639 represent the multiple ways the generating unit may be operated over the intervals shown.

As will be appreciated, the output of the method of FIG. 18 may be used in conjunction with diagrams FIGS. 19 and 20 to configure proposed turndown operating sequences for the generating units of a power plant. That is, FIGS. 19 and 20 illustrate examples as to how a generating unit of a power plant may be engaged and how its operating modes modified as the time intervals pass, which may include instances when the generating unit's operating mode remains unchanged, instances when the unit's operating mode is modified from a shutdown operating mode to a turndown operating mode, as well as instances when the unit's operating mode is modified from a shutdown operating mode to a turndown operating mode. As illustrated, the transient operating constraint used in this example is that modifying an operating modes requires that the unit remain in the modified operating mode for a minimum of at least two of the intervals. The many sequences (or pathways) by which the generating unit arrives at the last interval represents the possible turndown operating sequences available to the unit given the transient operating constraints.

As will be appreciated, the analytical results from FIG. 18—i.e., the optimized turndown operation for each of the matrix permutations—may be used to select from the possible turndown operating sequences, a plurality of preferred cases, which may be referred to as proposed turndown operating sequences. Specifically, given the results of the method described in relation to FIG. 18, the proposed turndown operation sequences may be chosen from cases of turndown operation that satisfy plant performance objectives and constraints, while also optimizing performance according to a selected cost function (such as MW output or fuel consumption). The considerations illustrated in FIGS. 19 and 20 represent a way of determining whether turndown operating sequences are attainable given transient operating constraints. That is, the proposed turndown operating sequences arrived at by of the combined analysis of FIGS. 18 through 20 are operating sequences that comport with temporal limitations associated with transitioning an unit from one operating mode to another.

Figure 21:
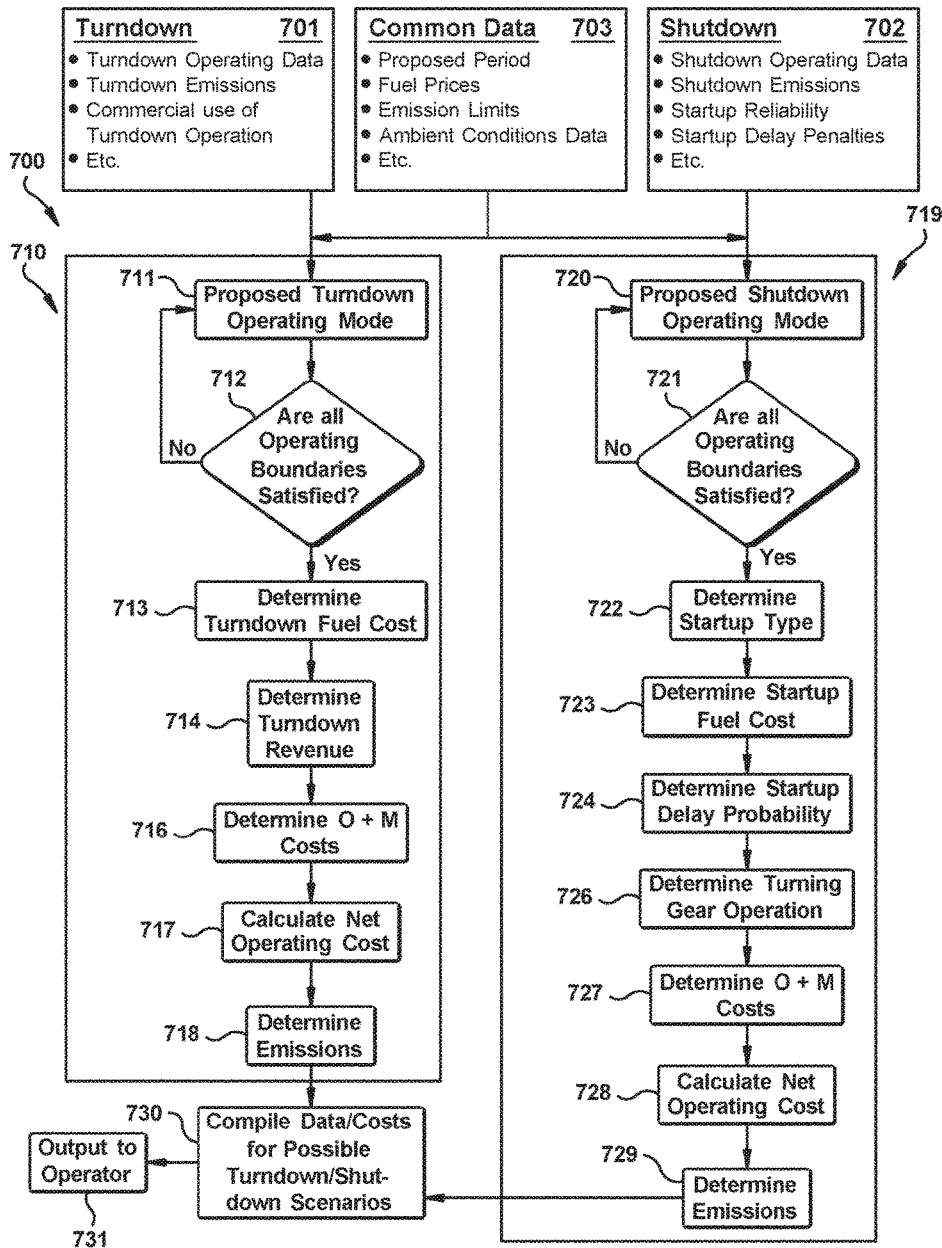
FIG. 21 is a diagram illustrating available operating modes of a gas turbine during a selected operating period having defined intervals according to aspects of an alternative embodiment of the present invention.

Looking now at FIG. 21, a method is provided to further model and analyze turndown operation of a power plant. As will be appreciated, this method may be used to analyze turndown costs versus shutdown costs for specific cases involving a single generating unit over a defined time interval. However, it may also be used to analyze plant level costs in which a recommendation is sought regarding ways in which the operation of several generating units may be controlled over a selected operating period having multiple intervals. In this way, the output of FIGS. 18 and 20 may be assembled so to configure possible operating modes or sequences over the span of multiple intervals, which, as will be demonstrated, then may be analyzed pursuant to the method of FIG. 21 so to provide a more fuller understanding of turndown operation over a broader operating period.

Plant operators, as already discussed, regularly have to decide between turndown and shutdown operating modes during off-peak hours. While certain conditions may make the decision a straightforward one, often times it is difficult, particularly given the increased complexity of the modern power plant and the multiple thermal generating units usual contained within each. As will be appreciated, the decision to turndown versus shutdown a power plant depends significantly on a full appreciation of the economic benefits associated with each mode of operation. The present invention, according to the alternative embodiment illustrated in FIG. 21, maybe used by plant operators to gain an improved understanding of the trade-offs associated with each of these different operating modes so to enhance decision-making. According to certain embodiments, the method of FIG. 21 may be used in tandem with the turndown advisor of FIG. 18 so to enable a combined advisor function that 1) recommends the best course of action between turndown and shutdown operating modes for the generating units of the power plant given known conditions and economic factors; and 2) recommends, if turndown operation is the best course of action for some of those units, the minimum turndown load level that is optimal. In this manner, plant operators may more readily identify situations when the units of power plants should be turned down versus being shutdown, or vice versa, based upon whichever represents the best economic course of action for the power plant given a specific scenario of ambient conditions, economic inputs, and operational parameters. Ancillary benefits, such as extending component part-life, are also possible. It should also be appreciated that the methods and systems described in relation to FIGS. 18 and 21 may be employed separately.

In general, the method of flow diagram 700—which also may be part of or referred to herein as a "turndown advisor"—applies user inputs and data from analytical operations so to perform calculations that evaluate costs associated with turning down a power plant versus those of shutting it down. As will be appreciated, the flow diagram 700 of FIG. 21 provides this advisor feature by, according to certain preferred embodiments, leveraging the tuned power plant model that is discussed at length above. As part of this functionality, the present invention may advise as to the various outcomes, economic and otherwise, between turning down and shutting down a power plant during off-peak demand periods. The present invention may provide relevant data that clarifies as to whether turning down the power plant is preferable to shutting it down over a specified market period. According to certain embodiments, the operation having the lower costs may be then recommended to the plant operator as the appropriate action, although, as also presented herein, ancillary issues or other considerations may also be communicated to the plant operator that may affect the decision. The present method may put forth potential costs, as well as the probability of incurring such costs, and these considerations may affect the ultimate decision as to which operating mode is preferable. Such considerations may include, for example, a complete analysis of both short-term operating costs as well as long-term operating costs associated with plant maintenance, operating efficiencies, emission levels, equipment upgrades, etc.

As will be appreciated, the turndown advisor may be implemented using many of the systems and methods described above, particularly those discussed in relation to FIGS. 16 through 20. The turndown advisor of FIG. 21 may collect and use one or more of the following types of data user specified start and stop time for the proposed turndown operating period (i.e., the period for which the turndown operating mode is being analyzed or considered); fuel costs; ambient conditions; time off breaker; alternate power uses; sale/price of power or steam during the relevant period; operating and maintenance cost over the period; user input; calculated turndown load; predicted emissions for operation; current emissions levels spent by the power plant and the limits for defined regulatory periods; specifications regarding the operation of the turning gear; regulation and equipment related to purge processes; fixed cost for modes of power plant operation; costs related to startup operation; plant startup reliability; imbalance charges or penalties for delayed startup; emissions related to startup; fuel rate used for auxiliary boiler if steam turbine present; and historical data regarding how the gas turbines of the power plant have been operating in turndown and shutdown operating modes. In certain embodiments, as discussed below, the outputs from the present invention may include: a recommended operating mode (i.e., turndown and shutdown mode of operation) for the power plant over the relevant period; costs associated with each operating mode; a recommended plant operating load and load profile over time; a recommended time to initiate unit startup; as well as emissions consumed year to date and emissions remaining for the remainder of the year. According to certain embodiments, the present invention may calculate or predict fuel consumption and emissions of the power plant over the relevant period, which then may be used to calculate the cost of turndown versus shutdown for one or more particular gas turbine engines. The present method may use the cost of each gas turbine in the shutdown and turndown mode to determine the combination which has the minimum operating cost. Such optimization may be based on different criteria, which may be defined by the plant operator. For example, the criteria may be based on revenue, net revenue, emissions, efficiency, fuel consumption, etc. In addition, according to alternative embodiments, the present method may recommend specific actions, such as whether or not to take a purge credit; the gas turbine units that should be shutdown and/or those that should be turned down (which, for example, may be based on historical startup reliability and potential imbalance charges that may be incurred due to a delayed start). The present invention may further be used to enhance predictions related to fuel consumption so to make prospective fuel purchases more accurate or, alternatively, enable fuel purchases for market periods farther into the future, which should have a positive effect on fuel pricing and/or maintenance of leaner fuel inventory or margin.

FIG. 19 illustrates an exemplary embodiment of a turndown advisor according to an exemplary embodiment of the present invention, which is in the form of a flow diagram 700. The turndown advisor may be used to advise as to the relative costs over a future period of operation of shutting down a power plant or a portion thereof while operating other of the generating units in a turndown mode. According to this exemplary embodiment, the possible costs associated with the shutdown and the turndown operating mode may be analyzed and then communicated to a plant operator for appropriate action.

As initial steps, certain data or operating parameters may be gathered that affect or may be used to determine operating costs during the selected turndown operating period. These, as illustrated, are grouped accordingly between: turndown data 701; shutdown data 702; and common data 703. The common data 703 includes those cost items that relate to both shutdown and turndown operating modes. The common data 703, for example, includes the selected operating period for which the analysis of the turndown operation mode is being performed. It will be appreciated that more than one selected operating period may be defined and analyzed separately for competing modes of turndown operation so that a broader optimization is achieved over an extended time frame. As will be appreciated, the defining of the selected operating period may include defining the length of the period as well as its starting or end point. Other common data 703, as shown, may include: the price of fuel; the various emission limits for the power plant; and data regarding ambient conditions. In regard to the emission limits, the data collected may include limits that may be accrued during a defined regulatory period, such as a year, and the amounts already accrued by the power plant and the extent to which the applicable regulatory period has already tolled. Further, emissions data may include penalties or other costs associated with exceeding any of the limits. In this manner, the present method may be informed as to the current status of the power plant relative to yearly or periodic regulatory limits as well as the likelihood of a possible violation and penalties associated with such noncompliance. This information may be relevant to the decision whether to shutdown or turndown generating units as each type of operation impacts plant emissions differently. In regard to ambient conditions data, such data may be obtained and used pursuant to those processes that have been already described herein.

The turndown operating mode, as will be appreciated, has data uniquely relevant to a determination of the operating costs associated with it. Such turndown data 701, as illustrated, includes revenue that may be earned via the power that is generated while the power plant operates at the turndowned level. More specifically, because the turndown operating mode is one in which power generation continues, albeit at a lower level, there is the potential that that power produces revenue for the power plant. To the extent that this is done, the revenue may be used to offset some of the other operating costs associated with turndown operating mode. Accordingly, the present method includes receiving a price or other economic indication associated with the sale or commercial use of the power that the plant generates while operating in the turndown mode. This may be based on historical data, and the revenue earned may depend upon the turndown level at which the power plant operates.

The turndown data 701 may further include operating and maintenance associated with operating the plant at the turndown level during the selected operating period. This also may be based on historical data, and such costs may be dependent upon the turndown level for the power plant and how the power plant is configured. In some cases, this charge may be reflected as a hourly cost that is dependent on load level and historical records of similar operation. The turndown data 701 may further include data related to plant emissions while operating in the turndown mode The shutdown data 702 also includes several items that are unique to the shutdown operating mode, and this type of data may be gathered at this stage of the current method. According to certain embodiments, one of these is data relating to the operation of the turning gear during the shutdown period. Additionally, data regarding the various phases of shutdown operation will be defined. This, for example, may include data related to: the shutdown operation itself, which may include historical data on length of time necessary to bring the generating units from a regular load level to a state where the turning gear is engage; the length of time that the power plant remains shutdown according to the selected operating period; the length of time the generating unit typically remains on the turning gear; and data regarding the process by which the generating units are restarted or brought back online after being shutdown as well as the time required so to do this, startup fuel requirements, and startup emissions data. In determining the startup time, such information as to the types of startups possible for the generating unit and specifications related thereto may be determined. As one of skill in the art will appreciate, startup processes may depend upon the time that the power plant remains shutdown. Another consideration affecting startup time is whether the power plant includes certain features that may affect or shorten startup time and/or whether the operator of the power plant chooses to engage any of these features. For example, a purge process, if necessary, may lengthen the startup time. However, a purge credit may be available if the power plant was shutdown in a certain manner. Fixed costs associated with shutdown operation, including those associated with startup, may be ascertained during this step, as well as costs particular to any of the relevant generating units. Emissions data associated with the startup and/or shutdown of the power plant also may be ascertained. These may be based on historical records of operation or otherwise. Finally, data related to startup reliability for each of thermal generating units may be ascertained. As will be appreciated, power plants may be accessed fees, penalties, and/or liquidated damages if the process of bringing units back online includes delays that result in the power plant being unable to meet load obligations. These costs may be determined and, as discussed in more detail below, may be viewed in light of the historical data related to startup reliability. In this manner, such charges may be discounted so to reflect the likelihood of incurrence and/or include an expenditure by which the risk of such charges is hedged or insured against.

From the initial data acquisition steps of 701 through 703, the exemplary embodiment illustrated in FIG. 19 may proceed via a turndown analyzer 710 and a shutdown analyzer 719, each of which may be configured to calculate operating costs for the operating mode to which it corresponds. As illustrated, each of these analyzers 710, 719 may proceed toward providing cost, emission, and/or other data to step 730 where data regarding possible turndown and unit shutdown scenarios is compiled and compared so that, ultimately, an output may be made to a power plant operator at step 731. As will be discussed, this output 731 may include cost and other considerations for one or more of the possible scenarios and, ultimately, may recommended a particular action and the reasons therefor.

In regard to the turndown analyzer 710, the method may first determine the load level for the proposed turndown operation during the selected operating period. As discussed more below, much of the costs associated with turndown operation may depend significantly on the load level at which the power plant operates as well as how the plant is configured so to generate that load, which, may include, for example, how the various thermal generating units are engaged (i.e., which ones are turned down and which are shutdown). The turndown load level for the proposed turndown operation may be determined in several different ways according to alternative embodiments of the present invention. First, the plant operator may selected the turndown load level. Second, the load level may be selected via analysis of historical records regarding past turndown levels at which the plant has operated efficiently. From these records, a proposed load level may be analyzed and selected based on operator supplied criteria, such as, for example, efficiency, emissions, satisfaction of one or more site specific objectives, availability of alternative commercial uses for the power generated during the turndown condition, ambient conditions, as well as other factors.

As a third method of selecting the turndown level for the proposed turndown operation, a computer implemented optimization program, such as the one described in relation to FIG. 18, may be used to calculate an optimized turndown level. In FIG. 19, this process is represented by steps 711 and 712. An optimized turndown level may be calculated by proposing turndown operating modes at step 711 and then analyzing at step 712 if the operational boundaries for the power plant are satisfied. As will be appreciated, a more detailed description as to how this is accomplished is provided above in relation to FIG. 18. By using a process such as this to optimize the turndown level, it will be appreciated that the turndown operating modes selected for comparison against the shutdown alternatives for the selected operating period will represent optimized case, and that, given this, the comparison between the turndown and the shutdown alternatives will be a meaningful one. As stated in relation to FIG. 18, the minimum turndown level may be calculated via an optimization process that optimizes the turndown level pursuant to operator selected criteria and/or cost functions. One of the functions may be the level of fuel consumption during the proposed turndown operating period. That is, the optimized turndown level may be determined by optimizing fuel consumption toward a minimal level, while also satisfying all other operational boundaries or site specific performance objectives.

From there, the present method of FIG. 19 may determine the costs associated with the proposed turndown operating mode for the selected operating period according to the characteristics of the turndown operating mode determined via steps 711 and 712. As illustrated, step 713 may calculate fuel consumption and, therefrom, fuel costs for the proposed turndown operation. Pursuant to the exemplary embodiment just discussed that describes an optimization based on minimizing fuel consumption, fuel costs may be derived by simply taking the fuel level calculated as part of the optimization step and then multiplying it by the anticipated or known price for fuel. At a next step (step 715), the revenue derived from the power generated during the selected operating period may be calculated given the proposed turndown level and the availability of commercial demand during the selected operating period. Then, at step 716, operating and maintenance costs may be determined. The operating and maintenance costs associated with the proposed turndown operation may be calculated via any conventional method and may be dependent upon the turndown level. The operating and maintenance costs may be reflected as a hourly charge that is derived from historical records of turndown operation, and may include a component usage charge that reflects a portion of the expected life of various component system that is used during the proposed turndown operation. At a next step, which is indicated by step 717, a net cost for the proposed turndown operating mode for the selected operating period may be calculated by adding the cost (fuel, operating and maintenance) and subtracting the revenue.

The present method may also include step 718 that determines the plant emissions over the selected operating period given the proposed turndown operating mode, which may be referred to as the "emissions impact". The net cost and the emissions impact may then be provided to a compilation and comparison step, which is represented as step 730, so that the cost and emissions impact of different turndown scenarios may be analyzed so that, ultimately, a recommendation may be provided at an output step 731, as discussed more below.

Turning to the shutdown analyzer 719, it may be used to calculate aspects relating to operating one or more of the generating units of the power plant at a shutdown operating mode during the selected operating period. As part of this aspect of the invention, operations including the procedures by which the power plant is shutdown and then restarted at the end of the selected period may be analyzed for cost and emissions. According to a preferred embodiment, the shutdown analyzer 719 may determine as part of initial steps 720 and 721 a proposed shutdown operating mode, which may represent an optimized shutdown operating mode. The proposed shutdown operating mode that includes processes by which one or more of the generating units are shutdown and then restarted so to bring the units back online at the end of the selected operating period. As will be appreciated, the length of the time period during which a generating unit is not operating will determine the type of possible startup processes available to it. For example, whether a hot or cold startup is available depends, respectively, on if the shutdown period is a brief or long one. In determining the proposed shutdown operating mode, the present method may calculate the time necessary for the startup process to bring the generating unit back to an operational load level. At step 721, the method of the present invention may check to make sure that the proposed shutdown operating procedure satisfies all operating boundaries of the power plant. If one of the operational boundaries is not satisfied, the method may return to step 720 so to calculate an alternative startup procedure. This may be repeated until an optimized startup procedure is calculated that satisfies the operational boundaries of the power plant. As will be appreciated, pursuant to the methods and systems discussed above, the tuned power plant model may be used to simulated alternative shutdown operating modes so to determine optimized cases given the relevant operating period and project ambient conditions.

Given the proposed shutdown operating mode of steps 720 and 721, the process may continue by determining the costs associated with it. Initial steps include analyzing the nature of the startup process that the shutdown operating mode includes. At step 722, the process may determine the specific operating parameters of the startup, which may include a determination as to whether or not a purge is required or requested by a plant operator. Given the determined startup, fuel costs may be determined at step 723. According to an exemplary embodiment, the shutdown analyzer 719 then calculates costs associated with the delays that are sometimes incurred during the startup process. Specifically, as indicated in step 724, the process may calculate the probability of such a delay. This calculation may include as inputs the type of startup as well as historical records regarding past startups of the relevant generating units at the power plant as well as data regarding startups of such generating units at other power plants. As part of this, the process may calculate a cost related to the proposed shutdown operating mode that reflects the probability of a start delay occurring and the penalties, such as liquidated damages, that would be incurred. This cost may include any cost associated with a hedging tactic by which the power plant passes a portion of the risk of incurring such penalties to a service provider or other insurer.

At step 726, the current method may determine costs associated with operating the turning gear during the shutdown process. The method may calculate a speed profile for the turning gear given the shutdown period and, using this, a cost for the auxiliary power needed to operate the turning gear is determined. As will be appreciated, this represents the power required to keep the rotor blades of the gas turbine turning as they cool, which is done to prevent the warping or deformation that otherwise would occur if the blades were allowed to cool in a stationary position. At step 727, as illustrated, operating and maintenance costs for the shutdown operation may be determined. The operating and maintenance costs associated with the proposed shutdown may be calculated via any conventional method. The operating maintenance costs may include a component usage charge that reflects a portion of the expected life of various component system that is used during the proposed shutdown operation. At a next step, which is indicated by step 728, a net cost for the proposed shutdown operating mode for the selected operating period may be calculated by adding the determined costs of fuel, turning gear, and operating and maintenance. The present method may also include step 729 in which plant emissions are determined over the selected operating period given the proposed shutdown operating mode, which, as before, may be referred to as the "emissions impact" of the operating mode. The net cost and the emissions impact may then be provided to the compilation and comparison step of step 730.

At step 730, the current method may compile and compare various plant turndown operating modes for the selected operating period. According to one embodiment, the current method may analyze competing turndown operating modes that were identified as part of the methods and processes described in relation to FIGS. 18 through 20. At step 730, the compiled cost data and emissions impact for each of the competing turndown operating modes may be compared and provided as an output as part of step 731. In this manner, according to how the competing operating modes compare, a recommendation may be provided as to how the power plant should be operated during the selected turndown operating period, including which of the turbines should be shutdown and which of the turbines should be turned down and the turndown level at which they should be operated.

Emissions data may also be provided as part of the output of step 731, particular in instances where the competing modes of operation analyzed have similar economic results. As will be appreciated, notification as to how each alternative impacts plant emissions and, given the impact, the likelihood of noncompliance during the present regulatory period may also be provided, as well as an economic result related thereto. Specifically, the accumulated emissions of one or more power plant pollutants during the regulatory period may be compared to the overall limits allowable during that timeframe. According to certain preferred embodiments, the step of communicating the result of the comparison may include indicating an emission rate of the power plant derived by averaging a cumulative emission level for the power plant over a portion of a current regulatory emission period relative to an emission rate derived by averaging a cumulative emission limit over the current regulatory emission period. This may be done to determine how the power plant stands when compared to the average emissions rate allowable without incurring a violation. The method may determine the emissions still available to the power plant during the current regulatory period, and whether or not there is sufficient levels available to accommodate either of the proposed operating modes or, rather, if the emissions impact impermissibly increases the probability of a future regulatory violation.

As an output, the present method may provide a recommended action which advises as to the advantages/disadvantages, both economic and otherwise, between the proposed turndown and shutdown modes of operation. The recommendation may include a reporting of costs as well as a detailed breakdown between the categories in which those costs were incurred and the assumptions made in calculating them. Additionally, the recommended action may include a summary of any other considerations which might affect the decision whereby the most favorable operating mode is selected. These may include information related to applicable emission limits and regulatory periods, as well as where the power plant's current cumulative emissions stand in relation thereto. This may include power plant operators being notified as to any operating mode that unreasonably increases the risk of violating emission thresholds as well as the cost related to such violations.

The present invention may further include an unified system architecture or integrated computing control system that efficiently enables and improves performance of many of the functional aspects described above. Power plants—even those commonly owned—often operate across different markets, governmental jurisdictions, and time zones, include many types of stakeholders and decision-makers participating in their management, and exist under varying types of servicing and other contractual arrangements. Within such varied settings, a single owner may control and operate a number of power plants, each of which having multiple generating units and types, across overlapping markets. Owners also may have different criteria for evaluating effective power plant operation, which, for example, may include unique costs models, response time, availability, flexibility, cyber security, functionality, and differences inherent in the ways separate markets operate. However, as will be appreciated, most current power trading markets rely on various off-line generated files shared by multiple parties and decision-makers, including those transmitted between traders, plant managers, and regulating authorities. Given such complexities, the capabilities of power plants and/or generating unit within a market segment may not be fully understood, particularly across the layered hierarchy that spans, for example, from individual generating units to power plants, or from power plants to fleets of such plants. As such, each successive level of the power trading market typically hedges the performance that is reported by the level below. This translates into inefficiencies and lost revenue for owners, as the successive hedging compounds into systemic underutilization. Another aspect of the present invention, as discussed below, functions to alleviate the disconnections that are at the root of these issues. According to one embodiment, a system or platform is developed which may perform analytics, collect and evaluate historical data, and perform what-if or alternate scenario analyses on an unified system architecture. The unified architecture may more efficiently enable various functions, various components, such as power plant modeling, operational decision support tools, prediction of power plant operation and performance, and optimization pursuant to performance objectives. According to certain aspects, the unified architecture may achieve this via an integration of components local to the power plant with those remote to it, such as, for example, those hosted on a centrally hosted or cloud based infrastructure. As will be appreciated, aspects of such integration may enable enhanced and more accurate power plant models, while not impacting consistency, efficacy, or timeliness of results. This may include utilizing the already discussed tuned power plant models on local and externally hosted computing systems. Given its deployment on an externally hosted infrastructure, the system architecture may be conveniently scale to handle additional sites and units.

Turning now to FIGS. 22 through 25, scalable architecture and control systems are presented which may be used to support the many requirements associated with controlling, managing, and optimizing a fleet of power plants in which multiple generating units are dispersed across several locations. A local/remote hybrid architecture, as provided herein, may be employed based on certain criteria or parameters that are situational or case specific. For example, an owner or operator having a series of power plants may desire that certain aspects of the systems functionality be hosted locally, while others are centrally hosted environment, such as in a cloud based infrastructure, so to pool data from all of the generating units and act as a common data repository, which may be used to scrubbed the data via cross-referencing values from common equipment, configurations, and conditions, while also supporting analytic functions as well. The method of choosing the suitable architecture for each of the various types of owner/operators may focus on the significant concerns that drive the operation of the power plants, as well as the specific characteristics of the power market in which the plants operate. According to certain embodiments, as provided below, performance calculations may be performed locally so to support the closed loop control of a particular power plant, improve cyber security, or provide the response speed needed to accommodate near real-time processing. On the other hand, the present system may be configured such that data flow between local and remote systems includes local data and model tuning parameters that are transferred to the centrally hosted infrastructure for the creation of a tuned power plant model that is then used for analytics, such as alternative scenario analysis. Remote or centrally hosted infrastructure may be used to tailor interactions with a common plant model according to the unique needs of the different user types that require access to it. Additionally, a strategy for scaling may be determined based on response time and service agreements that depend on the unique aspects of a particular market. If faster response times are required on the availability of final results, then the analytic processes may be scaled both in terms of software and hardware resources. The system architecture further supports redundancy. If any system running analytics becomes inoperable, the processing may be continued on a redundant node that includes the same power plant models and historical data. The unified architecture may bring applications and processes together so to promote performance and increase the scope of functionality so to achieve both technical and commercial advantages. As will be appreciated, such advantages include: convenient integration of new power plant models; separation of procedures and models; the enablement of different operators to share the same data in real-time while also presenting the data in unique ways pursuant to the needs of each of the operators; convenient upgrades; and compliance with NERC-CIP limitations for sending supervisory controls.

Figure 22:
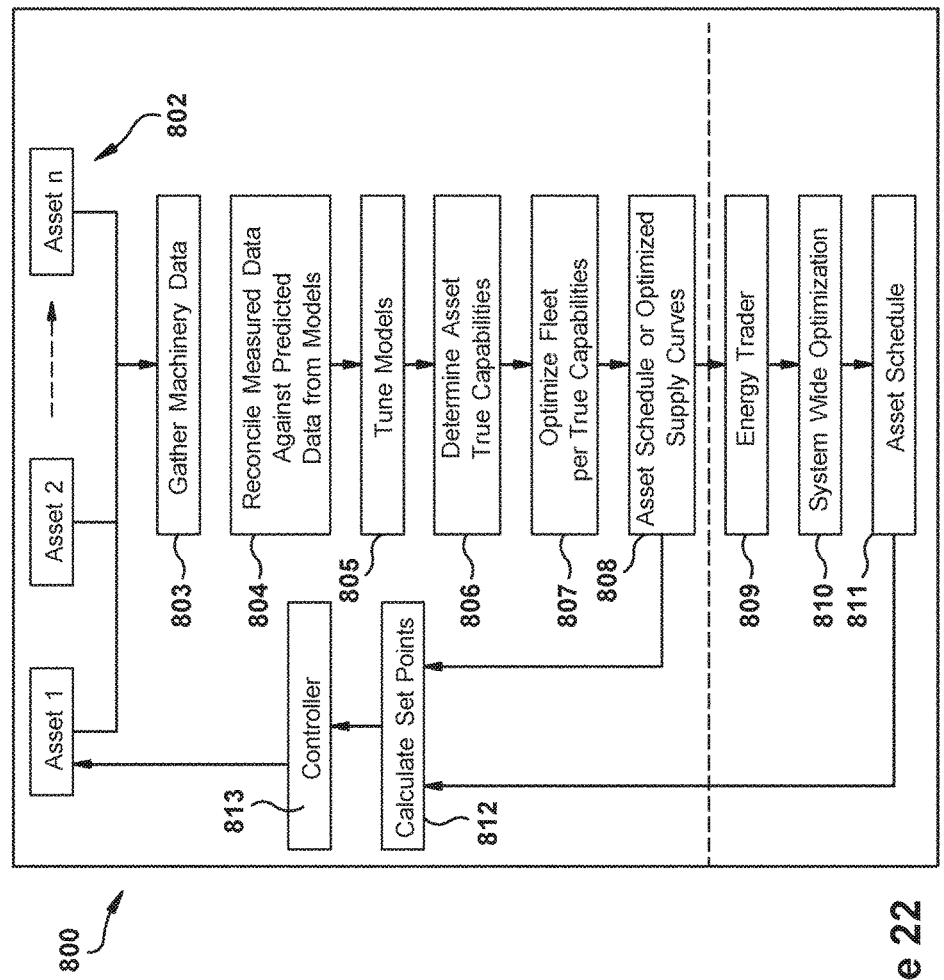
FIG. 22 illustrates a flow diagram according to a power plant fleet optimization process according to an alternative embodiment of the present invention.

FIG. 22 illustrates a high-level logic flow diagram or method for fleet level optimization according to certain aspects of the present invention. As shown, the fleet may include multiple generating units or assets 802, which may represent separate generating units across multiple power plants or the power plants themselves. The assets 802 of the fleet may be owned by a single owner or entity, and compete against other such assets across one or more markets for contract rights to generate shares of the load required by a customer grid. The assets 802 may include multiple generating units that have the same type of configurations. At step 803, performance data that is collected by the sensors at the various assets of the plants may be communicated electronically to a central data repository. Then, at step 804, the measured data may be reconciled or filtered so, as described below, a more accurate or truer indication of the performance level for each asset is determined.

As described in detail above, one way in which this reconciliation may be done is to compare the measured data against corresponding data predicted by power plant models, which, as discussed, may be configured to simulate the operation of one of the assets. Such models, which also may be referred to as off-line or predictive models, may include physics based models and the reconciliation process may be used so to periodically tune the models so to maintain and/or improve the accuracy by which the models represent, via simulation, actual operation. That is, as previously discussed in detail, the method, at step 805, may use the most currently collected data to tune the power plant models. This process may include tuning the models for each of the assets, i.e., each of the generating units and/or power plants, as well as more generalized models covering the operation of multiple power plants or aspects of fleet operation. The reconciliation process also may involve the collected data being compared between similar assets 802 so to resolve discrepancies and/or identify anomalies, particularly data collected from the same type of assets having similar configurations. During this process, gross errors may be eliminated given the collective and redundant nature of the compiled data. For example, deference may be given to sensors having higher accuracy capabilities or those that are known to have been checked more recently and demonstrated to be operating correctly. In this manner, the data collected may be comparatively cross-checked, verified and reconciled so to construct a single consistent set of data that may be used to calculate more accurate actual fleet performance. This set of data may then be used to tune off-line assets models that may then be used to simulate and determine optimized control solutions for the fleet during a future market period, which, for example, may be used to enhance the competitiveness of the power plant during dispatch bidding procedures.

At step 806, as illustrated, the true performance capabilities of the power plant are determined from the reconciled performance data and the tuned models of step 805. Then, at step 807, the assets 802 of the fleet may be collectively optimized given a selected optimization criteria. As will be appreciated, this may involve the same processes already discussed in detail above. At step 808, an optimized supply curve or asset schedule or may be produced. This may describe the manner in which the assets are scheduled or operated as well as the level at which each is engaged so to, for example, satisfy a proposed or hypothetical load level for the power plant fleet. The criteria for optimization may be chosen by the operator or owner of the assets. For example, the optimization criteria may include efficiency, revenue, profitability, or some other measure.

As illustrated, subsequent steps may include communicating the optimized asset schedule as part of a bid for load generating contracts for future market periods. This may include, at step 809, communicating the optimized asset schedule to energy traders who then submit a bid according to the optimized asset schedule. As will be appreciated, at step 810, the bids may be used to take part in a power system wide dispatch process by which load is distributed among multiple power plants and generating units located within the system, many of which may be owned by competing owners. The bids or offers for the dispatch process may be configured pursuant to a defined criteria, such as variable generating cost or efficiency, as determined by the particular dispatcher of the power system. At step 811, the results of the optimization of the power system may be used to generate an asset schedule that reflects how the various assets in the power system should be engaged so to meet predicted demand. The asset schedule of step 811, which reflects the outcome of the system-wide optimization or dispatching process, may then be communicated back to the owners of the assets 802 so that, at step 812, operating setpoints (or particularly operating modes), which may include, for example, the load at which each of the assets is operated, may be communicated to a controller that controls the operation of the assets 802. At step 813, the controller may calculate and then communicate a control solution and/or directly control the assets 802 so to satisfy the load requirements that it contracted for during the dispatch process. Fleet owners may adjust the way one or more power plants operate as conditions change so to optimize profitability.

Figure 23:
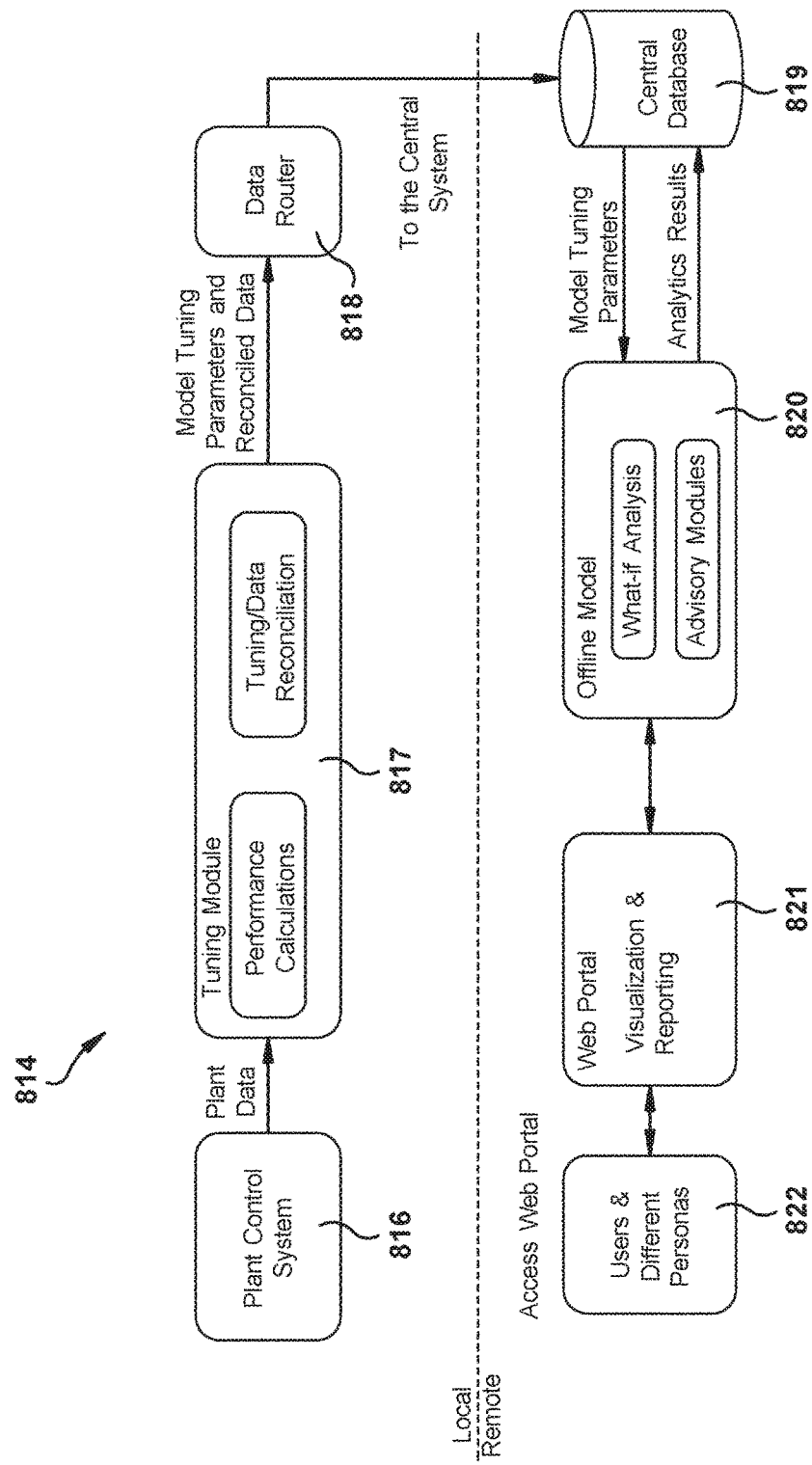
FIG. 23 illustrates a schematic diagram of a power plant fleet optimization system according to aspects of the present invention.

FIG. 23 illustrates the data flow between local and remote systems according to an alternative embodiment. As stated, certain functionality may be locally hosted, while other functionality is hosted off-site in a centrally hosted environment. The method of choosing the suitable architecture according to the present invention includes determining the considerations that are significant drivers of the operation of the assets within the fleet. Accordingly, considerations such as cyber security concerns might require certain systems remain local. Time-consuming performance calculations also remain locally hosted so that necessary timeliness is maintained. As illustrated in FIG. 23, a local plant control system 816 may take in sensor measurements and communicate the data to a tuning module 817 where, as discussed previously, particularly in relation to FIG. 17, a tuning or data reconciliation process may be completed using performance calculations that compare actual or measured values against those predicted by the plant or asset model. Via data router 818, as illustrated, the model tuning parameters and reconciled data then may be communicated to a centrally hosted infrastructure, such as remote central database 819. From there the model tuning parameters are used to tune the off-line power plant model 820, which then may be used, as described above, to optimize future fleet operation, provide alternate scenario or "what-if" analysis, as well as advise between possible or competing modes of operating the asset fleet.

The results of the analytics performed using the off-line power plant model 820, as illustrated, may be communicated to fleet operators via a web portal 821. The web portal 821 may provide customized access 822 to users for the management of the fleet. Such users may include plant operators, energy traders, owners, fleet operators, engineers, as well as other stakeholders. Pursuant to the user interaction through the web-portal access, decisions may be made regarding the recommendations offered by the analytics performed using the off-line power plant model 820.

Figure 24:
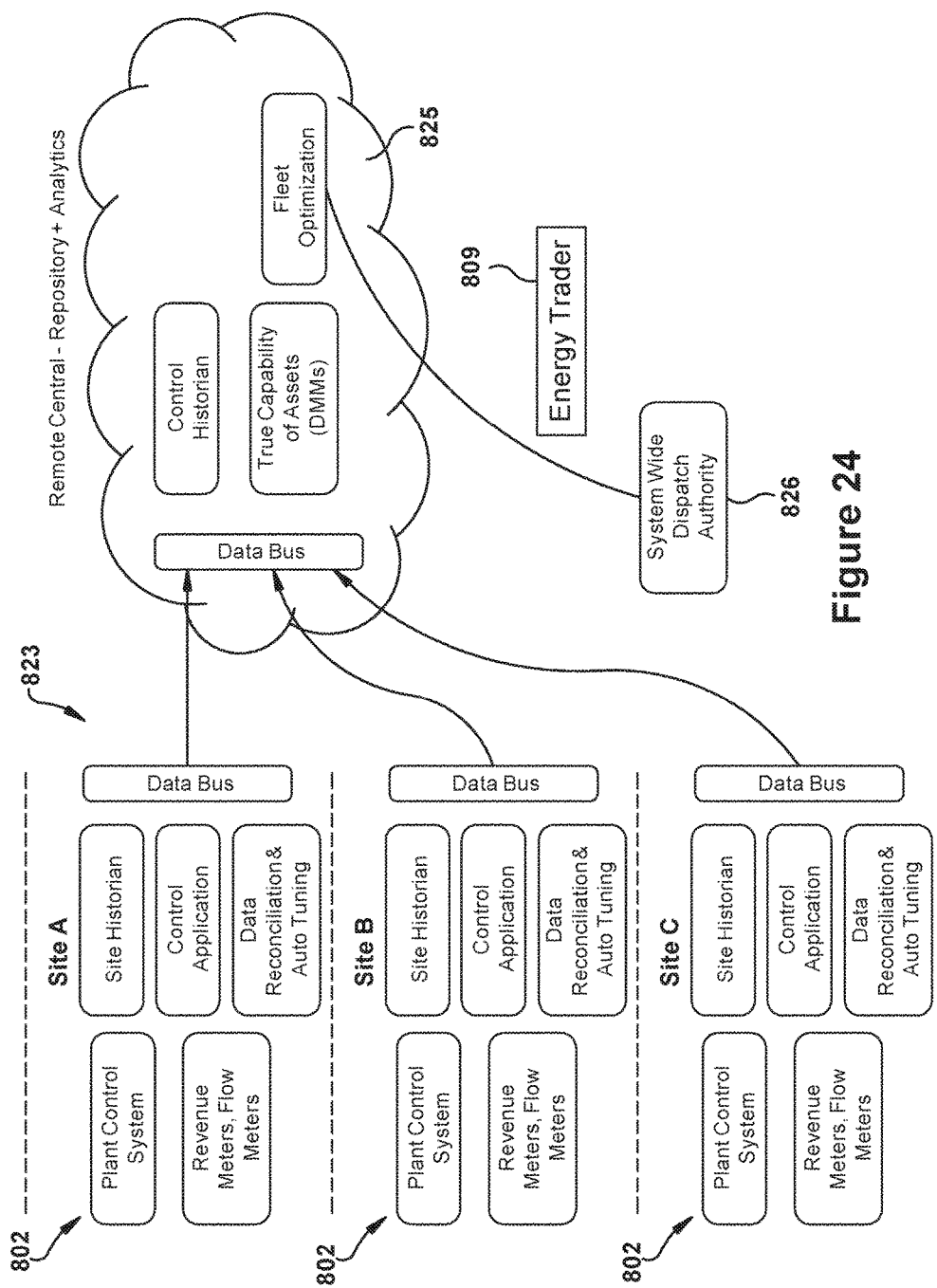
FIG. 24 illustrates a schematic diagram of a power plant fleet optimization system according to alternative aspects of the present invention.
Figure 25:
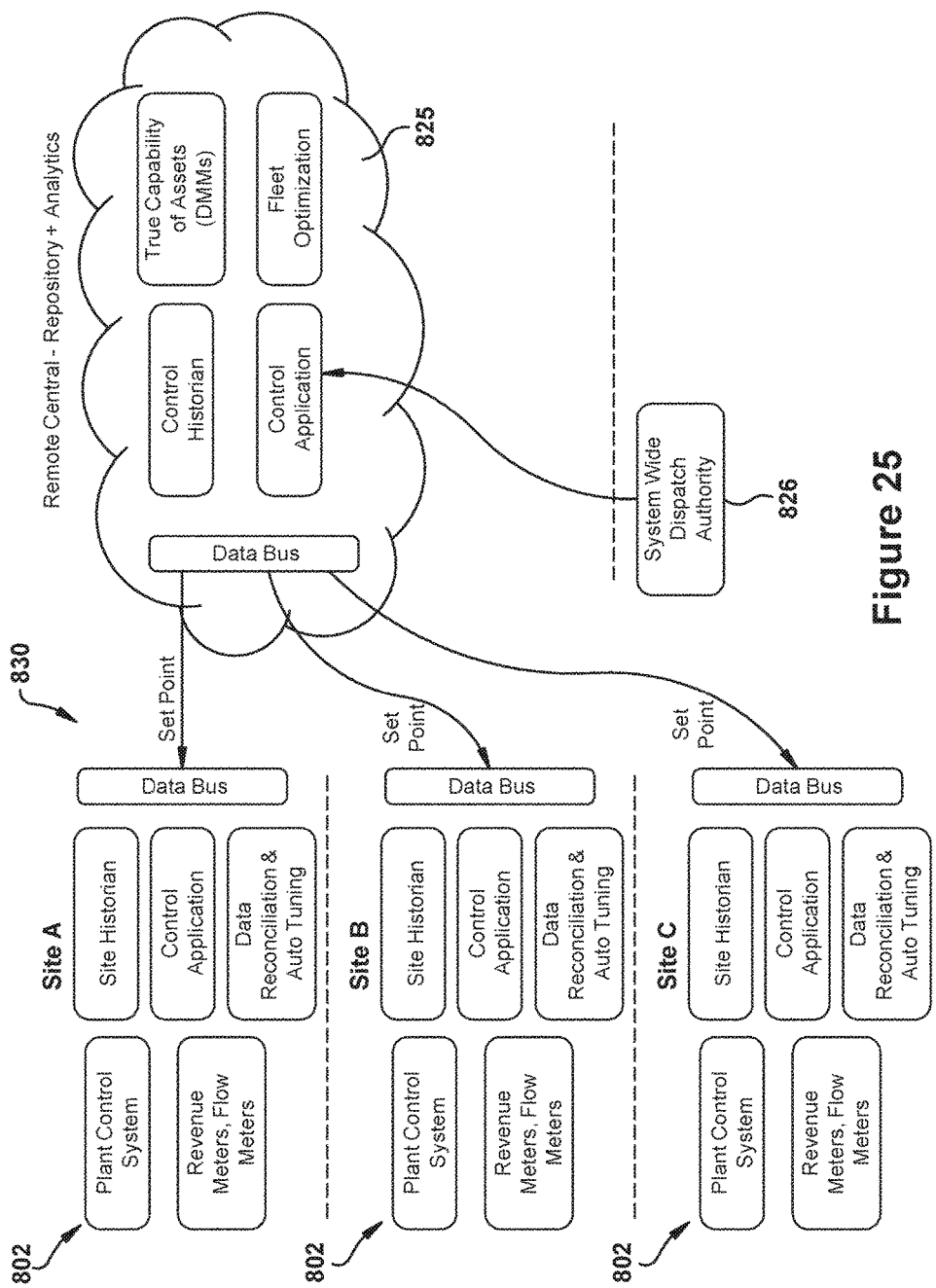
FIG. 25 illustrates a schematic diagram of a power plant fleet optimization system according to alternative aspects of the present invention.

FIGS. 24 and 25 illustrate a schematic system configurations of an unified architecture according to certain alternative aspects of the present invention. As illustrated in FIG. 25, a remote central repository and analytics component 825 may receive performance and measured operating parameters from several assets 802 so to perform a fleet level optimization. The fleet level optimization may be based on additional input data, which, for example, may include: the current fuel amounts stored and available at each power plant, the location specific price for fuel for each power plant, the location specific price for electricity generated at each power plant, current weather forecasts and the dissimilarities between remotely located assets, and/or outage and maintenance schedules. For example, a scheduled component overhaul for a gas turbine may mean that short-term operation at higher temperatures is more economical. The process may then calculate a supply curve, which includes an optimized variable generating cost for the fleet of power plants. Additionally, the present invention, as illustrated, may enable more automated bid preparation so that, at least in certain circumstances, the bid may be transferred directly to the system wide dispatch authority 826, and thereby bypass energy traders 809. As illustrated in FIG. 25, the results of the optimization of the power system (via the system wide dispatch authority) may be used to produce an asset schedule that reflects how the various assets in the power system should be engage so to meet predicted demand. This asset schedule may reflect a system-wide optimization, and, as illustrated, may be communicated back to the owners of the fleet of assets 802 so that operating setpoints and operating modes for the assets may be communicated to the controller that controls each asset in the system.

Accordingly, methods and systems may be developed pursuant to FIGS. 22 through 25 by which a fleet of power plants operating within a competitive power system is optimized toward enhanced performance and bidding related to future market periods. Current data regarding operating conditions and parameters may be received in real-time from each of the power plants within the fleet. The power plant and/or fleet models may then be tuned pursuant to the current data so that the models accuracy and range of prediction continue to improve. As will be appreciated, this may be achieved via the comparison between measured performance indicators and corresponding values predicted by power plant or fleet models. As a next step, the tuned power plant models and/or fleet level models may be used to calculate true generating capabilities for each of the power plants within the fleet based upon competing operating modes that are simulated with the tuned models. An optimization then is performed using the true plant capabilities and optimization criteria defined by the plant or fleet operator. Upon determining an optimized mode of operation, an asset schedule may be produced that calculates optimal operating points for each of the power plants within the fleet. As will be appreciated, the operating points may be then transferred to the different power plants for controlling each consistent therewith, or, alternatively, the operating points may serve as the basis on which bids for submission to the central dispatch authority are made.

Figure 26:
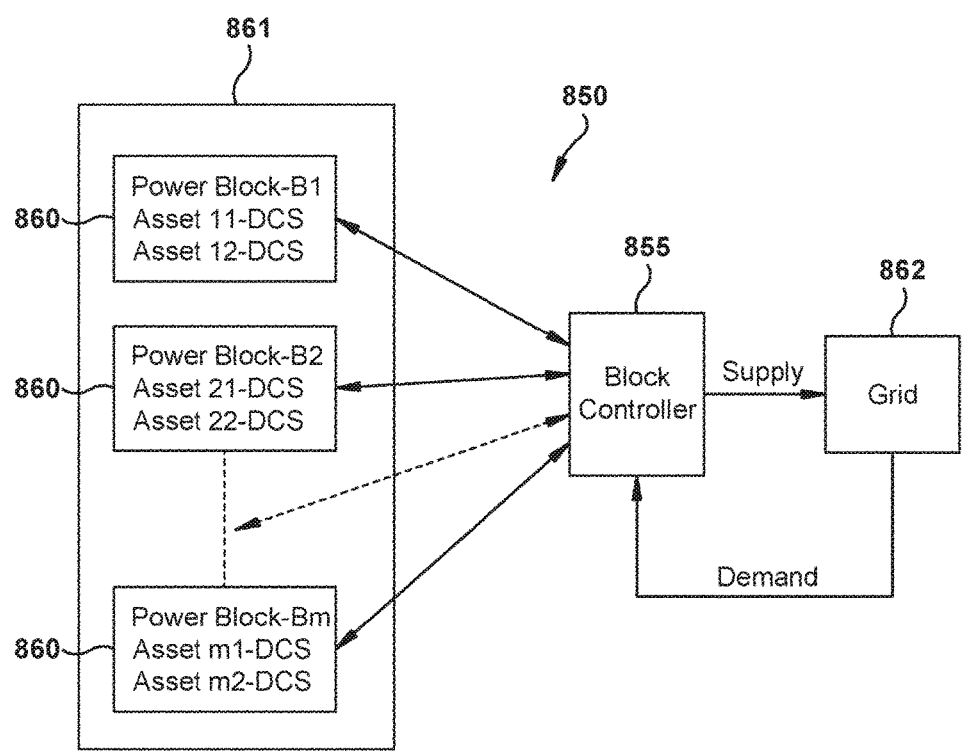
FIG. 26 illustrates a schematic diagram of a power block optimization system that includes a block controller.
Figure 27:
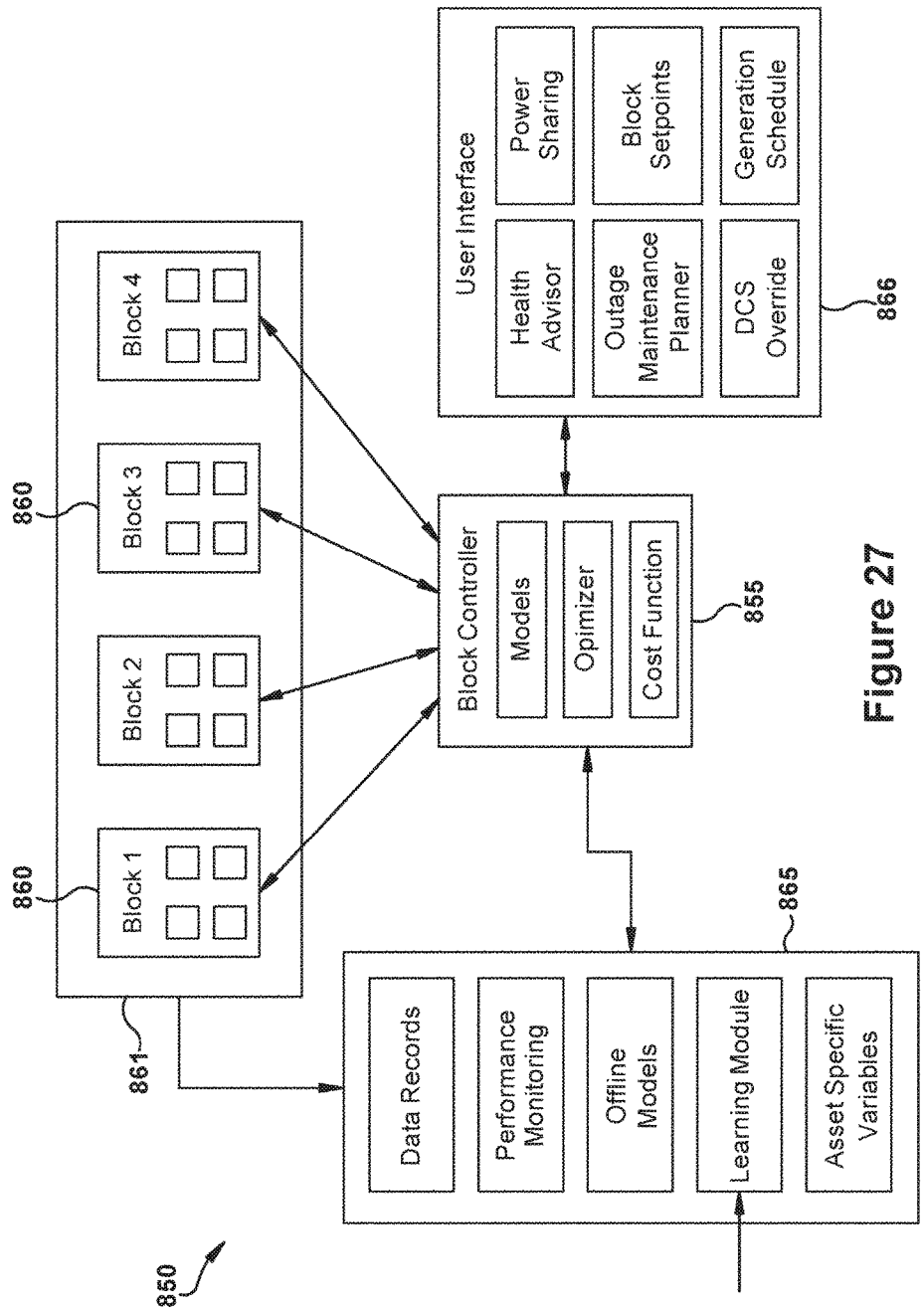
FIG. 27 illustrates a schematic diagram of an alternative power block optimization system that includes a block controller.

Also related to centralize control and optimization of multiple power units, FIGS. 26 and 27 illustrates a power system 850 in which a block controller 855 is used to control a plurality of power blocks 860. The power blocks 860, as indicated, may define a fleet 861 of the generating assets ("assets"). As will be appreciated, these embodiments provide another exemplary application of the optimization and control methods described in more detail above, though include broadening the optimization perspective to a fleet level. In so doing, the present invention may further offer ways of reducing certain inefficiencies that still impact modern power generating systems, particularly those having a large number of remote and varied thermal generating units. Each of the assets may represent any of the thermal generating units discussed herein, such as, for example, gas and steam turbines, as well as related subcomponents, like HRSGs, inlet conditioners, duct burners, etc. The assets may be operable pursuant to multiple generating configurations according to how the subcomponents are engaged. The power generation from the multiple power blocks 860 may be centrally controlled by a block controller 855. With respect to the system in FIG. 27, which will be discussed in more detail below, the block controller 855 may control the system pursuant to optimization processes that take into consideration asset and power block health, as well as generation schedules, maintenance schedules, as well as other factors that might be particular to one of the assets or power blocks 860, including location dependent variables. In addition, learning from operational data collected from similarly configured assets and power blocks, but not part of the fleet, may be utilized so to further refine control strategies.

Typically, conventional asset controllers (which are indicated in FIG. 26 as "DCS") are local to the generating assets and operate in substantial isolation. Because of this, such controllers fail to take into account the current health of the other assets that make up the power block 860 and/or fleet 861. As will be appreciated, this lack perspective leads to less than optimal power generation for the fleet 861 when considered from that perspective. With continued reference to the methods and systems already described, particularly those pertaining to FIGS. 3, 4, and 17 through 25, the present exemplary embodiment teaches a fleet level control system that enables several system-wide benefits, including enhanced power sharing strategies, cost-effectiveness, and improved efficiencies across grouped assets or power blocks.

As indicated, the control system, as represented by the block controller 855, may interact with the asset controllers. The block controller 855 also may communicate with the grid 862, as well as with a central dispatch or other governing authority that is associated with its management. In this manner, for example, supply and demand information may be exchanged between the fleet 861 and a central authority. According to an exemplary embodiment, supply information, such as dispatch bids, may be based on the block controller's optimization of the fleet 861. The present invention may further include optimization processes that occur between bid periods, which may be used periodically to optimize the way in which the fleet 861 is configured so to satisfy an already established load level. Specifically, such inter-bid optimization may be used to address dynamic and unanticipated operating variables. Appropriate control actions for the assets of the power blocks 860 may be communicated by the block controller 855 to the control systems within each of the power blocks 860 or, more directly, to the assets. According to preferred embodiments, implementation of control solutions of the block controller 855 may include enabling it to override asset controllers when certain predefined conditions are met. Factors affecting such override may include variable generating cost for each of the power blocks/assets, remaining useful part-life of hot gas path components, changing levels of demand, changing ambient conditions, as well as others.

The block controller 855, as illustrated, may be communicatively linked to the several power blocks 860 of the fleet 861 as well as directly to the assets, and thereby may receive many data inputs upon which the control solutions described herein are based. The optimization procedures may consider one or more of the following inputs: health and performance degradation; power generation schedules; grid frequency; maintenance and inspection schedules; fuel availability; fuel costs; fuel usage patterns and predictions; past issues and equipment failures; true performance capabilities; lifing models; startup and shutdown features; measurement operating parameter data, past and present; weather data; cost data; etc. As discussed in more detail in relation to other embodiments, inputs may include detailed present and historical data regarding measured operating parameters for each of the generating assets of the fleet 861. All such inputs, past and present, may be stored pursuant to conventional methods in, for example, a central database, and thereby made available upon query from the block controller 855 as might be necessary according to any of the procedural steps described herein.

A cost function may be developed according to the preferences of a fleet operator. According to a preferred embodiment, a weighted average sum of a fleet robustness index may be used to determine preferable or optimized power sharing configurations. The fleet robustness index may include, for example, an optimization according to several factors that is applicable to a given demand or fleet output level. These factors may include: thermal and mechanical stresses; degradation or losses, including rate of degradation; cost of generation; and/or fuel consumption. In this manner, the present embodiment may be used to address several ongoing issues relating to fleet control, particularly, optimizing performance across several power blocks having multiple and varied generating assets.

Data inputs may include the types already discussed herein, including those related to computer modeling, maintenance, optimization, and model-free adaptive learning processes. For example, according to the present embodiment, computer models, transfer functions, or algorithms may be developed and maintained so that the operation (or particular aspects of the operation) of the assets and/or, collectively, the power blocks or the fleet, may be simulated under a variety of scenarios. Results from the simulations may include values for certain performance indicators, which represent predictions as to aspects of the operation and performance of the assets, power block, or fleet performance over the selected operating period. The performance indicators may be selected because of a known or developed correlation to one or more cost results, and thus may be used to compare the economic aspects of each simulation. A "cost result", as used herein, may include any economic ramification, positive or negative, associated with the operation of the fleet 861 over the selected operating period. Cost results, thus, may include any revenue earned from the generation of power over the period, as well as any operating and maintenance costs incurred by the fleet. These operating and maintenance costs may include resulting degradation to the assets of the fleet given the scenarios and the simulated operation resulting from each. As will be appreciated, data extracted from the simulation results may be used to calculate which of the alternative operating modes for the fleet is/are more desirable or cost-effective.

The models for the assets, blocks or fleet may include algorithms or transfer functions developed through physics-based models, adaptive or learned "model free" process input/output correlations, or combinations thereof. Baseline degradation or loss models may be developed that correlate process inputs/outputs to degradation or loss data for each asset type. The degradation or loss data and the cost result related thereto, thus, may be calculable based on the predicted values for the operating parameters of proposed, alternative or competing operating modes of the fleet, which, according to certain embodiments, may be differentiated by the manner in which the assets and power blocks are engaged, the way in which generation is shared across the fleet assets, as well as other factors described herein. As stated, learning from similarly configured assets may be used to inform or further refine the models used as part of this process. For example, degradation model may be developed that calculate accrued equipment degradation and losses given the values for selected performance indicators. Such degradation then may be used to calculate the economic ramifications or cost result for each of the competing operating modes. Those economic ramifications may include degradation to asset performance, wear to components, expended useful part-life (i.e., the portion of the useful life of a component that is expended during a period of operation), as well as other measures of value, such as, for example, costs related to emissions, regulatory fees, fuel consumption, as well as other variable costs that are dependent upon output level. As will be appreciated, because the degradation and the expenditure of useful part-life for a particular asset may accrue in a nonlinear fashion as well as being dependent on dynamic and/or location specific variables, significant cost savings may be achieved over time by distributing the output level of the fleet so to minimize overall fleet degradation, particularly if that minimization is shared across the assets so to minimally impact overall fleet generating capacity and efficiency.

Thus, taking into account conditions predicted for a future market period, which may include anticipated demand and ambient conditions forecasts, a plurality of competing operating modes for the fleet may be selected for analysis and/or simulation so to determine an optimized, or, at least, preferred fleet operating mode. Each of the competing fleet operating modes may describe an unique generating configuration for the fleet 861. The competing fleet operating modes may be developed so to include parameter sets and/or control settings that define the unique generating configurations by which a particular fleet output level is reached. As mentioned, the fleet output level may be selected in a number of ways. First, it may be selected to reflect an already known fleet output level, for example, an output level established via a recently concluded dispatch process such that the optimization process may be used to determine an optimized fleet configuration by which that particular output level is satisfied. The fleet output level also may be selected pursuant to an expected load level given historical generation records, expected customer demand and/or other forecasted conditions. Alternatively, the fleet output level may also be varied over a chosen range. In this way a variable generating cost for the fleet 861 may be calculated and then, for example, used as part of a bidding procedure so to inform the preparation of a competitive bid. Thus, the manner in which the fleet output level is defined by the fleet operator may be used so that, in one instance, activities around preparing a competitive bid is supported, while, at other times, the output level may be selected so to support an advisor function that operates to optimize fleet performance as actual conditions might stray from those anticipated.

According to exemplary operation, as indicated by the more detailed system of FIG. 27, parameter sets may be developed that describe each of the competing fleet operating modes, and, for each of the competing fleet operating modes, different scenarios or cases may be developed within which manipulable variables are varied over a selected range so to determine the effect of the variation on the overall operation of the fleet. The different cases for the competing fleet operating modes may be configured so to cover alternative ways in which the fleet output level is shared across the power blocks 860 and/or assets. According to another example, the different cases may be selected based on alternative configurations available to certain of the assets, including the various ways by which each of the assets is engaged. For example, some cases may include the engagement of certain subcomponents of the assets, such as duct burners or inlet conditioners, so to augment power generation capabilities, while recommending that other assets operate at shutdown or turndown levels. Other scenarios may explore situations in which those asset configurations are varied somewhat or altogether reversed.

As illustrated in FIG. 27, the block controller 855 may communicate with a data and analytics component 865, which may include several modules by which relevant data is collected, normalized, stored, and made available upon query to the block controller 855. A data records module may receiving real-time and historical data inputs from a monitoring system associated with generating assets. A module related to performance monitoring may also be included, and related thereto one or more off-line models may be maintained. Each of these modules may function substantially consistent with other embodiments discussed herein. A learning module may also be included for the collection of operating data from similarly configured assets or power blocks that are not operating within the fleet 861. This data, as will be appreciated, may support a learning function by which a deeper and more thorough operational understanding of the assets is obtained. Such data may also be used to normalize measured data collected from the fleet 861 so that performance degradation of the generating assets may be calculated accurately, which may include accounting for the effects of other variables, such as fuel characteristics, ambient conditions, etc., that also may affect output capacity and efficiency.

As described in relation to FIGS. 24 and 25, fleet level optimization may be based on locality-dependent variables. These variables may reflect conditions that are unique and apply to certain particular assets or power blocks, and, for example, may include: the current fuel amounts stored and available at each asset; the location specific price for fuel for each asset; the location specific market price for electricity generated at each asset; current weather forecasts and the dissimilarities between remotely located assets within the fleet; and outage and maintenance schedules for each asset. For example, a scheduled component overhaul for a gas turbine asset may mean that short-term operation at higher temperatures is more economically beneficial. As illustrated, the data and analytics component 865 may include a module for accounting for these differences.

The block controller 855, as indicated, further may include modules directed toward power generation models (which may include asset models, block models, fleet models, as well as degradation or loss models), an optimizer, and a cost function. The asset, power block, and/or fleet models may be created, tuned and/or reconciled and maintained according to the methods already described herein. These models may be used to simulate or otherwise predict the operation of the fleet, or a selected portion thereof, over the selected operating period such that the optimizer module is able to determine a preferred scenario according to a defined cost function. More specifically, the results from the simulations may be used to calculate a cost result for each, which may include a summation across the power blocks and/or fleet assets of revenue, operating costs, degradation, expended useful part-life, and other costs mentioned herein. The revenue, as will be appreciated, may be determined via a projected output level multiplied by a market unit price. The calculation of the costs, as stated, may include degradation models or algorithms that correlate an economic result to the manner in which the assets operate within the simulations. Performance data from the simulation results may be used to determine fleet-wide operating costs, degradation, and other losses as already described. As will be appreciated, certain cost considerations, such as fixed aspects of operating costs, may not be appreciable different between the competing fleet operating modes and, thus, be excluded from such calculations. Additionally, the simulations described herein may be configured so to include the entire fleet of assets or a portion thereof, and may be focused on limited aspects of asset operation that, as provided herein, have been found particularly relevant at predicting cost results.

According to certain embodiments, the cost function module may include a fleet robustness index so to efficiently differentiate between alternative operating modes. The fleet robustness index may represent an averaged summation of losses accrued within the power blocks. The robustness index may include a factor indicating costs related to expended useful part-life, which may be a summation of the part-life expended across the assets, such as hot gas path parts and compressor blades in gas turbines. For example, a generating asset that is scheduled to be shutdown during the selected operating period pursuant to one of the competing fleet operating modes will incur an economic loss corresponding to the useful part-life expended per each shutdown/startup procedure. Whereas, a generating asset scheduled to operate at full load during the same operating period may incur a loss commensurate to those hours of operation. As will be appreciated, such losses may be further calibrated to reflect specific the thermal and mechanical loads that are expected given the load level and the operating parameters predicted to satisfy a particular load level, which, for example, may depend upon such factors as forecasted ambient conditions, fuel characteristics, etc. Other economic losses may be included within the summation of fleet losses so to derive a cost result for each of the competing fleet operating modes. These may include a summation of fuel consumption for the fleet assets, as well as, for example, the economic impact of predicted emission levels given the simulation results.

Once the summation of fleet-wide revenue and/or losses is complete for each of the simulated scenarios, the present method may include the step of calculating one or more preferred or optimized cases. The present method then may include one or more outputs that relate to the preferred or optimized cases. For example, the preferred or optimized cases may be electronically communicated to a fleet operator, such as through user interface 866. In such cases, outputs of the present method may include: a power block block/asset health advisor; a power sharing recommendation; an outage planner; an optimal setpoints control solution for the power blocks; DCS override; and/or an expected generation schedule. The output also may include an automated control response, which may include automatically overriding one of the asset controllers. According to another alternative, an output may include generating a dispatch bid according to one or more of the preferred or optimized cases. As will be appreciated, the outputs of the method, as indicated on the user interface 866, may enable fleet savings in a number of ways. First, for example, preferred power-sharing configurations may minimize, reduce, or advantageously apportion fleet degradation, which may significantly impact generating capacity and efficiency over future operating periods. Second, an adviser function may be configured using the described components so to optimize or, at least, enhance maintenance intervals by which degradation losses, both recoverable and non-recoverable, are mitigated. Monitoring and predicting the rate of degradation and scheduling/conducting maintenance procedures effectively, such as compressor washes or filter cleanings, will ensure that the gas turbine operates most efficiently.

Figure 28:
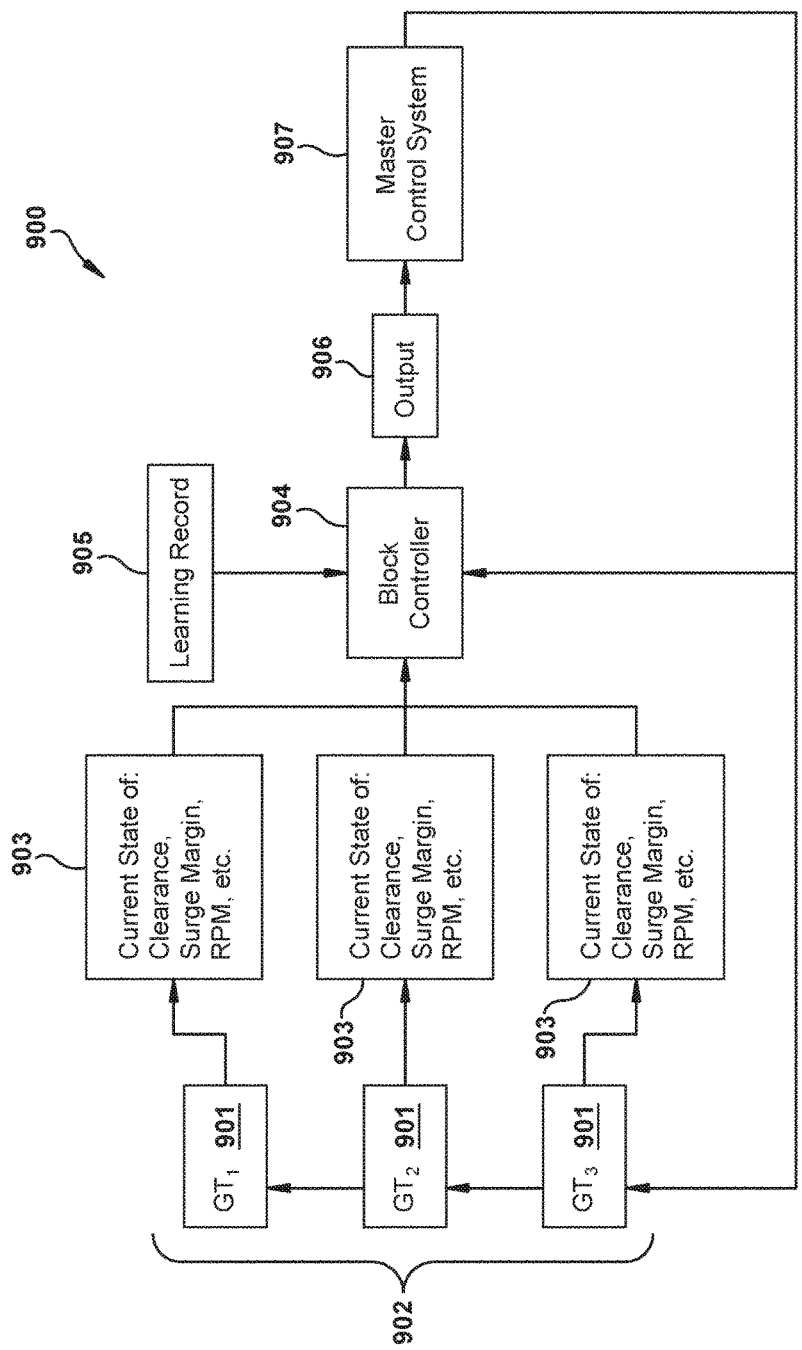
FIG. 28 is a flowchart depicting an embodiment of a process for optimizing a shutdown of a combined cycle power plant.

Turning now to FIG. 28, another related aspect of the present invention is discussed, which describes the more specific example of controlling the operation of multiple gas turbine engines operating as a power block. The gas turbine engines, as will be appreciated, may be located at a particular power plant or across several remote power plants. As already discussed, controlling a block of gas turbines so to optimize or enhance power sharing is a challenge. Current control systems do not effectively synchronize across a block of multiple engines and, instead, substantially engage each of the engines individually based upon unsophisticated apportioning of the output level for which the power block is collectively responsible. As will be appreciated, this often leads to imbalances and inefficient rates of degradation. Accordingly, there is a need for more optimal control strategies and, in particular, a system controller that provides for efficient power sharing strategies across multiple gas turbines that promote a more cost-effective loss or degradation rate when the units are collectively considered as a power block. For example, if a gas turbine block has several engines having the same ratings, the present invention may make recommendations based on the engines current degradation state as to which of units should operate at higher output levels and which should operate at reduced levels. The present invention may accomplish this in accordance with aspects already discussed herein, particularly those discussed relative to FIGS. 24 through 27. As one of ordinary skill in the art will appreciate, the advantages of such functionality include: increased life and performance of the gas turbines; improved life prediction, which may enable more competitive and/or risk sharing service agreements; greater operational flexibility for the power block as a whole; and robust multi-objective optimization that efficiently takes into account operational trade-offs, which may relate, for example, to hot gas path useful part-life expenditures, current degradation levels, and rates of degradation, and present power generating performance, such as demand, efficiency, fuel consumption, etc.

One way in which this may be accomplished is pursuant to a system 900, which will now be described with respect to FIG. 28. As indicated, a plurality of gas turbines 901 may be operated as part of a power block or "block 902". As discussed as part of the systems above, operating parameters 903 for each of the assets 901 may be gathered and electronically communicated to a block controller 904. According to a preferred embodiment, the operating parameters may include a rotor speed, compressor surge margin, and a blade tip clearance. As will be appreciated, the compressor surge margin may be calculated relative to measured rotor speed, and the blade tip clearance may be measured pursuant to any conventional method, including, for example, microwave sensors. As a further input, the block controller may receive records 905 from a database component, such as any of those already discussed, which may record current and past operating parameter measurements, including rotor speed, surge margin, blade tip clearance, control settings, ambient conditions data, etc., so to adaptively correlated process inputs and outputs.

According to preferred embodiments, the block controller 904 may be configured to operate as a model-free adaptive controller. The model-free adaptive controller may include a neural network based setup that has inputs (for example, via the records 905) from each of the gas turbines corresponding to demand, heat rate, etc. As will be appreciated, model-free adaptive control is a particularly effective control method for unknown discrete-time nonlinear systems with time-varying parameters and time-varying structures. The design and analysis of model-free adaptive control places an emphasis on process inputs and outputs so to "learn" predictive correlations or algorithms that explain the relationships therebetween. Correlations between measured inputs and outputs of the system being controlled. Functioning in this manner, the block controller 904 may derive control commands or recommendations, and these may be communicated as an output 906 to a master control system 907 for implementation. According to a preferred embodiment, the output 906 from the block controller 904 includes a preferred or optimized power sharing command or recommendation. According to other embodiments, the output 906 may include commands or recommendations related to modulated coolant flow for hot gas path components of the gas turbines 901 and/or modulated IGV settings for the compressor units of the gas turbines 901.

The master control system 907 may be communicatively linked to the gas turbines 901 of the power block 902 so to implement control solutions given the output 906. As illustrated, the master control system 907 may also communicate such information to the block controller 904. Thusly configured, the control system of FIG. 28 may operate to control the several gas turbines of the power block 902 so to generate a combined load or output level—such as, for example, a contract output level as might be determined by a dispatch bid process, for which the gas turbines collectively are responsible—in an enhanced or optimized manner according to a defined cost function. This control solution may include recommending a percentage of the combined output level that each of the gas turbines should contribute. In addition, the master control system 907 may include a physics based model for controlling the gas turbines pursuant to the optimized operating mode, as discussed previously.

According to an exemplary embodiment, for example, clearance and surge margin data may be tracked for each of the gas turbines. If clearance or surge margin data for any of the gas turbines is determined to be above a predefined threshold, that particular turbine may be operated at a reduced load. If operating that gas turbine at a reduced level is not possible, other recommendations may be made such as modulating IGV settings or coolant flow to hot gas path components. On the other hand, if one of the gas turbines is selected to operate at a reduced level, the optimized generating configuration may include recommending that one or more of the other gas turbines operate at a higher/peak load so to make up for any deficit. The method may select the higher/peak load turbines based upon surge margin and clearance data, with the desired effect of balancing current degradation levels and rate of degradation among the gas turbines of the power block so to collectively extend operating life, while maintaining higher a higher block output level and efficiency. As mentioned, because performance degradation rates and useful part-life expenditures may accrual nonlinearly as well as be dependent upon parameters that are variable across geographically dispersed units, savings may be achieved by using the block level perspective described herein to apportion load in a way that optimizes a cost result for the block. Power generation thus may be apportioned so to optimize costs across the block 902 by taking into account real time data (particularly, surge margin and clearance data) that has been determined to be highly dispositive and efficient at evaluating performance degradation levels, rates of degradation, remaining part-life, and true performance capacity for the gas turbines of the block.

Figure 29:
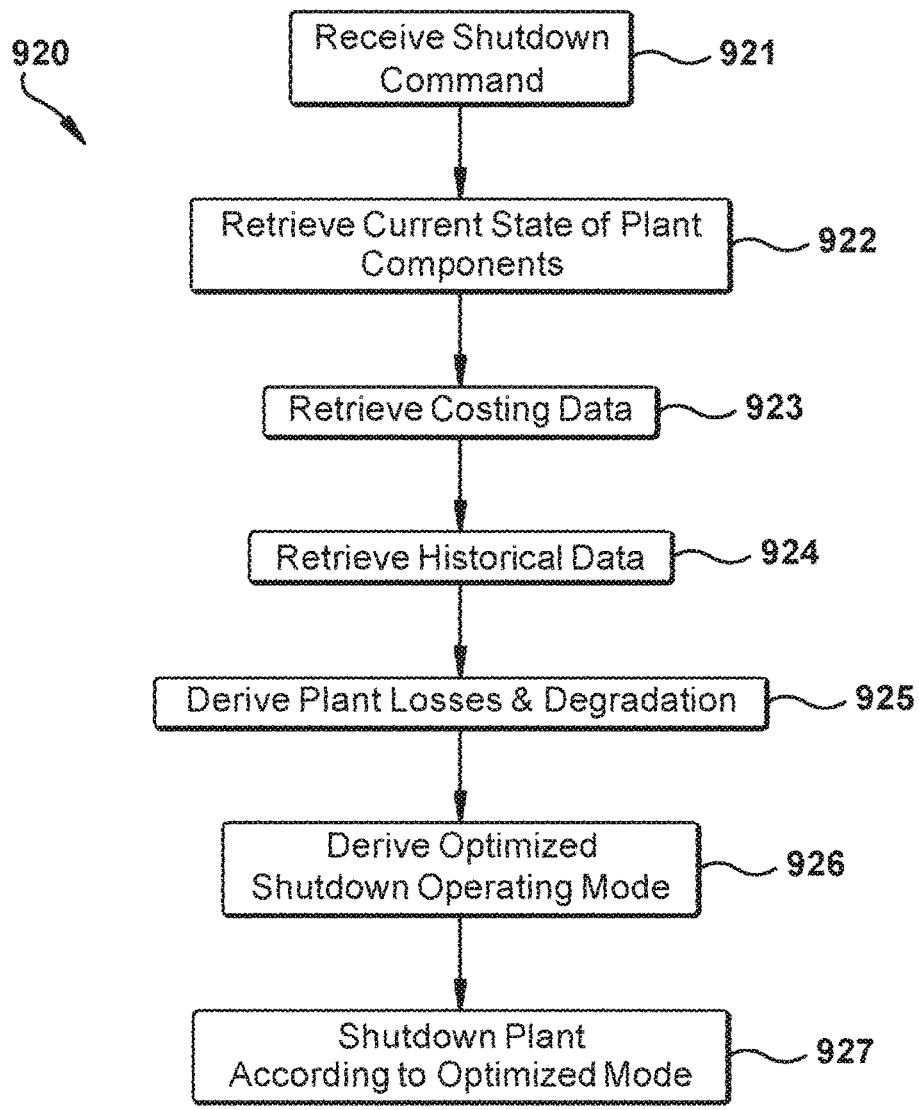
FIG. 29 illustrates an exemplary control system in which a model-free adaptive controller is used according to aspects of the present invention.

Referring now to FIG. 29, another exemplary embodiment of the present invention includes systems and methods that provide for more efficient and/or optimized shutdown of combined cycle power plants. As will be appreciated, during shutdown of a combined cycle plant, a controller typically reduces fuel flow to the gas turbine gradually so to reduce rotor speed toward a minimum speed. This minimum speed may be referred to as the "turning gear speed" because it represents the speed at which the rotor is engaged by a turning gear and thereby rotated so as to prevent thermal bowing of the rotor during the shutdown period. Depending upon the nature of the gas turbine engine, the fuel flow may be stopped at about twenty percent or so of typical full speed, with the turning gear engaged at about one percent of full speed. Reducing the flow of fuel in this gradual manner, however, does not provide a direct relationship with the reduction of the rotor speed. Rather, large and unyielding variations in the speed of the rotor over the shutdown period is typical. The variations in rotor speed may then cause significant differences in the fuel to air ratio, which is due to the fact that air intake is a function of the rotor speed, while fuel flow is not. Such variations then may lead to significant and abrupt variations in firing temperatures, transient temperature gradients, emissions, coolant flow, as well as others. The variations in shutdown behavior may have an impact on turbine clearances and, hence, overall turbine performance and component lifetime.

There is, therefore, a desire for a combined cycle shutdown controller that improves plant shutdown by rectifying one or more of these issues. Preferably, such a controller would control the rate of deceleration of the turbine rotor and related components over time so as to minimize uneven shutdown variations and, thereby, minimize the negative impact to the engine systems and components. According to certain embodiments, a more effective controller functions so to optimize rotor stresses and the slew rate of rotor speed and torque. The shutdown controller also may correct variability in subsystems such that, for example, coolant flow and wheelspace temperature remain at preferred levels. According to preferred embodiments, the present method may control the rate of the deceleration of the rotor and related components over time so as to minimize shutdown variations in a way that reduces costs, plant losses, and other negative effects. Pursuant to the systems and methods already described, the control methodology may function so that factors impacting shutdown costs are optimized according to operator-defined criteria or cost functions. One way in which this may be accomplished is pursuant to a process 920, which will now be described with respect to FIG. 29. As will be apparent to one of ordinary skill in the art, aspects of the process 920 draw upon subject matter already discussed herein—particularly with reference to the discussion related to FIGS. 3 and 4—which, for the sake of brevity, will be summarized, but not entirely repeated.

According to one embodiment, the shutdown procedures and/or the combined cycle shutdown controller of the present invention is configured as a conventional loop-shaping controller. The controller of the present invention may include aspects of model-free adaptive control as well as model-based control, as delineated in the appended claims. The combined cycle shutdown controller may include target shutdown time controller, and an actual shutdown time controller, and may control most if not all aspects of the plant shutdown. The controller may receive inputs such as exhaust spread, wheel-space temperature, clearance, surge margin, steam and gas turbine rotor stresses, gas turbine rotor rate of deceleration, demand, fuel flow, current power production, grid frequency, secondary firing, drum levels, and so on. Based on these inputs, the shutdown controller may compute a time range for shutdown (e.g., rate of shutdown), slew rate of rotor deceleration, corrected coolant flow, and corrected inlet guide vane profile, and/or a generator reverse torque desired during shutdown, as described in more detail below. According to certain embodiments, each of these outputs may be used to offset potentially harmful shutdown variations detected by one of the power plant sensors. The combined cycle shutdown controller may provide a trajectory of RPM/slew rate versus time profile, and rate of deceleration versus current power production profile more suitable for shutdown operations, and both may take into account combined cycle systems, such as the HRSG, steam turbines, boilers, and the like. The shutdown controller may control the components described herein until turning gear speed is achieved, thus providing for more optimal steam turbine and HRSG operability conditions, while also lowering component stresses.

FIG. 29 is a flow chart depicting an embodiment of a process 920 suitable for shutting down a combined cycle power plant, such as the power plant 12 described in relation to FIG. 3. The process 920 may be implemented as computer code executable by the combined cycle shutdown controller, and may be initiated after receiving (step 921) a shutdown command. The shutdown command may be received, for example, based on a maintenance event, a fuel change event, and so on. The process 920 may then retrieve (step 922) a current state of plant components, which may be sensed, gathered, stored, and retrieved per any of the sensors, systems, and/or methods already described herein. The current state of plant components, for example, may include turbine rotor speed, temperature of components, exhaust temperature, pressures, flow rates, clearances (i.e., distances between rotating and stationary components), vibration measurements, and the like. The state of the plant may additionally include current power production, and costing data such as, for example, cost of not producing power, cost of power at market rates, green credits (e.g., emission credits), and the like.

At a next step, costing or loss data may be retrieved (step 923), for example, by querying a variety of systems, including accounting systems, futures trading systems, energy market systems, or a combination thereof. Historical data may additionally be retrieved (step 924). The historical data may include log data for performance of systems, maintenance data, fleet-wide historical data (e.g., logs from other components in plants disposed in various geographic localities), inspection reports, and/or historical cost data.

The process may then derive algorithms regarding plant shutdown degradation or losses (step 925) related to shutdown operation. Such derivations may be determined using several input types, including, for example, historical operating data related to gas turbine systems, steam turbine systems, HRSG units, as well as for any other subcomponents as may be present. According to certain embodiments, a variety of models or algorithms may be developed by which combined cycle shutdown losses are derived. As discussed more fully in the discussion related to FIG. 4, such algorithms may function to provide a summation of power plant shutdown losses based on values for selected operating parameters or performance indicators, such as temperatures, pressures, flow rates, clearances, stresses, vibration, shutdown time, and the like. As will be appreciated, consistent with the other embodiments described herein, alternative, proposed or competing shutdown modes for the combined cycle power plant may be simulated in a combined cycle power plant model. That is, a combined cycle power plant model may be developed, tuned, and maintained, and then used to simulate alternative or competing shutdown operating modes so to derive predicted values for certain predefined performance indicators. The predicted values for the performance parameters then may be used to calculate shutdown costs pursuant to the derived loss algorithms.

For example, algorithms may be developed that correlate shutdown losses and a predicted thermal stresses profile, which may be determined from the predicted values for certain performance parameters given the operating parameters related to one of the competing shutdown operating modes. According to certain embodiments, such losses may reflect an overall economic consequence of the competing shutdown operating mode, and, for example, may take into account degradation to hot gas path components and/or a percentage of useful part-life expended given the shutdown mode, as well as any resulting performance degradation to the plant, and may be calculated from initiation of shutdown until an achieved time of shutdown, which, for example, may be when the turning gear speed is achieved. Similarly, loss algorithms may be developed so to determine losses related to: compressor and turbine mechanical stresses; clearances between stationary and rotating parts; shutdown emissions; shutdown fuel consumption; steam turbine rotor/stator thermal stresses; boiler drum pressure gradients; etc.

The process 920 may then derive (step 926) an enhanced or optimized shutdown operating mode, which may include a RPM/slew rate versus time profile, and/or a rate of deceleration versus current power production profile that is particularly well-suited for the shutdown of the combined cycle power plant. For example, the optimized shutdown operating mode may be determined as the one that best accommodates and takes into account the operation of the steam turbine, HRSG unit, the boiler, and/or other components of the combined cycle plant. According to one embodiment, the controller take in the aforementioned inputs and derive therefrom expected conditions at various RPM/slew time parameters so to derive a RPM/slew curve plotted along a time axis that minimizes stresses and/or optimizes shutdown costs. Likewise, rate of deceleration versus current power production profiles may include a fuel flow that more desirably (as compared to other proposed shutdown modes) improves current power production based on deceleration of the shaft. According to other embodiments, cost functions may be defined by which other more preferable or optimized shutdown operating modes are derived and selected. As will be appreciated, scenarios may be derived that, for example, minimizes stresses and/or losses for the gas turbine, minimizes stresses and/or losses for the steam turbine, minimizes stresses and/or losses for the HRSG, or a combination thereof. Depending on how the cost function is defined, further optimized shutdown operating modes may be determined based on criteria, such as, costs for power production during the shutdown period, plant emissions, fuel consumption, and/or combinations thereof without limitation.

The combined cycle shutdown controller may further include a control system for shutting down the power plant according to the optimized shutdown mode. According to a preferred embodiment, this control system may include a physics-based modeler or a model based controller that then derives a control solution given the optimized shutdown mode. The model based controller may derive control inputs and settings for controlling actuators and control devices so that the combined cycle power plant is operated during the shutdown period in accordance with the preferred or optimized shutdown operating mode. For example, the shutdown controller may actuate fuel valves to conform to a desired fuel flow rate while also controlling inlet guide vanes of the gas turbine exhaust to control exhaust flow into the HRSG, while additionally controlling steam valves of the steam turbine to control steam turbine shutdown. By combining control of a variety of components approximately simultaneously with each other, the shutdown for the plant may be improved and may conform with desired scenarios.

As will be appreciated, the economic and performance optimization processes discussed herein are, at least according to certain embodiments, reliant upon a tuned power plant model that accurately depicts or simulates different types of power plant operation. When successfully achieved, such power plant models may be used to analyze alternative scenarios so to determine more efficient operating modes that might otherwise have alluded detection. A necessary component in the construction of the sophisticated plant models necessary for this is the availability of highly accurate data measuring operating and performance parameters of the power plant during operation. Further, once constructed, the process of maintaining and recalibrating such power plant models requires the continued input of trustworthy data, as a previously tuned power plant that was operating well may quickly regress if fed data that is believed accurate, but turns out to instead be flawed. A primary consideration remains the proper functioning of the many types of sensors that are used to measure and communicate plant conditions and performance parameters during operation. Accordingly, quickly identifying sensors that are malfunctioning or not working properly is an important component to the optimization and control systems described above. Otherwise, large amounts of otherwise trustworthy data may be corrupted by flawed readings by a single sensor that goes unnoticed. Flawed data also may have a downstream effect that magnifies its negative impact in that, to the extent that the flawed data is used for tuning power plant models, the models may no longer reflect actual plant operation and, because of this, make control recommendations that do not reflect advantageous or efficient operating modes.

Figure 30:
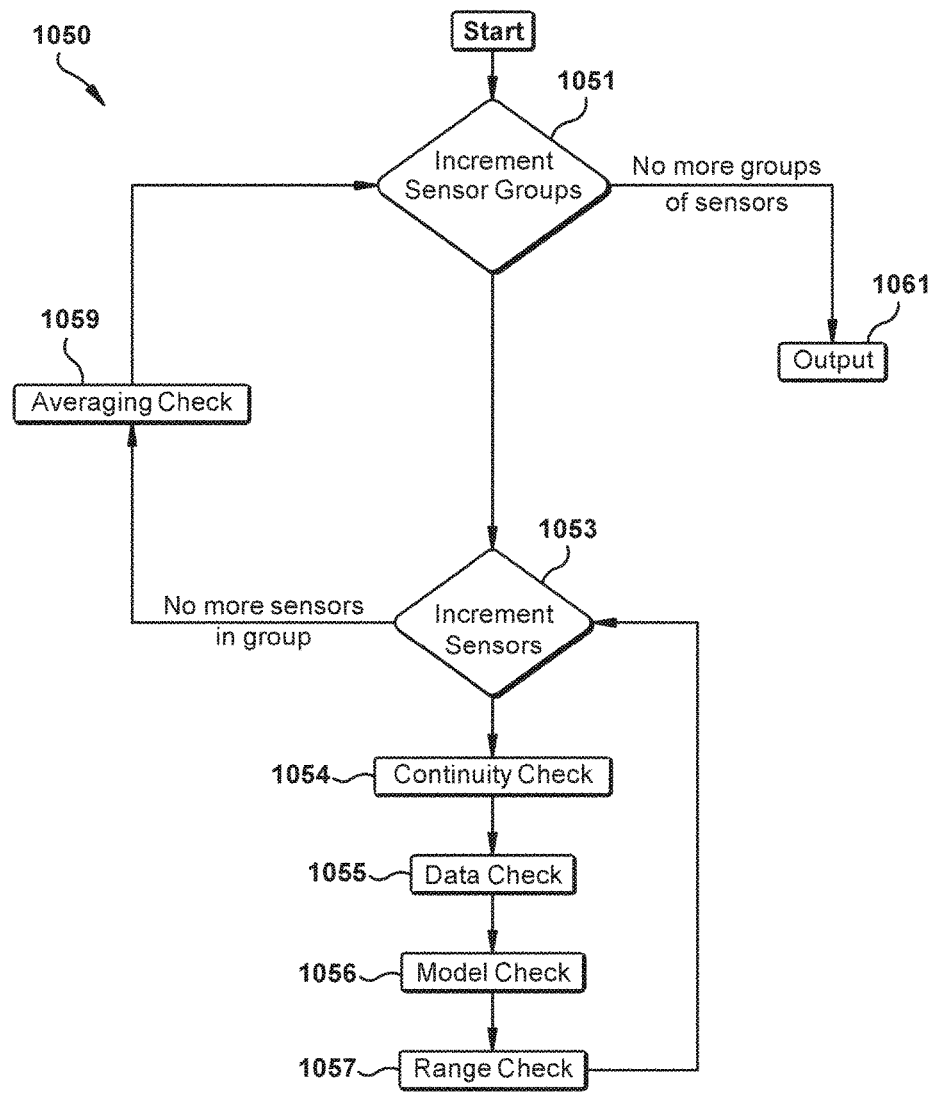
FIG. 30 illustrates a schematic diagram of a method for controlling the operation of power plant sensors according to alternative aspects of the present invention.
Figure 31:
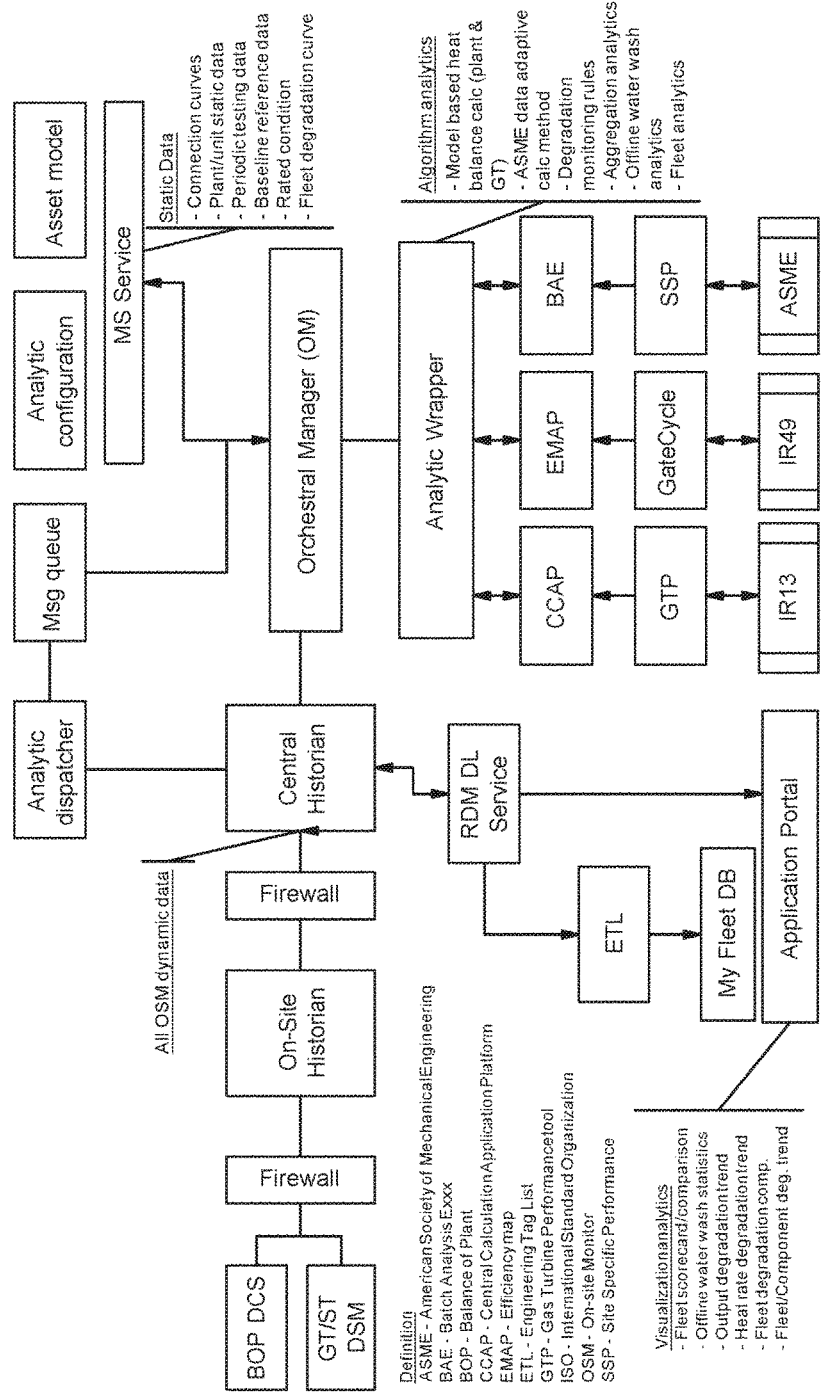
FIG. 31 illustrates a schematic representation of a power plant performance and maintenance monitoring control system according to certain aspects of the current invention.
Figure 32:
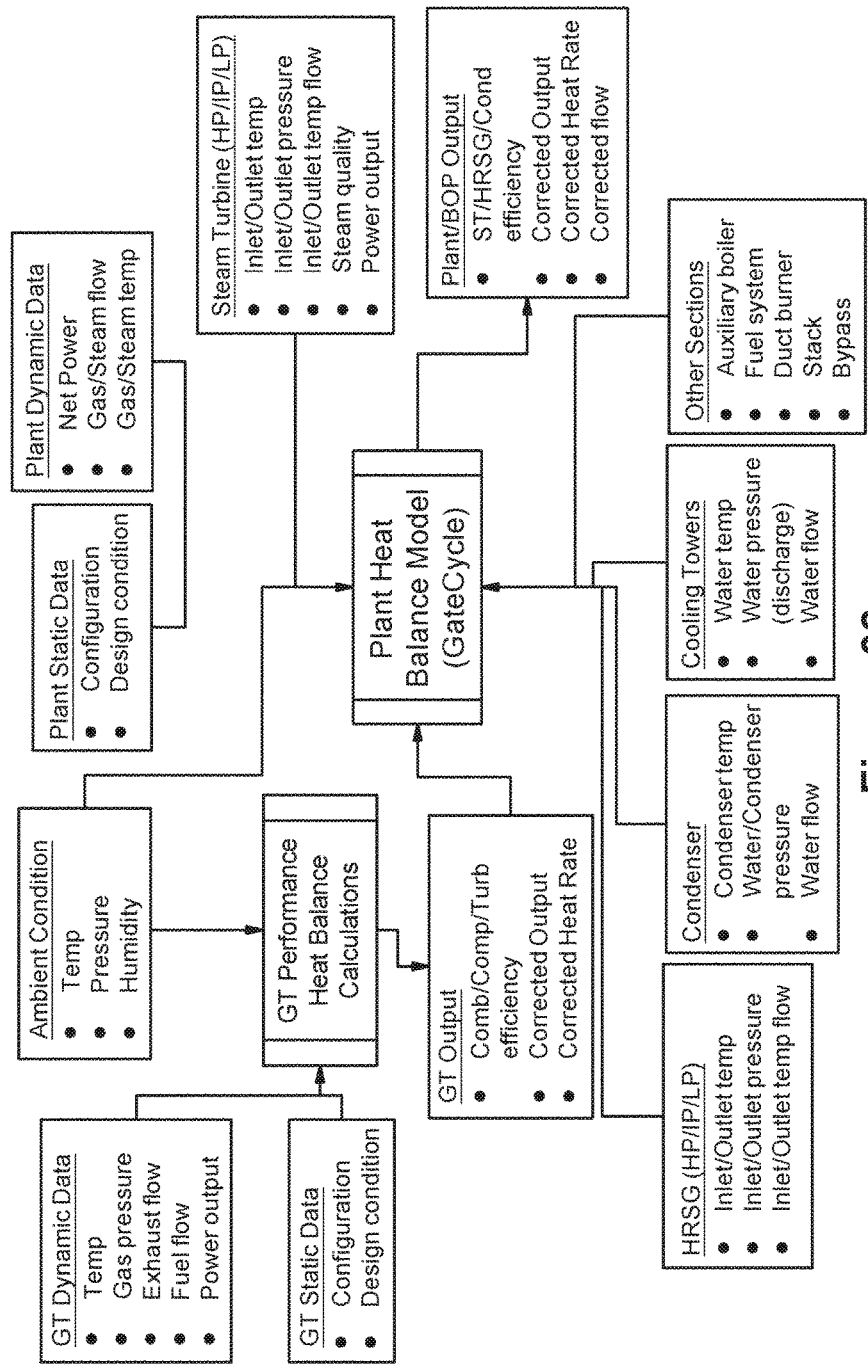
FIG. 32 illustrates a schematic representation of a power plant performance and maintenance monitoring control system according to certain alternative aspects of the current invention.
Figure 33:
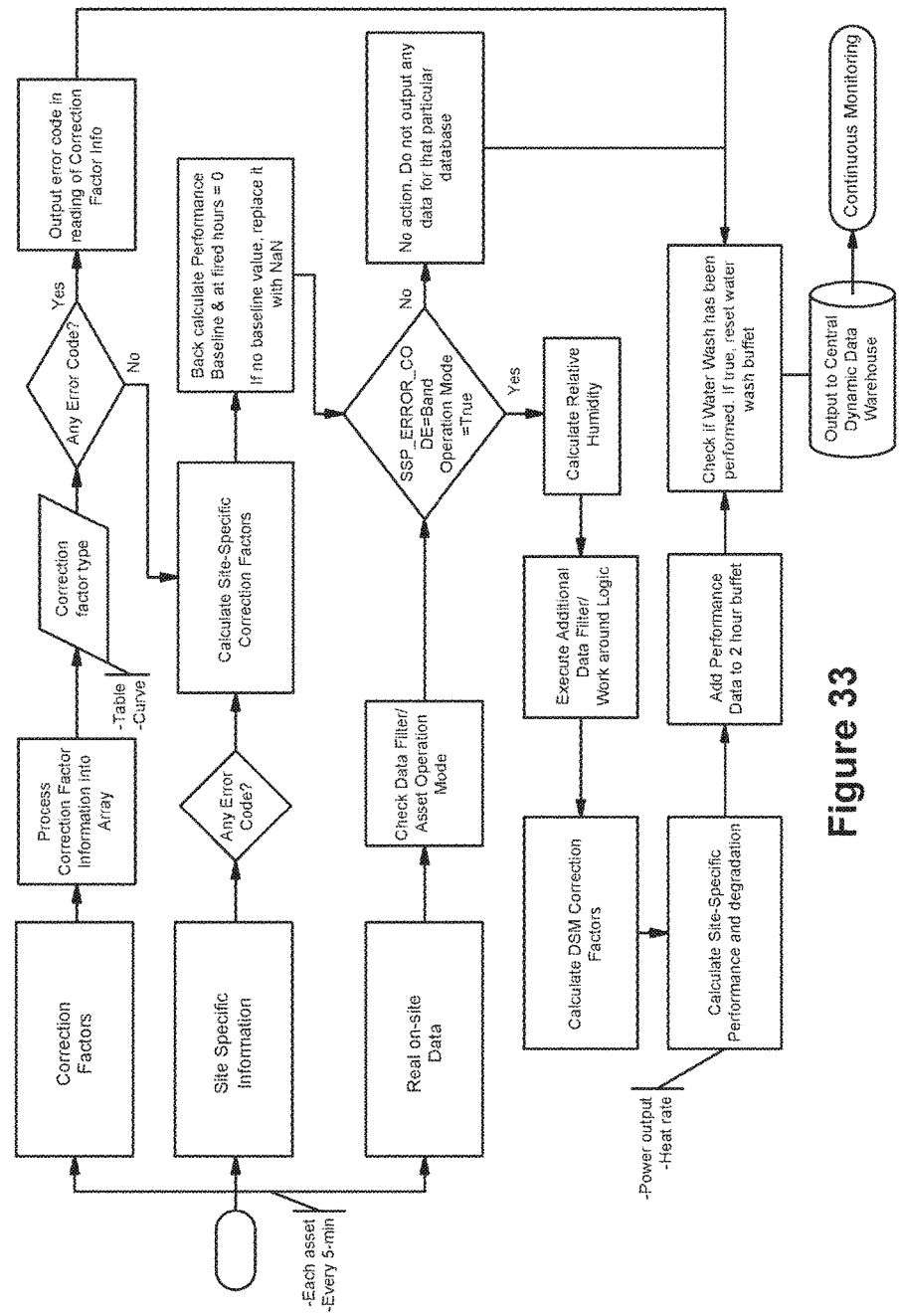
FIG. 33 illustrates a schematic representation of a power plant performance and maintenance monitoring control system according to certain alternative aspects of the current invention.

According to the embodiments represented in FIG. 30, an additional aspect of the present invention is discussed that relates to a multiple step procedure for evaluating the functioning of plant sensors by analyzing the data that the sensors record. As will be appreciated and unless otherwise expressly narrowed to a more specific case, the method described herein for verifying the proper functioning of a sensor or group of sensors (also "sensor health check") is applicable to any of the sensor types already discussed, as well as other type of gas turbine sensors and/or similar apparatus. As will be described, the present method may include checking and evaluating data in real-time as it is collected as well as perform evaluations after communicating and cataloguing the data measurements at a remote or off-site storage system, such as a central or cloud-hosted data repository. The evaluation of the sensors and that data collected by them may be configured to repeat in set time increments so to create a time based and evolving view of sensor performance. Further, as will be described, the present method may include real-time data evaluations for sensor malfunction or failures, such as, shift, drift, senility, noise, spikes, etc., as well as evaluations that are done less frequently and that are focused on data accumulated over a longer period of plant operation. According to certain embodiments, the process may detect sensor failure by comparing measured sensor against predicted values that are modeled by tuned power plant models. These embodiments reflect the discovery that combining certain types of real-time data analysis occurring over a shorter lookback period with certain other analysis having a longer lookback period is particularly effective at accurately and quickly identifying sensors that are not operating properly. As provided herein, a "lookback period" is the period of plant operation for which the data signals from the sensor or sensors is analyzed for certain types of irregularities that suggest sensor malfunction or an increased risk thereof. As used herein a "short lookback period" is one that collects sensor readings and/or the data from such readings for operation occurring within a last few minutes, for example, the last 5 minutes, though other similar durations are also possible. A "long lookback period" is defined as one that collects sensor readings and/or the data from such readings within the last few hours. According to a preferred embodiment a long lookback period is one having a duration of about 1.5 hours. As described in more detail below, the long lookback period may be partitioned into several regularly spaced intervals. According to exemplary embodiments, the intervals of the long lookback period may be configured to coincide with the length of the short lookback period. In such cases, according to a preferred embodiment, the number of the intervals included in the long lookback period may include between approximately 10 and 20. As will be appreciated, given this arrangement, the short lookback period may be the latest one of the intervals that make up the long lookback period.

FIG. 30 illustrates a schematic process diagram of a method 1050 in accordance with an embodiment of the present invention. As will be appreciated, several types of sensor health checks are included within the method 1050 and are depicted as operating together as components of the overall procedure. It should be understood, though, that this has been done for the sake of brevity and so to describe an exemplary embodiment. As delineated in the appended claims, the different types of sensor health checks (or "checks") may operate separately or in different combinations than the ones that are provided in FIG. 30.

At an initial step, the method 1050 includes a junction 1051 that initiates a progressive or incremental loop by which the several types of sensor groups are sequentially analyzed. According to a preferred embodiment, data from sensor readings may be read out or collected in 5-minute datasets. Consistent with this, health checks may be configured to scan or analyze the most recent 5-minute dataset or may be configured to analyze the data from multiple of the most recent datasets recorded, as will be indicated in the descriptions of each of the different types of sensor health checks. The sensor data may be sent through checking routines that, as illustrated, are included within a second loop defined within the first. Specifically, at a junction 1053, the second loop may function to incrementally loop each of the sensors of sensor group through a number of different health checks, which, as illustrated, may include a continuity check 1054, a data check 1055, a model check 1056, and a range check 1057. Once these health checks are completed for one of the sensors in the group, the process returns to the junction 1053 until it is determined that there are no more sensors within the sensor group. At this point, the method 1050, as illustrated, continues from the junction 1053 to an additional health check—which is an averaging check 1059—before proceeding back to the junction 1051 which would mark the completion of the first loop. The method may continue cycling through the first loop until it is determined that all sensor groups have been checked. As described in more detail below, as the health checks are completed, sensor readings may be flagged so to indicate concerns with the data and, thereby, the sensors that recorded the data. The accumulation of multiple flagged readings within the dataset of a particular sensor may be used as an indication that the sensor is malfunctioning or, at least, a greater likelihood that it is.

Once all of the sensor groups have been addressed, the method may continue to an output step 1061. As part of the output step 1061, the method 1050 may electronically communicate one or more results given the health checks that were performed. Such communication, for example, may take the form of an e-mail or screen alert to a plant operator or employee. In such cases, the output may be configured so to include different information and/or be formatted according to predefined warning categories, such as a more severe warning that indicates a high likelihood that one of the sensors is malfunctioning given the analyzed sensor readings, or a less severe warning that communicates questionable readings. The severity of the warning, according to a preferred embodiment, may depend upon the number of times that the dataset was flagged by the several health checks. The output may further include indications of sensors judged to be functioning properly. In those cases, the output may provide a reporting of the health checks that were performed, data related to the analysis, as well as an explanation as to why sensors are thought to be functioning normally. According to another embodiment, the output may include automatic steps that are taken when the results of the health checks described certain predefined situations. For example, in the case where a sensor is shown to be malfunctioning, the usage of the data being gathered by that sensor may be discontinued until the issue is addressed. The output of the health checks may be stored in a central repository or historian for later visualization of results and how they have changed over time. According to an alternative embodiment (not shown), the present invention may include a step to determine if the analytical results from the sensor health checks correspond with an explaining event, which, for example, may consist of a change as to how the gas turbine is being operated. Specifically, the method may determine if the flagged sensor readings may be explained by or consistent with a concurrent and intended operational modification for the engine, such as a change in output level. If this is likely the case, additional actions may be taken so to confirm that the shift measured by the sensors is consistent with the operational modification.

The functionality of the several health checks described above may be as follows. The continuity check (represented by step 1054 of FIG. 30) may include an initial step where sensor readings may be gathered over a predefined lookback period. According to an exemplary embodiment, the lookback period may be approximately 5 minutes. A first check of the continuity health check may include a determination as to whether at least a minimal number of readings were taken during the lookback period. That is, the readings from the sensor should have at least a minimum number of readings or data points over the predefined lookback period. The procedure 870 may determine if the number of readings for the lookback period is sufficient. More specifically, the number of total readings for the lookback period may be compared to a predefined acceptable minimum. If the total readings is less than the minimum required, the sensor may be flagged. On the other hand, if the total readings are greater than the minimum required, this part of the continuity check may be deemed as passed and the method may continue to a step where a portion of non-available readings within the total readings is determined. Non-available readings represent those in which the sensor is operating and readings scheduled, but the data is either not available, not applicable, and/or otherwise unaccounted for. In determining the non-available readings, the procedure may determine the percentage that the non-available readings represent of the total readings for the lookback period. At the following step, the percentage of non-available readings may be compared to a predefined maximum threshold. If the percentage of non-available readings is greater than the threshold, the process may continue to a step where the sensor is flagged. If however the percentage of non-available readings is less than the predefined maximum threshold, the process may continue to a final step, which represents a termination of the continuity health check. At that point, the procedure may proceed to the next sensor within the group and perform the same check, or, if all the sensors of the group have already been checked, the procedure may proceed to the next health check within the overall procedure.

Pursuant to an exemplary embodiment, the data check (represented by step 1055 of FIG. 30) may include an initial step where sensor readings may be gathered over a predefined lookback period. Pursuant to a preferred embodiment, this lookback period may be approximately 5 minutes in length. The sensor readings may then be sequentially checked for various types of data irregularities. For example, the procedure may determine if a shift is indicated given the sensor readings over the lookback period. As will be appreciated, absent other causes, data that exhibits an appreciable and otherwise unexplainable shift of this type often signals an issue with the sensor, and not an actual shift in the operating parameters being measured. If a shift is deemed to have occurred, the process may flag sensor, and then proceed to the next test. The procedure may determine if spikes are indicated by the sensor readings. This type of data plot also may be indicative of an issue with the sensor. If the dataset meets the criteria so that spiking data is deemed occurring, the process flag the sensor as indicated. If the spiking behavior is not noticed, the procedure may proceed to a next step where the procedure examines the dataset so to determine if a data drift irregularity is indicated. A data drift also may point toward a sensor malfunction. A drift irregularity occurs when the data values inexplicably drift away from what otherwise might be expected based on historical readings. As will be appreciated, this type of irregularity is similar to the data shift, but occurs more gradually. If the data meets the definition of a drift irregularity, the process may flag the sensor as indicated. As a last test, the process may determine if noise or senility data irregularities are present in the dataset. These may include cases where random noise increases substantially over prior levels or where random noise decreases substantially. In the case of senility, the readings are noticed to substantially stop altogether. Thusly, the data checks include determining whether a sequential plot of the readings of a dataset over the lookback period produce a profile indicative of a data irregularity. If any of these irregularities are indicated, the sensor may be flagged. At that point, the data check procedure may terminate, where another of the health checks may be initiated according to the method of FIG. 30.

Pursuant to an exemplary embodiment, the model check (represented by step 1056 of FIG. 30) may include comparing data collected from the sensors against corresponding values that are predicted by a tuned power plant or generating unit model so to determine if there is a disparity between the those that changes over time. According to a preferred embodiment, the model may be a physics-based thermal model for either one of the generating units or the power plant as a whole. At an initial step, sensor readings may be gathered over a predefined lookback period. Concurrently, a tuned model may be used to predict sensor readings that correspond to the actual readings being taken by the sensors during the lookback period. As will be appreciated, the power plant or generating unit model may be tuned and used according to any of the procedures already discussed extensively herein. A comparison may be made between the predicted values and the values measured by the sensors. Pursuant to a more superficial first check, sensors may be flagged based on this first comparison. This determination may be based simply upon whether the differences between the predicted and measured values are significant enough to warrant concern as to the trustworthiness of the measured values. A second comparison may be made at a next step. According to this check, the procedure may compare the comparison between the predicted and measured values of current lookback period against the same comparison made during a previous lookback period. As part of this, the procedure may define a second lookback period that is significantly longer than the 5-minute shorter period. For example, according to a preferred embodiment, the second lookback period may be approximately 1.5 hours. As part of the analysis, according to a preferred embodiment, the procedure may compare how the patterns between the most recent comparisons between actual/predicted sensor values look against the comparison made earlier in the second lookback period. This process may advance to a next step where patterns in the comparisons of actual/predicted sensor values are evaluated so to determine how the patterns change for each of the 5 minute increments over the course of the longer lookback period. More specifically, the comparison between the predicted/measured readings made for each of the short lookback periods—for example, the five-minute lookback period—may be examined relative to each other so to determine how the relationship between the predicted/measured values evolves over the longer lookback period—for example, the 1.5 hour lookback period. As will be appreciated, certain changes in this relationship over the longer lookback period may be used to indicate situations where one of the sensors is malfunctioning or likely malfunctioning. In cases where the patterns demonstrate such a changing relationship, the sensor may be flagged.

Pursuant to an exemplary embodiment, the range check (represented by step 1057 of FIG. 30) may include a lookback period that is relatively short in length, for example, approximately 5 minutes. This variation of a sensor health check includes determining whether the data readings fall within an expected predefined range. Sensor readings for the lookback period may be gathered. Then, at a next step, the procedure may initiate a loop by which each data point is then tested. Specifically, each of the data points is tested to determine if the data point is greater than a predefined maximum or less than a predefined minimum. As will be appreciated, the predefined maximum and minimum may be a range that is defined by an operator and/or be defined relative to historical readings based on past operation, and thereby configured to represent a ceiling and a floor by which nonconforming or deviant data points are discerned. According to preferred embodiments, the maximum and minimum thresholds may be configured as values having a low probability of occurring during a given mode of operation. If the data point is found to be in excess of the predefined maximum or less than the predefined minimum, the sensor responsible for the data point may be flagged. Once each of the data points within the dataset of the lookback period has been tested, the procedure may end.

Pursuant to an exemplary embodiment, the averaging check (represented by step 1059 of FIG. 30) may test readings against a range that is defined about an average of the readings from all of the sensors within the group. The procedure may begin by accumulating the readings from the sensors within the group over the lookback period. The lookback period for this health check, according to a preferred embodiment, may be 5 minutes in length. The averaging check 1059 is one that is administered to the sensor group as a whole, unlike the other health checks that are shown as being applied to each sensor separately. The averaging procedure may calculate the average value for a particular operating parameter given all of the readings taken by the sensors within the sensor group. The procedure may initiate a loop by which each data point is then tested according to a range defined about the calculated average. More specifically, each of the data points is tested to determine if it is: 1) greater than a predefined upper limit that is defined in relation to the calculated average value of the sensor group; or 2) less than a predefined lower limit that is defined in relation to the calculated average value of the sensor group. As will be appreciated, the predefined upper and lower limits may be configured to represent a relative range by which nonconforming or deviant data points are identified. If the data point is found to the excess of the upper limit or less than the lower limit, the sensor responsible for the data point may be flagged. Once each of the data points within the dataset of the lookback period has been tested, the procedure may end.

The present invention further includes plant performance monitoring and diagnostics that may be combined with the controllers and control methods discussed above so to achieve further plant optimization. These may further include methods and systems related to the optimization and scheduling of maintenance procedures within one or more power plants. It will be appreciated that a combined-cycle gas turbine power plant, combining one or more gas top cycles with a water/steam bottoming cycle, is built to use the exhaust of the top cycle as the heat source for the bottoming cycle, thus extracting more useful energy from the heat to increase the plant overall efficiency. Such combined-cycle plants often consists of one or more gas turbines (GTs), steam turbines (STs), generators, Heat Recovery Steam Generators (HRSGs), condensers and controls. It usually uses one or more gas turbines to burn natural gas or synthesis gas from coal, whose exhaust heat is then used to power the steam turbine. The plant is required to be operated with higher availability, reliability, and performance in order to provide the customer with sufficient operating revenues and reduced fuel costs meanwhile enhancing customer dispatch competitiveness. A combined-cycle plant may have various configurations based on steam cycles utilization in the plant, such as single-pressure or multi-pressure non-reheat or reheat heat recovery feed-water heating systems. A combined-cycle plant may also be divided into single shaft or multiple shaft configurations, based on whether the gas and steam turbines have their own generators. The main components and simplified flow in a multi-shaft combined-cycle plant are illustrated in FIG. 2. Over the past decade the combined-cycle plants have become increasingly important and popular in the energy field around the world due to the relatively cheap natural gas as the major source of fuel. In comparison to a simple cycle gas turbine plant, a combined-cycle plant is able to produce higher thermal efficiency. The availability of a combined-cycle plant can be increased through increasing the reliability of individual assets in that plant by maintenance enhancement and recovering performance degradation by remote efficiency monitoring that provides timely corrective recommendations. In addition, increasing fuel costs drive the need for the higher efficiencies of combined-cycle systems. As result, remote performance monitoring of combined-cycle plants have become important in the energy industry.

According to the present invention, remote health monitoring of a combined-cycle power plant may include a wide range of data collection, data processing, mechanical condition monitoring algorithms, and alarm disposition, as well as issue analysis and diagnostics and recommendations for improvement. For instance, every day of the year, the remote monitoring and analytics center of General Electric Company collects more than 30,000 operating hours of data from a fleet of more than 1,600 globally deployed gas turbines, steam turbines, generators, and bottoming cycle assets. Its purpose is to monitor the operation status of each asset by using the time series data instrumented and transmitted from the customer site so to detect abnormality at nearly real-time. It will be appreciated that this wealth of data may be mined toward the development of novel analytics.

Thermodynamic performance monitoring may continuously track performance changes of power generation assets. This helps to make sure that generating facilities are appropriately operated and maintained in order to obtain enhanced performance from the total plant. These analytics and processes have made thermal performance monitoring a critical service in enabling customers to increase operating revenues, reduce fuel costs and enhance customer dispatch competitiveness.

Degradation is the gradual loss of performance in the plant's components (i.e., GT, ST, HRSG, Condenser and other auxiliaries) over operational time. Performance monitoring of combined-cycle plants requires long-team effort to instrument, sustain, and improve the plant and its component thermal efficiency, capacity, dispatch cost, and maintenance planning. In addition to the degradation of gas turbines and steam turbines, the overall plant performance loss may be attributable to many factors, including system design, bottoming cycle component technology upgrade, operating mode, contaminants in fuel, water and air ingression into the system, and site ambient conditions.

Machinery degradation accumulates with operating hours. Such degradation is usually divided into two categories: mechanical degradation and performance degradation. The mechanical degradation is caused by a variety of factors such as normal wear and tear in bearings and seals, coupling issues, excessive vibration and noise, problems in the lube oil system, or tube fouling and scaling in bottoming cycle equipment.

The other category, performance degradation, is contributed by multiple components, such as compressor fouling, turbine blade erosion or corrosion, HRSG or condenser fouling, steam path chemical deposition, etc. The performance degradation of a plant's component can be categorized into two types: recoverable and non-recoverable. The recoverable degradation may be recovered by proper maintenance actions such as regular water washes and parts replacement or upgrade during major inspection. Usually most of the degradation resulted from the gas turbine operation can be recovered through proper offline water wash of its compressor, while the degradation resulted from the mechanical deterioration (e.g., hot gas path component wear/damage) or parts malfunction (e.g., compressor bleed valve open) can be recovered from an overhaul. On the other hand, the non-recoverable degradation becomes permanent deterioration on the component even after a major overhaul. A hardware upgrade or replacement is needed to recover the performance deterioration. According to certain aspects of the present invention, remote performance monitoring of a combined-cycle plant may be able to monitor both recoverable and non-recoverable performance degradation and pinpoint the possible root causes at the component level. For example, with an allowable degradation level predefined, an alarm may be triggered to recommend corrective actions to the site such that the optimal maintenance can be taken to restore the recoverable performance degradation at the component level.

Further, as will be appreciated, there are a number of time-varying site conditions that impact the component performance in a power plant. These conditions include, but not limited to, ambient humidity, ambient pressure, ambient temperature, inlet filter pressure losses, exhaust system pressure losses, fuel heating value, fuel flow, fuel temperature, ST inlet steam flow and pressure, HRSG steam and water flows, and HRSG steam pressure. It should be pointed out that usually the change of site conditions is not the cause of performance degradation, but will result in variability of performance results. In order to assess the performance of a component (e.g., GT or ST) over a given operational period (e.g., two years), or to compare the performance over a fleet of assets over a certain time, the effect of site conditions on performance degradation needs to be eliminated from the instrumented performance indicators (e.g., power output) via proper techniques. The measured performance output along with the calculated performance heat rate and efficiency is calibrated to remove the effects of site conditions. The obtained performance indicators are referred to as the corrected ones and used as monitoring indicators.

In remote performance monitoring of a total plant and its component health, on-site monitor (OSM) data may be continuously instrumented and collected in real time via sensors installed on the equipment and control system on the power site, usually at specified intervals, according to embodiments, the data is transmitted to the monitoring center via a secured network. The OSM data used for performance calculation may include key ambient condition parameters such as temperature, humidity, and pressures, and turbine operational parameters such as power output, fuel temperature, fuel heating value, turbine shaft speed, and compressor inlet and exhaust pressure drop, as well as bottoming cycle conditions such as flow and pressure of steam and water. For illustrative purpose, FIG. 6 shows the data instrumented in the gas turbine for performance calculation. In addition, static constants about the asset may be required for performance calculation and modeling, including component configuration profile, configured condition as well as certain accessory options (e.g., steam injection flow). According to exemplary embodiments, both static constants and time-dependent dynamic data may be merged in the monitoring central database and then read as inputs to the performance calculation of the combined-cycle, as shown in FIG. 7, and, further, to performance anomaly detection in the rule calculation engine. Further, before performance anomaly detection analytics are implemented on an asset in the central system, the quality of all input data and the existence of all critical performance parameters, such as compressor inlet temperature, compressor discharge temperature, generator gross power output, turbine shaft speed, as well as all critical flow and pressure values in the bottoming cycle may be checked for sufficient quality. If any of critical input variables are unavailable or invalid, an error code will be output to the central data base. In addition, parameter anomaly detection analytics may trigger alarms for the corresponding variable with unavailable or invalid data in order to take corrective actions. For other vital tags such as ambient pressure and compressor inlet pressure drop, ISO (International Standard Organization) or configured condition values are applied to impute the missing or invalid data point to ensure continuous performance monitoring.

According to embodiments, performance monitoring of a total power plant may involve tracking and comparing the performance indicators at both component and plant levels consistently over time. These performance indicators typically include power output, heat rate, component efficiency, flow or pressure at either the plant or component level or both. For comparison and assessment purpose, these performance parameters must be continuously corrected to desired conditions, such as configured or ISO conditions. Two sets of performance calculation methodologies may be used for performance calculation and correction of a total plant: thermodynamic modeling and factor interpolation approaches. The thermodynamic modeling approach calculates the performance of the total plant using physics-based thermodynamic cycle matching. Inputs into this approach typically include three parts: dynamic OSM data, static condition data, and equipment configuration data. A physics based thermal heat balance model needs to be established to model the power plant components and their thermodynamic relationships. The time-dependent dynamic inputs instrumented from each component in the plant may be merged with the static data from the database. These static inputs contain the performance of a component at ISO condition, configured condition and certain accessory options available for the asset. All these inputs may be merged with the unit configuration data to generate an input file for performance calculation. Then a data reduction technique may be employed to satisfy continuity and conserve energy of the individual component and the total plant using OSM data.

Finally, the performance of the total plant may be calculated and corrected via thermodynamic cycle matching at baseload and ISO conditions.

A data-driven adaptive approach, called factor interpolation algorithm, may be also employed to calculate the corrected output and heat rate using site-specific correction factors, raw OSM plant data, performance test methodology, and baseline test information. With this method, a set of correction factor curves may be pre-established from the abovementioned physics-based heat balance model given the desirable conditions. Then real-time measured performance indicators or parameters of the plant may be corrected to given or ISO conditions from the pre-established curves through linear interpolation. It will be appreciated that this method doesn't require thermodynamic heat balance calculation at each monitoring time step, thus providing a more efficient solution to continuous performance monitoring of a total plant than the heat balance method. Therefore, this approach has the potential to simulate and validate, if not replace, the field performance test of the total plant, particularly if OSM data is collected from well calibrated sensors on site. This approach may be run for an individual site or for all the sites of interest for every critical operating condition, such as baseload (i.e., inlet guide vane full open and turbine shaft full speed). The results are generated on a specified interval corresponding to the inputs, often every 5 minutes or less. However, this data-driven adaptive approach may be more difficult for part-load operation conditions due to the correction factor curves created from the base load conditions. Also it provides limited capability for deep troubleshooting of performance issues at component levels, which may be handled by thermodynamic modeling method described previously.

Across any given fleet of power plants, particular generating units can degrade much faster than expected for a variety of reasons, including, for example, significant compressor fouling, bleed valve open, lube oil leakage, inlet filter ineffectiveness, turbine blade erosion or corrosion, HRSG or condenser fouling, and steam path chemical deposition. According to certain embodiments, an important objective is the timely detection of anomalies as to when such excessive degradation is occurring. When detected, a proactive solution, such as an offline water wash, instrumentation calibration, or early maintenance outage, may be pin order to restore the lost performance and reduce the total non-recoverable degradation that may occur if left unchecked. Multiple rules may be embedded in the monitoring system to detect performance anomalies related to either hardware or operational issues. Based on the thermodynamic heat balance performance modeling, factor interpolation calculation, performance degradation trend and offline water wash monitoring analytics may be developed at both component and plant levels. The results may then be processed and sent to the system to trigger alarming and escalation.

In addition to performance degradation, corrected performance calculations can be used in conjunction with other information to detect potential hardware failures at component levels. Based on the corrected results obtained from thermodynamic modeling, for example, compressor anomaly and performance degradation analytics may be developed to detect stator hardware damage and turbine operational issues. These analytics apply adaptive methodologies to continuously compare current performance to last known detected conditions, thus escalating abnormal changes for multi-tier diagnostics in order to recommend corrective actions and reduce risk of hardware damage.

According to embodiments, performance indicators (such as output, heat rate, efficiency, and flow) at component or plant level may be calculated and corrected to ISO or site conditions first, and an alarm may be generated if the corrected indicator has a significant change upon the continuous monitoring.

The present method further provides enhanced ways of detecting performance anomaly issues while also reducing false alarms. According to certain embodiments, three-layer alarming logic may be incorporated into the monitoring system. The logic may trigger an alarm based on the percent reduction of corrected power output and corrected heat rate relative to the corresponding values after the latest offline water wash was conducted. If no water wash information is available, the baseline performance after the unit was commissioned can be used as the reference. An alarm may also be triggered if the performance improvement after offline water wash is lower than a specified threshold (e.g., improvement is negative). These analytics can be extended to include other performance metrics such as corrected compressor efficiency or other indicators including speed of degradation (i.e., relative reduction over the operational time after the last offline water wash). The multi-layer smart alarm system enables the detection of performance degradation issues and the reduction of false alarms.

It will be appreciated that a wide variety of techniques may be used to identify underlying causes of performance degradation, including statistical analytics, physics-based thermodynamic simulation, time series trend analysis, and ad-hoc empirical evaluation. An operator may be very involved in the diagnostics process in order to generate a proper, proactive strategy to recover performance for a specified site. In addition to the diagnostics, performance degradation may be projected to next planned outage for facilitating critical business decision making such as resource allocation, hardware upgrade, and part procurement. The projection analytics are usually called degradation prognostics, which utilize the historical performance data, degradation trend, and physics-based simulation to predict the degree of degradation at a given point in time (e.g., next planned outage).

After proper actions are taken, the performance degradation may be corrected to the target level. The diagnostics and prognostics information may continue its to be broadcast via multi-channels including telephone, email, and web. Recommendations regarding performance degradation may be projected to next planned outage for facilitating business decision making such as resource allocation and part procurement. These projection analytics may utilize historical performance data, degradation trends, and physics-based simulation. Through performance prognostics from the current status of a given unit or component, the monitoring system enables the trade-off analytics to facilitate critical decision-making regarding hardware upgrades, maintenance scope, and resource allocation. For example, thermodynamics based simulation of the total plant may be employed to quantify how much the performance improvement can be achieved for a certain hardware upgrade, such as enhanced inlet filtration, advanced hot gas path, enhanced compressor package, or steam high pressure section upgrade. Such performance prognostics may also advise on the timing and frequency of maintenance outage or offline water wash and predict the quality of next outage based on historical performance degradation data at the component or plant level. As will be appreciated, with multi-tier diagnostics, proactive recommendations may be provided to operators in order to increase efficiencies and reduce losses. These recommendations may include maintenance actions, sensor calibrations, offline compressor water wash timing and assessments, maintenance schedules, hardware upgrades, and engineered improvements. If performance diagnostics show that the continuously monitored degradation rate is attributed to the lack of compressor washes, lube oil leakage, inlet filter clogging or open bleed valve, maintenance earlier than planned may be needed to ensure that the gas turbine operates most efficiently.

Accordingly, as provided herein, total plant performance monitoring may provide valuable identification and understanding of which components or units were suffering from rapid or severe degradation as well as the required technical assistance to resolve the deficiencies. Intelligent analytics may provide comprehensive thermal performance monitoring of a combined-cycle power plant at plant or component level, including data instrumentation, hardware/operational anomaly detection, proactive expert recommendations, site specific degradation assessment, water wash effectiveness monitoring, HRSG fouling, condenser fouling, etc. These performance activities have been validated to improve equipment efficiency and drive significant value for plant operators by lowering operating fuel cost, potentially increasing dispatch competitiveness. In particular, performance monitoring of plant assets in a centralized and remote fashion provides reliable and repeatable business insight into plant or unit performance with proactive real-time monitoring to capture performance issues sooner. Further, as will be appreciated that the financial value of a real-time monitoring system, methodology, and process can be directly related to improving the efficiency of the turbine's thermodynamic conversion (i.e., the consumption of fuel per unit of generated output), thus lowering the operating cost of fuel for customers.

Referring now to FIGS. 31 through 34, other aspects of the present invention will be discussed. It will be appreciated that monitoring, software and analytics resources have been invested on remotely monitoring performance degradation and automating diagnostics of performance anomaly for heat duty combined cycle gas turbine power plants in pseudo-real time mode, visualizing performance monitoring & diagnostics and automating fleet analytics and reporting. The objective is monitor, project, and track the customer specific performance degradation as well as monetize and forecast the bonus and liquidated damage on a total plant as well as its individual units. The other aim of the performance monitoring is to facilitate the automation of proactive recommendation in terms of asset & schedule optimization of maintenance and operation for power plant customers. The present invention is focused on the innovative analytics, infrastructure, apparatus, and processes developed in the total plant performance monitoring. These analytic techniques include multi-resolution performance calculation, sophisticated modeling, centralized monitoring, performance tracking, component-based anomaly diagnostics, fleet comparison and visualization. The analytics engine utilizes two sets of sophisticated performance calculation methodology at the total plant level. One embodiment includes the model based heat balance calculation of the total plant, integrating gas turbine, steam turbine, heat recovery steam generators, condenser and cooling tower. A second embodiment includes a calculation methodology as the ASME performance test code (ASME PTC 46-1996). It produces different resolutions of performance results for monitoring of performance degradation at a total plant level. Models and data for all monitored plants may be centralized and integrated in one data base and platform for convenience of management, sustaining, fleet assessment and visualization. Multiple analytics rules may be deployed to the monitoring system to trigger the alarm for components-based diagnostics and further recommendation for corrective actions on the affected subsystems. This invention has the capability of covering all monitored sites at the total plant level. It enables the users to timely, remotely, graphically understand the performance status of a specific customer or site or block among the fleet.

Combined cycle gas turbine plants may be built and operated with higher availability, reliability, and performance in order to provide the customer with sufficient operating revenues and reduced fuel costs meanwhile enhancing customer dispatch competitiveness. The availability of a power plant can be improved through increasing the reliability of individual assets by maintenance enhancement and recovering performance degradation through remote efficiency monitoring to provide timely corrective recommendations. In addition, power generation suppliers and commercial utilities throughout the world have a vested interest in protecting asset health and maintaining performance through analysis of both historical and real time asset data. It will be appreciated that contractual service agreements (CSAs) which integrate OEM technical knowledge, remote monitoring & diagnostics, and extensive fleet management experience with field service, parts, and repairs to create a customized maintenance solution to protect customer assets, maximize operational productivity, and minimize costs. These contracts typically stipulate certain unit performance requirements (time based) to be guaranteed by the provider via a monetized incentive program (i.e. bonuses and liquidated damages). Both remote real-time plant performance monitoring and routine asset performance tests on site can serve to enable a systematic approach to total plant and fleet performance optimization.

The present invention provides a systematical analytics methodology, integrated infrastructure, apparatus, and process for customized thermal performance monitoring of power plants. The combined cycle plant of interest consists of one or more gas turbines (GTs), steam turbines (STs), generators, Heat Recovery Steam Generators (HRSGs), condensers (Cond) and cooling tower (CT), as illustrated in the figures. The present invention may include physics-based, interdependent, integrated heat balance modeling of total plant (GT, ST, HRSG, Cond, CT, etc.). A data adaptive method for plant level performance correction may also be provided which is able to quickly simulate field testing on plant performance and provide remote testing capability of a total plant. Other advantages include: sophisticated monitoring system for total plant performance degradation in a real time mode (remote, centralized/interdependent calculation, monitoring, escalation, and dependent on gas turbine performance modeling); component based performance troubleshooting and diagnostics able to pinpoint the issues related to individual component in the plant; a set of KPIs (key performance indications) for fleet analytics and actionable recommendations able to identify/alarm the performance degradation among its own life-cycle operation history or the same frame fleet; fleet analytics on customer-specific performance degradation curve and fleet percentile comparison able to identify the position of a plant/site/customer at the bonus/LD guarantee level or at the entire fleet; multi-resolution performance calculation able to provide solutions to customer requests at different resolutions level; multi-layer, multi-shells performance degradation alarming at plant, block, and component levels; visualization analytics for output data and alarming from plant performance monitoring via a web based portal.

The figures also demonstrated a plant thermal performance monitoring analytics and infrastructure framework according to the present invention. According to preferred embodiments, it includes multi-resource input data (dynamic on-site monitoring data on the components and plant static data), multiple algorithm analytics (performance calculation, degradation, aggregation, offline water wash, and fleet level), visualization analytics, multiple platforms, and multiple data to implement these analytics. The on-site monitor data may be continuously updated, real-time collected via the sensors instrumented on the equipment and control system, usually on a specified interval (e.g., one-minute or one-second). The data may be then transmitted to the Monitoring, Software & Analytics (MS&A) center via a multi-layer secured network, as shown in the figures. The data used for gas turbine performance calculation and modeling may include key ambient condition parameters such as temperature, humidity, and pressures, and turbine operational parameters such as power output, fuel temperature, turbine shaft speed, compressor inlet and exhaust pressure drop. The figures further illustrate the layout of the critical performance parameters in a gas turbine. The definition of each parameter is included below the illustration of this figure, for example, AFPAP—Ambient pressure, DPF—Power factor, and AFPEP—Exhaust pressure drop. These parameters may be used as time-dependent dynamic inputs to calculate and monitor the performance of a given gas turbine. Static constants required for performance calculation and modeling include turbine configuration profile, influencing factors correction curves or tables, designed condition, certain accessory options (e.g., steam injection flow), etc. Both static constants and time-dependent dynamic data may be merged in the monitoring central database and then read as inputs to the performance calculation of the combined cycle, as shown in the figures, and, further, to performance anomaly detection in the rule calculation engine.

Two sets of performance calculation methodologies may be embedded in the system for performance calculation and correction of a total plant: thermodynamic modeling and data adaptive factor interpolation approaches. The thermodynamic modeling approach calculates the performance of the total plant using physics-based thermodynamic cycle matching. Inputs into this approach include three parts: dynamic OSM data, static condition data, and equipment configuration data, as shown in figures. A physics based thermal heat balance model needs to be established to model the power plant components and their thermodynamic relationships. The figures further show a graphical representation of a single shaft CCGT plant. The time-dependent dynamic inputs instrumented from each component in the plant may be first merged with the static data from the database. These static inputs contain the performance of a component at ISO condition, configured condition and certain accessory options available for the asset. All these inputs may be merged with the unit configuration data to generate an input file for performance calculation. Then a data reduction technique may be employed to satisfy continuity and conserve energy of the individual component and the total plant using OSM data. Finally, the performance of the total plant may be calculated and corrected via thermodynamic cycle matching at baseload and ISO conditions. As an illustrative example, the figures further illustrate a physics-based heat balance model used for performance calculation of a single shaft CCGT plant.

It will be appreciated that the present invention provides a data-driven adaptive approach, called factor interpolation algorithm, as documented in ASME test procedure (ASME PTC 46-1996) for field test of plant overall performance, may be also employed to calculate the corrected output and heat rate using site-specific correction factors, raw OSM plant data, performance test methodology and baseline test information. In this method, a set of correction factor curves may be pre-established from the abovementioned physics-based heat balance model given the desirable conditions. Then real-time measured performance indicators or parameters of the plant may be corrected to given or ISO conditions from the pre-established curves through linear interpolation. This approach can be run for an individual site or all the sites of interest for every critical operation, such as base load. The results may be generated on a specified interval corresponding to the inputs, say every 5 minutes. The referenced figures shows the process of realizing the customized performance analytics and summarizes the difference between the ISO (International Standard Organization) and SSP (Site Specific Performance) correction performance analytics.

Customized Performance Degradation Analytics: Across the fleet, units can degrade much faster than expected for reasons such as significant compressor fouling, bleed valve open, lube oil leakage, inlet filter ineffectiveness, turbine blade erosion or corrosion, HRSG or condenser fouling, and steam path chemical deposition. One important goal of performance anomaly detection may be to detect when this excessive degradation may be occurring. The performance of a gas turbine can be significantly reduced until one of multiple options may be exercised and the plant performance degradation may be shown. With the automated real-time detection, a proactive solution such as an Offline Water Wash and instrumentation calibration, hardware replacement, or earlier maintenance may be provided to the customer in order to enable the site to restore the lost performance, while minimizing the total non-recoverable degradation that can occur. Based on the performance analytics results, the multiple performance degradation analytics may be developed to automate the detection of severe performance degradation. Three-layer alarming logics may be incorporated in the system, including orange (serious), red (significant), and yellow (medium) alarms. An alarm may be triggered in terms of the percentage reduction of corrected power output and corrected heat rate relative to the corresponding values after latest offline water wash, or baseline performance after unit was commissioned.

Visualization analytics include fleet scorecard/comparison, fleet/unit offline water wash statistics, output/heat rate degradation trend, fleet degradation comparison, etc. Reusable templates with the pre-defined visualizations may be utilized to display respective analytic output tags within a thin client environment (webplayer). The templates may be hosted within a web portal for use by multiple remote users as required. Portal functionality not only provides secure internal access but also allows power users to interactively query, visualize, aggregate, filter, and drill down into specific asset datasets. Data within the templates may be retrieved in an on-demand basis from both the rules engine and central databases.

Over the past decade the combined cycle gas turbine plants have become increasingly important and popular in the energy field around the world due to the relatively cheap natural gas as the major source of fuel. The availability of a CCGT total plant can be increased through increasing the reliability of individual assets in that plant by maintenance enhancement and recovering performance degradation via remote efficiency monitoring to provide timely corrective recommendations. In addition, increasing fuel costs on operating the plant requires maintaining the higher efficiency in the combined cycle system. For example, a combined cycle plant with the engineered capacity of 900 MW power output can have an annual fuel bill of over 200 million dollars. Therefore, remote performance monitoring of a combined cycle plant has become increasingly important in the energy industry.

This invention provides a systematical analytics methodology, infrastructure, apparatus, and process for customized thermal performance monitoring of power plants to monitor, project, and track the customer specific performance degradation as well as monetize and forecast the bonus and liquidated damage on a power plant as well as its individual units. In addition, this invention may be able to facilitate the automation of proactive recommendation in terms of asset and schedule optimization of maintenance and operation for power plants. Moreover, this invention provides a systematical analytics methodology for smart performance monitoring, remote performance testing of a total plant, and degradation based maintenance with ensuring compliance to the service contract. Advantages include: centralize and automate the sophistic plant performance calculation at both model based heat balance method and data adaptive ASME approach; enable to validate the dollar impact of maintenance actions, hardware or operational changes on customized performance for a certain site at the plant level; enable automated custom specific performance issue detection, escalation, and diagnostics with remote access capability; customer-accessed web platform; incorporate multiple analytics and processes for thermal performance monitoring of a power plant; ensure the detection of performance issues via multi-layer smart alarming system; enable business initiatives like remote performance testing and degradation based maintenance with ensuring compliance to the service contract; Improve accuracy on execution recommendations and/or upgrade opportunity identification based on site performance degradation (performance assessment); Provide decision support on outage planning, maintenance optimization and asset health assessment; Enable fleet comparison of a certain cite at plant level to facilitate the business decision for hardware upgrade.

Figure 35:
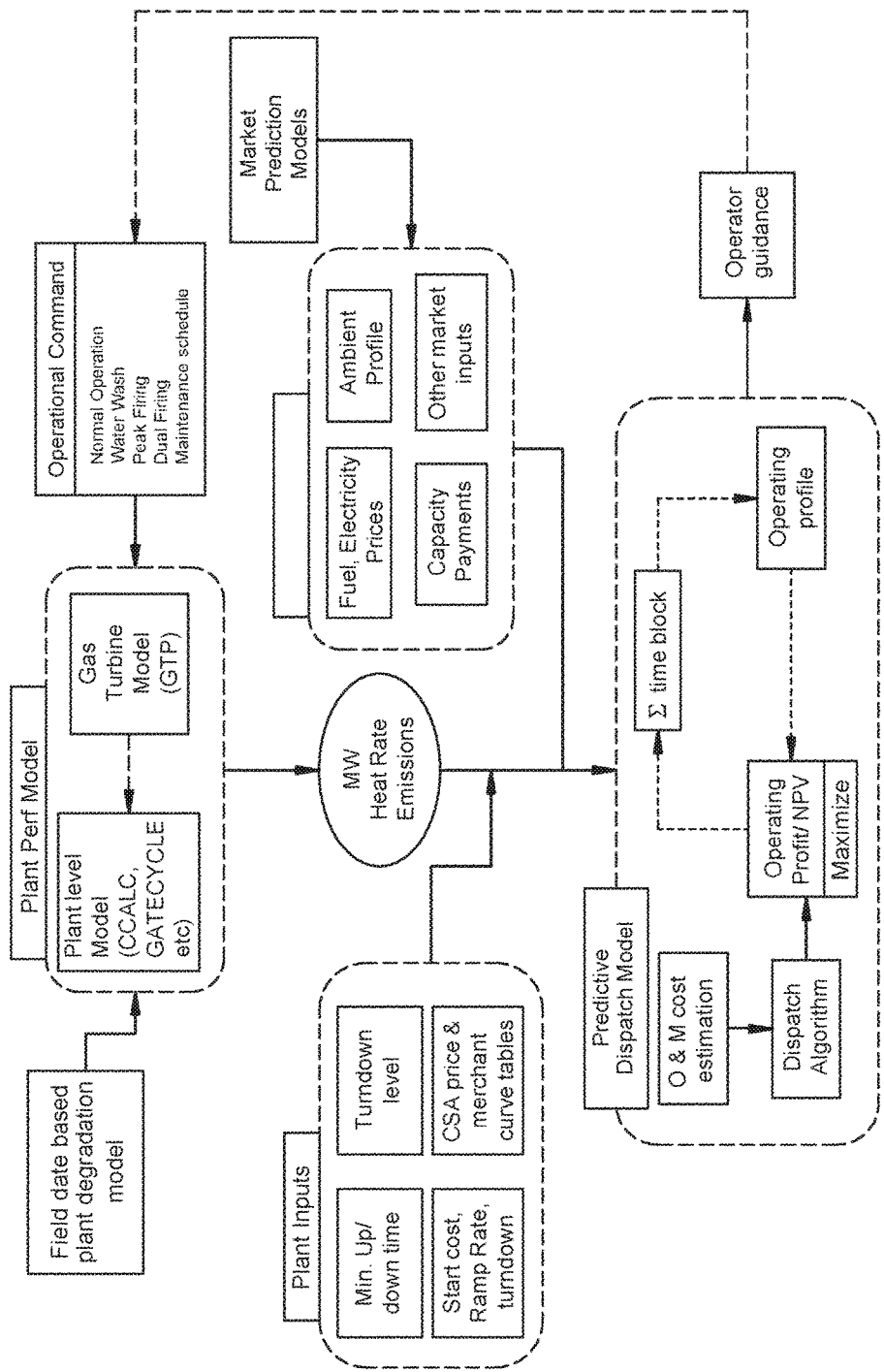
FIG. 35 illustrates a schematic representation of a power plant performance and maintenance monitoring control method according to certain alternative aspects of the current invention.
Figure 36:
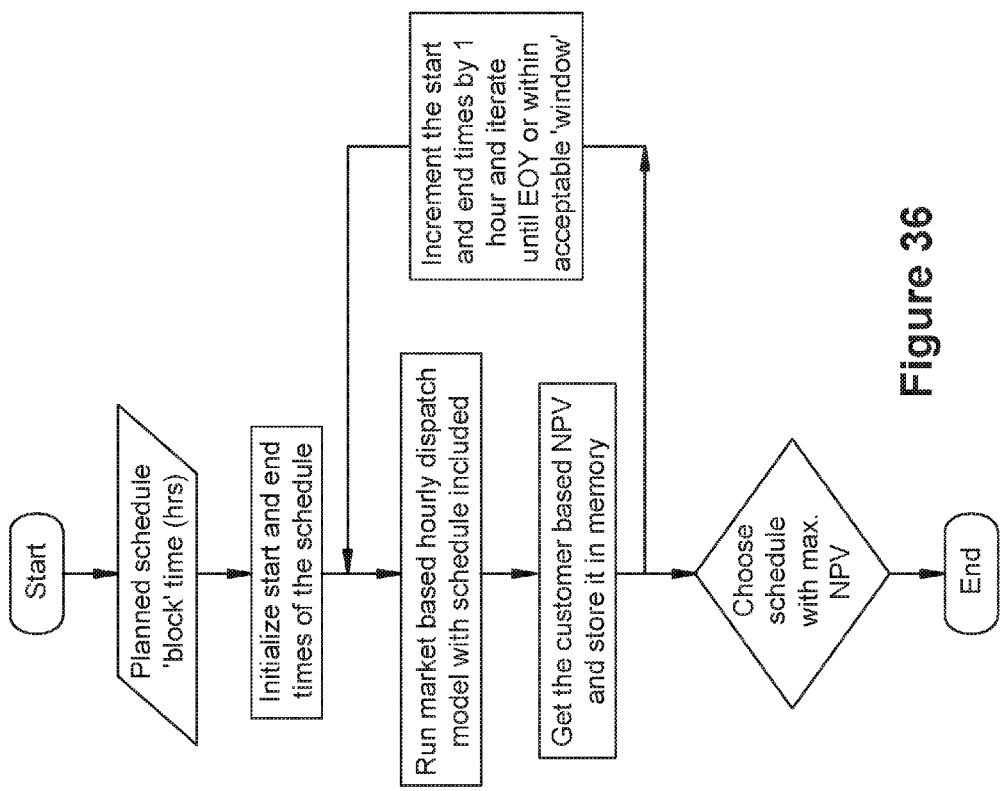
FIG. 36 illustrates a schematic representation of a power plant performance and maintenance monitoring control method according to certain alternative aspects of the current invention.

With reference now to FIGS. 35 and 36, another aspect of the present invention is discussed that is applicable to gas turbine based power plants where operational and maintenance schedules of the equipment are carried at specific intervals. Present invention includes the use predictive dispatch models with market specific inputs (like electricity prices, fuel prices, ambient temperature profile, etc) and product specific inputs (like performance, start cost, O&M cost, etc) coupled with customer specific inputs (like financials, etc.) to arrive at a maintenance schedule that minimizes the downtime cost of the plant. This schedule may be provided to the plant operator and the management team for guidance. These models can also be used to maximize the customer revenue for optimizing the operational schedules like online water wash, steam injection for power augmentation, inlet chilling, peakfire, duct burner operation, etc. The present invention further provides a method for optimizing the schedules for a gas turbine based power plant that maximizes the customer value (Net Present Value to be specific). The present invention takes market, regional and operational inputs of a power generating asset and runs a predictive dispatch algorithm to find the NPV for given customer's financial conditions. After a series of simulation runs, the operational profile for the said power generating asset that yields the maximum NPV to the customer may be selected and provided as a guidance to the plant operator or the management for deciding on a maintenance or operational schedule. The present invention may further optimizing schedules (operational and maintenance) for maximizing customer value, which is a common problem in today's power plants, more so in deregulated power markets. Today, most plant operators perform the operational schedules (like water wash) based on experience or based on a change in some performance parameter (like heat rate) beyond a certain limit. However, these operations performed might result in a sub-optimal NPV (Net Present Value) to the customer's power plant. The present invention provides a quantitative guidance to the plant operators on the timing of these schedules and maximize the value for the power generating assets. The present invention uses the latest available market inputs. In a turbulent market scenario, use of up-to-date inputs can provide more accurate guidance on plant economics. This invention provides an unambiguous recommendation (in form of a net NPV benefit) for the plant management to maximize their net cash flows.

Figure 37:
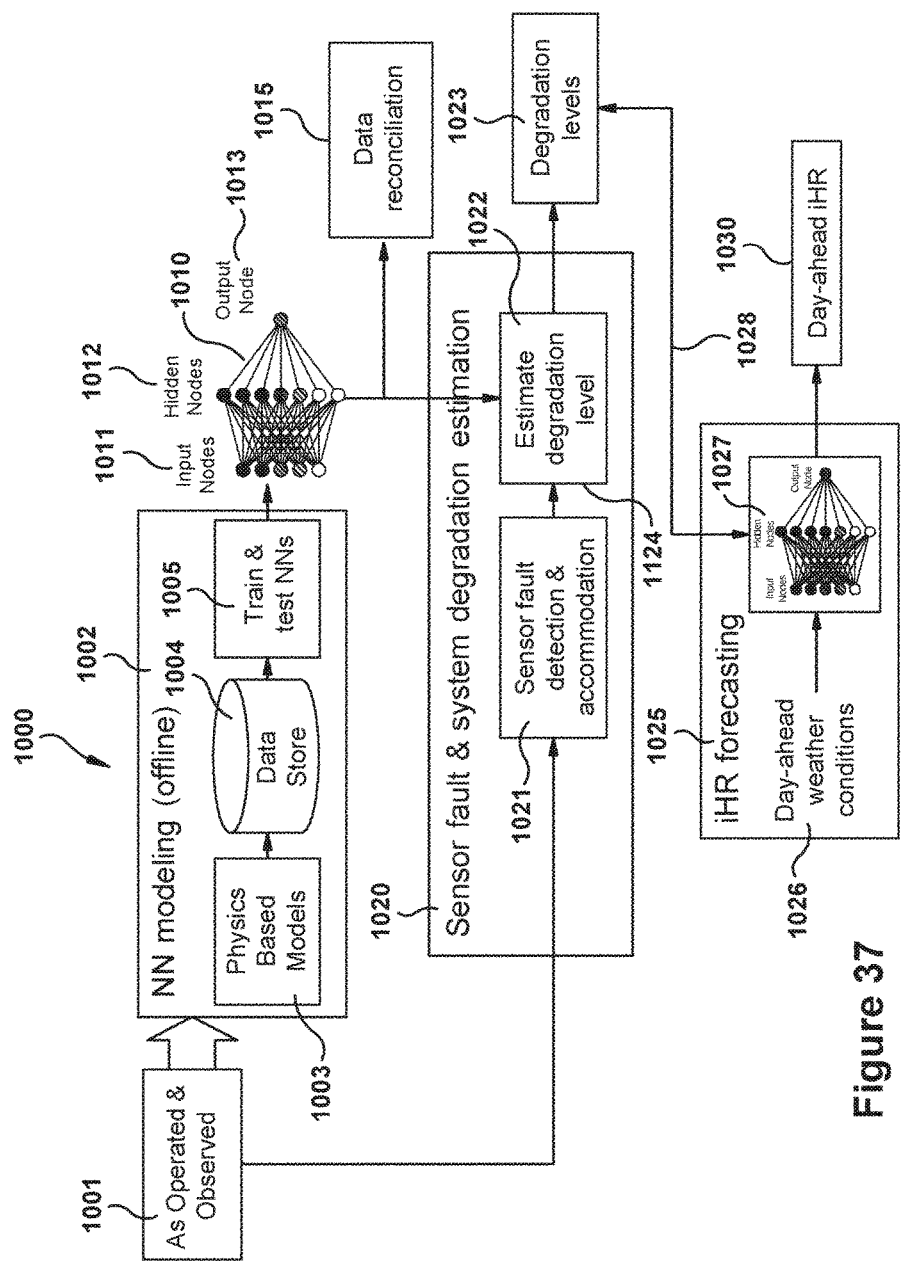
FIG. 37 illustrates a method for consuming operational data and the providing decision support according to certain alternative aspects of the current invention.
Figure 38:
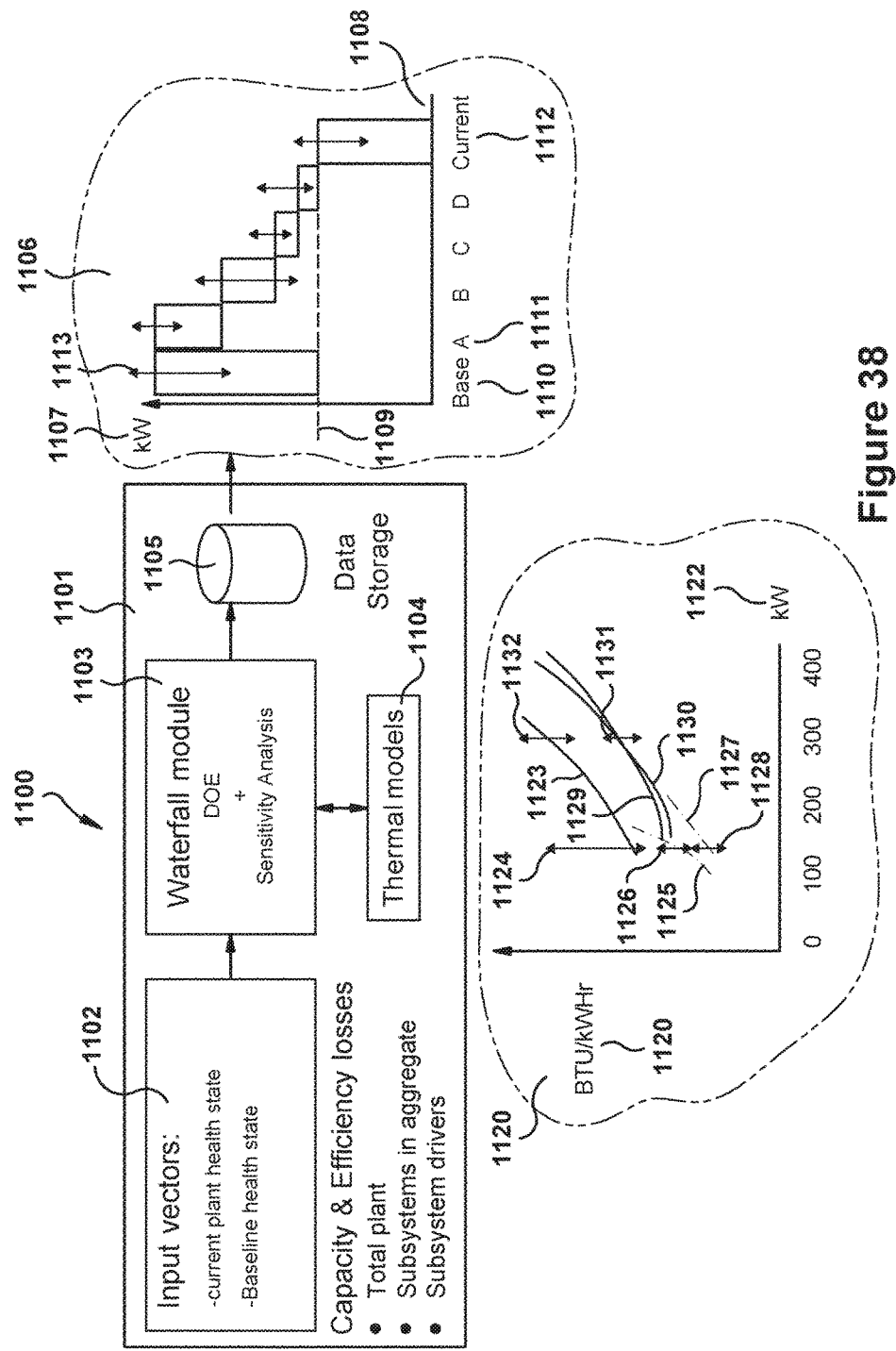
FIG. 38 illustrates schematically represented logic flow related providing decision support according to certain alternative aspects of the current invention.
Figure 39:
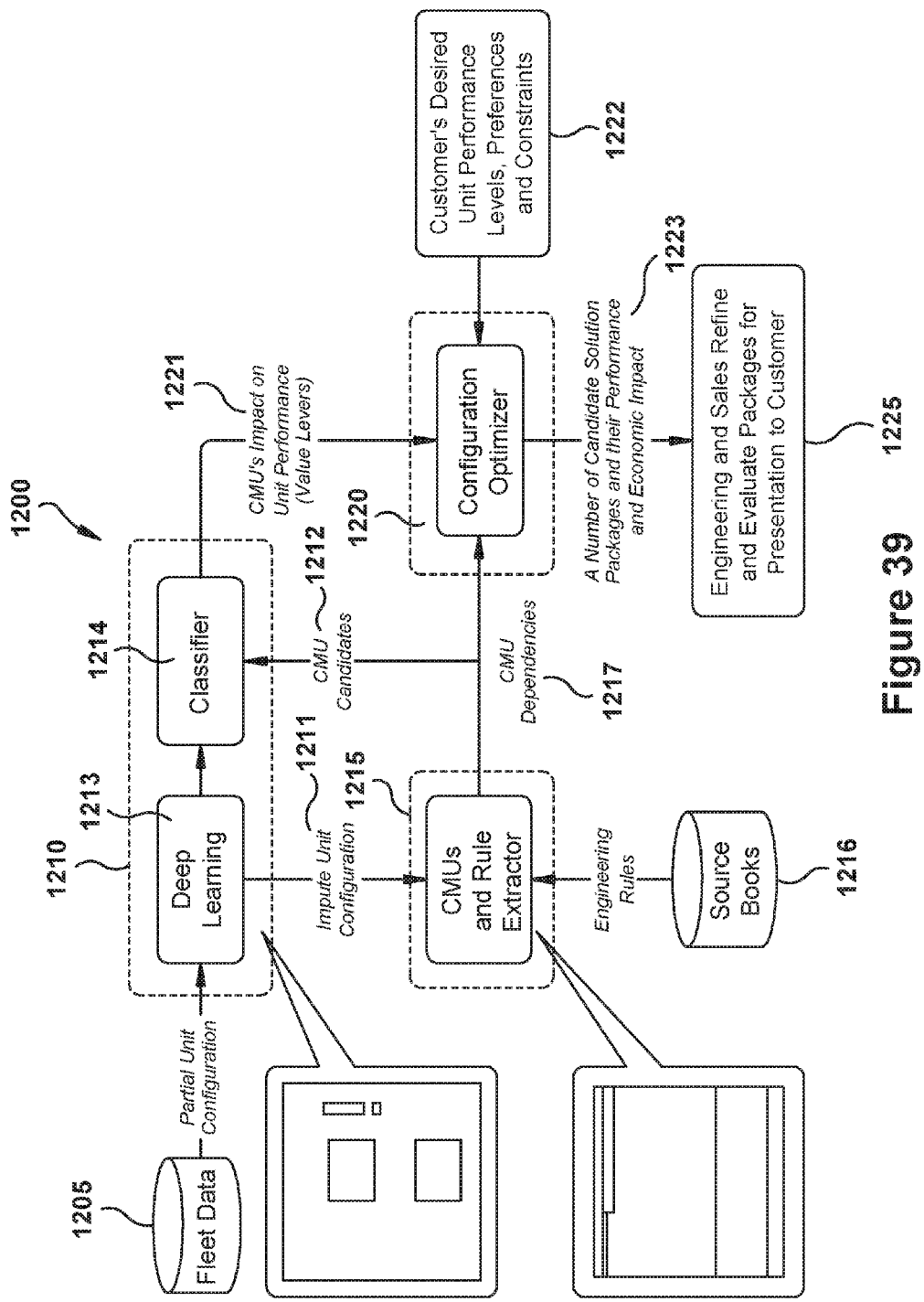
FIG. 39 schematically illustrates a system related to providing decision support according to certain alternative aspects of the current invention.

As will further be appreciated, with reference to FIGS. 37 through 39, plant output and efficiency as a function of engineering models, data driven models, exogenous variables and endogenous design, maintenance and operating choices are used to improve sensor precision, determine the difference between sensor fault and underlying physical system degradation estimation, maintenance disposition, and scheduling the plant's dispatch and line up. Referring to FIG. 37, the method 1000 for consuming operational data 1001 and the providing decision support is described. A data driven model using neural nets 1002 is built with data input 1001 from the operating physical system and/or the physics based model 1003 of the plant. For observed load and exogenous factor points and for those calculated points from engineering models 1003, data is stored 1004 from which Neural Nets are derived and trained 1005. Input nodes 1011 are the known data sources which relate to physical aspects of the plant. A hidden set of nodes 1012 is created from the known points and data. A final neural net translation 1010 is made to create an output node 1013. Inconsistent weights derived for hidden reference nodes 1012 in future runs of the plant model data indicate that a sensing system or physical change has occurred when reverse chaining from an output node 1013 fit to the observed data at the input 1011.

The physics based 1003 or data driven 1005 or their combination is a model used to sequence combinations of plant data input 1001 with holdout sampling of model inputs 1011 and used to create a matrix vector that reconciles 1015 the set of input values 1011 that more close to actual value, solve for the combination of holdout data with the least total error. In this way, the sensors which may have a large gage repeatability variance are able to provide the plant performance model with more true to actual data for use in downstream analysis. One such analytical element is sensor fault and system degradation estimation 1020 which consumes observed operating data 1001 into sensor fault detection and accommodation 1021 where checks are made for consistent input ranges and quality as has been discussed prior in the present application. Valid signals 1124 are compared with plant reference model anticipated 1013 signals and differenced 1022 to calculate degradation levels 1023 across the subsystems of the plant. An accurate representation of the plant's actual capacity and efficiency is thus made available 1028 as well as where losses are occurring throughout the physical system 1022 so that a forward looking estimate may be made 1025 for purposes of operations, commercial bidding of the plant's output at a given set of prices and the value of lost capacity or efficiency may be quantified for maintenance decision support. The future exogenous variable levels are estimated 1026 such as weather, consumed by the physics and/or data driven plant model 1027 to produce the incremental heat rate for the forecast period 1030. These values of plant output and efficiency are stored 1030 for various line-ups or configuration of the plant, which are trained for 1003, 1005 and whose maintenance losses are quantified 1022 and then estimated economically for the forecast period 1027 such that combinations of value loss for maintenance items and plant line ups are exposed to the optimization logic.

The plant operations optimization 1100 selects the optimal set of maintenance activities, plant line-ups and load assignments for the available assets. Maintenance actions are dispositioned into, for example, "repair now", "repair at next trip" or "repair at next scheduled outage" It can be appreciated that a repair may be a single maintenance item or a series of repair activities which when combined, describe a work scope. Two input vectors 1102 are made—the current plant state and a reference baseline state of operating performance (capacity and safety being examples of two). A surface by surface and component by component breakdown of losses 1103 is made by testing the plant against a reference standard 1102, model output 1104 and exercising the model through stochastic variation proportional to the assumptions variation of signal accuracy, weather forecast, model error and storing these inputs and outputs 1105 for loss attribution 1106. Loss attribution in output or efficiency 1107 is made by plant system 1108 and key surfaces within a system 1111 so that a current 1112 output 1109 is made as baseline 1109 relative to the base case performance or output 1110 such as was established during a testing period after a plant maintenance event. The variation in current output calculations and the losses across surfaces and in systems are estimated with 1103 reference vs a structured design of experiment that exercises the thermal model 1104. The confidence interval 1113, whose displayed range is adjustable by the analyst, is calculated by drawing input assumption variation that forms the basis of probabilities of a value, using a Monte Carlo simulation. Repairing a given loss is a decision made when a task(s) is identified for correction of a loss 1111 that is of a lesser net present value than the present value of lost fuel and/or capacity opportunity cost and scheduled according to the disposition rules of a given repair. To calculate optimized plant line-ups, repairs and dispatch decisions 1120, the various ranges of heat rates are characterized with respect to power output 1122, corrected for the system "as-is" versus "would-be" with a given repair, maintenance, lineup or load assignment. A lowest total generating cost for a required load output over a given operating duration interval is the desired objective, subject to the terms of a service contract, emissions or other limiting factor. In the illustrative example, four combinations of power generation are provided over a load range 1123, 1125, 1127 and 1129. In the case of 1129, a repair or change in line up provides an alternate efficiency-output relationship 1130. At each load point, a confidence interval for efficiency or output is made available 1124, 1126, 1128, 1131 and 1132 for each mode of operation or repair. A selected period of operation is chosen by the decision maker and the feasible combinations of available repairs, line-ups and load allocations are integrated over the duration of interest, the lowest cost combination, accounting for switching costs between line-ups and load allocation with the lowest total variation is typically considered as the most optimal decision.

Figure 34:
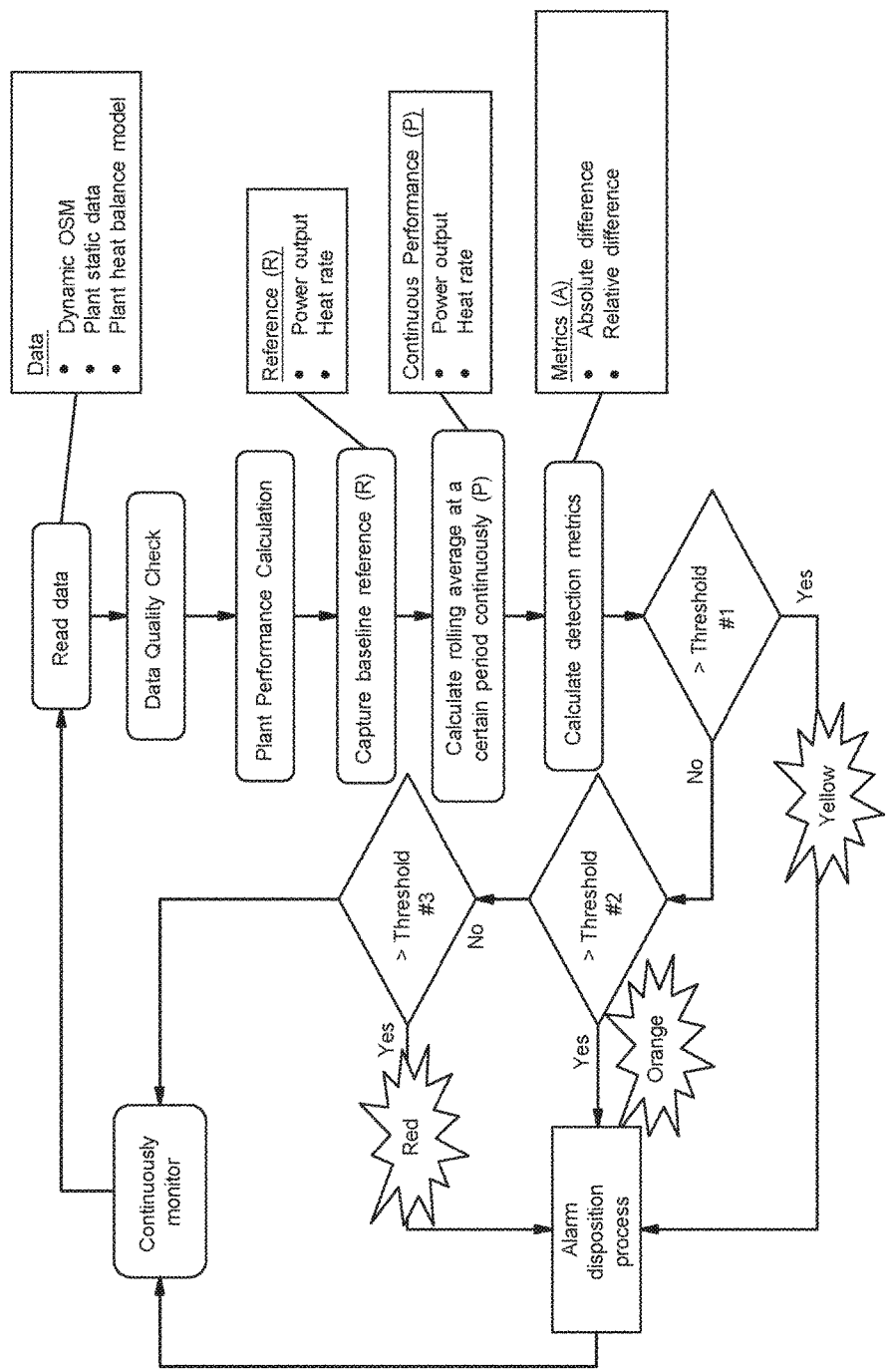
FIG. 34 illustrates a schematic representation of a power plant performance and maintenance monitoring control method according to certain aspects of the current invention.

Another means to increase the optimal operation of a plant is to change the design of the plant. FIG. 34 describes a means 1200 to select the best available configuration for a plant with its current design and feasible modifications and uprates that could be made. Fleet and unit data 1205 is attained for value characterization and operations history 1210. Data quality is boosted 1213 by using all monitored assets and triangulating on the most likely missing values of data, if any with deep learning techniques. The most likely unit configuration 1211 is imputed as a base case of what is actually installed in the physical system. A classifier 1214 calculates a given modification or uprate's change in economic performance for a subject unit, given all other observed unit configuration and operating performance data 1205, 1213 being utilized. A given plant may have more objectives than pure economic value, and those other aspects of value are similarly ascribed. A plant's design and configuration is then theoretically modified 1215 with available and feasible modifications 1216, checked for required dependencies 1217 and fed to the valuation classifier 1214 for imputation of value for all sets of feasible modifications or uprates over a selectable period. With imputed value 1221 and feasible options that are complete 1217, a configuration optimization 1220 is made with the customer's desired objectives 1222 and constraints so that available capital may be allocated to the subset of candidate solution packages and value propositions 1223 for further evaluation by experts 1225 at the customer and in the OEM's or service provider's organization.

Figure 40:
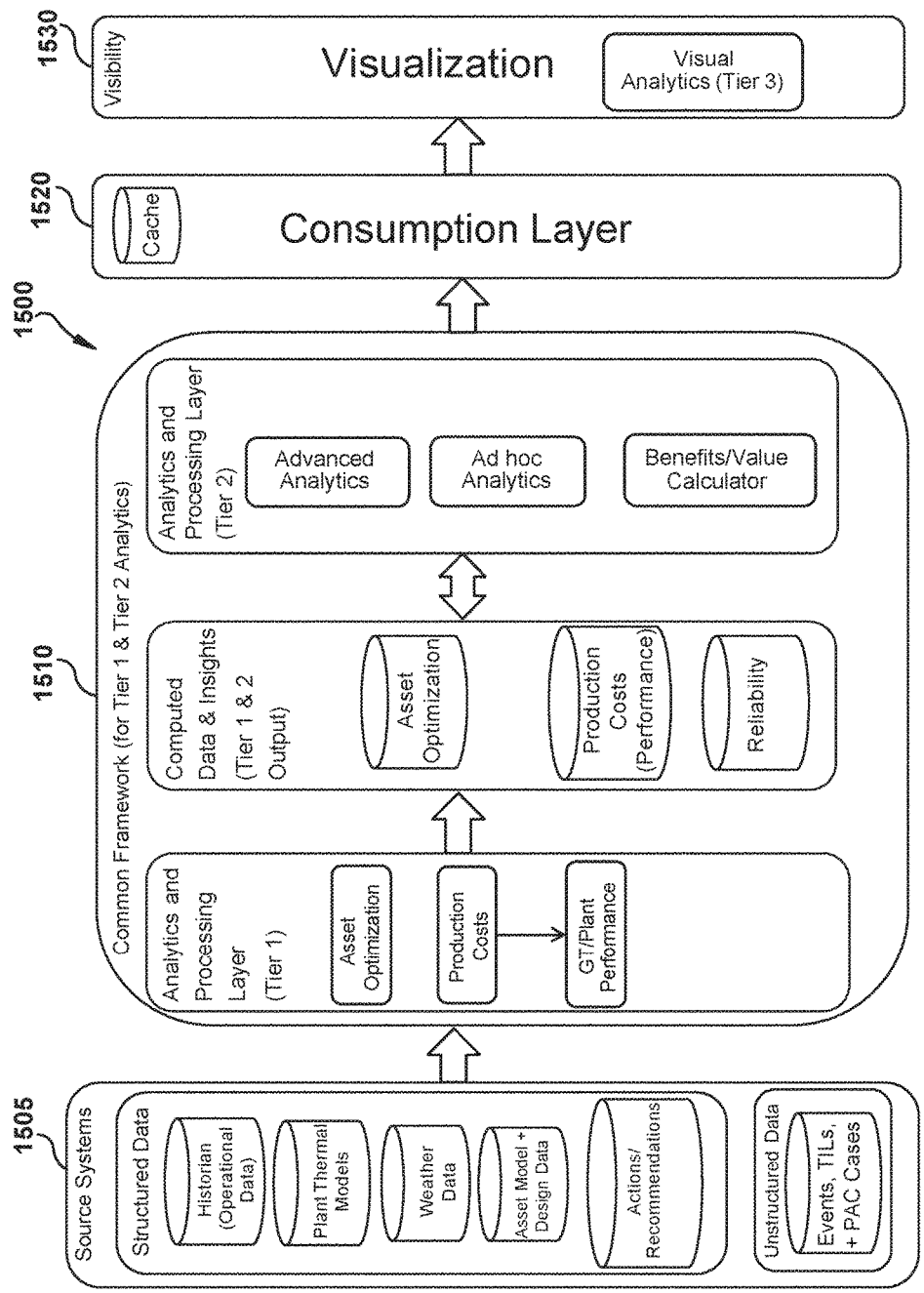
FIG. 40 is a high-level data flow diagram according to an alternative embodiment of the present invention.
Figure 41:
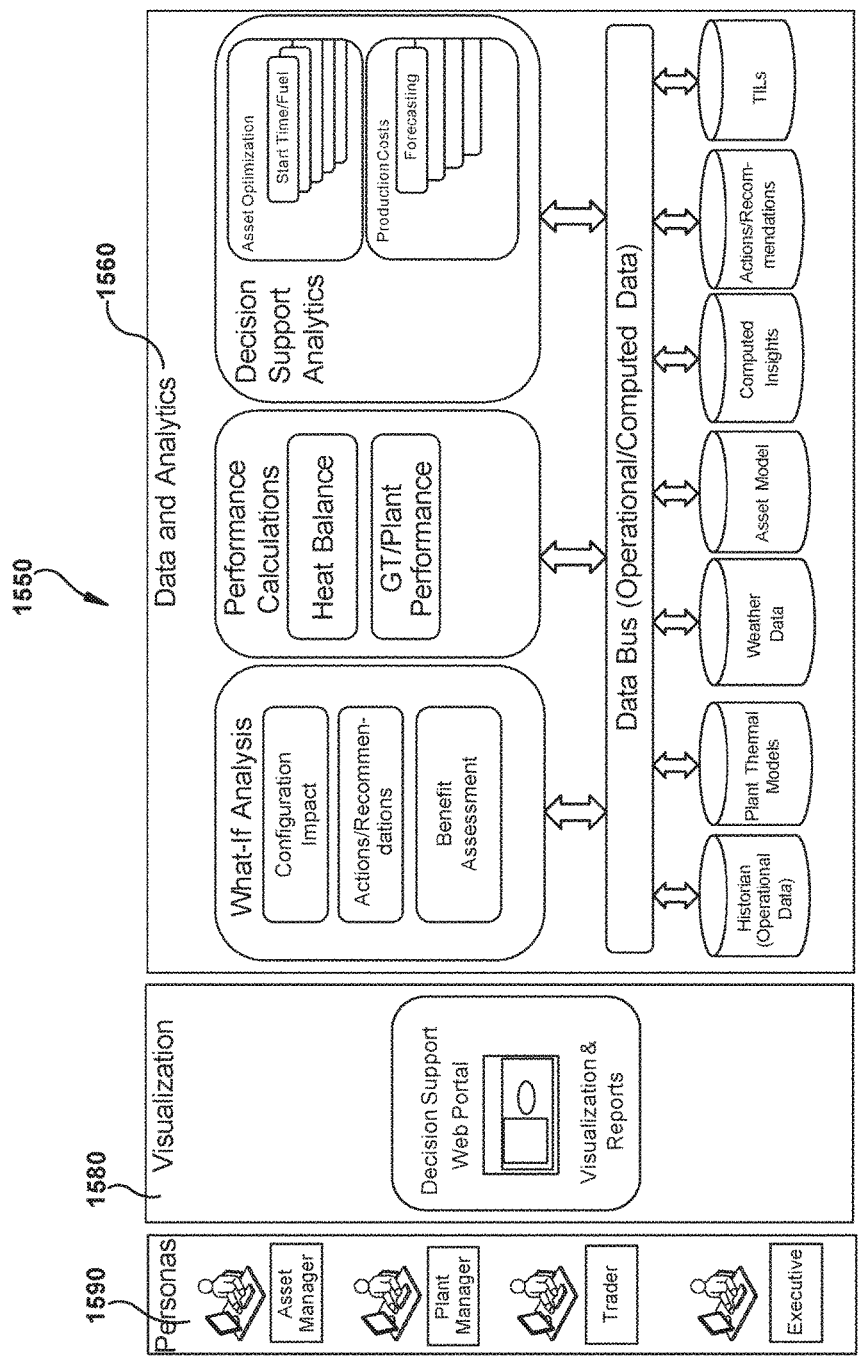
FIG. 41 is an exemplary high-level system architecture according to an alternative by the present invention.
Figure 42:
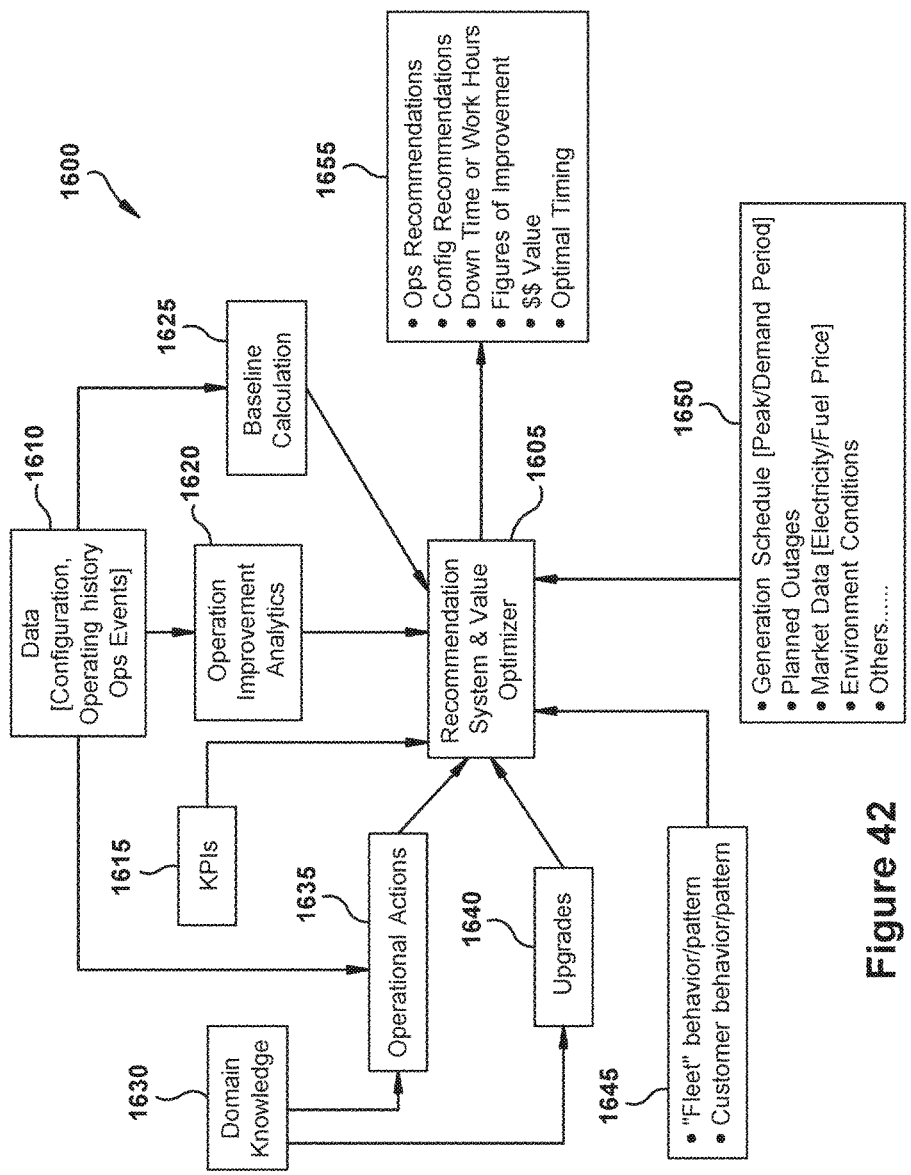
FIG. 42 is a data flow diagram illustrates a recommendation system/value optimizer module according to the present invention.

The present invention further may include systems and methods for economically optimizing or enhancing of a power plant or a fleet of such plants, as described in relation to FIGS. 40 through 49. With particular reference now to FIGS. 40 and 42, diagrams are presented that illustrate a high level system architecture and data flow according to such economic optimization or enhancement systems and methods. According to embodiments, the present invention may include a cloud-based web interface that allows operators and other stakeholders of power plants to maximize operational efficiencies for power generation. According to certain embodiments, the present invention includes two such components. The first component includes an operational component that enhances or maximizes operational efficiencies based on plant level initiatives of reducing production costs, optimizing existing asset capabilities, improving reliability, and managing regulatory compliance. Such operational efficiencies may address visibility, insights, and actions specific to operational plant level initiatives, which reduce production costs and improves asset performance and reliability. A second component relates to market optimization. The second component may focus on maximizing market responsiveness based on plant level initiatives of optimizing trading/scheduling, exploring upgrades to asset capabilities, and strategic compliance.

As will be appreciated, such systems and methods may enable visibility, insights, actions, and recommendations around key performance indicators, such as start time, start fuel usage, output, heat-rate, turndown, etc. Visualization (for example, graphs or tables and the like) may be provided that relate to how the power plant or fleet of such plants is performing currently as well as historically. For power plant start times or start curves with respect to steam temperature, comparison of start time performance with respect to the fleet may be provided. Insights may include such items as explaining plant performance and what is being driven by current operations, plant lineup and configurations. Actions and recommendations may include actionable items to improve the operation of the power plant and the benefits and value that relate thereto.

With particular reference now to FIG. 40, a high-level data flow diagram 1500 is provided. Moving from left to right on the diagram, the present invention may include a data layer 1505 that collects data from several different resources. These may include operational data (machine data from sensors), weather data (including ambient conditions), thermal models for the power plant, asset models and design data (definition/configuration), as well as previous actions and/or recommendations. As part of the data layer 1505, the present invention may marry structured and unstructured data to identify insights and propose actions with expected recovery impacts in real-time. Unstructured data may include recorded events, observational reports and the like. As illustrated, data from the data layer 1505 may flow to an analytic layer 1510. Within the analytic layer, Tier 1 and 2 analytics may be included that manipulate the collected data in particular ways. Tier 1 analytics may include the normalization of operational data. Tier 2 analytics may include complex transformations or advanced models, and may use information from Tier 1 analytics and other data sources to produce information which provides insights into plant operations and performance. Tier 1 analytics may include raw engineering data, such as those collected within the first layer 1505, while Tier 2 analytics include reconciled feature data that is then made available for consumption within a consumption layer 1520. As shown, certain Tier 3 analytics may be found in a visualization layer 1530. Tier 3 analytics, for example, may include aggregation and post-processing data that is used to make operational decisions. Functionality may further include: abstraction of data sets and processes that enables new capabilities to be added incrementally leveraging the same methodology (Tier 1/2/3 analytics and datasets); visibility insights and actions at the asset level, plant level and fleet level; projection of future operational states with recommendations about asset formants and cost benefit analysis around recommended actions; optimization across global decisions vs. local decisions; marrying the intelligence of different types of data to generate a higher value and more actionable results; continuous learning (feedback loop) so that solutions improve over time; and historical validation of recommendations vs. realized benefit.

With particular reference now to FIG. 41, an exemplary high-level system architecture 1550 is provided. As illustrated, within a data and analytics module 1560, performance calculations may be provided with a number of data inputs. The data inputs may include operational data (from and historian database), plant and asset models, weather data, computed insights, and actions and recommendations. The analytics may include performance calculations, decision-support analytics, and "what if" analysis. These analytics might pertain to the fleet, the power plant, and/or the individual generating asset. According to a preferred embodiment, the performance calculations, decision-support analytics, and the what-if analysis are brought together in real time for the optimization of a fleet, which, as used herein, is defined as a plurality of power plants. The performance calculations, for example, may include a heat balance (mass/energy balance). Decision support analytics may include asset optimization. For example, pertaining to startup, asset optimization may include a predictor of start time start time fuel consumption, startup profile comparison, startup insights, startup benchmarking, startup characteristic curves, ramp rates, regulation performance, etc. Decision-support analytics may further relate to production costs. According to the present invention, theses may include: forecasting, degradation, turndown. The "what-if" analytics may include analysis related to different "what if" configurations for the power plant and the impact thereof, actions and recommendations related to those configurations, as well as assessments as to the benefit stemming from such possible configurations, including an economic cost/benefit analysis. Actions and recommendations may change as asset performance changes over time.

According to exemplary embodiments, a visualization module 1580 may further be included. The visualization module 1580 may include a web portal for delivering visualizations and reports that are tailored in regard to content toward specific user groups having different roles within the power plant. As illustrated, these may include asset managers, plant managers, fleet managers, traders, dispatchers, engineering groups, financial managers, and/or other stakeholders. As will be appreciated, other ownership groups and technical employees may also be supported.

With particular reference to FIG. 42, a data flow diagram 1600 is provided that demonstrates an exemplary method that implements the concepts provided in FIGS. 40 and 41. At the heart of the diagram is a recommendation system/value optimizer module 1605, which has several inputs as wells several possible outputs, as will be provided herein. As inputs, the optimizer module 1605 may include several data modules, including an operational data module 1610 (which may include measured operating data, configuration information, and operational events), a key performance indicator ("KPI") module 1615 (which may include data related to full load output, full load heat rate, start time, start fuel, turndown level, as well as other key operational parameters), an operational improvement module 1620 (which may include data that relates to items such as water wash recovery, filter change improvements, etc.), and a baseline calculation module 1625 (which may include data related to benchmarking, such as average ISO full load output, average ISO full load heat rate, average start fuel consumption, etc.).

Other inputs to the optimizer module 1605 may be found relative a domain knowledge module 1630. The domain knowledge module 1630 may include information and specifications related to the particular equipment and assets of the plant, such as those that might be maintained by the original equipment manufacturer. Included modules related to the domain knowledge module 1630 may include an operational actions module 1635 as well as an upgrades module 1640. The operational actions module 1635 may include information related to possible maintenance actions, such as water washes, compressor blade polishing, and the like. The upgrades module 1640 may include various upgrades, whether equipment or software related, that are available to the power plant and the generating assets thereof given its current arrangement. These may include, for example, the addition of an evaporator cooler, a new type of combustion system, purge credit, control software, a duct burner, and the like.

A further input to the optimizer module 1605 may include a behavior module 1645 that includes information related to patterns of behavior exhibited by the fleet and/or any of its generating assets. These may include for example, water wash frequency and timing, filter change frequency and timing, demography, market region, buys/service pattern, operated profile, and functional knowledge. A final input to the optimizer module 1605 may include a market module 1650, which includes information related to market tendencies, such as electricity and fuel pricing, typical generation schedule, peak demand periods, environmental conditions, and the like.

The optimizer module 1605 may include a predefined objective function that includes many user-specific constraints. The optimizer module 1605 may be configured to examine a multitude of possibilities for determining an enhanced or optimized solution given all of the available input data. For example, the objective function may include a cost function whereby an economic net present value is calculated given the number of different factors and criteria defined within several scenarios related to a future period of operation for the power plant, generating asset, or fleet. Each such scenario may include a set of operational, performance, behavioral, equipment upgrades, degradation rates, market characteristics, and environmental assumptions, as well as other defined criteria. The optimizer module 1605 may then present results in a recommendation module 1640. Such recommendations may include ones related to operations, configurations, generation hours, downtime, improvements, scheduling, as well as providing an economic value for each.

The present invention may further include systems and methods for determining and visualizing key performance indicators to a plant operator via derived aggregated metrics at the unit/block/plant level. Such aggregate metrics may take into account multiple factors, including configuration changes and operational actions, and may be used to provide measures of historical and current performance against set targets, operational and configuration entitlement from an original equipment manufacturer, as well as for benchmarking the same against other power plants, fleets, ISO market competitors, as well as theoretical calculated limits. The present invention further may include systems and methods for aggregated operational data summaries that demonstrate key performance indicators for a given operator. As will be shown, the advantages of such a system may be several, including: the ability to provide aggregated measure to an operator of historical and current key performance indicators across their fleet/plants/blocks/units in an automated and digitized way; enabling the comparison of operational performance of the producer's fleet/plants/blocks/units against the producer's defined targets, operational entitlement and/or configuration entitlement from the original equipment manufacturer over different time periods of interest; the ability to benchmark operational performance of fleets/plants/blocks/units against ISO market equivalents over different time period of interest; and the ability to account for configuration changes, operational actions, and other key factors into aggregated key performance indicator measures.

Figure 43:
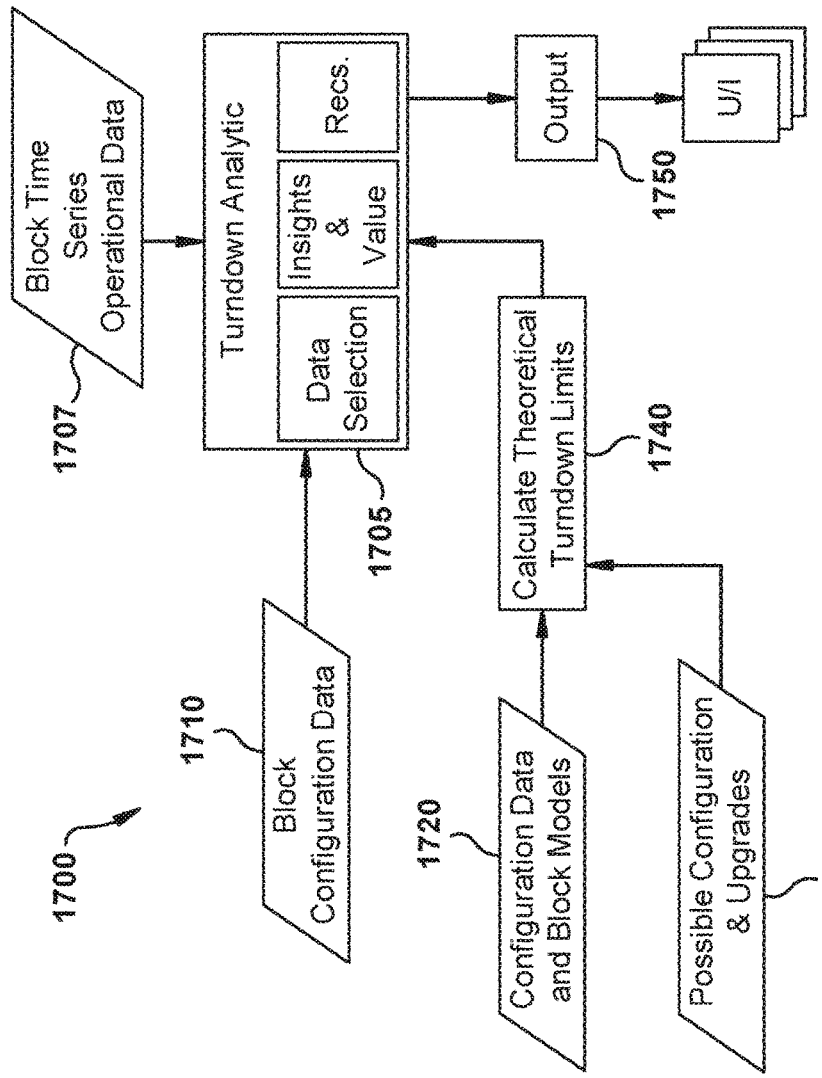
FIG. 43 is a data flow diagram in accordance with a turndown analytic module of the present invention.
Figure 44:
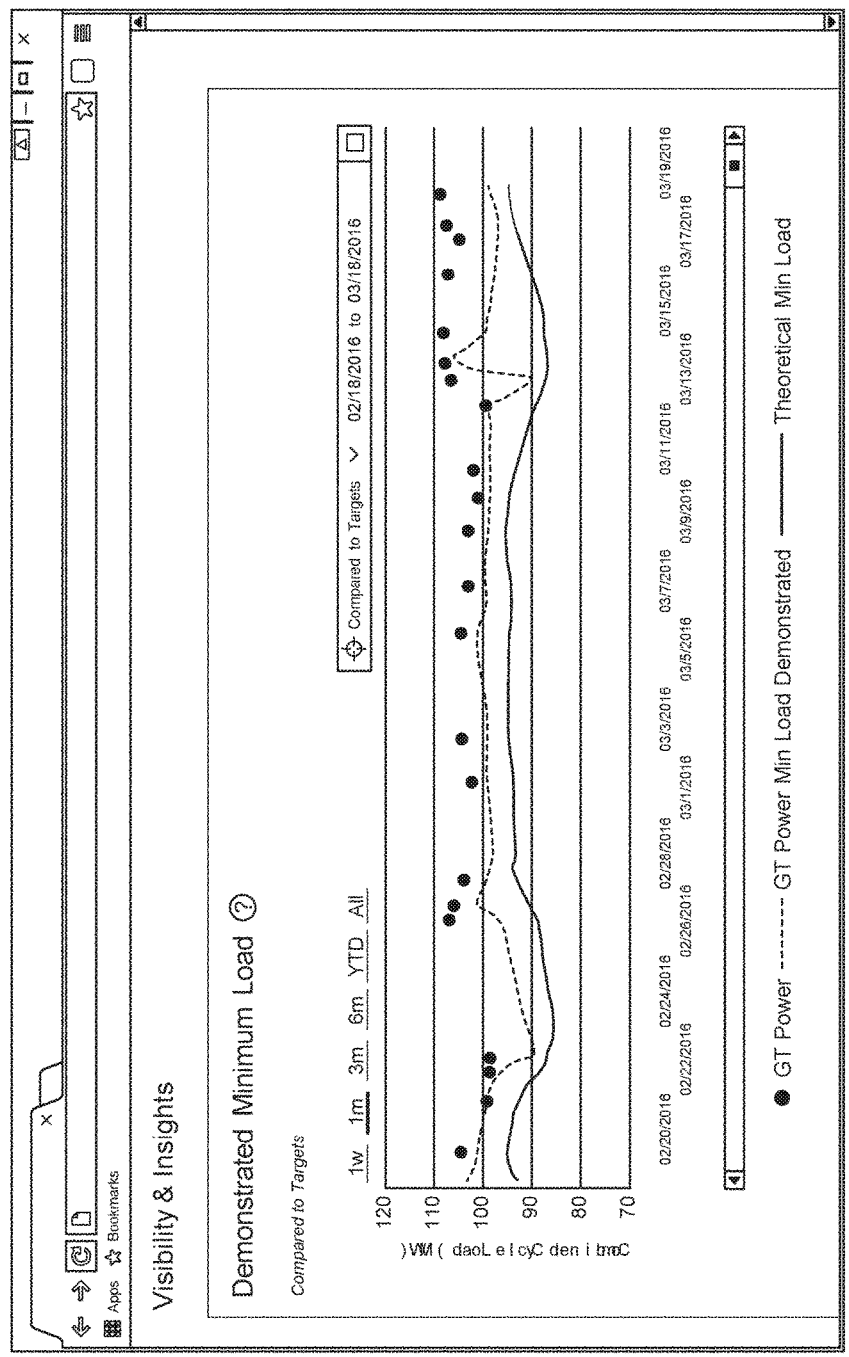
FIG. 44 is a visual output in accordance with the turndown analytic module of the present invention.
Figure 45:
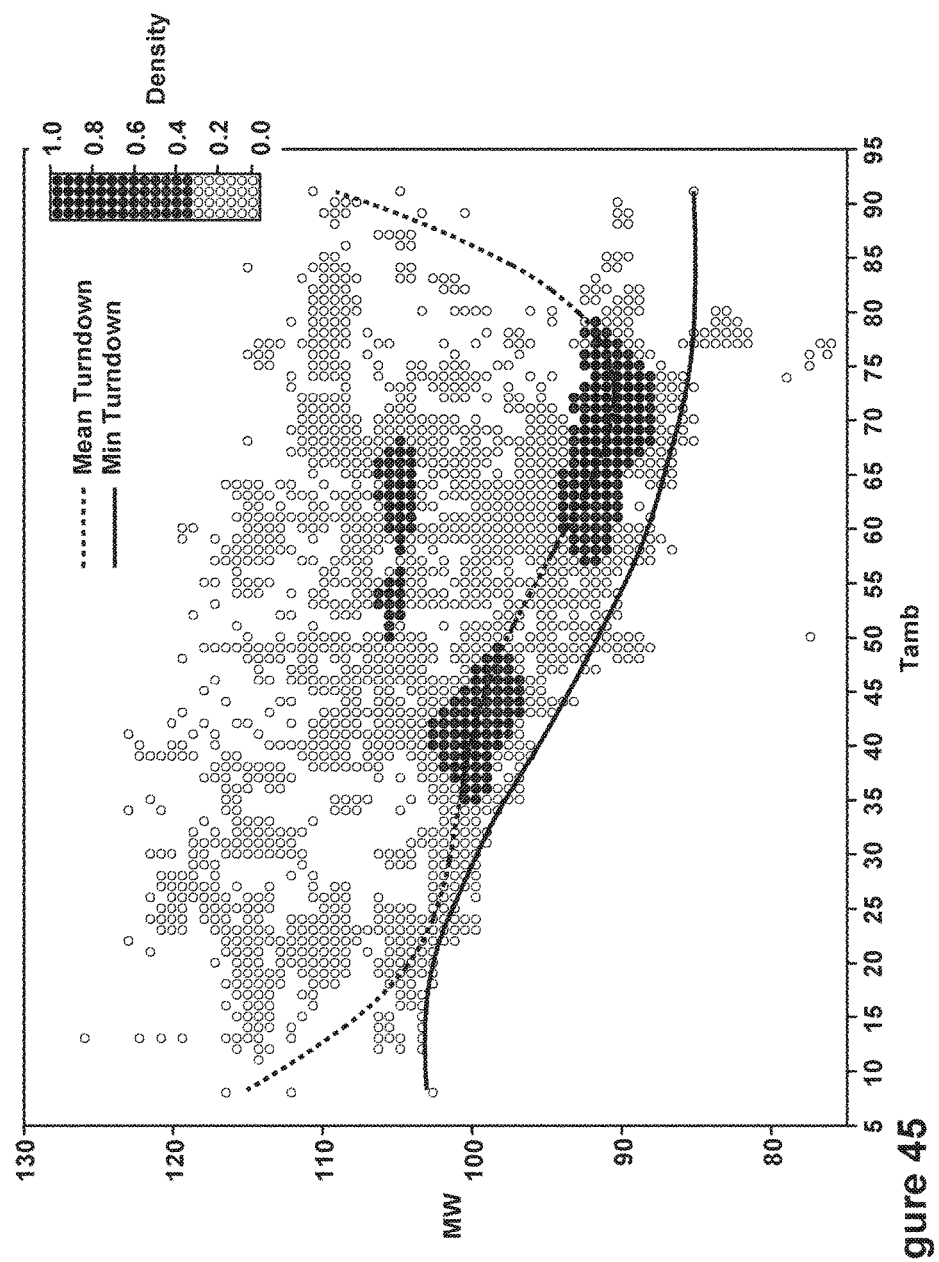
FIG. 45 is an alternative visual output of aggregated minimum turndown data in accordance with an embodiment of the present invention.

With particular reference now to FIGS. 43 and 45, a particular embodiment of the present invention is shown that is aimed at calculating, recommending, and/or automatically operating a power plant at an optimized or enhanced turndown mode and/or decision support around such operation. According to preferred embodiments, the present invention may calculate in real-time gas turbine and/or block or plant minimum turndown operating modes. As will be appreciated, with conventional power plants having gas turbines, there is no direct alert as to when the units are operating at minimum turndown. The minimum load of the gas turbine is determined by various parameters, including emissions and operability, and the present invention uses operational data (combustion mode, dynamics, surge limits) that can help determine the minimum load achieved by the gas turbine in real time. This can be joined with other plant or unit data (emissions and their particular limits) to help determine specific minimum turndown loads that are achievable. As will be discussed, the present invention may be used to determine the minimum load for enhancing in real time performance, and may also be used for deriving insights as to the factors driving current performance as well as upgrades, configurations, and/or operational modifications for enhancing future performance. This may be applied on the level of the asset, i.e., gas turbine unit, the block, i.e., combined cycle unit having at least one gas turbine and one steam turbine, the power plant, and/or the fleet. According to certain embodiments, this includes minimizing costs according to an objective function that includes minimizing variable cost. Such systems and methods may include analytics focused on the following key performance indicators: asset optimization, historical/current operations for latest configuration, minimum turndown demonstrated, typical turndown operations, and configuration/upgrade turndown capability.

With particular reference to FIG. 43, a data flow diagram 1700 is illustrated in accordance with an embodiment of the present invention. As shown, the data flow diagram 1700 may include a turndown analytic module 1705 as well as several data sources or repositories. The data repositories may include a data repository 1707 within which power plants or block time series operational data is recorded. This may include any of the types of operational or performance data already described herein, as may be relevant to turndown operation. A data repository 1710 may also be included which records configuration data relating to the power plant or block. Another data repository 1720 may include configuration data for the power plant or block, as well as power plant or block models that relate thereto. Finally, a repository 1730 includes information relating to possible configurations and upgrades that are available to the power plant or block given the present configuration. Within a turndown analytic module 1705, the data received may be used to provide performance insights, turndown recommendations, as well as recommendations regarding possible upgrades for greater turndown capabilities.

The specific functionality of the turndown analytic module 1705 may include several types of analyses. For example, according to certain embodiments of the present invention, the data points from a specific operating period (as may be recorded in the repository 1707) may be analyzed to determine a demonstrated minimal turndown for a particular unit over a defined operating period, such as a 24 hour period. This may include a data selection and qualification routine where data from the data repository 1707 is selected and qualified for usage in determining the demonstrated minimal turndown load. For example, a first step in this process may determine whether any of the relevant load data within the defined operating period qualifies according to certain predefined criteria. In such cases, the criteria may include determining whether the gas turbine was emission compliant during the specified time period. Further, for the demonstrated minimum turndown load to qualify, it may be determined whether or not the gas turbine was operating at a steady state at the time, with non-steady-state operation being disqualified for not being intended as turndown operation. Additionally, a range for the demonstrated minimal turndown load may be set. This range may be defined in relation to the baseload of the machine. Output loads that fall outside this range be disqualified. For example, to qualify for consideration as the demonstrated minimum turndown load for the operating period, the particular gas turbine may be required to the operating between 10%-70% of the rated baseload of the unit. Once the data has been qualified, the minimum qualifying load (if any) may then be designated as the demonstrated minimal turndown for the relevant operating period.

After determining the demonstrated minimum, the process may record ambient temperature data that relates to it. The process may accumulate such data at each ambient temperature so that, ultimately, data concerning the demonstrated lowest turndown point at each ambient temperature may be visualized and used for recommending future turndown levels. Ambient temperatures for which data has not been achieved may be estimated according to interpolative or extrapolative methods.

At a theoretical turndown limits module 1740, the process may calculate the theoretical turndown limits given the configuration data and power block models ascertained from data repository 1720. These theoretical limits may be compared to the demonstrated minimum turndown data produced within the turndown analytic module 1705. The theoretical turndown limits module 1740 may further calculate the theoretical turndown limits given possible configuration changes and/or upgrades, as may be ascertained via data repository 1730.

An output module 1750 may receive the analysis provided by the turndown analytic module 1705 and produce an output, which, for example, may be an output to a user interface such as an internet portal. One particular embodiment for the output is provided in FIG. 44. As illustrated, the output of FIG. 44 includes a user interface screenshot as may be provided to efficiently communicate results from the analytic module 1705. As shown, this user interface includes time series data illustrating turndown operation, where the x-axis includes information relating to the operating period while the y-axis includes data relating to output level of the combined cycle plant. The illustrated graph may include several data points that efficiently provide insights into our plant operation and turndown capability. These may include a minimum turndown achieved for each particular operating period that qualifies according to criteria such as that discussed above. As will be appreciated, this information is expressed via the larger dots. Further information may include the dotted line, which expresses the demonstrated minimum turndown at similar ambient conditions, as may have been achieved in prior plant operation. Theoretical minimum turndown may also be provided. As illustrated, this is represented by the solid line. Other information that may be provided include target turndown levels and/or benchmark turndown levels, as may be calculated via operation in other similarly configured power plants within the same ISO.

According to another embodiment, as illustrated in FIG. 45, the turndown analytic module 1705 and the output module 1750 may operate to assess and display aggregated minimum turndown data as part of a histogram of a defined previous operating period (such as the 12 previous months) by plotting min load in MW (y-axis) vs T amb (x-axis) vs total cumulative hours at each min load. As shown in the example of FIG. 45, according to a preferred embodiment, the total cumulative hours at each minimum load may be communicated by varying the color or shade intensity of the plotted point. Within this graph, as illustrated, an estimated minimum turndown may be shown, as well as a mean turndown. Other information may also be provided within the graph, such as target turndown levels, benchmark turndown levels, and/or theoretical turndown levels.

From this data, several calculations may be made that may inform future turndown and operational decisions. For example, the present invention may calculate and display an excess MWh generated over the previous 6 months or other specified time period. As will be appreciated, this value may be calculated using the delta between actual turndown levels over the previous specified period and one of the other plotted lines, such as the demonstrated lowest minimum turndown, benchmark turndown levels, and/or theoretical turndown levels. Based on this, the present invention may calculate and display a projected excess MWh that will be generated over the next specified operating period as well as calculate a cost associated with this excess. As a further alternative, the present invention may further measure the configuration entitlement against the best entitlement that there is and against operator set targets. The present invention may further calculate savings or projected savings should plant upgrades be implemented that enhance plant turndown capabilities. These may be shown has a line on the plot as well as an aggregated value over the defined previous operating period or one projected over a future operating period. A cost relating to the upgrade may be calculated that reflects the cost to implement against the projected savings given the enhanced turndown capabilities and avoidance of excess generation.

With particular reference now to FIGS. 46 through 49, an embodiment of the present invention is shown that relates to start time and start time fuel operation aspects for power plants having combined or simple cycle generating units. As will be appreciated, there is considerable variation in start times for different power blocks ("blocks") due to multiple factors. These may include system, human and economic considerations. Steam turbine bowl metal temperature at the time of lead gas turbine start is one of the critical factors in determining the start type and time taken to achieve various startup milestones. Start time is also a factor of the time difference between start of lead gas turbine, lag gas turbine and steam turbine roll off in a 2×1 configuration. The present invention provides a way to handle unexpected variation in start times due to the aforementioned factors as well as methods identifying bad data and/or removing outliers through a filtering schema, which will also be described herein. Such may be used to avoid skewing relationships between key startup parameters. As provided below, the present invention further addresses the variation in the rate at which steam turbine metal temperatures cool down during non-running periods. As will be appreciated, establishing a separate and unique transfer functions for different blocks and configurations may substantially remove the effect this variation has on startup analysis.

More specifically, the present systems and methods may be used to establish relationships between critical startup parameters and start times and fuel consumption for efficient and accurate analyses related thereto. As provided herein, the normalization of start times may enable more accurate benchmarking across a fleet of blocks as well as predict start times and the fuel consumption related thereto after variable length shutdowns, such as those lasting from a few hours to a whole weekend. For example, according to the present invention, normalizing the effect of a wide range in steam turbine bowl metal temperatures, non-running hours of gas turbines, or cool down time of steam turbines may allow a common reference for hot/cold/warm starts, and thereby allow an understanding of the effects of varying plant system conditions, departures from normal startup procedures, and operator dependent aspects on start times and fuel consumption. As will be appreciated, such operational insights may include several significant advantages: the ability to provide aggregated normalized measures of an operator's historical and current start times and fuel performance at the fleet/ plant/block/unit level in an automated, visual, and digitized way; the enablement of more accurate benchmarking over defined time period of interest of start times across fleets/plants/blocks/units against other such assets, the ISO market assets, or assets produced by a particular manufacturer; the discernment of the effect of varying plant system conditions, departures from normal startup procedure, and operator dependent aspects on start time and fuel consumption so to determine performance drivers; as well as insights, decision support, and impact or benefit valuation related to plant and equipment upgrades that effect the startup process. As will be appreciated, these advantages may flow through in a myriad of ways the hierarchy of stakeholders within any particular power generating business entity. For example, plant managers and traders may be able to compare start times and fuel consumption for different blocks and units by different start modes and types, as well as predict start times after varying length shutdowns so to affect operational decisions in real time. Owners, operators, financial stakeholders, and service providers may be able to inform plant operational decisions and capital investment with more accurate start time and fuel consumption data and the cost/benefit "what if" analysis that attends possible upgrades.

Thus, according to exemplary embodiments and as provided herein, the start time analytic of the present invention may include developing correlations, transfer functions, or relationships between several key startup parameters. These parameters may include: steam turbine cool down time or non-running time ("block non-running time"); steam turbine bowl metal temperature ("steam turbine metal temperature"); and startup time for combined cycle blocks ("block start time"), which, as used herein, is defined as the time period between initiating start procedures and emission compliance mode for gas turbines or inlet pressure control mode in the case of steam turbines). As discussed more below, other key startup parameters of the present invention for which relationships also may be developed include: gas turbine cool down time or non-running time ("gas turbine non-running time"); gas turbine startup time ("gas turbine start time"); startup fuel consumption ("start fuel consumption"); startup heat rate ("start heat rate"); and startup output ("start output"). According to a preferred embodiment, the relationships between these startup parameters may be normalized according to start type, which, as used herein, includes an indication as to startup steam turbine metal temperature, and, for example, may be classified into three groups, such as "hot start", "warm start" and "cold start". The relationships between the startup parameters further may be normalized according to start modes, which, as used herein, indicates the number of gas turbines versus the number of steams turbines involved in the startup process. For example, using an exemplary block configuration of 2 gas turbines and 1 steam turbine, the start mode may be expressed given the following nomenclature: "2×1" is a start involving 2 gas turbine versus 1 steam turbine; "1×1" is a start involving 1 gas turbine versus 1 steam turbine, and "1×0" is a start involving just the gas turbine, i.e., 1 gas turbine versus no steam turbines. According to present embodiments, the normalized relationships may then be used for improved benchmarking purposes as well as for predicting future block or gas turbine start times and start fuel consumption based on expected non-running time or steam turbine metal temperatures, information which may be provided by an end user or operator as an estimation given further possible operation. As will be appreciated, such normalization of start times may be done to suppress the effect of steam turbine bowl metal temperature variation on the start time and, thus, may allow more meaningful comparison of start times across a fleet of blocks or generating units.

According to preferred embodiments, one or more of the following transfer functions or data relationships may be developed from a data repository that includes operating parameter data collected from numerous qualifying combined cycle and simple cycle startups. These developed relationships may include: block non-running time vs. steam turbine metal temperature (for both 1×1 and 2×1 startup modes); steam turbine metal temperature vs. block start time (for both 1×1 and 2×1 startup modes); gas turbine non-running time vs. gas turbine start time (for 1×0 starts); and, for cases where steam turbine metal temperature data is unavailable or not trustworthy, block non-running time vs. block start time (for both 1×1 and 2×1 startup modes). These relationships may be developed according to startup type, i.e., for hot, warm and cold starts. Further, these relationships may be developed according to other plant configuration classifications.

Figure 46:
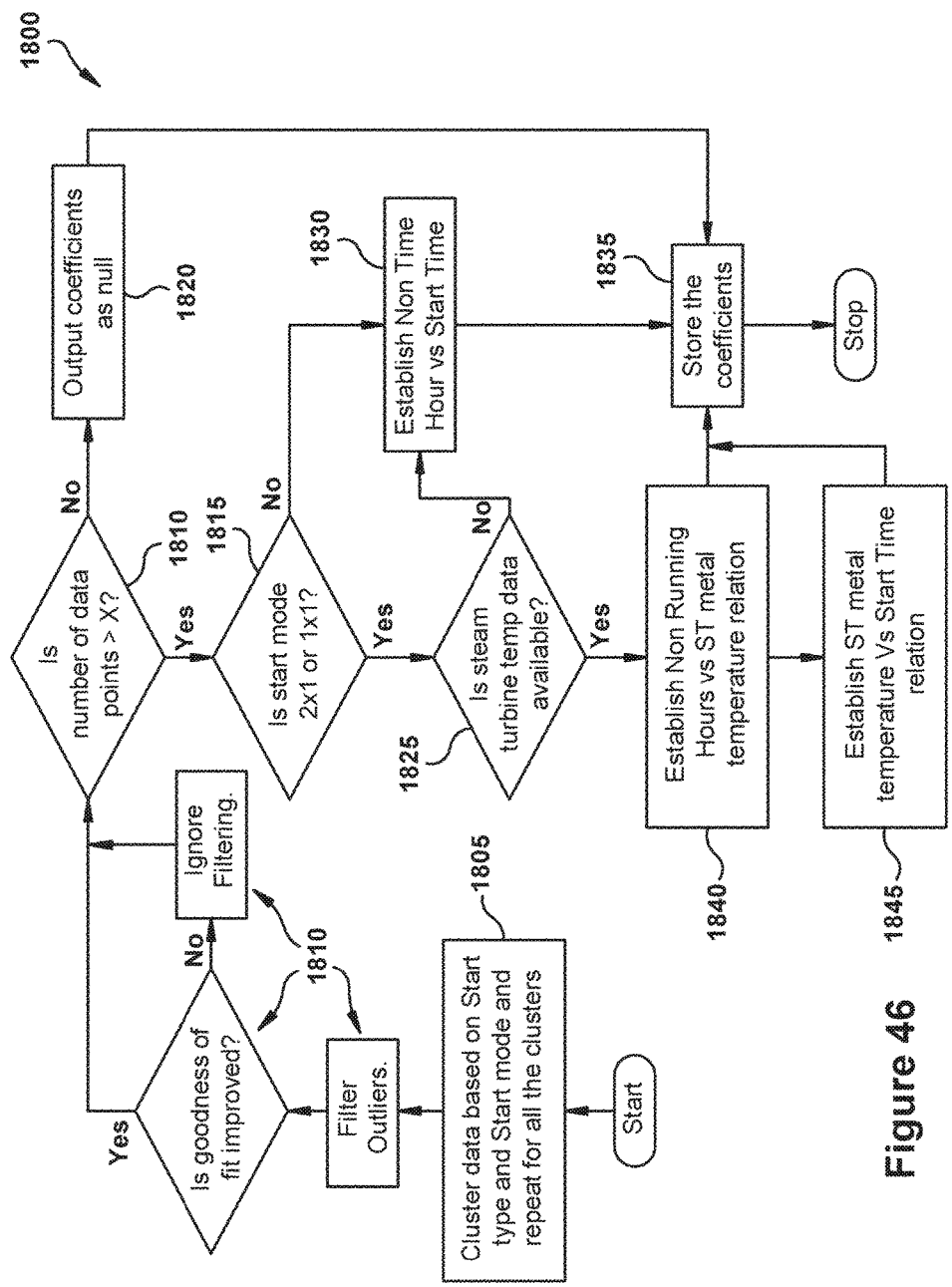
FIG. 46 includes a method by which a unique set of coefficients is developed for a transfer function where the coefficients reflect the unique startup properties and characteristics for a particular combined cycle block.

FIG. 46 includes a method 1800 by which a unique set of coefficients may be developed for the above described transfer functions where the coefficients reflect the unique startup properties and characteristics for a particular combined cycle block. As described in more detail below, once developed, these coefficients may be used As shown, an initial step 1805 includes breaking down the collected data inputs into different clusters. The clusters may be organized according to the particular block to which the data pertains as well as the start mode and type. Then the next steps 1810 may include a filtering routine that serves to qualify the data set for coefficient processing. For example, filters may remove data outliers or data that does not conform to certain predefined rules that are drawn according to domain expertise. The merits of such filtering may be checked, such as, for example, whether the statistical coefficient of determination (i.e., R2) improves. If R2 is found to have improved, then the filtering results may be kept. If not, then the filtering results may be ignored. The method may then progress to a decision block 1810 where it be determine whether the number of data points is sufficient to continue processing. Specifically, the method may check to see if the number of data points in the set exceeds a defined minimum threshold. If "YES" the threshold is satisfied, then the method may continue to decision block 1815. If "NO" the threshold level of data points is not satisfied, the method may proceed to step 1820 where further processing of the coefficients is halted.

Assuming that the threshold for the number of data points is satisfied, the method may continue to decision block 1815 where it is determined what type of start mode is represented in the data set. Specifically, assuming again the exemplary block configuration of 2 gas turbine versus 1 steam turbine, it is determined whether the start mode for the data set is a 2×1 or 1×1 startup. If "YES" the start mode is either 2×1 or 1×1 startup, then the method may continue to decision block 1825. On the other hand, if "NO" the start is not either a 2×1 or 1×1 startup, this indicates that the start is a 1×0 startup (i.e., includes only a gas turbine startup) on the exemplary block configuration. The process then may continue to a step 1830 where it establishes a relationship between the gas turbine non-running time versus the gas turbine start time. In doing this, the startup data set may be processed by a curve fitting module. The curve fitting module may first qualify the data by checking sufficiency of the data points. The curve fitting module may then establish a transfer function between parameters of interest, which in this case is the gas turbine non-running time versus the gas turbine start time, but could be done between any of those parameters of interest already discussed herein. The curve fitting module may take into account the complexity and neatness of the curve fit. As discussed more in relation to FIG. 47, within this step the method may further develop coefficients that normalize the curve per a reference curve. The reference curve may represent a reference transfer function reflects aggregated parameter data taken from a multitude of previous startups that conform in mode and type and block configuration to the block presently being analyzed. According to other embodiments, the reference curve represents a transfer function derived from simulated startups as simulated via a physics based model of a similarly configured block. Using the reference curve and the derived coefficients, a unique transfer function between the startup parameters of interest may be developed for each particular block, which then may be provided beneficial insights into performance drivers, future startup times and fuel consumption, and benchmarking, as already described. The process may continue to step 1835 where the derived coefficients are stored.

At decision block 1825, the method may determine whether or not steam turbine temperature data is available. If "YES" the steam turbine temperature data is available, then the method may proceed to steps 1840 and 1845. On the other hand, if "NO" the steam turbine temperature data is not available, then the method may proceed to step 1830, which may operate similarly as that described for it above in relation to the gas turbine startup, except in this case the step 1830 operates to establish a relationship between the block non-running time versus block start time. In the cases where the steam turbine temperature data is available, the method proceeds to steps 1840 and 1845 where further data relationships are developed. In the case of step 1840, the method may establish a relationship between the parameters of block non-running time versus steam turbine metal temperature. As provided above in relation to step 1830, this relationship may include deriving coefficients that when applied to a reference transfer function or reference curve represent the block's unique startup performance characteristics. In the case of step 1845, the method may establish a relationship between the parameters of steam turbine metal temperature versus block start time. Again, in establishing this relationship, coefficients may be derived that when applied to a reference transfer function or reference curve represent the block's unique startup performance characteristics. From steps 1840 and 1845, the method may proceed to step 1835 where the derived coefficients are stored for future reference and use. As will be appreciated, the method 1800 may be repeated as other startup data sets are obtained.

Figure 47:
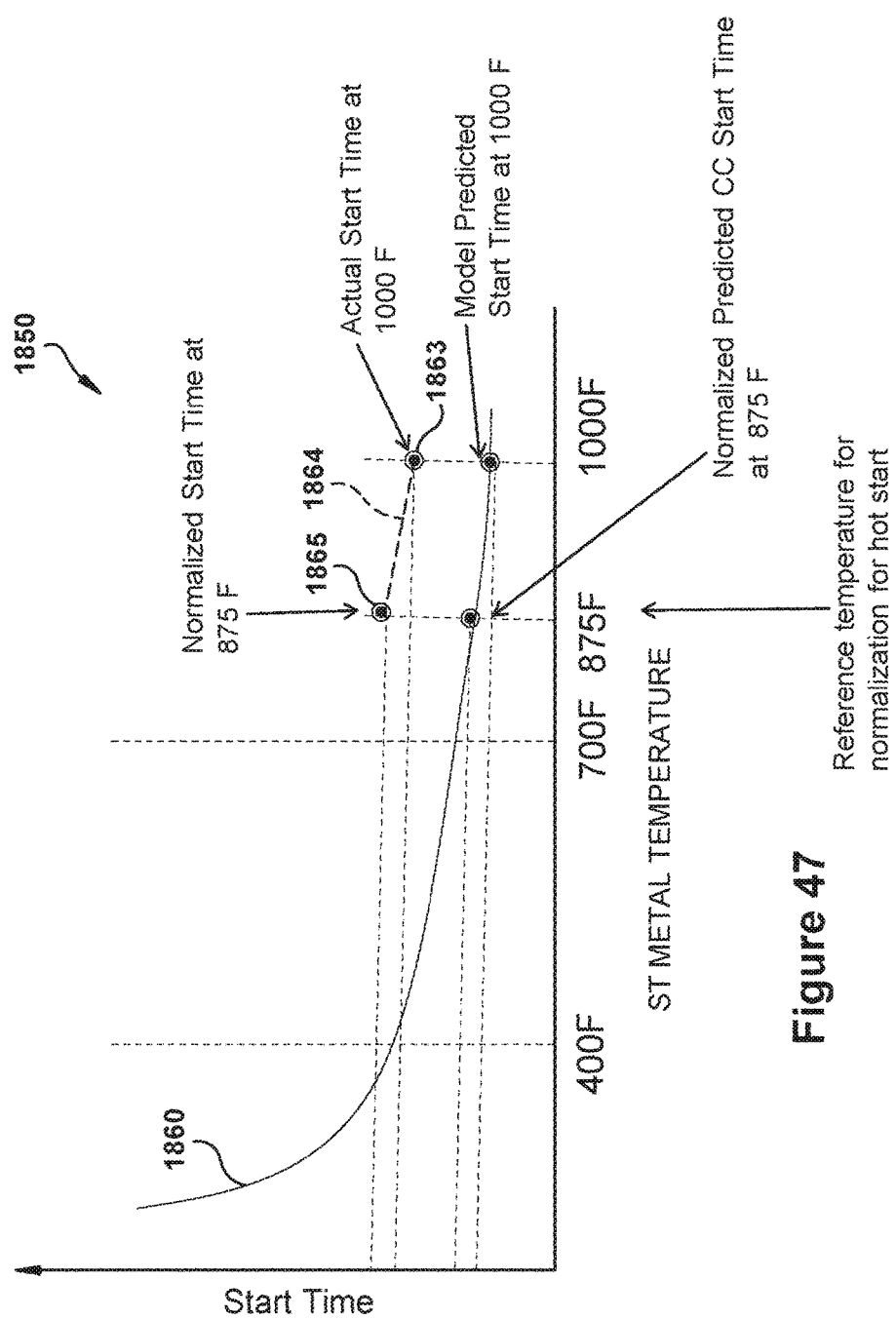
FIG. 47 is a graph showing an exemplary method for normalizing the relationship or curve between relevant startup parameters.

With particular reference now to FIG. 47, a graph 1850 is provided that illustrates an exemplary method, which has been simplified for the sake of illustration, for normalizing the relationship or curve between relevant startup parameters and for deriving the above-referenced coefficients. As shown, in this case, the exemplary curve represents the relationship or transfer function between start time and steam turbine metal temperature. It will be appreciated, though, that the same methodology may be used with other relationships between any of the other relevant startup parameters. As shown, the graph includes a reference curve 1860 which reflects modeled start times over a range of steam turbine metal temperatures. Two points are highlighted on the reference curve 1860, and these include start times at metal temperatures of 875° F. and 1000° F. The graph includes a third point 1863 which is not on the reference curve 1860. The third point 1863 instead reflects startup parameters measured at a particular block. As plotted, this third point 1863 reflects the start time at a measured metal temperature of 1000° F. According to embodiments of the present invention, a second curve 1864 (which is represented partially by the dotted line) may be derived or estimated given: 1) what is known about the reference curve 1860 (i.e., its shape or profile); and 2) the location of the third point 1863 relative to the location of the point on the reference curve 1860 that corresponds to it. As will be appreciated, the second curve 1864, once derived, represents the unique startup characteristics of the particular block from which the data was recorded. Of course, in actuality, the second curve 1864 would be bolstered by many other sets of data. Further, the coefficients referenced above represent those necessary for deriving the second curve 1864 (or the transfer function the second curve 1864 represents) from the reference curve 1860 (or transfer function the reference curve 1860 represents). Finally, as shown, the second curve 1864 includes a fourth point 1865 which represents a prediction by which a start time is estimated for the particular block at a metal temperature of 875° F. As stated, in similar fashion, the present invention may include developing relationships between other startup parameters and developing these for application to specific power blocks. These may include start time versus start fuel consumption, start time versus heat rate, and start time versus start output.

Figure 48:
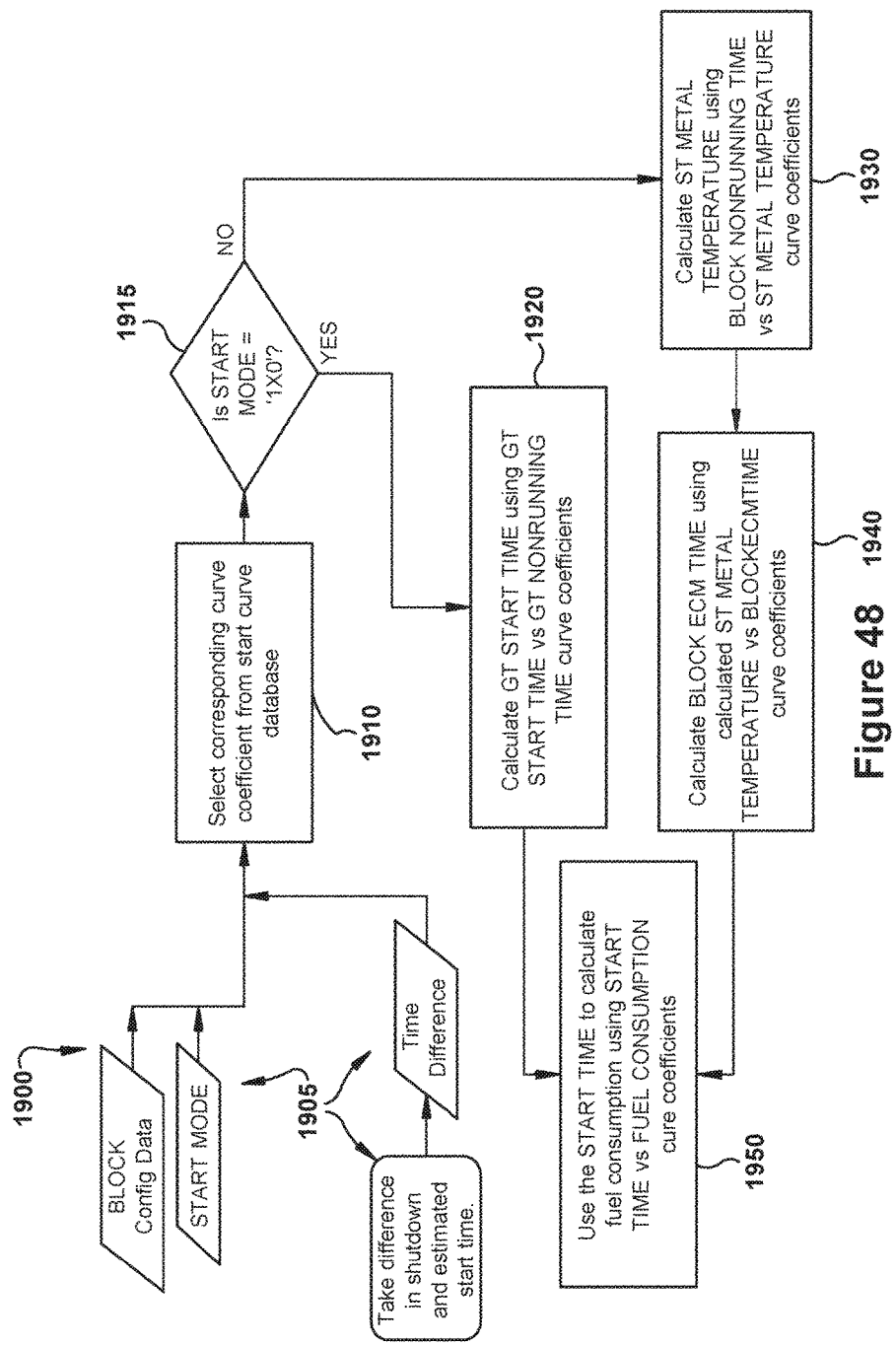
FIG. 48 is an exemplary method illustrating how the developed relationships between startup parameters are used to predict future startup procedures and outcomes.

With particular reference to FIG. 48, a method 1900 is shown in accordance with another exemplary embodiment of the present invention. As will be appreciated, the method 1900 illustrates how the developed relationships between startup parameters, which are described above, may be used to predict future startup procedures. According to initial steps 1905, the method may first acquire information about the upcoming or anticipated startup process. This information, as shown, may include information about the configuration of the particular block as well as the start of mode and type. The information may further include the time of the shutdown as well as the estimated time of the start. Given this initial information, at a step 1910 the method may the corresponding curve or transfer function and the coefficients developed, as described above, for the particular block. As a next step 1915, the method may determine the start mode involves only a gas turbine, i.e., is a 1×0 start. If it is determined that the start does only involve a gas turbine, the process may continue to step 1920 where, using the appropriate curve or transfer function and/or corresponding coefficients, the method may predict the gas turbine start time using the developed relationship between gas turbine start time versus gas turbine non-running time for that particular gas turbine.

If it is determined that the start does not involve only a gas turbine, the process may continue to step 1930 where, using the appropriate curve or transfer function and/or corresponding coefficients, the method may predict steam turbine metal temperature using the developed relationship between block non-running time and steam turbine metal temperature. From there, the method may advance to step 1940 where, using the appropriate curve or transfer function and/or corresponding coefficients, the method may then calculate the block start time using the developed relationship between block start time and steam turbine metal temperature. The method may then proceed to step 1950 where the fuel consumption for the start is predicted. Again, using the appropriate curve or transfer function and/or corresponding coefficients, the method may calculate the start fuel consumption using the developed relationship between block start time and start fuel consumption. In similar fashion, the method may predict start heat rate as well as start output (MWh) via developed relationships between these parameters and start time.

Figure 49:
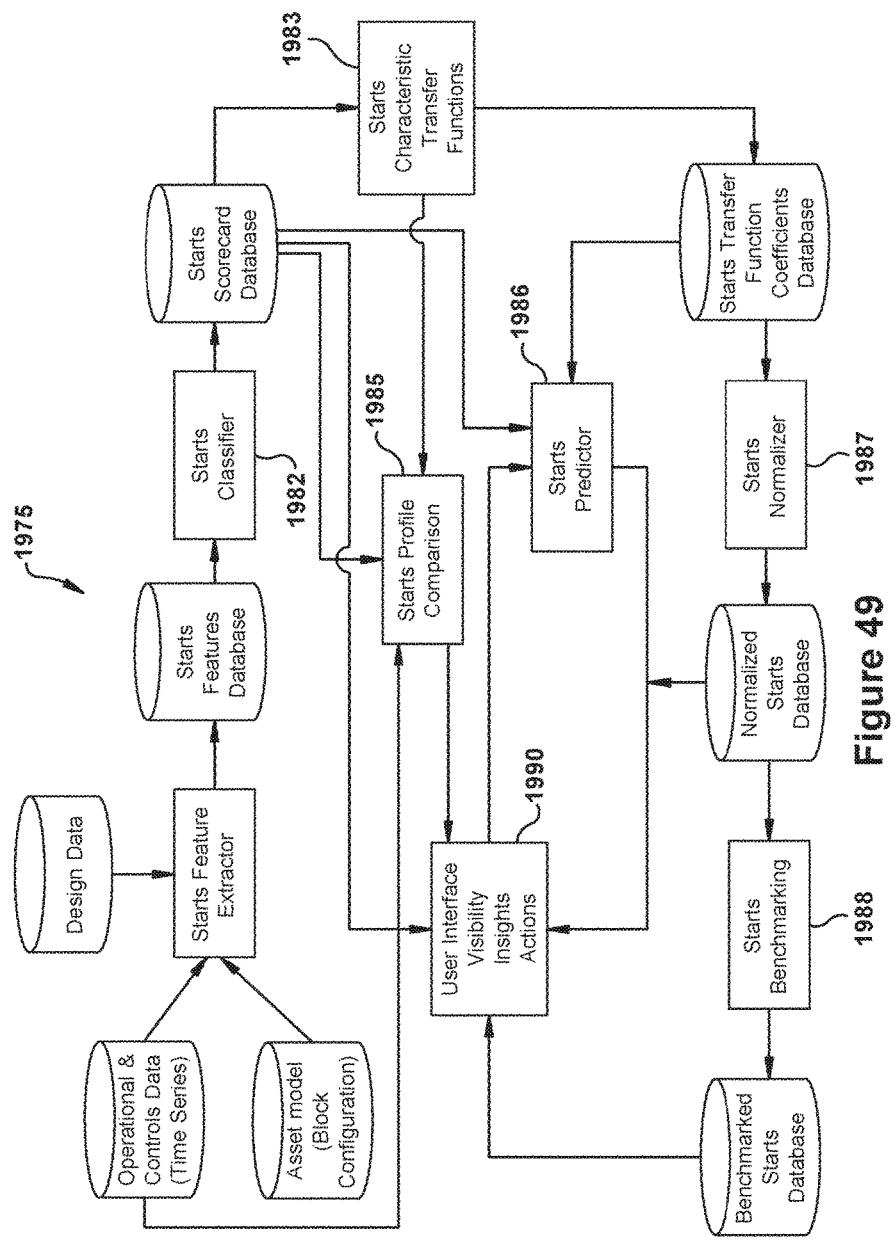
FIG. 49 illustrates an alternative data flow diagram that related to startup optimization in accordance with an alternative embodiment of the present invention.

FIG. 49 discloses an alternative data flow diagram 1975 related to startup optimization. As shown, a starts feature extractor 1980 may collect and extract data related to startup operations taking place at multiple blocks. This data may be classified by a starts classifier 1982 and used to develop the aforementioned transfer functions in a starts characteristic transfer functions module 1983. Using these transfer functions, as described above, the following features may be enabled: a starts profile comparison 1985, a starts predictor 1986, a starts normalizer 1987, and a starts benchmarking 1988. The results may be displayed to a user on a user interface 1990, which may also provide user interactivity with the features.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A method for controlling and enhancing a startup operation for a combined cycle power block (block) having at least one gas turbine and at least one steam turbine, wherein operating parameters define performance and operational characteristics for the startup operation, the method comprising:

sensing and filtering measured operating parameters from startup operations of a plurality of reference blocks, and sensing and filtering measured operating parameters from startup operations of the target block;

receiving the measured operating parameters from the plurality of reference blocks, wherein for each of the plurality of reference blocks, a plurality of types of the startup operations are included;

given the measured operating parameters from the plurality of reference blocks, developing one or more reference transfer functions between two of the measured operating parameters;

receiving measured operating parameters from the startup operation of a target block;

given the measured operating parameters from the target block, developing one or more transfer functions for the target block between two of the operating parameters, wherein each of the transfer functions for the target block corresponds to one of the reference transfer functions;

selecting corresponding ones of the reference transfer functions and the transfer function of the target block;

normalizing the selected transfer function of the target block per the selected reference transfer function;

prompting an input and receiving the input from the operator of the target block, the input regarding the constraints related to the future startup operation, including at least one of: (a) a command from the operator regarding a number of the gas turbines and steam turbines of the block involved in the startup operation; and (b) a command from the operator related to an estimated block non-running time;

communicating at least one operational insight to an operator of the target block based on a value of the coefficients; and basing an outcome to an operational decision for the target block given the at least one operational insight;

wherein the step of normalizing includes calculating coefficients for the transfer function of the target block, the coefficients comprising multipliers for normalizing the transfer function of the target block to the reference transfer function;

wherein the step of communicating the at least one operational insight comprises electronically displaying the operation insight to an operator of the target block, the at least one operational insight comprising information about at least one predicted operating parameter of the startup operation of the target block.

2. The method according to claim 1, wherein the measured operating parameters comprise at least two taken from the list of: a block non-running time; a steam turbine metal temperature; and a block start time;

wherein:
the steam turbine metal temperature comprises a temperature of metal in a bowl section of the steam turbine of the block;
the block non-running time comprises a shutdown period defined between a shutdown of the block and an initiation of the startup operation of the block; and
the block start time comprises a time period defined between the initiation of the startup operation of the block and one of: an emission compliant operating mode for the gas turbine of the block; and inlet pressure control operating mode for the steam turbine of the block.

3. The method according to claim 2, wherein:
the plurality of types of the startup operations includes:
a plurality of groupings based on temperature ranges of the steam turbine at the initiation of the startup operation; and
a plurality of startup modes, each of which indicate a number of gas turbines versus a number of steams turbines involved in the startup operation; and
each of the transfer functions for the target block corresponding to one of the reference transfer functions is defined as corresponding as to the startup type.

4. The method according to claim 3, wherein the plurality of startup modes includes at least a 2×1 startup mode involving 2 gas turbines versus 1 steam turbine; a 1×1 startup mode involving 1 gas turbine versus 1 steam turbine; and 1×0 mode involving 1 gas turbine versus 0 steam turbines.

5. The method according to claim 2, wherein the reference transfer function reflects aggregated measured operating parameters taken from a multitude of previous startup operations according to a particular one of the startup operation type and mode; and
wherein the coefficients reflect unique performance and operational characteristics for the particular one of the startup operation types and modes of the target block as compared against the reference transfer function of the aggregated measured operating parameters.

6. The method according to claim 2, wherein the normalization of the start time suppresses an effect of the steam turbine metal temperature variation on the start time.

7. The method according to claim 2, wherein the at least one operational insight comprises benchmarking the target block against the plurality of reference blocks.

8. The method according to claim 7, wherein the plurality of reference blocks comprises at least one of: a fleet of blocks under common ownership; a fleet of blocks with a defined market; a fleet of blocks manufactured by a single manufacturer.

9. The method according to claim 2, wherein the at least one operational insight comprises predicting future startup operation for the target block.

10. The method according to claim 9, wherein the future startup operation includes estimating a start time for the target block.

11. The method according to claim 10, wherein the future startup operation includes estimating an adjusted start time given a proposed upgrade to the target block, the proposed upgrade comprising a proposed equipment upgrade for the target block that affects the startup operation.

12. The method according to claim 10, wherein the reference transfer functions and the corresponding ones of the transfer functions for the target block each includes at least:
   the block non-running time versus the steam turbine metal temperature; and
   the steam turbine metal temperature versus the block start time.

13. The method according to claim 2, wherein the reference transfer functions and the corresponding one of the transfer functions for the target block each includes the block non-running time versus the block start time.

14. The method according to claim 2, wherein the reference transfer functions and the corresponding one of the transfer functions for the target block each includes the steam turbine metal temperature versus the block start time.

15. The method according to claim 2, wherein the measured operating parameters comprise a start fuel consumption;
   wherein the start fuel consumption is defined as a fuel amount consumed during the start time of the startup operation;
   wherein the reference transfer functions and the corresponding ones of the transfer functions for the target block each includes:
      the block non-running time versus the block start time; and
      the block start time versus the start fuel consumption;
   wherein the at least one operational insight comprises estimating the start fuel consumption for a future startup operation for the target block.

16. The method according to claim 2, wherein the measured operating parameters comprise a start fuel consumption;
   wherein the start fuel consumption is defined as a fuel amount consumed during the start time of the startup operation;
   wherein the reference transfer functions and the corresponding ones of the transfer functions for the target block each includes:
      the block non-running time versus the steam turbine metal temperature;
      the steam turbine metal temperature versus the block start time; and
      the block start time versus the start fuel consumption;
   wherein the at least one operational insight comprises estimating the start fuel consumption for a future startup operation for the target block.

17. The method according to claim 2, wherein the measured operating parameters comprise a gas turbine non-running time and a gas turbine start time;
   wherein:
      the gas turbine non-running time comprises a shutdown period defined between a shutdown of the gas turbine of the block and an initiation of the startup operation of the gas turbine of the block; and
      the gas turbine start time comprises a time period defined between an initiation of the startup operation of the gas turbine of the block and an emission compliant operating mode for the gas turbine of the block; and
   wherein the reference transfer functions and the corresponding one of the transfer functions for the target block each includes the gas turbine non-running time versus the gas turbine start time.

18. The method according to claim 2,
   wherein the filtering comprises at least one of: removing data outliers; determining if a statistical coefficient of determination improves; and determining if a threshold level of data points is available.

19. The method according to claim 2, wherein the measured operating parameters comprise at least one of a start output and start heat rate;
   wherein:
      the start output is defined as an output in megawatt hours for the block produced during the start time of the startup operation;
      the start heat rate is defined as an efficiency for the block during the start time of the startup operation;
   wherein the reference transfer functions and the corresponding ones of the transfer functions for the target block each includes at least one of:
      the start output versus the start time; and
      the start heat rate versus the start time;
   wherein the at least one operational insight comprises estimating at least one of: the start fuel consumption and start output for a future startup operation for the target block; and the start heat rate for the future startup operation for the target block.

* * * * *